United States Patent
Kim et al.

(10) Patent No.: US 11,265,784 B2
(45) Date of Patent: Mar. 1, 2022

(54) METHOD AND APPARATUS FOR SUPPORTING LIGHT CONNECTION IN NEXT GENERATION MOBILE COMMUNICATION SYSTEMS

(71) Applicant: Samsung Electronics Co., Ltd., Gyeonggi-do (KR)

(72) Inventors: Donggun Kim, Seoul (KR); Seungri Jin, Gyeonggi-do (KR); Alexander Sayenko, Seoul (KR); Soenghun Kim, Gyeonggi-do (KR); Gert Jan Van Lieshout, Apeldoorn (NL); Sangkyu Baek, Gyeonggi-do (KR); Jaehyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/012,544

(22) Filed: Sep. 4, 2020

(65) Prior Publication Data
US 2020/0404564 A1 Dec. 24, 2020

Related U.S. Application Data

(63) Continuation of application No. 15/861,129, filed on Jan. 3, 2018, now Pat. No. 10,772,017.

(30) Foreign Application Priority Data

Jan. 3, 2017 (KR) .......................... 10-2017-0000623

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0066* (2013.01); *H04W 72/042* (2013.01); *H04W 72/14* (2013.01); *H04W 74/0833* (2013.01)

(58) Field of Classification Search
CPC ............. H04W 36/08; H04W 36/0066; H04W 72/042; H04W 72/14; H04W 74/0833
See application file for complete search history.

(56) References Cited

U.S. PATENT DOCUMENTS 11,134,535 B2 * 9/2021 Fujishiro ................. H04W 8/02
2005/0041663 A1 2/2005 Jiang
(Continued)

FOREIGN PATENT DOCUMENTS

CN 105898894 8/2016
EP 3 454 623 3/2019

OTHER PUBLICATIONS

Catt, "Discussion on UE mobility in lightly connected mode", R3-162169, TSG RAN WG3 Meeting #93bis, Oct. 10-14, 2016, 4 pages (Year: 2016).*

(Continued)

*Primary Examiner* — Kent Krueger
(74) *Attorney, Agent, or Firm* — The Farrell Law Firm, P.C.

(57) ABSTRACT

Methods and apparatuses are provided in which a first radio resource control (RRC) release message in an RRC connected state is received from a first base station. The first RRC release message includes first information configuring an RRC inactive state and second information associated with a paging area. A system information block 1 (SIB1) in the RRC inactive state is received from a second base station. A cell is identified that does not belong to the paging area based on the SIB1. An RRC resume request message is transmitted to the second base station to resume an RRC connection from the RRC inactive state. The RRC resume request message includes a cause value for updating the paging area. A second RRC release message for the RRC resume request message is received from the second base (Continued)

station. The second RRC release message includes third information associated with an updated paging area.

20 Claims, 75 Drawing Sheets

(51) Int. Cl.
*H04W 74/08* (2009.01)
*H04W 72/14* (2009.01)
*H04W 72/04* (2009.01)

(56) References Cited

U.S. PATENT DOCUMENTS

| | | | |
|---|---|---|---|
| 2011/0028171 | A1 | 2/2011 | Guo et al. |
| 2012/0300752 | A1 | 11/2012 | Kwon |
| 2014/0226621 | A1 | 8/2014 | Choi et al. |
| 2016/0029426 | A1 | 1/2016 | Bangolae et al. |
| 2016/0143059 | A1 | 5/2016 | Jha et al. |
| 2016/0164793 | A1 | 6/2016 | Basu Mallick et al. |
| 2016/0309379 | A1 | 10/2016 | Pelletier et al. |
| 2016/0381611 | A1 | 12/2016 | Uchino |
| 2019/0037420 | A1* | 1/2019 | Fujishiro ............. H04W 52/02 |
| 2019/0261427 | A1 | 8/2019 | Comstock |
| 2020/0029300 | A1* | 1/2020 | Du ..................... H04W 76/27 |

OTHER PUBLICATIONS

European Search Report dated Dec. 1, 2020 issued in counterpart application No. 20195087.0-1212, 7 pages.
Simone Barbera et al., "Synchronized RACH-less Handover Solution for LTE heterogeneous Networks", 2015 International Symposium on Wireless Communication Systems, (ISWCS), Aug. 25-28, 2015, 6 pages.
Samsung, "On Stopping the T304 Timer with the RACH-less Handover", R2-167495, 3GPP TSG-RAN WG2 Meeting #96, Nov. 14-18, 2016, 3 pages.
International Search Report dated Apr. 12, 2018 issued in counterpart application No. PCT/KR2018/000035, 3 pages.
ZTE Corporation, "Introduction of Preallocated Uplink Grant in MAC", R2-169177, 3GPP TSG-RAN2 Meeting #96, Nov. 14-18, 2016, 13 pages.
Zte et al., "CR to Introduce Handover Requirements for Mobility Enhancement", R4-1610878, 3GPP TSG-RAN WG4 Meeting #81, Nov. 14-18, 2016, 10 pages.
European Search Report dated Sep. 10, 2019 issued in counterpart application No. 18736081.3-1214, 10 pages.
Nokia Networks, "Further Discussion on PDCP Discard with Split Bearers", R2-153088, 3GPP TSG-RAN WG2 Meeting #91, Aug. 24-28, 2015, 4 pages.
European Search Report dated Dec. 23, 2021 issued in counterpart application No. 21198705.2-1212, 11 pages.

* cited by examiner

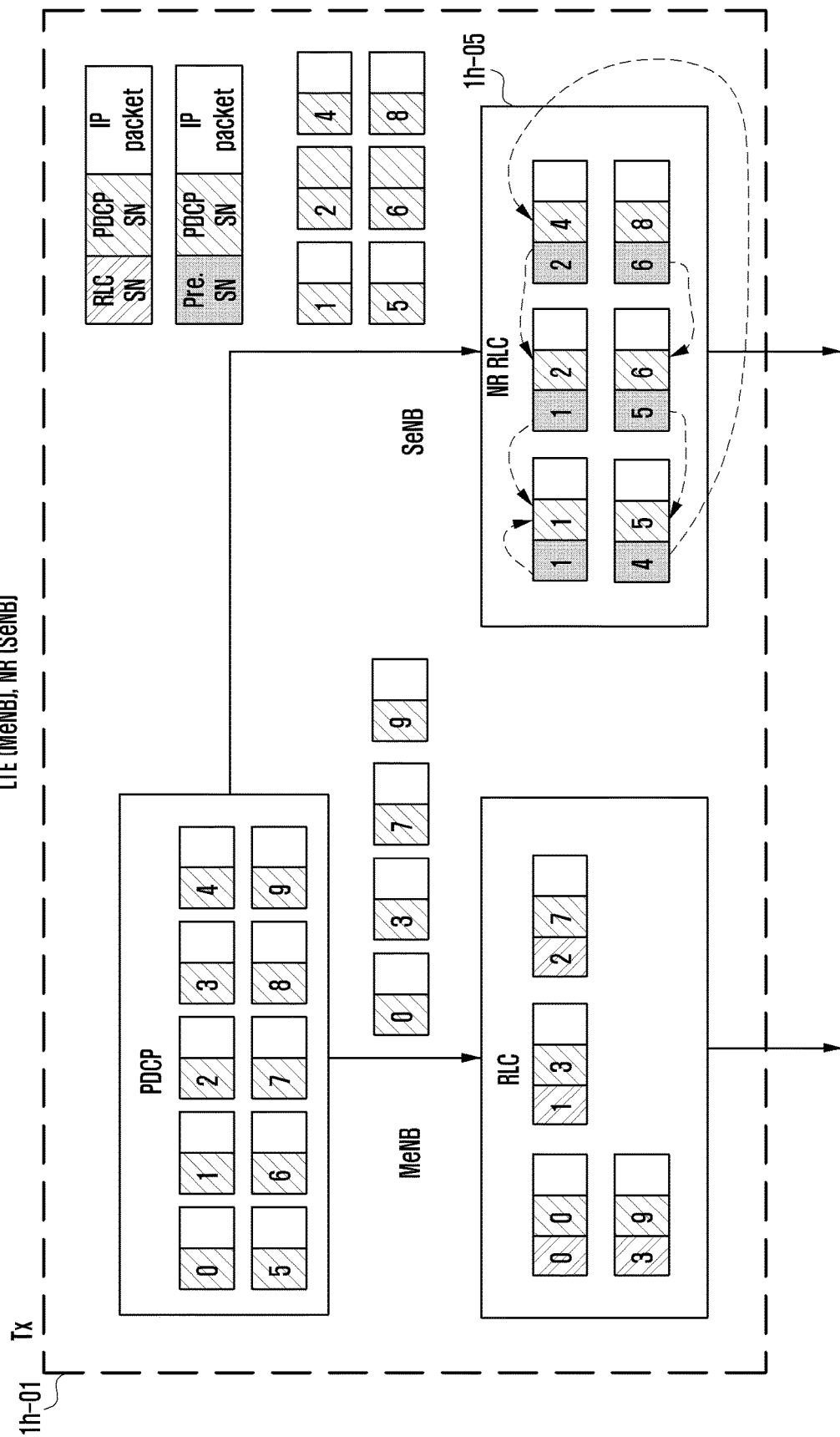

FIG. 2G
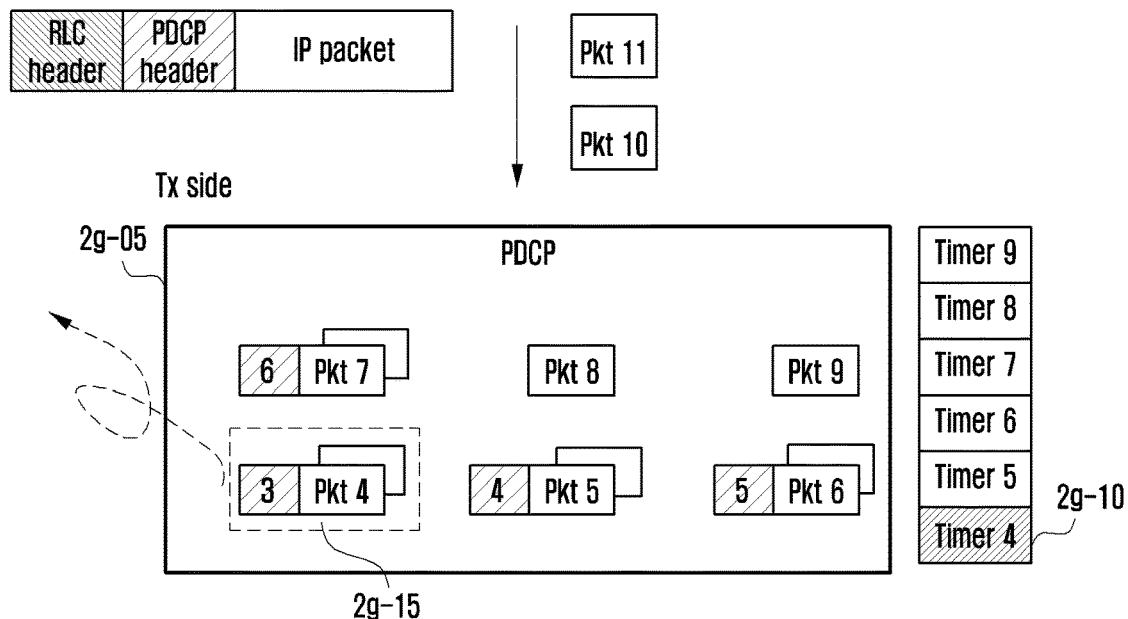
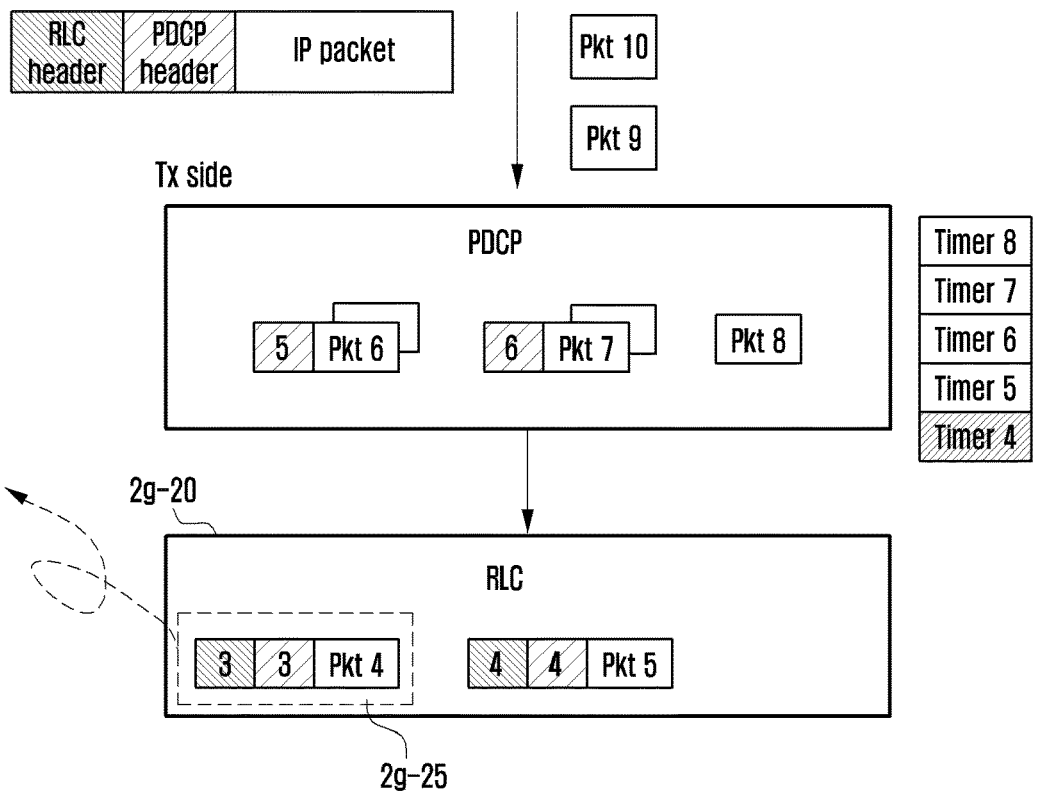

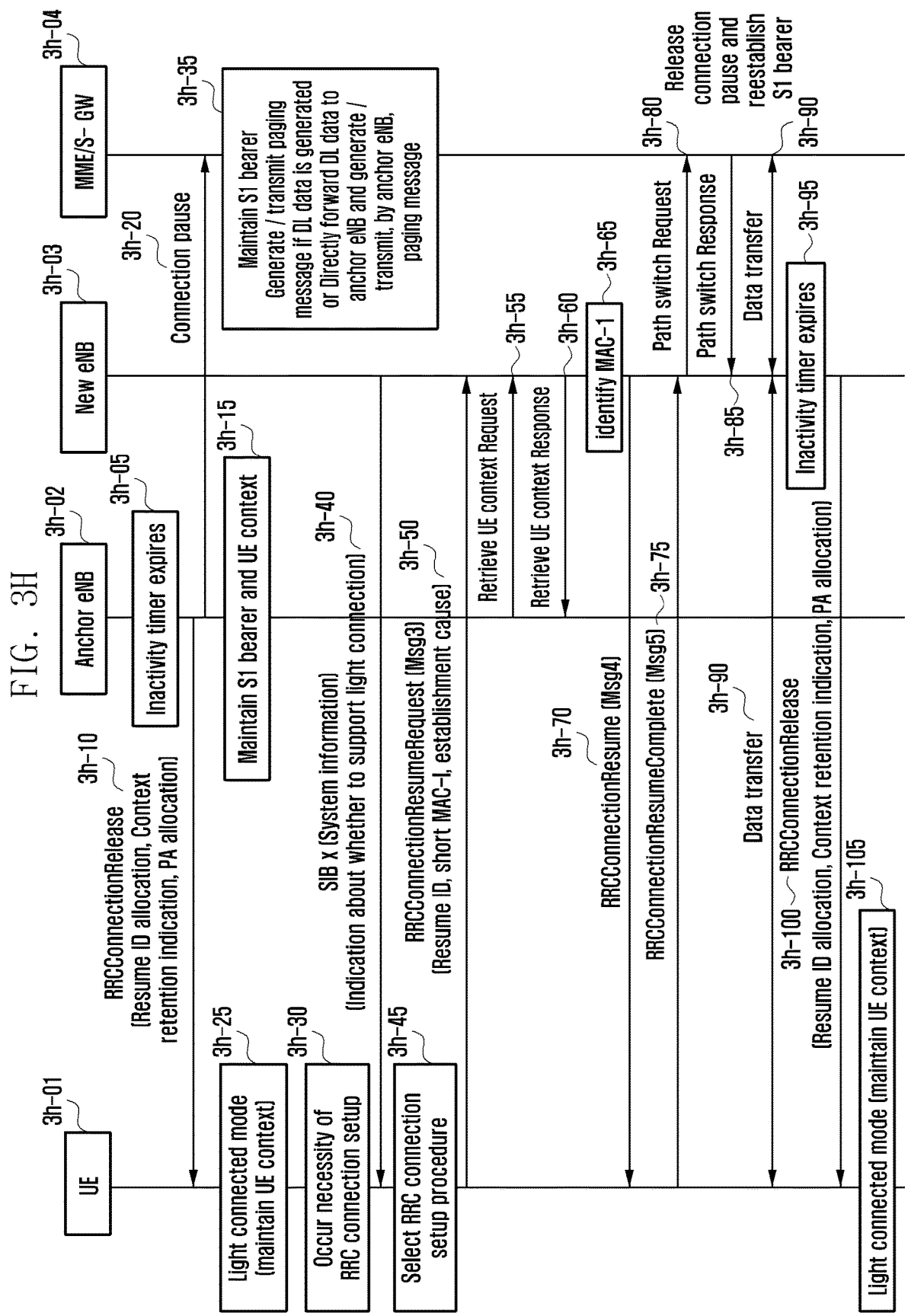

FIG. 5C
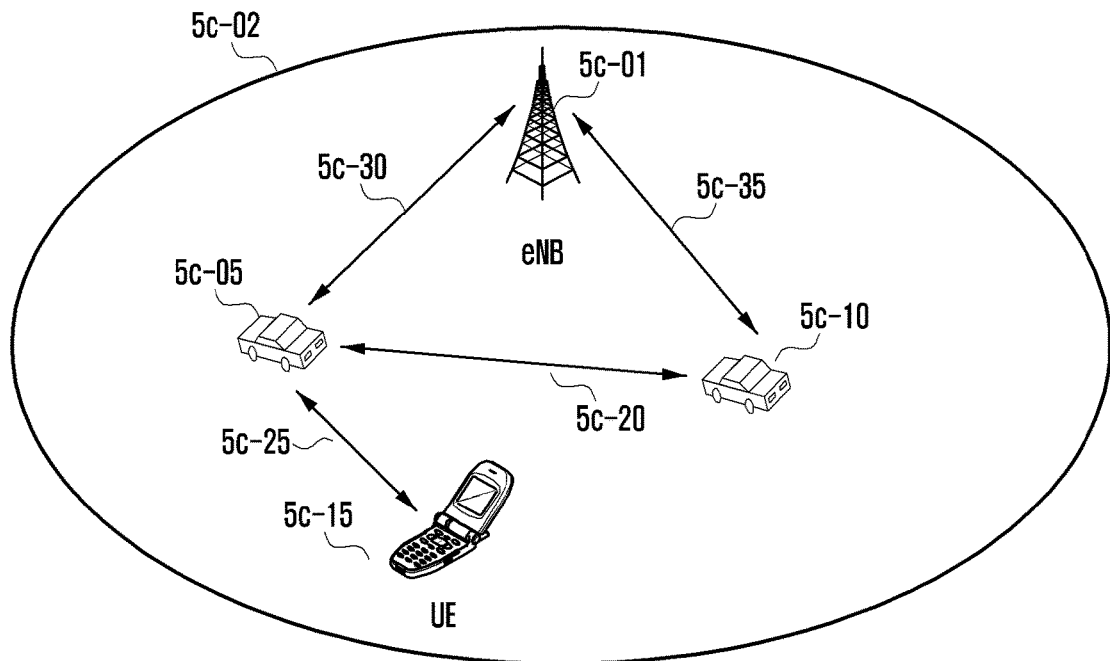
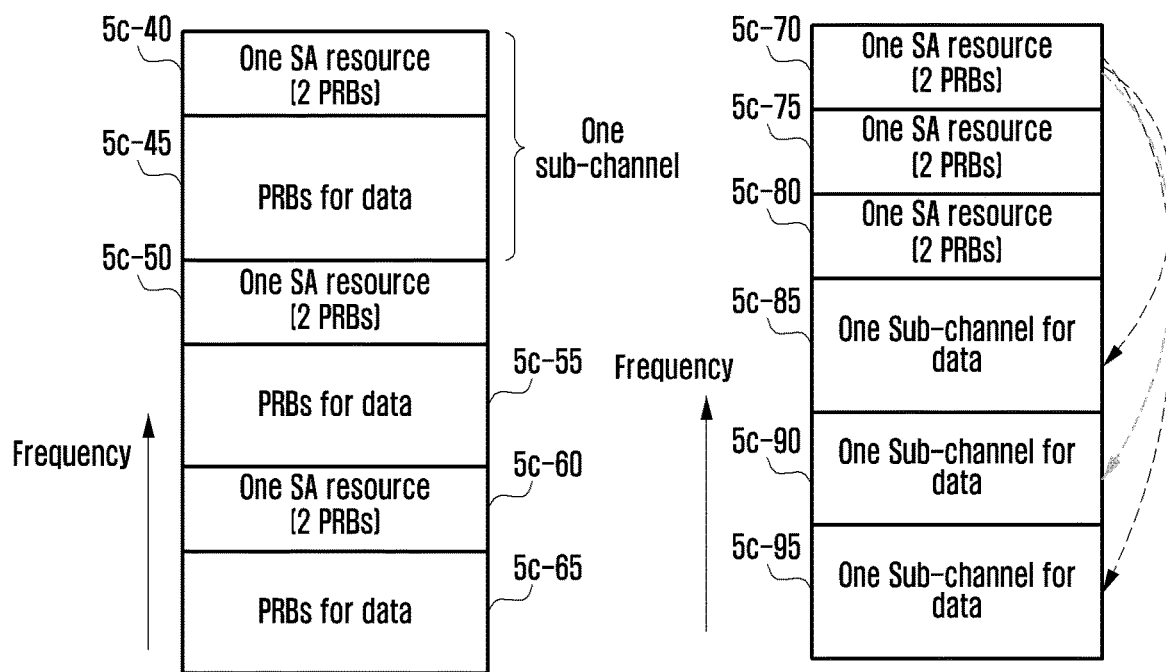

METHOD AND APPARATUS FOR SUPPORTING LIGHT CONNECTION IN NEXT GENERATION MOBILE COMMUNICATION SYSTEMS

PRIORITY

This application is a continuation application of U.S. application Ser. No. 15/861,129, filed in the U.S. Patent and Trademark Office on Jan. 3, 2018, which claims priority under 35 U.S.C. § 119(a) to Korean Patent Application Serial No. 10-2017-0000623, which was filed in the Korean Intellectual Property Office on Jan. 3, 2017, the entire content of which is hereby incorporated herein by reference.

BACKGROUND

1. Field of the Disclosure

The present disclosure relates generally to a method and an apparatus for supporting a multiple access in next generation mobile communication systems, and more particularly, to a method and apparatus for supporting light connection in next generation mobile communication systems.

2. Description of the Related Art

The 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band).

To relieve a path loss of a radio wave and increase a transfer distance of the radio wave in the very high frequency band, in the 5G communication system, beamforming, massive multiple-input and multiple-output (MIMO), full dimensional MIMO (FD-MIMO), array antenna, analog beam-forming, and large scale antenna technologies have been used. To improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a nonorthogonal multiple access (NOMA), and a sparse code multiple access (SCMA) that are an advanced access technology, and so on have been developed.

The Internet has evolved from a human-centered connection network through which a human being generates and consumes information to the Internet of things (IoT) network that transmits/receives information between distributed components such as things and processes the information. The Internet of everything (IoE) technology in which big data processing technology is combined with the IoT technology by connection with a cloud server has also emerged. To implement the IoT, technology elements, such as a sensing technology, wired and wireless communication and network infrastructure, a service interface technology, and a security technology, have been used. Recently, technologies such as a sensor network, machine to machine (M2M), and machine type communication (MTC) for connecting between things have been used. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced health-care service, by fusing and combining the existing information technology with various industries.

Therefore, 5G communication systems has been applied to the IoT network. The 5G communication technologies, such as the sensor network, the M2M, and the MTC, have been used by techniques such as the beamforming, the MIMO, and the array antenna. The application of the cloud RAN as the big data processing technology described above may also be used for combining the 5G communication technology with the IoT technology.

In the next generation mobile communication systems, when a terminal using a light connection releases a connection with a network and tries to reconnect with the network after a predetermined time, there is a need to identify a base station (or cell) that supports the light connection and a base station (or cell) that does not support the light connection. When the light connection to the base station (or cell) that does not support the light connection is resumed, a normal connection cannot be established.

SUMMARY

In the next generation mobile communication systems, if only one sequence number (SN) is used, it is possible to reduce overhead upon supporting a single connection. However, it is impossible to support a multiple access with one SN. Therefore, a new mechanism needs to be added. Accordingly, an aspect of the present disclosure provides a gap encoding method, and a radio link control (RLC) status reporting method that supports a loss of a large number of packets.

In the next generation mobile communication systems, when the expiration date of the data packet expires, processing the expired packet is an important issue. The expired packet may already be a packet data convergence protocol (PDCP) protocol data unit (PDU), or may be an RLC PDU or a media access control (MAC) PDU. That is, functions of each layer may be affected depending on how to process the expired packet. Accordingly, an aspect of the present disclosure provides different processing methods depending on an extent that the expired packet is processed.

Accordingly, an aspect of the present disclosure provides a method for enabling a terminal to identify whether or not to support a light connection and establish a connection by broadcasting system information as to whether each base station supports a light connection in next generation mobile communication systems.

In the current LTE system, when a terminal performs a handover (HO), the terminal performs synchronization based on a random access procedure to a target cell, and receives an uplink grant to complete a handover procedure. If a handover without a random access procedure is introduced to reduce the influence of time interference in the handover procedure, there is no way to inform the successful completion of the handover procedure. Accordingly, an aspect of the present disclosure provides a method for determining successful completion of a handover with a target cell when a terminal performs handover without a random access.

When an LTE terminal supporting vehicle to everything (V2X) has a limited RF chain, there is a problem as to which link should be selected if an uplink transmission link to a base station and a side link transmission between the V2X terminals are generated at the same time. Accordingly, an aspect of the present disclosure provides a clear priority and operation principle of an uplink transmission link to a base station for an LTE terminal supporting V2X and a side link transmission between V2X terminals.

In accordance with an aspect of the present disclosure, a method performed by a terminal in a wireless communication system is provided. A first radio resource control (RRC) release message in an RRC connected state is received from a first base station. The first RRC release message includes first information configuring an RRC inactive state and second information associated with a paging area. A system information block 1 (SIB1) in the RRC inactive state is received from a second base station. A cell is identified that does not belong to the paging area based on the SIB1. An RRC resume request message is transmitted to the second base station to resume an RRC connection from the RRC inactive state. The RRC resume request message includes a cause value for updating the paging area. A second RRC release message for the RRC resume request message is received from the second base station. The second RRC release message includes third information associated with an updated paging area.

In accordance with an aspect of the present disclosure, a method performed by a second base station in a wireless communication system is provided. An SIB1 is transmitted to a terminal in an RRC inactive state and configured with a paging area. An RRC resume request message is received from the terminal to resume an RRC connection from the RRC inactive state. The RRC resume request message includes a cause value for updating the paging area in case that a cell does not belong to the paging area. An RRC release message for the RRC resume request message is transmitted to the terminal. The RRC release message includes first information associated with an updated paging area.

In accordance with an aspect of the present disclosure, a terminal is provided in a wireless communication system. The terminal includes a transceiver configured to transmit and receive a signal, and a controller. The controller is configured to receive, from a first base station, a first RRC release message in an RRC connected state. The first RRC release message includes first information configuring an RRC inactive state and second information associated with a paging area. The controller is also configured to receive, from a second base station, a SIB1 in the RRC inactive state, and identify a cell that does not belong to the paging area based on the SIB1. The controller is also configured to transmit, to the second base station, an RRC resume request message to resume an RRC connection from the RRC inactive state. The RRC resume request message includes a cause value for updating the paging area. The controller is further configured to receive, from the second base station, a second RRC release message for the RRC resume request message. The second RRC release message includes third information associated with an updated paging area.

In accordance with an aspect of the present disclosure, a second base station is provided in a wireless communication system. The second base station includes a transceiver configured to transmit and receive a signal, and a controller. The controller is configured to transmit, to a terminal in an RRC inactive state and configured with a paging area, a SIB1. The controller is also configured to receive, from the terminal, an RRC resume request message to resume an RRC connection from the RRC inactive state. The RRC resume request message includes a cause value for updating the paging area in case that a cell does not belong to the paging area. The controller is further configured to transmit, to the terminal, an RRC release message for the RRC resume request message. The RRC release message includes first information associated with an updated paging area.

BRIEF DESCRIPTION OF THE DRAWINGS

The above and other aspects, features, and advantages of the present disclosure will be more apparent from the following detailed description, taken in conjunction with the accompanying drawings, in which:

FIG. 1H is a diagram of a multiple access that is supported by one SN, according to an embodiment of the present disclosure;

FIG. 1O is a diagram of an RLC status reporting method, according to an embodiment of the present disclosure;

FIG. 2G is a diagram of a timer (e.g., PDCP discard timer) maintained at a PDCP layer, according to an embodiment of the present disclosure;

FIG. 2O is a block diagram of an internal structure of the terminal, according to an embodiment of the present disclosure;

FIG. 3H is a diagram of a light connection procedure of a terminal and a base station for supporting a light connection in a next generation mobile communication system, according to an embodiment of the present disclosure;

FIG. 3O is a block diagram of a base station transceiver, according to an embodiment of the present disclosure;

FIG. 5C is a diagram of a V2X communication within a cellular system, according to an embodiment of the present disclosure;

DETAILED DESCRIPTION

Figure 1A:
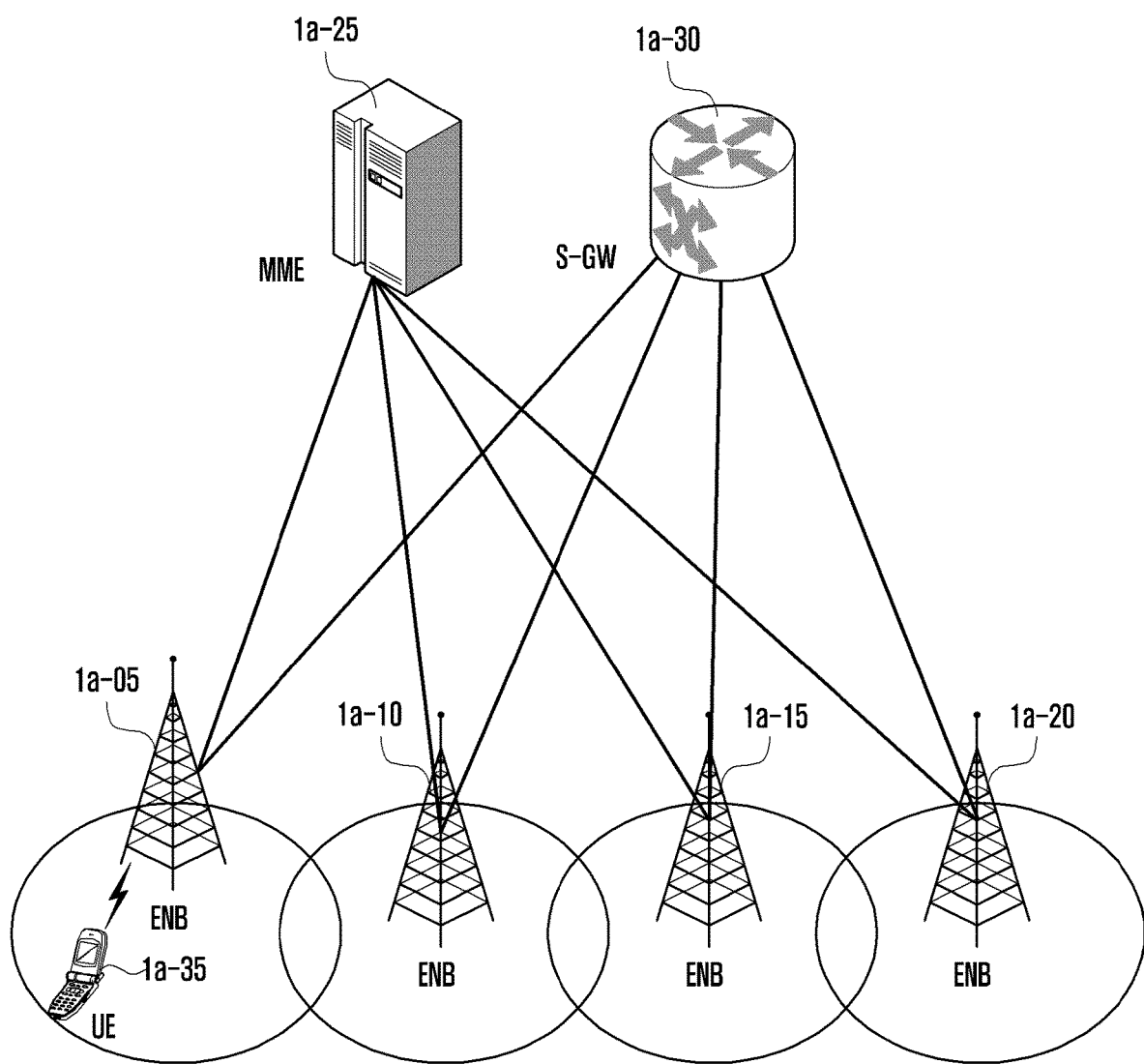
FIG. 1A is a diagram of a long term evolution (LTE) system, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

The present disclosure discloses a method of a terminal including identifying missed RLC PDUs based on a SN of a plurality of RLC PDUs received from a base station; generating a message including a first field indicating the number of missed RLC PDUs and a second field indicating whether there is the first field; and transmitting a message from the base station.

The present disclosure discloses a method of a base station including transmitting a plurality of RLC PDUs to a terminal; and receiving, from the terminal, a message including a first field indicating the number of missed RLC PDUs among the plurality of RLC PDUs and a second field indicating whether there is the first field.

The present disclosure discloses a terminal including a transceiver configured to transmit/receive a signal; and a controller configured to identify missed RLC PDUs based on a SN of a plurality of RLC PDUs received from a base station, generate a message including a first field indicating the number of missed RLC PDUs and a second field indicating whether there is the first field, and transmit the message to the base station.

The present disclosure discloses a base station including a transceiver configured to transmit/receive a signal; and a controller configured to transmit a plurality of RLC PDUs to a terminal and receive, from a terminal, a message including a first field indicating the number of missed RLC PDUs among the plurality of RLC PDUs and a second field indicating whether there is the first field.

The present disclosure discloses a method of a terminal including receiving a PDCP service data unit (SDU) in PDCP entity; generating a PDCP PDU including a PDCP header for the PDCP SDU if a timer corresponding to the PDCP SDU expires; and transmitting the PDCP PDU to a base station.

The present disclosure discloses a method of a base station including receiving a PDCP PDU from a terminal; identifying whether the PDCP PDU includes only a PDCP header; and performing decoding on the PDCP PDU based on whether the PDCP PDU includes only the PDCP header, wherein if the PDCP PDU includes only the PDCP header, the decoding on the PDCP PDU may be omitted.

The present disclosure discloses a terminal including a transceiver configured to transmit/receive a signal, and a controller configured to receive a PDCP SDU in PDCP entity, generate a PDCP PDU including a PDCP header for the PDCP SDU if a timer corresponding to the PDCP SDU expires, and transmit the PDCP PDU to a base station.

The present disclosure discloses a method of a base station including a transceiver configured to transmit/receive a signal and a controller configured to receive a PDCP PDU from a terminal, identify whether the PDCP PDU includes only a PDCP header, and perform decoding on the PDCP PDU based on whether the PDCP PDU includes only the PDCP header, wherein if the PDCP PDU includes only the PDCP header, the decoding on the PDCP PDU may be omitted.

The present disclosure discloses a method of a terminal including receiving, from a base station, information indicating whether the base station supports an RRC inactive mode; and transmitting a message requesting a PAU to the base station when the base station supports the RRC inactive mode.

The present disclosure discloses a method of a base station including transmitting information indicating whether the base station supports an RRC inactive mode to a terminal which is an RRC connected mode; and receiving a message requesting a paging area update from the terminal when the base station supports the RRC inactive mode.

The present disclosure discloses a terminal including a transceiver configured to transmit/receive a signal; and a controller configured to receive, from a base station, information indicating whether the base station supports an RRC inactive mode and transmit a message requesting a paging area update to the base station if the base station supports the RRC inactive mode.

The present disclosure discloses a base station including a transceiver configured to transmit/receive a signal; and a controller configured to receive, from a base station, information indicating whether the base station supports an RRC inactive mode to a terminal which is an RRC connected mode, and receive a message requesting a paging area update from a terminal if the base station supports the RRC inactive mode.

The present disclosure discloses a method of a terminal including receiving, from a source base station, a message indicating a handover without random access from the source base station to a target base station; receiving, on a downlink control channel from the target base station, an uplink grant for the handover without random access; and transmitting, to the target base station, a message indicating a completion of the handover without random access based on the uplink grant.

The present disclosure discloses a method of a base station including receiving, from a source base station, a message to request a handover without random access for a terminal; transmitting, on a downlink control channel to the terminal, an uplink grant for the handover without random access; and receiving, from the terminal, a message indicating a completion of the handover without random access based on the uplink grant.

The present disclosure discloses a terminal including a transceiver configured to transmit and receive signals; and a controller coupled with the transceiver and configured to control the transceiver to receive, from a source base station, a message indicating a handover without random access from the source base station to a target base station, receive, on a downlink control channel from the target base station, an uplink grant for the handover without random access, and transmit, to the target base station, a message indicating a completion of the handover without random access based on the uplink grant.

The present disclosure discloses a base station including a transceiver configured to transmit and receive signals; and a controller coupled with the transceiver and configured to control the transceiver to receive, from a source base station, a message to request a handover without random access for a terminal, transmit, on a downlink control channel to the terminal, an uplink grant for the handover without random access, and receive, from the terminal, a message indicating a completion of the handover without random access based on the uplink grant.

The present disclosure discloses a method of a terminal including identifying a generation of an uplink data to be transmitted to a base station and a generation of a side link data to be transmitted to an opponent terminal of device to device (D2D) communication; determining that the uplink data or the side link data are transmitted if the transmission of the uplink data and the transmission of the side link data overlap with each other; and transmitting determined data among the side link data.

The present disclosure discloses a terminal including a transceiver configured to transmit/receive a signal; a controller configured to identify a generation of an uplink data to be transmitted to a base station and a generation of a side link data to be transmitted to an opponent terminal of D2D communication; determine that the uplink data or the side link data are transmitted if the transmission of the uplink data and the transmission of the side link data overlap with each other; and transmit determined data among the side link data.

According to an aspect of the present disclosure, the overhead can be reduced by proposing the gap encoding method supporting multiple accesses with one SN, and when a large number of packets are lost, the new RLC status report method can be applied to reduce the overhead.

According to an aspect of the present disclosure, there is an effect of preventing a problem from occurring in each layer by proposing different processing methods depending on to what extent the expired packet is processed when the expired packet is processed.

According to an aspect of the present disclosure, the terminal to which the light connection is applied confirms whether the light connection is supported by the base station (or cell) which can be currently connected to system information and tries to establish the connection.

According to an aspect of the present disclosure, the method for determining a completion of successful handover with a target cell is defined when the terminal performs handover without the random access, thereby completing the handover without affecting the time interference in the handover procedure.

According to an aspect of the present disclosure, there is an effect of clarifying how to operate when the transmission of different links is generated at the same time by proposing the clear prioritization and operation principle of the uplink and downlink transmission link to the base station for the LTE terminal supporting the V2X and the side link between the V2X terminals.

Hereinafter, for convenience of explanation, the present disclosure uses terms and names defined in the 3rd generation partnership project long term evolution (3GPP LTE). However, the present disclosure is not limited to these terms and names but may also be identically applied to the system according to other standards.

FIG. 1A is a diagram of an LTE system, according to an embodiment of the present disclosure.

As illustrated in FIG. 1A, a RAN of an LTE system is configured to include next generation base stations (evolved node B, hereinafter, ENB, Node B, or base station) 1a-05, 1a-10, 1a-15, and 1a-20, an MME 1a-25, and an S-GW 1a-30. User equipment (hereinafter, UE or terminal) 1a-35 accesses an external network through the ENBs 1a-05 to 1a-20 and the S-GW 1a-30.

In FIG. 1A, the ENBs 1a-05 to 1a-20 correspond to an existing node B of the universal mobile telecommunications system (UMTS). The ENB is connected to the UE 1a-35 through a radio channel and performs a more complicated role than an existing node B. In the LTE system, in addition to a real-time service like a voice over internet protocol (VoIP) through the Internet protocol, all the user traffics are served through a shared channel, and therefore an apparatus for collecting and scheduling status information such as a buffer status, an available transmission power status, and a channel state of the terminals is required. Here, the ENBs 1a-05 to 1a-20 control collecting and scheduling status information. One ENB generally controls a plurality of cells. For example, to implement a transmission rate of 100 Mbps, the LTE system uses, as a radio access technology (RAT), orthogonal frequency division multiplexing (OFDM) in, for example, a bandwidth of 20 MHz. Further, an adaptive modulation & coding (AMC) scheme for determining a modulation scheme and a channel coding rate depending on a channel status of the terminal is applied. The S-GW 1a-30 is an apparatus for providing a data bearer and generates or removes the data bearer according to the control of the MME 1a-25. The MME is an apparatus for performing a mobility management function for the terminal and various control functions and is connected to a plurality of base stations.

Figure 1B:
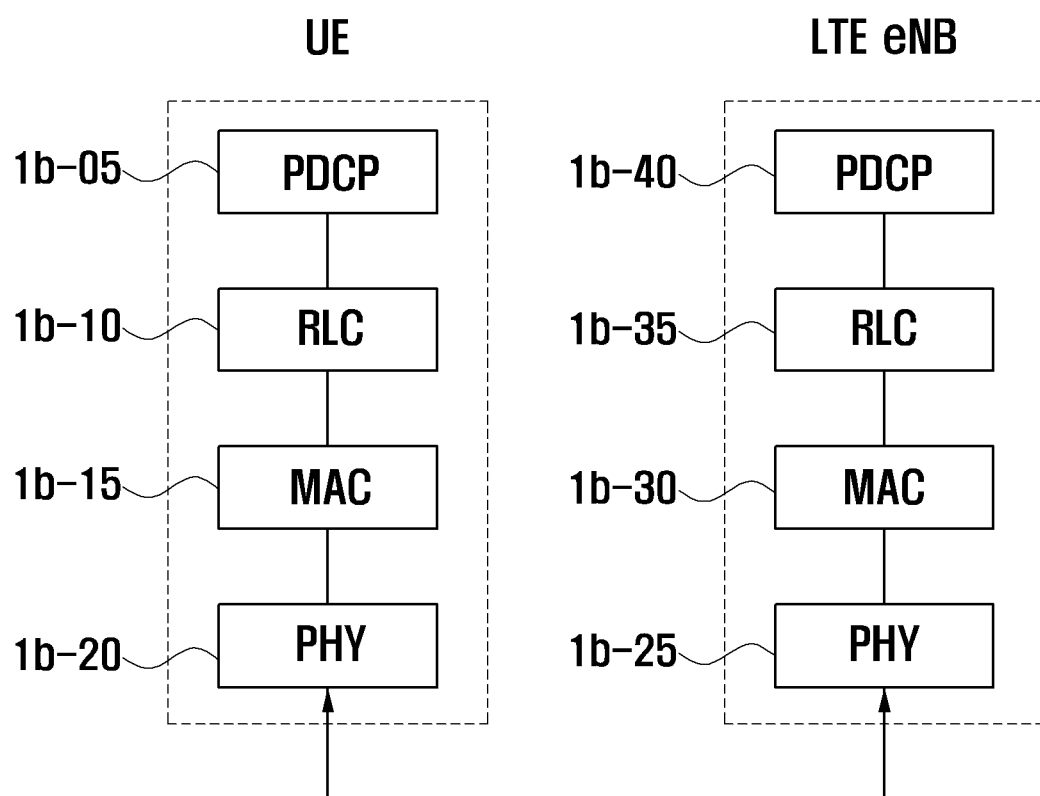
FIG. 1B is a diagram of a radio protocol structure in the LTE system, according to an embodiment of the present disclosure.

FIG. 1B is a diagram of a radio protocol structure in the LTE system.

Referring to FIG. 1B, the radio protocol of the LTE system is configured to include PDCPs 1b-05 and 1b-40, RLCs 1b-10 and 1b-35, and MACs 1b-15 and 1b-30 in the terminal and the ENB. The PDCPs 1b-05 and 1b-40 control operations such as internet provider (IP) header compression/decompression. The main functions of the PDCP are summarized as follows.

Header compression and decompression function (Header compression and decompression: robust header compression (ROHC) only)

Transfer of user data

In-sequence delivery function (In-sequence delivery of upper layer PDUs at PDCP re-establishment procedure for RLC acknowledgement mode (AM))

Reordering function (For split bearers in dual connectivity (DC) (only support for RLC AM): PDCP PDU routing for transmission and PDCP PDU reordering for reception)

Duplicate detection function (Duplicate detection of lower layer service data unit (SDU)s at PDCP re-establishment procedure for RLC AM)

Retransmission function (Retransmission of PDCP SDUs at handover (HO) and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 1b-10 and 1b-35 reconfigures the PDCP PDU to an appropriate size to perform the automatic repeat request (ARQ) operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for unacknowledged mode (UM) and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 1b-15 and 1b-30 are connected to several RLC layer apparatuses configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

Hybrid automatic repeat request (HARQ) function (Error correction through HARQ)

Priority handling function between logical channels (Priority handling between logical channels of one UE)

Priority handling function between terminals (Priority handling between UEs by dynamic scheduling)

Multimedia broadcast multicast service (MBMS) identification function (MBMS identification)

Transport format selection function (Transport format selection)

Padding function (Padding)

Physical layers 1b-20 and 1b-25 perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 1C:
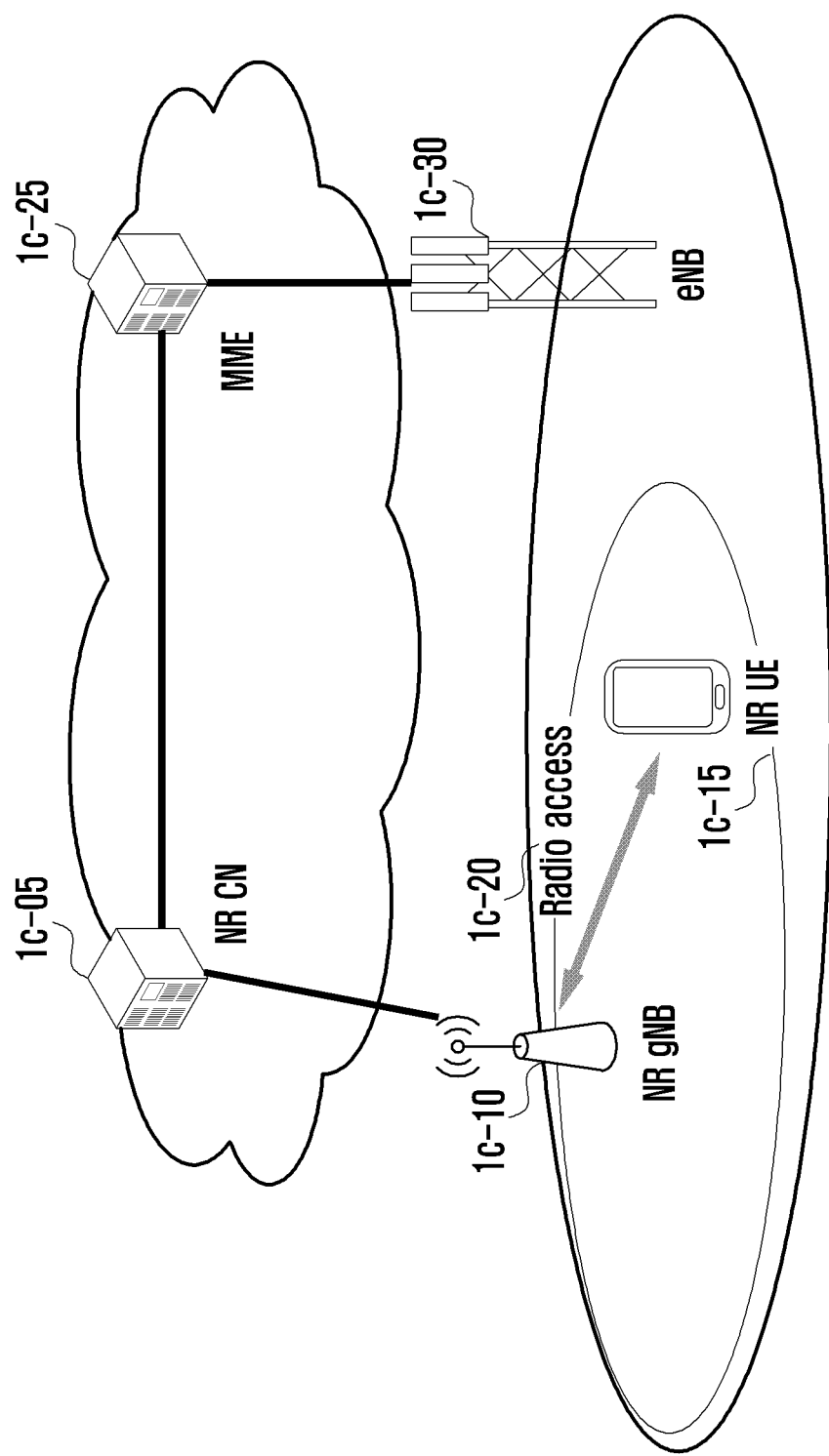
FIG. 1C is a diagram of a structure of a next generation mobile communication system, according to an embodiment of the present disclosure.

FIG. 1C is a diagram of a next generation mobile communication system, according to an embodiment of the present disclosure.

Referring to FIG. 1C, a RAN of a next generation mobile communication system (hereinafter referred to as new radio (NR) or 5G) is configured to include a next generation base station (NR node B, hereinafter NR gNB or NR base station) 1c-10 and a NR core network (NR CN) 1c-05. The user terminal (NR UE or UE) 1c-15 accesses the external network through the NR gNB 1c-10 and the NR CN 1c-05.

In FIG. 1C, the NR gNB c-10 corresponds to an eNB of the existing LTE system. The NR gNB is connected to the NR UE 1c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 1c-10 may serve as the device. One NR gNB generally controls a plurality of cells. In order to realize high-speed data transmission compared with the current LTE, the NR gNB may have an existing maximum bandwidth, and may be additionally incorporated into a beam-forming technology and may be applied by using OFDM as a radio access technology. Further, an AMC scheme determining a modulation scheme and a channel coding rate depending on a channel status of the terminal is applied. The NR CN 1c-05 may perform functions such as mobility support, bearer setup, quality of service (QoS) setup, and the like. The NR CN 1c-05 is a device for performing a mobility management function for the terminal and various control functions and is connected to a plurality of base stations. In addition, the next generation mobile communication system can interwork with the existing LTE system, and the NR CN 1c-05 is connected to the MME 1c-25 through the network interface. The MME is connected to the eNB 1c-30 which is the existing base station.

Figure 1D:
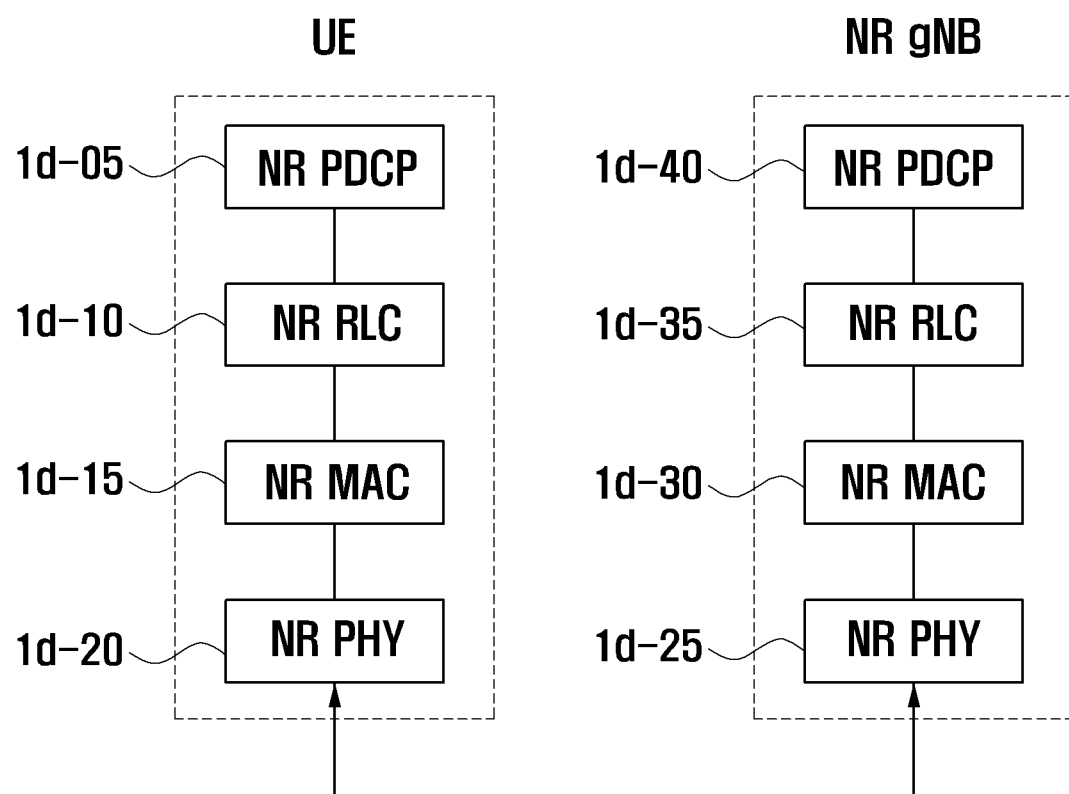
FIG. 1D is a diagram of a radio protocol structure of a next generation mobile communication system proposed in the present disclosure, according to an embodiment of the present disclosure.

FIG. 1D is a diagram of a radio protocol structure of a next generation mobile communication system, according to an embodiment of the present disclosure.

Referring to FIG. 1D, the radio protocol of the next generation mobile communication system is configured to include NR PDCPs 1d-05 and 1d-40, NR RLCs 1d-10 and 1d-35, and NR MACs 1d-15 and 1d-30 in the terminal and the NR base station. The main functions of the NR PDCPs 1d-05 and 1d-40 may include some of the following functions.

Header compression and decompression function (Header compression and decompression: ROHC only)

Transfer of user data

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

The reordering function of the NR PDCP apparatus is for rearranging PDCP PDUs received in a lower layer in order based on a PDCP SN and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 1d-10 and 1d-35 may include some of the following functions.

Data transfer function (Transfer of upper layer PDUs)
In-sequence delivery function (In-sequence delivery of upper layer PDUs)
Out-of-sequence delivery function (Out-of-sequence delivery of upper layer PDUs)
ARQ function (Error correction through HARQ)
Concatenation, segmentation, reassembly function (Concatenation, segmentation and reassembly of RLC SDUs)
Re-segmentation function (Re-segmentation of RLC data PDUs)
Reordering function (Reordering of RLC data PDUs)
Duplicate detection function (Duplicate detection)
Error detection function (Protocol error detection)
RLC SDU discard function (RLC SDU discard)
RLC re-establishment function (RLC re-establishment)

The in-sequence delivery function of the NR RLC apparatus is for delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC SN or the PDCP SN, a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received to the higher layer in order if the predetermined timer expires even if there is the lost RLC SDU.

The out-of-sequence delivery function of the NR RLC apparatus is for directly delivering the RLC SDUs received from the lower layer to the higher layer regardless of order, and may include a function of reassembling and transferring an original RLC SDU which is divided into several RLC SDUs and received, and a function of storing the RLC SN or the PDCP SP of the received RLC PDUs and arranging it in order to record the lost RLC PDUs.

The NR MACs 1d-15 and 1d-30 may be connected to several NR RLC layer apparatuses configured in one terminal, and the main functions of the NR MAC may include some of the following functions.

Mapping function (Mapping between logical channels and transport channels)
Multiplexing and demultiplexing function (Multiplexing/demultiplexing of MAC SDUs)
Scheduling information reporting function (Scheduling information reporting)
HARQ function (Error correction through HARQ)
Priority handling function between logical channels (Priority handling between logical channels of one UE)
Priority handling function between terminals (Priority handling between UEs by dynamic scheduling)
MBMS service identification function (MBMS service identification)
Transport format selection function (Transport format selection)
Padding function (Padding)

The NR PHY layers 1d-20 and 1d-25 may perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 1E:
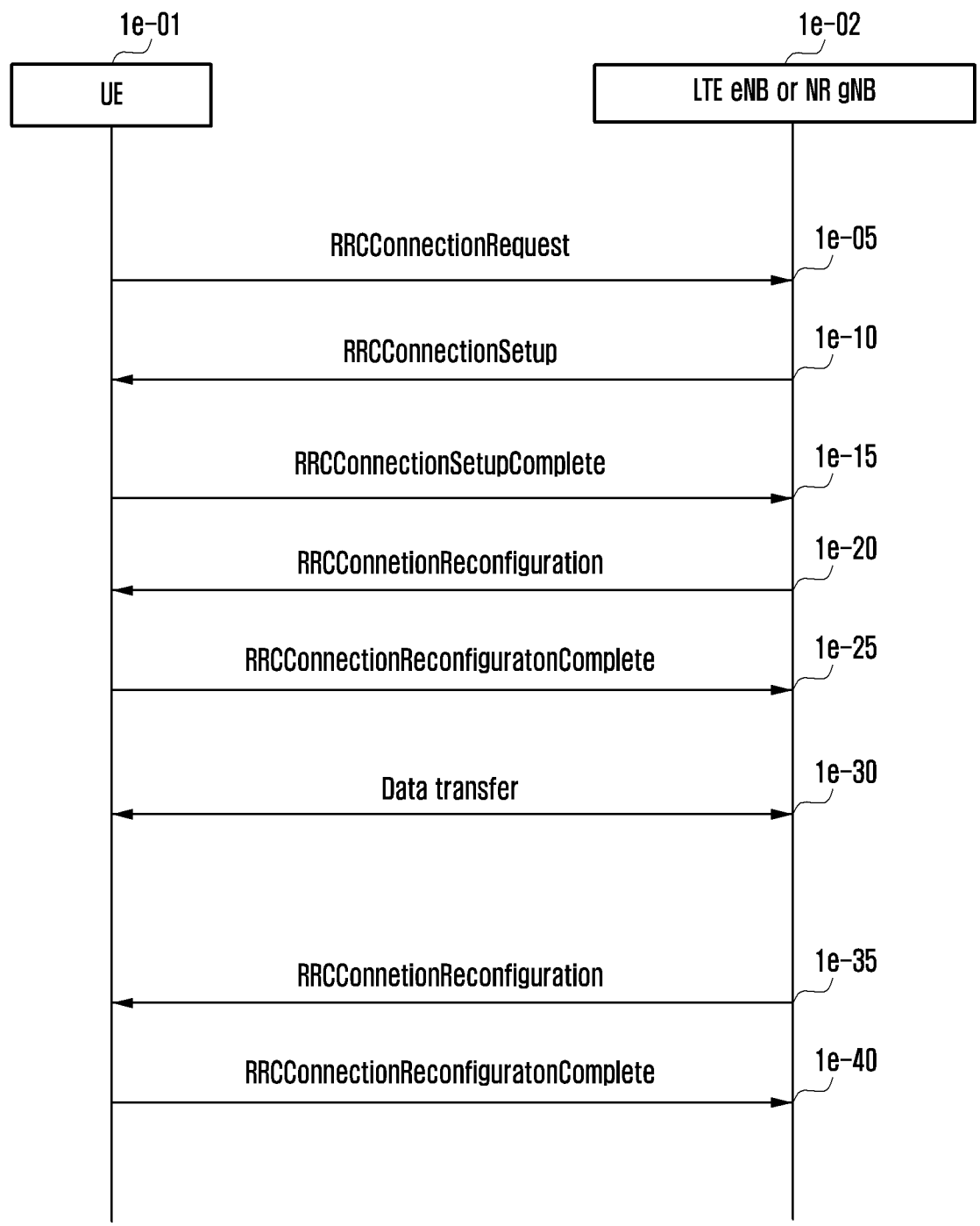
FIG. 1E is a diagram of setting, by a terminal, each layer apparatus in the next generation mobile communication system, according to an embodiment of the present disclosure.

FIG. 1E is a diagram of setting, by a terminal, each layer apparatus (entity, hereinafter, apparatus) in the next generation mobile communication, according to an embodiment of the present disclosure.

FIG. 1E also describes a procedure of setting a connection with a network via which a terminal transmits/receives data and setting apparatuses (entity, hereinafter, apparatuses) of each layer.

If there is data to be transmitted, a terminal 1e-01 (hereinafter, referred to as an idle mode UE) for which no connection is currently established performs an RRC connection establishment procedure with the LTE base station or the NR base station 1e-02. The terminal 1e-01 establishes uplink transmission synchronization with the base station 1e-02 through a random access procedure and transmits an RRCConnectionRequest message to the base station 1e-02 (at step 1e-05). The message includes establishmentCause for connection with an identifier of the terminal 1e-01. The base station 1e-02 transmits an RRCConnectionSetup message to allow the terminal 1e-01 to set the RRC connection (at step 1e-10). The message may store RRC connection configuration information, setting information of each layer, and the like. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions described in FIG. 1B or 1D supported by the layer apparatuses. In addition, the message may include an indication of whether to allocate a PDCP SN in the PDCP apparatus or may include an indication of whether to allocate an RLC SN in the RLC apparatus. The RRC connection is also called a signaling radio bearer (SRB) and is used for transmission and reception of the RRC message that is a control message between the terminal 1e-0I and the base station 1e-02. The terminal establishing the RRC connection transmits an RRCConnetionSetupComplete message to the base station (at step 1e-15). The base station transmits an RRCConnectionReconfiguration message to the terminal in order to set up a data radio bearer (DRB) (at step 1e-20). The configuration information of each layer and the like may be stored in the message. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions described in FIG. 1B or 1D supported by the layer apparatuses. In addition, the message may include an indication of whether to allocate a PDCP SN in the PDCP apparatus or may include an indication of whether to allocate an RLC SN in the RLC apparatus. In addition, the message includes the configuration information of the DRB in which user data are processed, and the terminal applies the information to set the DRB and set the functions of each layer and transmits an RRCConnectionReconfigurationComplete message to the base station 1e-02 (at step 1e-25). If the above procedure is completed, the terminal 1e-01 transmits and receives data to and from the base station 1e-02 (at step 1e-30). While transmitting and receiving data, the base station 1e-02 may again transmit the RRCConnectionReconfiguration message to the terminal 1e-01 (at step 1e-35), if necessary, set the configuration information of each layer of the terminal 1e-01. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions described in FIG. 1B or D supported by the layer apparatuses. In addition, the message may include an indication of whether to allocate a PDCP SN in the PDCP apparatus or may include an indication of whether to allocate an RLC SN in the RLC apparatus. In addition, the message may include the information for setting the interworking between the LTE base station (or NR base station) and the NR base station. The information for setting the interworking between the LTE base station and the NR base station may include information indicating a 3C type or a 1A type, information on each layer apparatus according to each type, and the like. Upon completion of the setting of apparatuses of each layer according to the message, the terminal 1e-01 transmits an RRCConnectionReconfigurationComplete message to the base station 1e-02 (at step 1e-40).

Figure 1F:
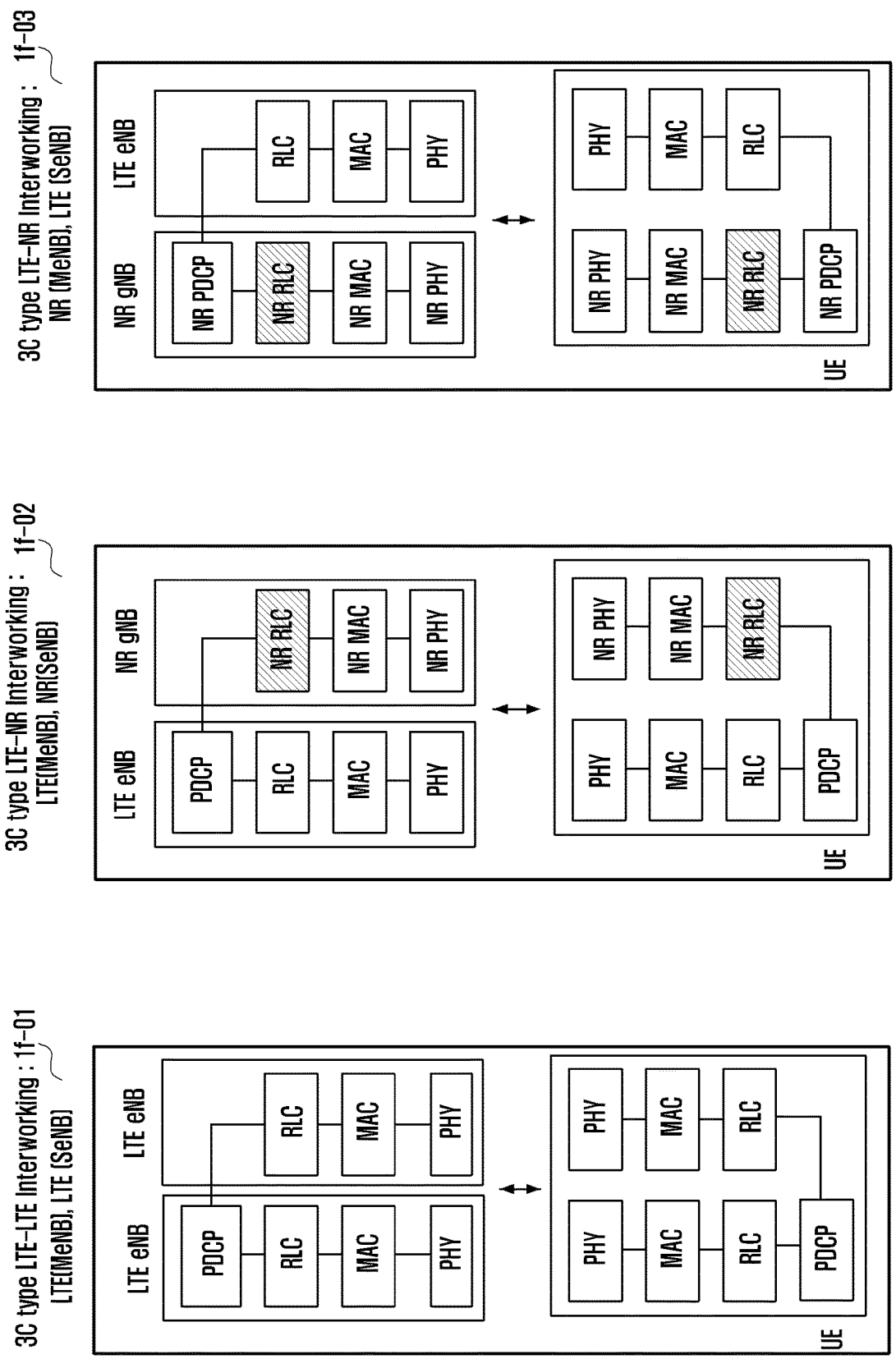
FIGS. 1FA and 1FB are diagrams of a terminal for receiving services through an LTE base station and an NR base station in the next generation mobile communication system, according to an embodiment of the present disclosure.
Figure 1F:
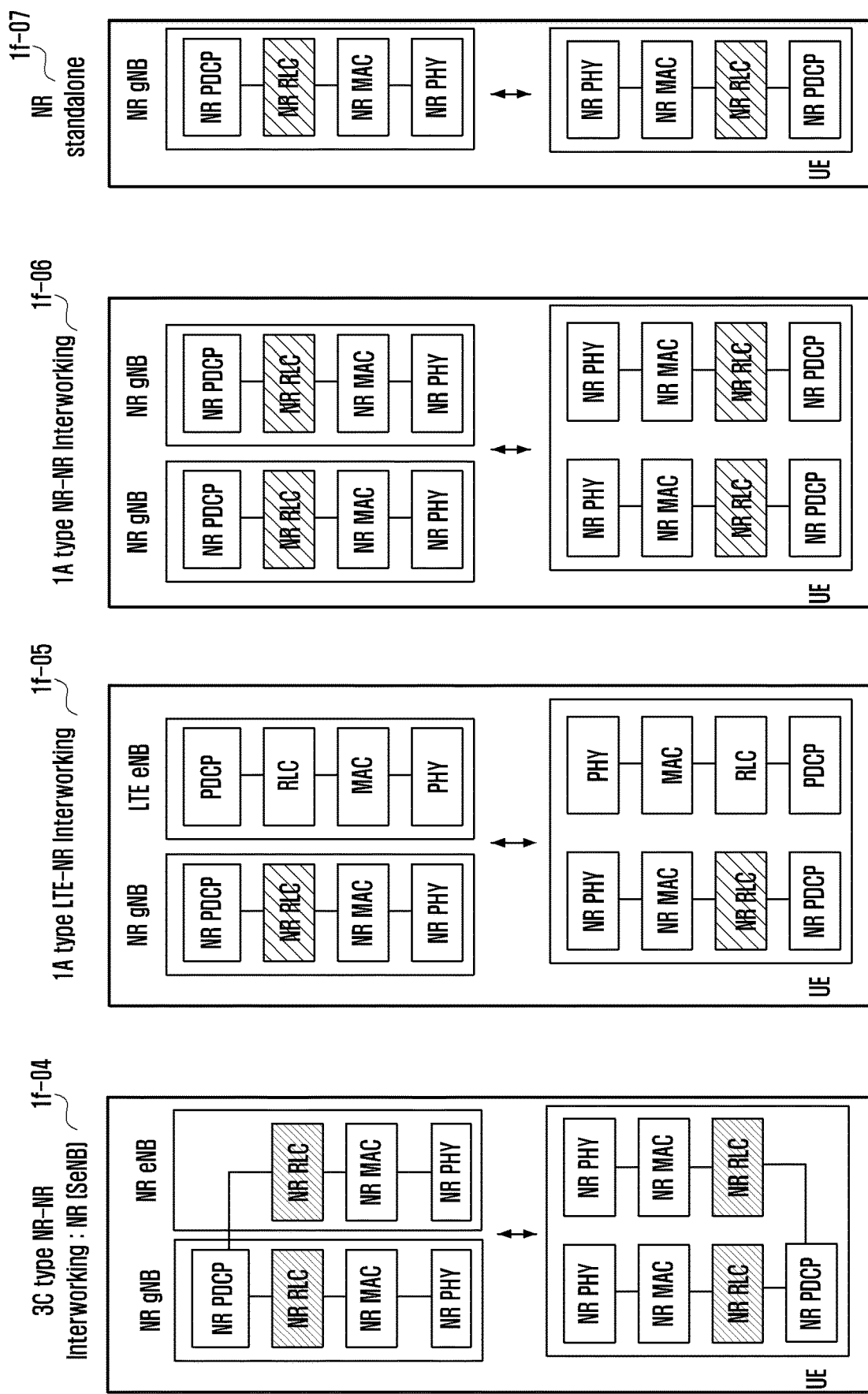

FIGS. 1FA and 1FB are diagrams of a terminal that receives services through an LTE base station and an NR base station in the next generation mobile communication system, according to an embodiment of the present disclosure.

In FIGS. 1FA and 1FB, 1f-01 shows that the LTE base station is a master (MeNB) in the 3C type LTE base station-LTE base station interworking, 1f-02 shows that the LTE base station is a master (MeNB) in the 3C type LTE base station-NR base station interworking, 1f-03 shows that the NR base station is a master (MeNB) in the 3C type LTE base station-NR base station interworking, and 1f-04 shows that the NR base station is a master (MeNB) in the 3C type NR base station-NR base station interworking, 1f-05 shows a 1A type LTE base station-NR base station interworking, 1f-06 shows a 1A type NR base station-NR base station interworking, and 1F-07 shows the NR base station.

The LTE system allocates a PDCP SN in the PDCP apparatus, and allocates an RLC SN in the RLC apparatus. However, in the next generation mobile communication systems, a PDCP SN may be allocated only in the NR PDCP device, and an RLC SN may not be allocated and a PDCP SN may be used in the NR RLC apparatus. Therefore, the overhead may be reduced by deleting the RLC SN. When a terminal accesses only one cell or a base station, the terminal can operate with a single SN without any problem. However, a problem may arise in the multiple access scenario described above with reference to FIGS. 1FA and 1FB. The above-mentioned problems that may occur are described with respect to FIGS. 1GA and 1GB.

Figure 1G:
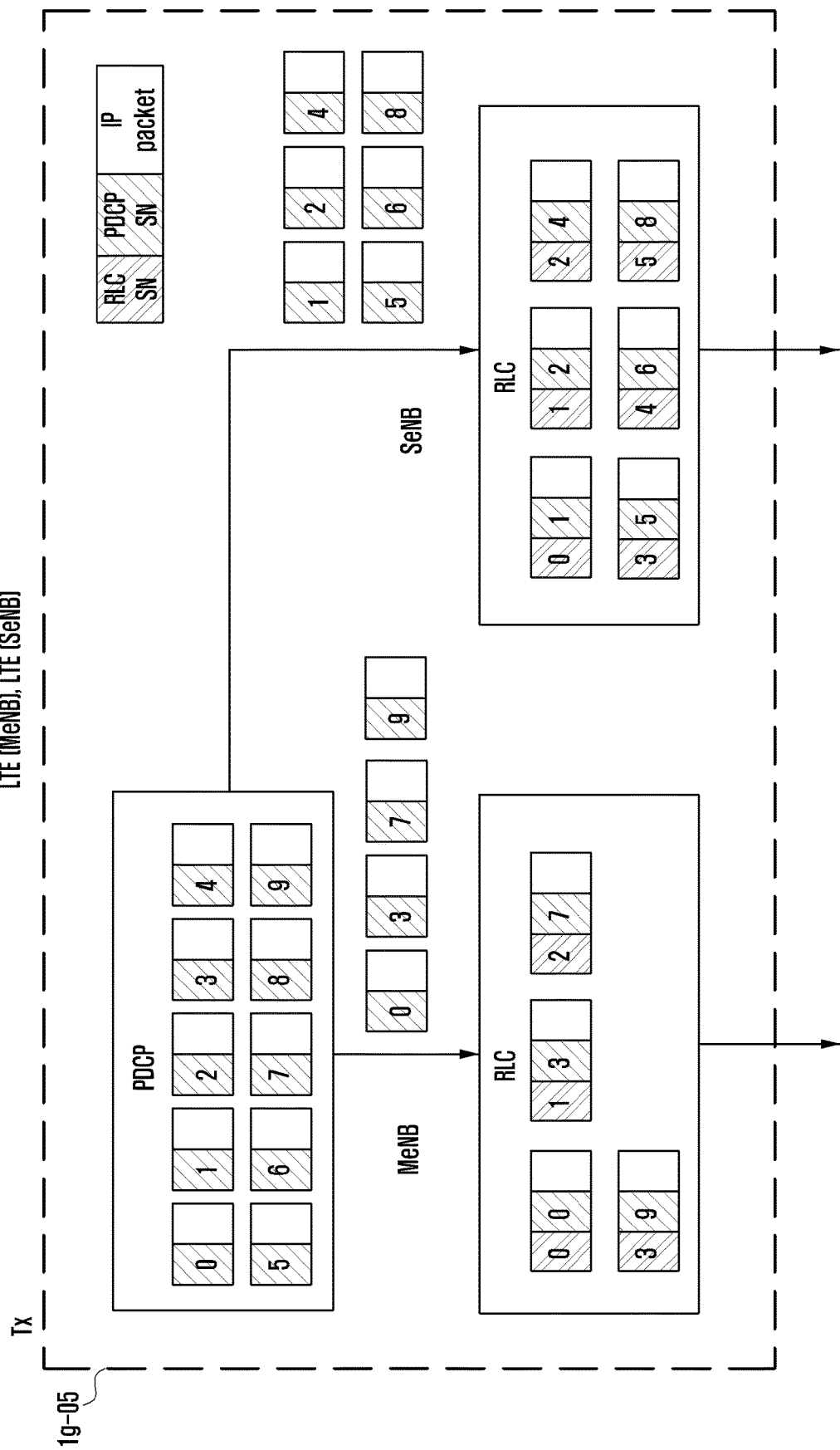
FIGS. 1GA and 1GB are diagrams of when one SN is used in a multiple access environment, according to an embodiment of the present disclosure.
Figure 1G:
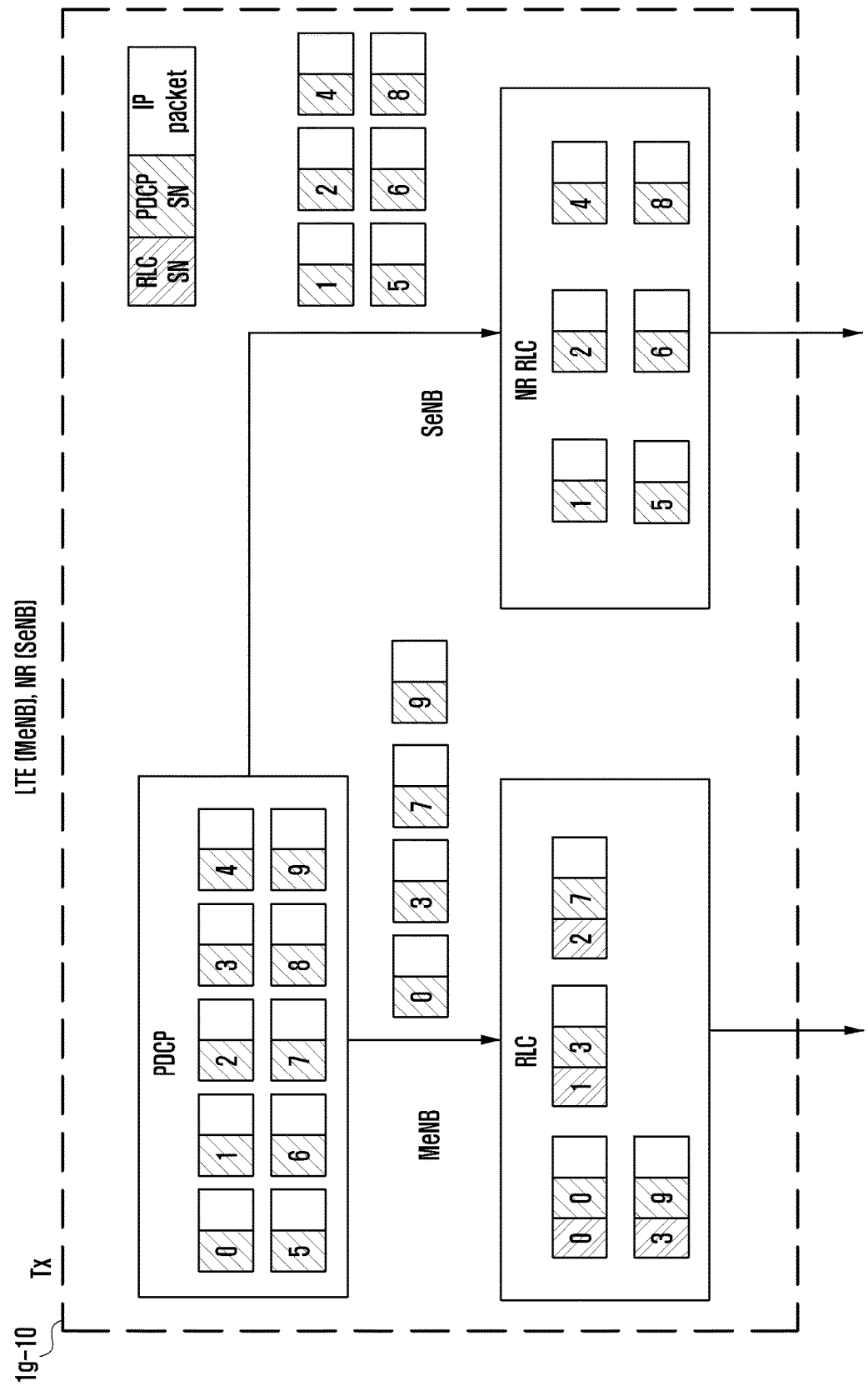

FIGS. 1GA and 1GB are diagrams when one SN is used in the multiple access environment, according to an embodiment of the present disclosure.

In FIGS. 1GA and 1GB, 1g-05 shows that the LTE base station is the master (MeNB) in the 3C type interworking between the LTE base station and the LTE base station and allocates the PDCP SN in the PDCP apparatus of the MeNB, and the RLC apparatuses of the MeNB and the RLC apparatuses of SeNB each allocate independent RLC SNs. Therefore, each RLC apparatus can normally perform an RLC ARQ operation based on the RLC SN together with the RLC apparatus of the receiving end.

In FIGS. 1GA and 1GB, 1g-10 shows that the LTE base station is the master (MeNB) in the 3C type interworking between the LTE base station and the NR base station, the PDCP SN is assigned in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. The RLC apparatus of the MeNB can normally perform an RLC ARQ operation based on the RLC SN together with the RLC apparatus of the receiving end. However, the NR RLC apparatus of the SeNB cannot normally perform the RLC ARQ operation together with the NR RLC apparatus of the receiving end. For example, if it is assumed that the NR RLC apparatus of the transmitting end transmits SNs 1, 2, and 4 to the receiving end and that the receiving end normally receives the SNs, the receiving end cannot know whether the SN 3 is lost during the transmission or whether the SN 3 is originally transmitted from another MeNB. Therefore, the NR RLC apparatus of the receiving end continuously waits for the SN 3. As a result, the transmission delay may occur and the window stalling problem may occur. Such a problem may occur in the NR RLC apparatus of the transmitting end in the scenarios 1f-02, 1f-03, and 1f-04 in FIGS. 1FA and 1FB.

FIG. 1H is a diagram in which multiple access is supported by one SN, according to an embodiment of the present disclosure in the present disclosure.

In FIG. 1H, 1h-01 shows that the LTE base station is the master (MeNB) in the 3C type LTE base station-NR base station interworking, the PDCP SN is allocated in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. Therefore the transmission delay and window stalling problem that is mentioned in FIGS. 1GA and 1GB may occur. In 1f-02, 1f-03, and 1f-04 in FIGS. 1FA and 1FB in which the same problem as described above, a method for inserting into an RLC header a SN that the NR RLC apparatus transmits as in 1h-05 may be used. That is, since the SN is the first RLC PDU of the corresponding NR RLC layer, the SN 1 indicating itself can be inserted into the RLC header (if the same SN is inserted, it may indicate the first RLC PDU). SN 2 that is transmitted subsequently may insert the SN 1 because it was the previous SN. SN 4 that is transmitted subsequently may insert the SN 2 because it was the previous SN. Therefore, if the NR RLC apparatus of the transmitting end transmits the SNs 1, 2, and 4 and the NR RLC apparatus successfully receives them, it can be confirmed that the previous SN is 2 in the header of the RLC PDU of the SN 4 and the SN 3 is transmitted in another MeNB. Therefore, the NR RLC apparatus of the transmitting end and the receiving end can normally perform the RLC ARQ operation. This operation can be equally applied to the NR RLC apparatus of the scenarios such as 1f-02, 1f-03, and 1f-04 in FIGS. 1FA and 1FB.

Figure 1I:
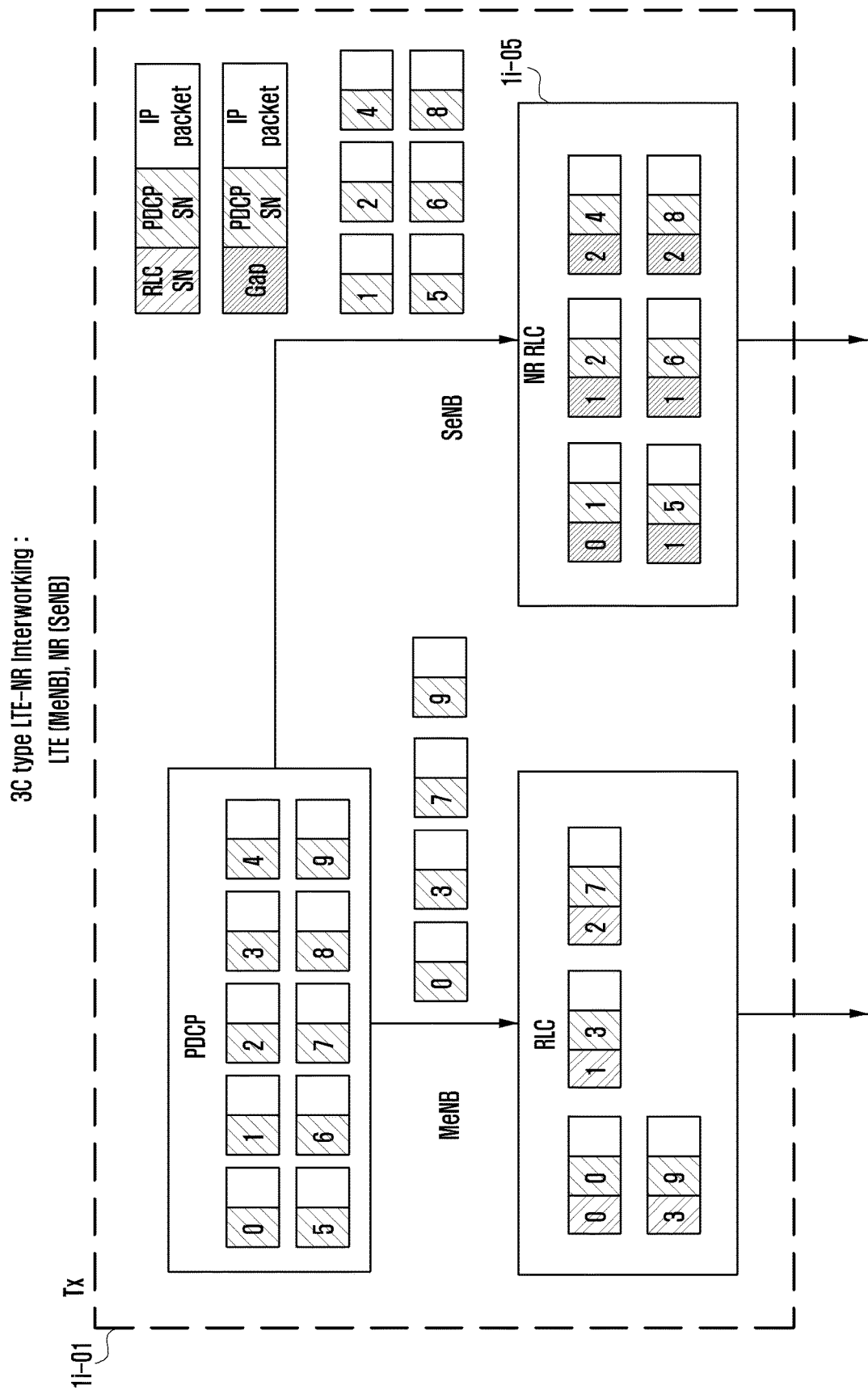
FIG. 1I is a diagram of a multiple access that is supported by one SN, according to an embodiment of the present disclosure.

FIG. 1I is a diagram in which multiple access is supported by one SN, according to an embodiment of the present disclosure.

In FIG. 1I, 1i-01 shows that the LTE base station is the master (MeNB) in the 3C type interworking between the LTE base station and the NR base station, the PDCP SN is assigned in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. Therefore the transmission delay and window stalling problem that is mentioned in FIGS. 1GA and 1GB may occur. In the scenarios such as 1f-02, 1f-03, and 1f-04 in FIGS. 1FA and 1FB in which the same problem as described above may occur, a method for inserting into an RLC header a gap between the SN the NR RLC apparatus transmits just before 1i-05 and the currently transmitted SN can be used. Here, if the gap is 0, it indicates the first RLC PDU in the corresponding connection. That is, since the SN 1 is the first RLC PDU of the corresponding NR RLC layer, the gap 0 can be inserted into the RLC header. SN 2 that is transmitted subsequently may insert gap 1 because a gap (2−1=1) from the just previous SN is 1. SN 4 that is transmitted subsequently may insert the gap 2 which is a gap (4−2=2) from the just previous SN, because the just previous SN is 2. Therefore, if the NR RLC apparatus of the transmitting end transmits the SNs 1, 2, and 4 and the NR RLC apparatus successfully receives them, it can be confirmed that the gap from the previous SN is 2 in the header of the RLC PDU of the SN 4 and the SN 3 is transmitted in another MeNB. Therefore, the NR RLC apparatus of the transmitting end and the receiving end can normally perform the RLC ARQ operation. The above operations can be equally applied to the NR RLC apparatus of the scenarios such as 1*f*-02, 1*f*-03, and 1*f*-04 in FIGS. 1FA and 1FB. Instead of the method for inserting into the RLC header the gap between the SN that the NR RLC apparatus transmits just before and the currently transmitted SN t, a method for inserting into an MAC subheader a gap between a SN (or other indicators) that the NR MAC apparatus transmits just before and the currently transmitted SN (or other indicators) may be applied. In this case, other indicators may be an indicator indicating the order of the corresponding packet.

Figure 1J:
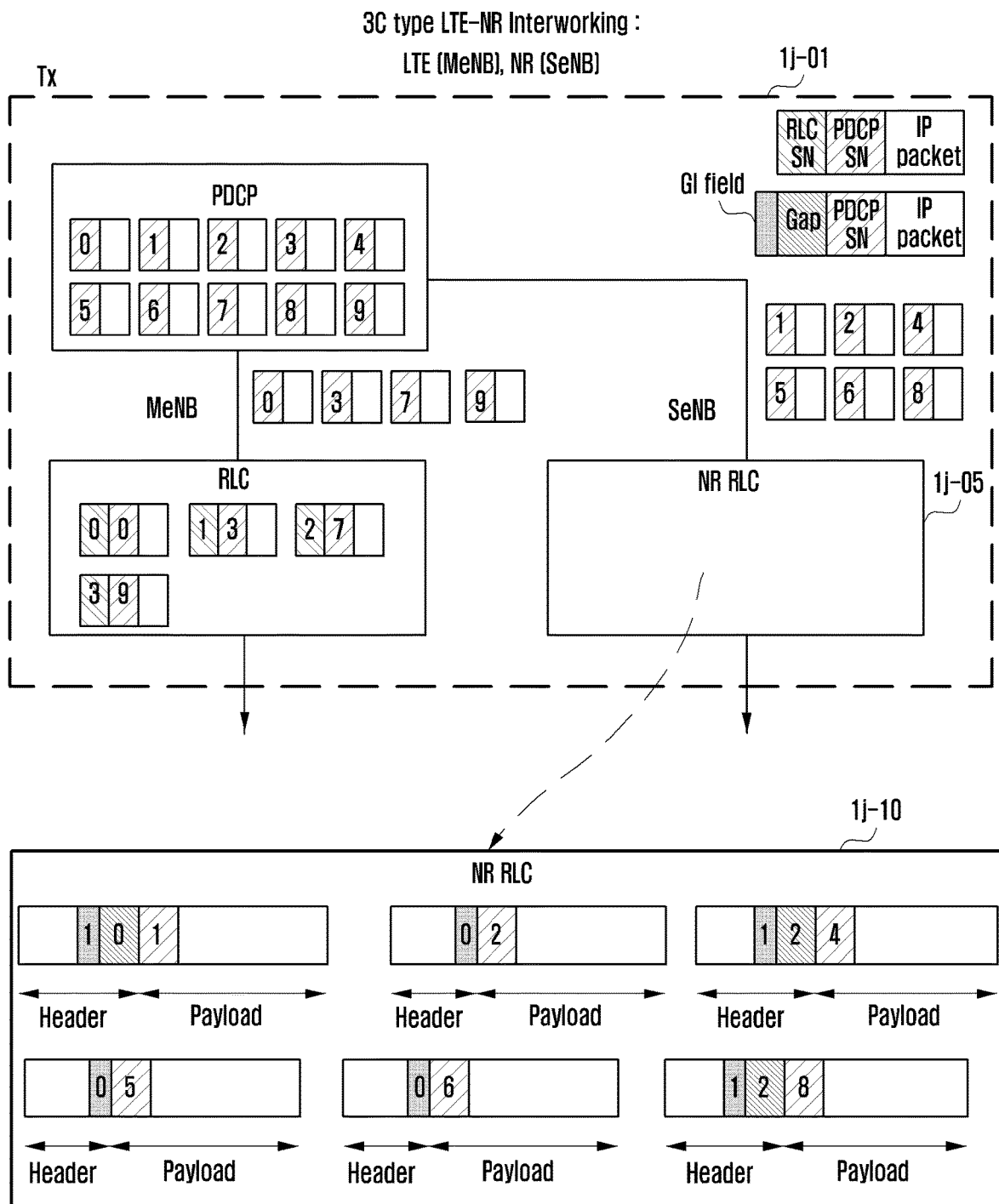
FIG. 1J is a diagram of a multiple access that is supported by one SN, according to an embodiment of the present disclosure.

FIG. 1J is a diagram in which multiple access is supported by one SN, according to an embodiment of the present disclosure.

In FIG. 1J, 1*j*-01 shows that the LTE base station is the master (MeNB) in the 3C type interworking between the LTE base station and the NR base station, the PDCP SN is assigned in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. Therefore the transmission delay and window stalling problem that is mentioned in FIGS. 1GA and 1GB may occur. In the scenarios such as 1*f*-02, 1*f*-03, and 1*f*-04 in FIGS. 1FA and 1FB in which the same problem as described above may occur, a method for inserting into an RLC header a gap between the SN the NR RLC apparatus transmits just before like 1*j*-05 and the currently transmitted SN can be used. The method for coding and inserting a gap between SNs in the NR RLC apparatus is the same as that of FIG. 1I, and if a gap is 0, it indicates the first RLC PDU in the corresponding connection.

However, if the gap is encoded and put in the header of all RLC PDUs, the overhead may be increased. For example, if it is assumed that the PDCP SN has a length of 18 bits, the length of the gap needs to have 18 bits (since the PDCP SN is separated and transmitted as MeNB and SeNB, the gap may need to indicate the whole space of the PDCP sequence). Therefore, since an 18-bit gap is inserted in the RLC header of all RLC PDUs, the overhead can be increased. To reduce the overhead, a gap indicator (GI) field having a size of 1 bit in the RLC header is defined as in Table 1-1.

TABLE 1-1

| GI field | Description |
|---|---|
| 0 | 5 bits gap field |
| 1 | 12 bits gap field |

The GI field value and information can be mapped to two different cases.

That is, if the GI field having a size of 1 bit is defined in the RLC header and thus the GI field value is 0, it may indicate that the gap is not inserted into the RLC header, and if the GI field value is 1, it may indicate that the gap is inserted into the RLC header. The case in which it is not necessary to insert the gap into the RLC header in the 1-2-2 embodiment corresponds to the case in which the RLC PDUs have a consecutive SN or do not correspond to a first segment among segments of one RLC PDU. For example, in the case of the SN 1 such as 1*j*-10, since it is the first RLC PDU of the corresponding connection, to indicate this, the GI field may be set to be 1 to indicate that there is a gap and insert a gap value as 0. In the case of the SN 2, there is no need to insert an interval value because it is a SN that is consecutive with the previous SN 1. Therefore, the GI field is set to be 0 and the overhead is reduced without inserting a gap value into the RLC header. In the case of the SN 4, there is no need to insert a gap value because it is not a SN that is consecutive with the previous SN 2. Therefore, the GI field is set to be 1 and the gap value 2 is inserted into the RLC header. In the case of the segments of one RLC PDU, in the case of the first segment, the gap value with the previous SN is inserted into the RLC header and the segment may not be inserted in other cases. If the first segment has the SN consecutive to the previous SN, the GI field is set to be 0 and thus the gap value may also be omitted.

Therefore, if the NR RLC apparatus of the transmitting end transmits the SNs 1, 2, and 4 and the NR RLC apparatus successfully receives them, since the GI field is set to be 1 in the RLC PDU of the SN 4, it can be confirmed that there is the gap value, and it can be confirmed that the gap from the previous SN is 2 and the SN 3 is transmitted from another MeNB. Therefore, the NR RLC apparatus of the transmitting end and the receiving end can normally perform the RLC ARQ operation. These operations can be equally applied to the NR RLC apparatus of the scenarios such as 1*f*-02, 1*f*-03, and 1*f*-04 in FIGS. 1FA and 1FB. Instead of the method for inserting into the RLC header the gap between the SN that the NR RLC apparatus transmits just before and the currently transmitted SN, a method for inserting into an MAC subheader a gap between a SN (or other indicators) that the NR MAC apparatus transmits just before and the currently transmitted SN (or other indicators) may be applied. In this case, other indicators may be an indicator indicating the order of the corresponding packet. In addition, the GI field is defined in the MAC subheader field and may be identical to and modified as described above to be applied to the MAC subheader.

Figure 1K:
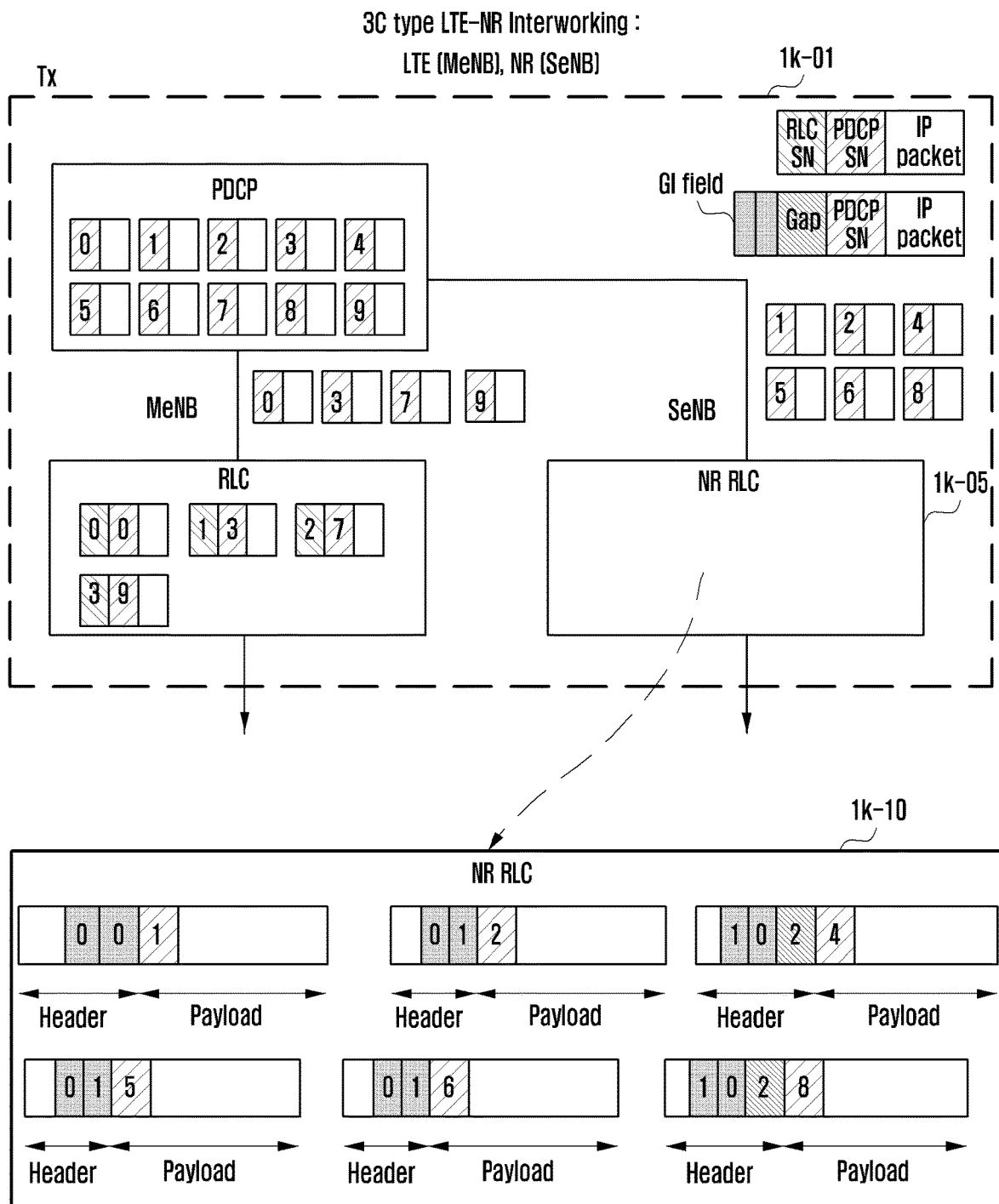
FIG. 1K is a diagram of a multiple access that is supported by one SN, according to an embodiment of the present disclosure.

FIG. 1K is a diagram in which multiple access is supported by one SN, according to an embodiment of the present disclosure.

In FIG. 1K, 1*k*-01 shows that the LTE base station is the master (MeNB) in the 3C type LTE base station-NR base station interworking, the PDCP SN is allocated in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. Therefore the transmission delay and window stalling problem that is mentioned in FIGS. 1GA and 1GB may occur. In the scenarios such as 1*f*-02, 1*f*-03, and 1*f*-04 in FIGS. 1FA and 1FB in which the same problem as described above may occur, a method for inserting into an RLC header a gap between the SN the NR RLC apparatus transmits just before 1*k*-05 and the currently transmitted SN can be used. The method for encoding and inserting a gap between the SNs in the NR RLC apparatus is the same as that of FIG. 1I.

However, if the gap is encoded and put in the header of all RLC PDUs, the overhead may be increased. For example, if it is assumed that the PDCP SN has a length of 18 bits, the length of the gap needs to have 18 bits (since the PDCP SN is separated and transmitted as MeNB and SeNB, the gap may need to indicate the whole space of the PDCP sequence). Therefore, in this case, since an 18-bit gap is inserted in the RLC header of all RLC PDUs, the overhead can be increased. To reduce the overhead, a GI field having a size of 2 bits defined in the RLC header is defined in Table 1-2.

TABLE 1-2

| GI field | Description |
| --- | --- |
| 00 | The first RLC PDU without gap |
| 01 | No gap for continuous RLC PDU |
| 10 | Gap |
| 11 | No gap for segments |

The GI field value and information can be mapped to 24 different cases, and the present disclosure includes the same.

That is, if the GI field having a size of 2 bits is defined in the RLC header and thus the GI field value is 00, it may be indicated that the first RLC PDU is in the corresponding connection and the gap is not inserted into the RLC header, if the GI field value is 01, it may be indicated that the current SN is a sequence consecutive to the previous sequence and thus the gap need not to be inserted into the RLC header, if the GI field value is 10, it may be indicated that the gap between the previous SN and the current SN is present and thus the gap is inserted into the RLC header, and if the GI field value 11, it may be indicated that it is segments of one RLC PDU and thus the gap is not inserted. In the case of the first segment among the segments, there is a need to insert the gap. However, if the SN of the first segment is consecutive with the previous SN, the gap may be omitted. The case in which it is not necessary to insert the gap into the RLC header corresponds to the case in which the RLC PDUs have a consecutive SN or do not correspond to a first segment among segments of one RLC PDU. For example, in the case of SN 1 such as 1k-10, since it is the first RLC PDU, the GI field is set to be 00 to indicate it and the gap may be omitted to reduce the overhead. In the case of the SN 2, there is no need to insert an interval value because it is a SN that is consecutive with the previous SN 1. Therefore, the GI field is set to be 01 and the overhead is reduced without inserting a gap value into the RLC header. In the case of the SN 4, there is no need to insert a gap value because it is not a SN that is consecutive with the previous SN 2. Therefore, the GI field is set to be 10 and the gap value 2 is inserted into the RLC header. In the case of the segments of one RLC PDU, in the case of the first segment, the gap value with the previous SN is inserted into the RLC header and the segment may not be inserted in other cases. If the first segment has the SN consecutive to the previous SN, the GI field is set to be 0 and thus the gap value may also be omitted.

Therefore, if the NR RLC apparatus of the transmitting end transmits the SNs 1, 2, and 4 and the NR RLC apparatus successfully receives them, since the GI field is set to be 10 in the RLC PDU of the SN 4, it can be confirmed that there is the gap value, and it can be confirmed that the gap from the previous SN is 2 and the SN 3 is transmitted from another MeNB. Therefore, the NR RLC apparatus of the transmitting end and the receiving end can normally perform the RLC ARQ operation. These operations can be equally applied to the NR RLC apparatus of the scenarios such as 1f-02, 1f-03, and 1f-04 in FIGS. 1FA and 1FB. Instead of the method for inserting into the RLC header the gap between the SN that the NR RLC apparatus transmits just before and the currently transmitted SN, a method for inserting into an MAC subheader a gap between a SN (or other indicators) that the NR MAC apparatus transmits just before and the currently transmitted SN (or other indicators) may be applied. In this case, other indicators may be an indicator indicating the order of the corresponding packet. In addition, the GI field is defined in the MAC subheader field and may be identical to and modified as described above to be applied to the MAC subheader.

Figure 1L:
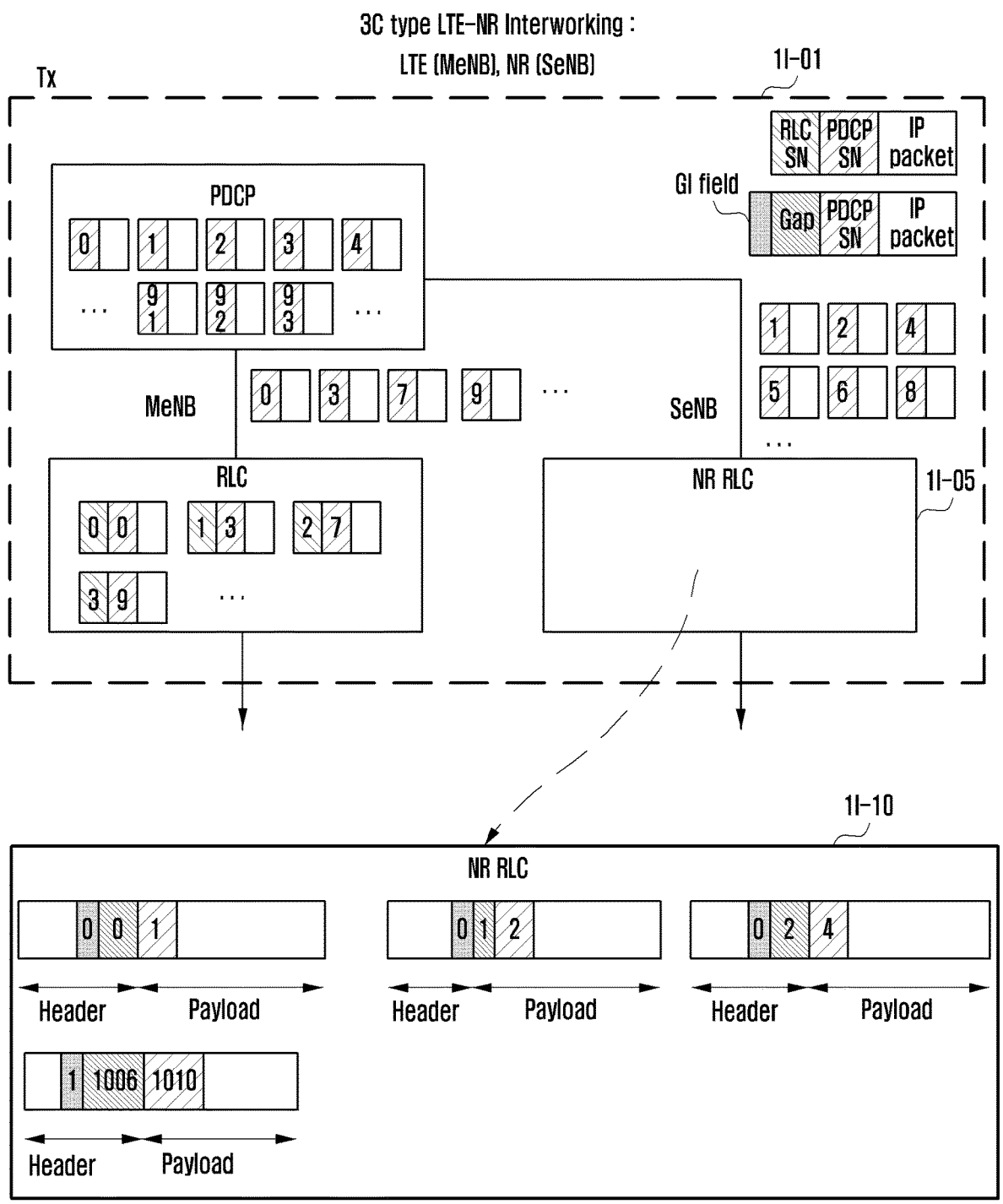
FIG. 1L is a diagram of a multiple access that is supported by one SN, according to an embodiment of the present disclosure.

FIG. 1L is a diagram in which multiple access is supported by one SN, according to an embodiment of the present disclosure.

In FIG. 1L, 1l-01 shows that the LTE base station is the master (MeNB) in the 3C type LTE base station-NR base station interworking, the PDCP SN is allocated in the MeNB PDCP apparatus of the MeNB, and since the RLC apparatus of the MeNB allocates the independent RLC SN and the NR RLC apparatus of the SeNB supports one SN, the RLC apparatus may reuse the PDCP SN without changing it. Therefore the transmission delay and window stalling problem that is mentioned in FIGS. 1GA and 1GB may occur. In the scenarios such as 1f-02, 1f-03, and 1f-04 in FIGS. 1Fa and 1FB in which the same problem as described above may occur, a method for inserting into an RLC header a gap between the SN the NR RLC apparatus transmits just before 1l-05 and the currently transmitted SN can be used. The method for coding and inserting a gap between SNs in the NR RLC apparatus is the same as that of FIG. 1, and if a gap is 0, it indicates the first RLC PDU in the corresponding connection. In addition, a gap is encoded and put in all the RLC PDUs; however, to reduce the overhead, a variable gap size is used.

For example, if it is assumed that the PDCP SN has a length of 12 bits, the length of the gap needs to have 12 bits (since the PDCP SN is separated and transmitted as MeNB and SeNB, the gap may need to indicate the whole space of the PDCP sequence. Therefore, in this case, since a 12-bit gap is inserted in the RLC header of all RLC PDUs, the overhead can be increased. A gap length (GL) field having a size of 1 bit is defined in the RLC header to reduce the overhead. In the above description, a predetermined bit may have several bits, and if x bits are included, a size of $2^x$ gap fields may be indicated. For example, a 1-bit GL field may be defined as in Table 1-3.

TABLE 1-3

| GI field | Description |
| --- | --- |
| 0 | 5 bits gap field |
| 1 | 12 bits gap field |

The mapping information may indicate a size of various gap fields using several bits.

That is, if the GL field having a size of 1 bit is defined in the RLC header and thus the field value is 0, a field having a length of 5 bits is used to indicate a gap in the corresponding RLC PDU, and if the GL field value is 1, a field having a length of 12 bits is used to indicate the gap in the PDU. For example, in the case of the SN 1 such as 1l-10, since it is the first RLC PDU of the corresponding connection, the GI field is set to be 00 to indicate it and the gap having a size of 5 bits may be used to reduce the overhead. In the case of the SN 2, since it is a SN consecutive to the previous SN 1, the gap value is reduced, so the GL field is set to be 0 and the gap having a size of 5 bits may be used. Even in the case of the SN 4, since it the previous SN 2 and the gap value are reduced, so the GL field is set to be 0 and the gap having a size of 5 bits may be used. However, in the case of the SN 1010, since the gap from the previous SN 4 is large, it is possible to set a GL field to be 1 and use a gap having a size of 12 bits.

Therefore, if the NR RLC apparatus of the transmitting end transmits the SNs 1, 2, and 4 and the NR RLC apparatus successfully receives them, since the GI field is set to be 0 in the RLC PDU of the SN 4, it can be confirmed that there is the gap value having a size of 5 bits, and it can be confirmed that the gap from the previous SN is 2 and the SN 3 is transmitted from another MeNB. Therefore, the NR RLC apparatus of the transmitting end and the receiving end can normally perform the RLC ARQ operation. These operations can be equally applied to the NR RLC apparatus of the scenarios such as 1f-02, 1f-03, and 1f-04 in FIGS. 1FA and 1FB. Instead of the method for inserting into the RLC header the gap between the SN that the NR RLC apparatus transmits just before and the currently transmitted SN, a method for inserting into an MAC subheader a gap between a SN (or other indicators) that the NR MAC apparatus transmits just before and the currently transmitted SN (or other indicators) may be applied. In this case, other indicators may be an indicator indicating the order of the corresponding packet. In addition, the GI field is defined in the MAC subheader field and may be identical to and modified as described above to be applied to the MAC subheader.

In the next generation mobile communication systems, a high data rate is supported, so if data is missed, a large amount of data is likely to be lost. Therefore, an RLC status report method is needed. The present disclosure proposes various RLC status reporting methods suitable for the next generation mobile communication system. The RLC status reporting methods proposed below can identically be transmitted in a single access environment connecting only to the LTE or the NR as well as the multiple access environment as described above.

Figure 1M:
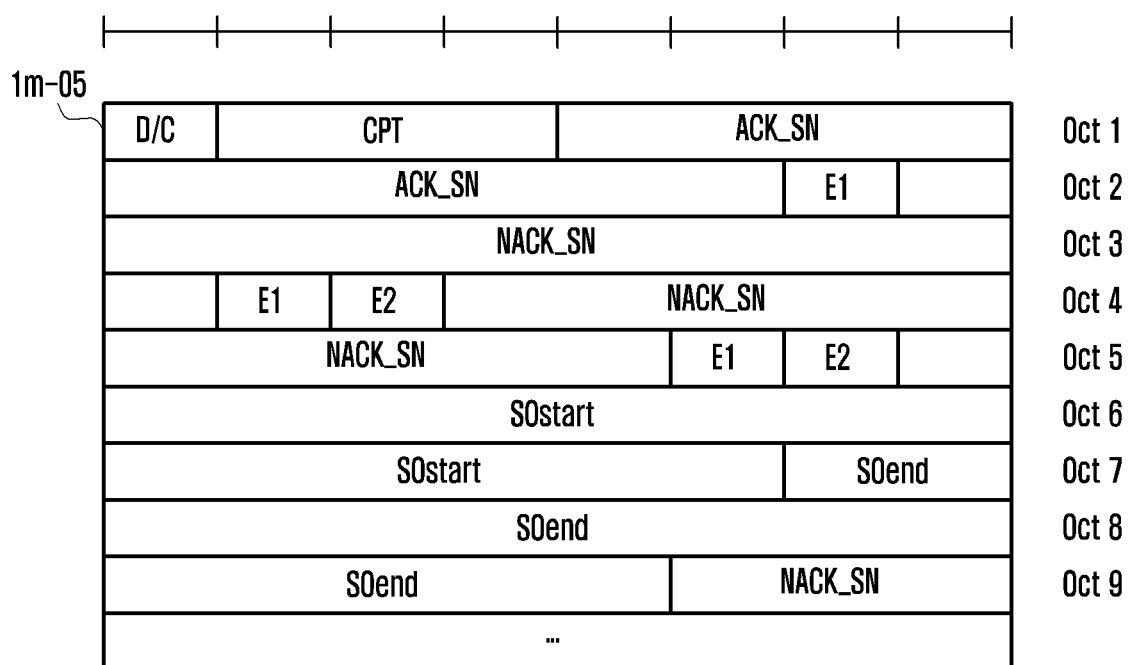
FIG. 1M is a diagram of an RLC status reporting method, according to an embodiment of the present disclosure.

FIG. 1M is a diagram of a RLC status reporting method, according to an embodiment of the present disclosure.

FIG. 1M an RLC status report can be sent from a receiving side RLC layer apparatus to a transmitting side RLC layer apparatus (assuming a 10 bit RLC SN length).

The receiving side RLC layer apparatus stores the received RLC PDUs in the receiving buffer and then checks the SN to recognize the SN of the RLC PDU missed during the transmission. If the predetermined condition is satisfied, the receiving side RLC layer apparatus generates an RLC status report message and transmits the generated RLC status report message to the transmitting side RLC layer apparatus. The RLC status report message includes information on the RLC PDU reception state of the receiving side RLC layer apparatus, and the transmitting side RLC layer apparatus identifies that the RLC PDU successfully transmitted and the RLC PDU failed to transmit, through the RLC status report message. The RLC status report message may be 1m-05 in FIG. 1M. The RLC status report message includes one ACK_SN or one ACK_SN and one or more NACK. The presence of NACK_SN is indicated by an E1 field. The E1 field indicates one NACK_SN, an E1 field, and an E2 field follow, and the E2 field indicates whether or not SOstart and SOend fields indicating a part of the NACK_SN follow. The ACK_SN field includes the next SN of the highest SN among the SNs of RLC PDUs successfully received so far and the NACK_SN includes the SNs of the RLC PDUs that have not been received. For example, the transmitting side RLC layer apparatus transmits RLC PDU 7 to RLC PDU 10 at any time, and the receiving side RLC layer apparatus receives only RLC PDU 7 and RLC PDU 9 and stores the received RLC PDU 7 and RLC PDU 9 in the receiving buffer. If the RLC status report message generation condition is satisfied at any time, the receiving side RLC layer apparatus generates the RLC status report message. A SN 10 is included in the ACK_SN field of the RLC status report message, and a SN 8 is included in the NACK_SN field. The transmitting side RLC layer apparatus receiving the RLC status report message determines that the RLC PDU having a SN lower than the lowest NACK_SN, that is, the RLC PDUs having a SN lower than 7 is successfully transmitted and discards it in a retransmission buffer. In addition, PDCP SDUs mapped to the RLC PDUs having a SN lower than 7 among the PDCP SDUs stored in the transmission buffer is also discarded. The transmitting side RLC layer apparatus retransmits the RLC PDU 8 reporting that the receiving side RLC layer apparatus has not received.

The RLC layer apparatus transmits the RLC PDU with the SN, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.

Identify RLC PDU failed in transmission
Identify RLC PDU succeeded in transmission It is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the RLC status reporting method for the present disclosure are as follows.

The D/C field has a length of 1 bit and indicates whether the RLC PDU is an RLC data PDU or an RLC control PDU as in Table 1-4.

TABLE 1-4

| D/C field value | Description |
| --- | --- |
| 0 | Control PDU |
| 1 | Data PDU |

The CPT field has a length of 1 bit and indicates a kind of RLC control PDU, as in Table 1-5.

TABLE 1-5

| CPT field value | Description |
| --- | --- |
| 000 | STATUS PDU |
| 001-111 | Reserved (PDUs with this coding will be discarded by the receiving entity for this release of the protocol) |

ACK_SN indicates the next SN of the RLC PDU that has not yet been received and a SN that is not reported as missed in the RLC status report. Upon receiving the RLC status report at the transmitting end, it is determined that the SN indicated by the ACK_SN is not included, the SN indicated by the NACK_SN is not included, and a SN smaller than ACK_SN has been received successfully (when the NACK_SN is indicated together with the SOstart and the SOend, it is determined that the SOstart and the SOend successfully receive only a part other than the part indicated by the NACK_SN). The ACK_SN has a predetermined length, and the predetermined length can be variously defined such as 10 bits, 16 bits, or 18 bits.

The E1 field has a length of 1 bit and indicates whether or not the NACK_SN, the E1 field, and the E2 field follow as in Table 1-6.

TABLE 1-6

| E1 field value | Description |
| --- | --- |
| 0 | A set of NACK_SN, E1 and E2 does not follow. |
| 1 | A set of NACK_SN, E1 and E2 follows. |

NACK_SN indicates the SN of the missed RLC PDU, and may indicate a part of the lost RLC PDU together with SOstart and SOend. The NACK_SN has a predetermined length, and the predetermined length can be variously defined such as 10 bits, 16 bits, or 18 bits.

The E2 field has a length of 1 bit and indicates whether the SOstart and the SOend follow as in Table 1-7.

TABLE 1-7

| E2 field value | Description |
| --- | --- |
| 0 | A set of SOstart and SOend does not follow for this NACK_SN. |
| 1 | A set of SOstart and SOend follows for this NACK_SN. |

The SOstart field indicates a head position of the part when indicating a part of the NACK_SN. The head position may be indicated by a byte unit. The SOstart has a predetermined length, and the predetermined length can be variously defined such as 15 bits, 16 bits, and 18 bits.

The SOend field indicates a tail position of the part when indicating a part of the NACK_SN. The tail position may be indicated by a byte unit. The SOend has a predetermined length, and the predetermined length can be variously defined such as 15 bits, 16 bits, and 18 bits.

The RLC status reporting method proposed above can be equally applied to the NR RLC apparatus of 1f-02, 1f-03, and 1f-04 in FIGS. 1FA and 1FB.

Figure 1N:
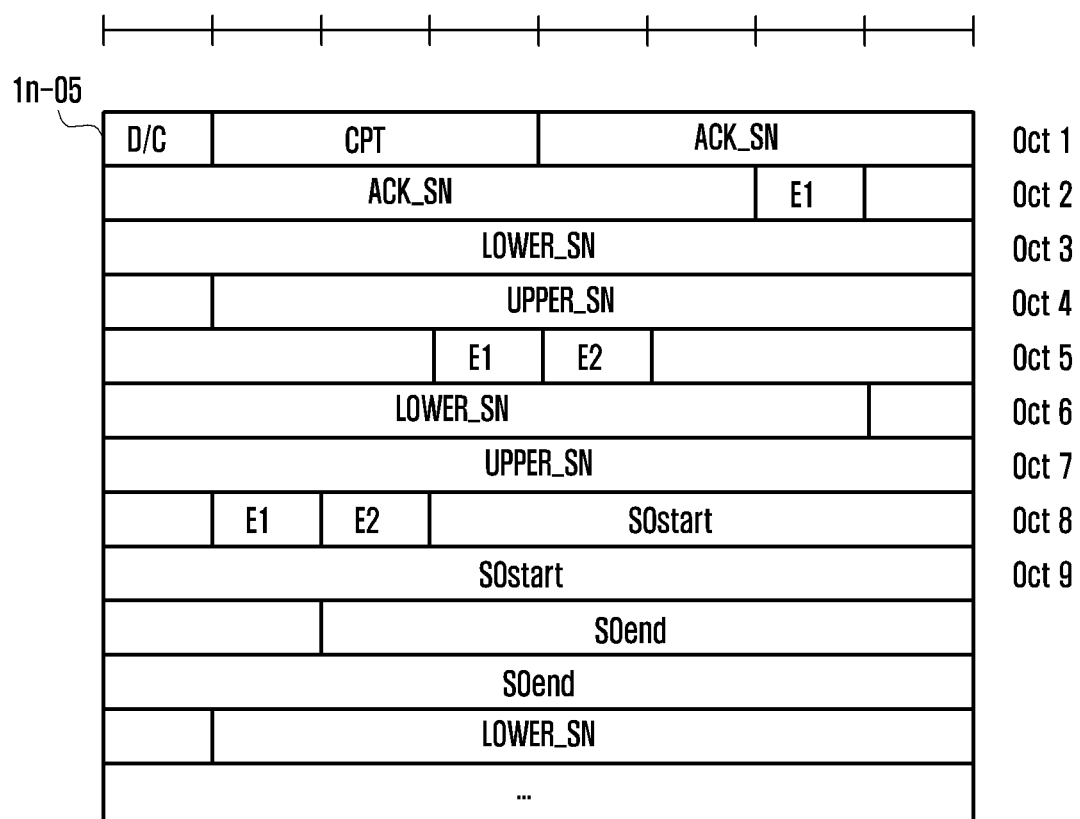
FIG. 1N is a diagram of an RLC status reporting method, according to an embodiment of the present disclosure.
Figure 10:
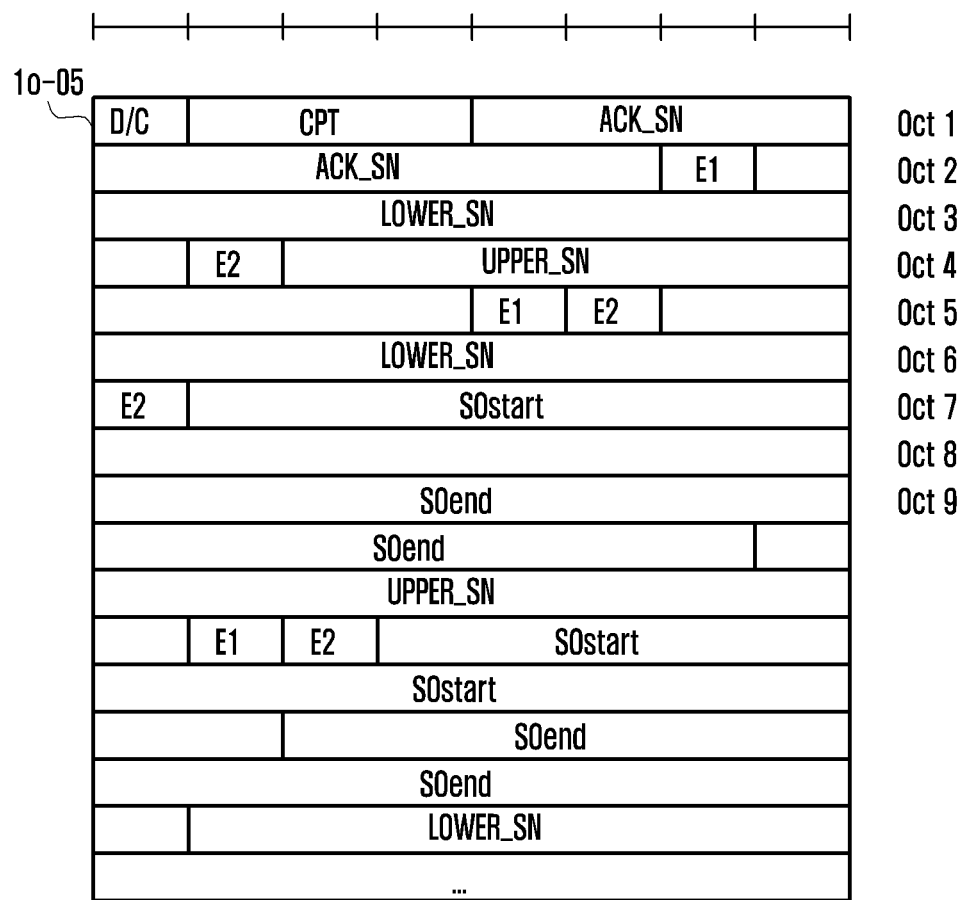

FIG. 1N shows an RLC status reporting method, according to an embodiment of the present disclosure.

In FIG. 1N an RLC status report can be sent from a receiving side RLC layer apparatus to a transmitting side RLC layer device according to a RLC status reporting method (assuming a 10 bit RLC SN length).

The receiving side RLC layer device stores the received RLC PDUs in the receiving buffer and then checks the SN to recognize the SN of the RLC PDU missed during the transmission. If the predetermined condition is satisfied, the receiving side RLC layer apparatus generates an RLC status report message and transmits the generated RLC status report message to the transmitting side RLC layer apparatus. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written as 1n-05 in FIG. 1N. The RLC status report message includes one ACK_SN or a set of one ACK_SN and one or more LOWR_SN, UPPER_SN, E1, and E2 fields. It is indicated by the E1 field whether there are the set of LOWER_SN, UPPER_SN, E1, and E2 fields. The E1 field indicates whether a set of one LOWER_SN field, the UPPER_SN field, the E1 field, and the E2 field follow, and the E2 field indicates whether or not SOstart and SOend fields indicating a part of the NACK_SN follow. The ACK_SN field includes the next SN of the highest SN among the SNs of RLC PDUs that have successfully been received and the NACK_SN includes the lowest SN that has successfully been received. The UPPER_SN may include the highest SN that has not been received. The LOWER_SN and the UPPER_SN may include the SN by various predetermined methods to indicate a range of a large number of missed SNs. That is, the RLC apparatus of the receiving end may request the retransmission to the RLC apparatus of the transmitting end since the RLC PDUs corresponding to all SNs between the LOWER_SN<SN<=UPPER_SN is missed. For example, the transmitting side RLC layer apparatus transmits RLC PDU 5 to RLC PDU 80 at any time, and the receiving side RLC layer apparatus receives only RLC PDU 5, RLC PDU 78, RLC PDU 79, and RLC PDU 80 and stores the received RLC PDU 5, RLC PDU 78, RLC PDU 79, and RLC PDU 80 in the receiving buffer. If the RLC status report message generation condition is satisfied at any time, the receiving side RLC layer apparatus generates the RLC status report message. The ACK_SN field of the RLC status reporting message may include SN 81, the LOWER_SN field my include SN 5, and the UPPER_SN may include 77. The transmitting side RLC layer apparatus receiving the RLC status report message determines that the RLC PDU having a SN lower than the lowest LOWER_SN, that is, the RLC PDUs having a SN lower than 5 is successfully transmitted and discards it in a retransmitting buffer. In addition, PDCP SDUs mapped to the RLC PDUs having a SN lower than 5 among the PDCP SDUs stored in the transmission buffer is also discarded. The transmitting side RLC layer apparatus retransmits the RLC PDU 6 to RLC PDU 77 reporting that the receiving side RLC layer apparatus has not received.

When the first RLC PDU of the RLC layer apparatus of the transmitting end is missed, the LOWER_SN may be allocated as the same value as the UPPER_SN to notify the transmitting end that all the SNs smaller than the UPPER_SN are not received. For example, if the LOWER_SN field includes a SN 77 and the UPPER_SN includes 77, (SN<=77) may be indicated. When the first RLC PDU is missed, the LOWER_SN and the UPPER_SN may be defined by various methods. Alternatively, another field may be defined.

The RLC layer apparatus transmits the RLC PDU with the SN, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.

Identify RLC PDU failed in transmission
Identify RLC PDU succeeded in transmission It is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the RLC status reporting method for the present disclosure are as follows.

The D/C field has a length of 1 bit and indicates whether the RLC PDU is an RLC data PDU or an RLC control PDU as in Table 1-8.

TABLE 1-8

| D/C field value | Description |
| --- | --- |
| 0 | Control PDU |
| 1 | Data PDU |

The CPT field has a length of 1 bit and indicates a kind of RLC control PDU as in Table 1-9.

TABLE 1-9

| CPT field value | Description |
| --- | --- |
| 000 | STATUS PDU |
| 001-111 | Reserved (PDUs with this coding will be discarded by the receiving entity for this release of the protocol) |

—ACK_SN indicates the next SN of the RLC PDU that has not yet been received and a SN that is not reported as missed in the RLC status report. Upon receiving the RLC status report at the transmitting end, it is determined that the SN indicated by the ACK_SN is not included, the SNs indicated by the LOWER_SN and the UPPER_SN are not included, and a SN smaller than ACK_SN has been received successfully (when the UPPER_SN is indicated together with the SOstart and the SOend, it is determined that the SOstart and the SOend successfully receive only a part other than the part indicated by the UPPER_SN). The ACK_SN has a predetermined length, and the predetermined length can be variously defined such as 10 bits, 16 bits, or 18 bits.

The E1 field has a length of 1 bit and indicates whether or not the LOWER_SN, the UPPER_SN, the E1 field, and the E2 field follow, as in Table 1-10.

TABLE 1-10

| E1 field value | Description |
| --- | --- |
| 0 | A set of LOWER_SN, UPPER_SN, E1 and E2 does not follow. |
| 1 | A set of LOWER_SN, UPPER_SN, E1 and E2 follows. |

The LOWER_SN may include the lowest SN that has successfully been received. The UPPER_SN may include the highest SN that has not been received. The LOWER_SN and the UPPER_SN may include the SN by various predetermined methods to indicate a range of a large number of missed SNs. The LOWER_SN and UPPER_SN have a predetermined length, and the predetermined length can be variously defined such as 10 bits, 16 bits, or 18 bits. When the first RLC PDU of the RLC layer apparatus of the transmitting end is missed, the LOWER_SN may be allocated as the same value as the UPPER_SN to notify the transmitting end that all the SNs smaller than the UPPER_SN are not received. For example, if the LOWER_SN field includes a SN 77 and the UPPER_SN includes 77, (SN<=77) may be indicated. When the first RLC PDU is missed, the LOWER_SN and the UPPER_SN may be defined by various methods. Alternatively, another field may be defined.

The E2 field has a length of 1 bit and indicates whether the SOstart and the SOend follow, as in Table 1-11.

TABLE 1-11

| E2 field value | Description |
| --- | --- |
| 0 | A set of SOstart and SOend does not follow for this UPPER_SN. |
| 1 | A set of SOstart and SOend follows for this UPPER_SN. |

The SOstart field indicates a head position of the part when indicating a part of the UPPER_SN. The head position may be indicated by a byte unit. The SOstart has a predetermined length, and the predetermined length can be variously defined such as 15 bits, 16 bits, and 18 bits.

The SOend field indicates a tail position of the part when indicating a part of the UPPER_SN. The tail position may be indicated by a byte unit. The SOend has a predetermined length, and the predetermined length can be variously defined such as 15 bits, 16 bits, and 18 bits.

The 1 RLC status reporting method proposed above can be equally applied to the NR RLC apparatus of 1f-02, 1f-03, and 1f-04 in FIGS. 1FA and 1FB.

FIG. 1O is a diagram of an RLC status reporting method, according to an embodiment of the present disclosure.

In FIG. 1O an RLC status report is sent from a receiving side RLC layer apparatus to a transmitting side RLC layer device (assuming a 10 bit RLC SN length).

The receiving side RLC layer device stores the received RLC PDUs in the receiving buffer and then checks the SN to recognize the SN of the RLC PDU missed during the transmission. If the predetermined condition is satisfied, the receiving side RLC layer apparatus generates an RLC status report message and transmits the generated RLC status report message to the transmitting side RLC layer apparatus. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written as 1o-05 in FIG. 1O. The RLC status report message includes one ACK_SN or a set of one ACK_SN and one or more LOWR_SN, E2, UPPER_SN, E1, and E2 fields. It is indicated by the E1 field whether there are the set of LOWER_SN, UPPER_SN, E1, and E2 fields. The E1 field indicates whether a set of one LOWER_SN field, the E2 UPPER_SN field, the E1 field, and the E2 field follow, and the E2 field indicates whether or not SOstart and SOend fields indicating a part of the LOWER_SN or the UPPER_SN follow. The ACK_SN field includes the next SN of the highest SN among the SNs of RLC PDUs that have been successfully received and the NACK_SN includes the lowest SN that has been successfully received. The UPPER_SN may include the highest SN that has not received so far. The LOWER_SN and the UPPER_SN may include the SN by various predetermined methods to indicate a range of a large number of missed SNs. That is, as an example, the RLC apparatus of the receiving end may request the retransmission to the RLC apparatus of the transmitting end since the RLC PDUs corresponding to all SNs between the LOWER_SN<SN<=UPPER_SN is missed. For example, the transmitting side RLC layer apparatus transmits RLC PDU 5 to RLC PDU 80 at any time, and the receiving side RLC layer apparatus receives only RLC PDU 5, RLC PDU 78, RLC PDU 79, and RLC PDU 80 and stores the received RLC PDU 5, RLC PDU 78, RLC PDU 79, and RLC PDU 80 in the receiving buffer. If the RLC status report message generation condition is satisfied at any time, the receiving side RLC layer apparatus generates the RLC status report message. The ACK_SN field of the RLC status reporting message may include SN 81, the LOWER_SN field my include SN 5, and the UPPER_SN may include 77. The transmitting side RLC layer apparatus receiving the RLC status report message determines that the RLC PDU having a SN lower than the lowest LOWER_SN, that is, the RLC PDUs having a SN lower than 5 is successfully transmitted and discards it in a retransmitting buffer. In addition, PDCP SDUs mapped to the RLC PDUs having a SN lower than 5 among the PDCP SDUs stored in the transmission buffer is also discarded. The transmitting side RLC layer apparatus retransmits the RLC PDU 6 to RLC PDU 77 reporting that the receiving side RLC layer apparatus has not received.

When the first RLC PDU of the RLC layer apparatus of the transmitting end is missed, the LOWER_SN may be allocated as the same value as the UPPER_SN to notify the transmitting end that all the SNs smaller than the UPPER_SN are not received. For example, if the LOWER_SN field includes a SN 77 and the UPPER_SN includes 77, (SN<=77) may be indicated. When the first RLC PDU is missed, the LOWER_SN and the UPPER_SN may be defined by various methods. Alternatively, another field may be defined.

The RLC layer apparatus transmits the RLC PDU with the SN, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information.

Identify RLC PDU failed in transmission
Identify RLC PDU succeeded in transmission It is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the 1-3-3-th RLC status reporting method for the present disclosure are as follows.

The D/C field has a length of 1 bit and indicates whether the RLC PDU is an RLC data PDU or an RLC control PDU as in Table 1-12.

TABLE 1-12

| D/C field value | Description |
| --- | --- |
| 0 | Control PDU |
| 1 | Data PDU |

The CPT field has a length of 1 bit and indicates a kind of RLC control PDU as in Table 1-13.

TABLE 1-13

| CPT field value | Description |
| --- | --- |
| 000 | STATUS PDU |
| 001-111 | Reserved (PDUs with this coding will be discarded by the receiving entity for this release of the protocol) |

ACK_SN indicates the next SN of the RLC PDU that has not yet been received and a SN that is not reported as missed in the RLC status report. Upon receiving the RLC status report at the transmitting end, it is determined that the SN indicated by the ACK_SN is not included, the SNs indicated by the LOWER_SN and the UPPER_SN are not included, and a SN smaller than ACK_SN has been received successfully (when the LOWER_SN is indicated together with the SOstart and the SOend or the UPPER_SN is indicated together with the SOstart and the SO end, it is determined that the SOstart and the SOend successfully receive only a part other than the part indicated by the LOWER_SN or a part other than the part indicated by the UPPER_SN). The ACK_SN has a predetermined length, and the predetermined length can be variously defined such as 10 bits, 16 bits, or 18 bits.

The E1 field has a length of 1 bit and indicates whether or not the LOWER_SN, the UPPER_SN, the E1 field, and the E2 field follow as in Table 1-14.

TABLE 1-14

| E1 field value | Description |
| --- | --- |
| 0 | A set of LOWER_SN, E2, UPPER_SN, E1 and E2 does not follow. |
| 1 | A set of LOWER_SN, E2, UPPER_SN, E1 and E2 follows. |

The LOWER_SN may include the lowest SN that has been successfully received. The UPPER_SN may include the highest SN that has not been received. The LOWER_SN and the UPPER_SN may include the SN by various predetermined methods to indicate a range of a large number of missed SNs. The LOWER_SN and UPPER_SN have a predetermined length, and the predetermined length can be variously defined such as 10 bits, 16 bits, or 18 bits. When the first RLC PDU of the RLC layer apparatus of the transmitting end is missed, the LOWER_SN may be allocated as the same value as the UPPER_SN to notify the transmitting end that all the SNs smaller than the UPPER_SN are not received. For example, if the LOWER_SN field may include a SN 77 and the UPPER_SN includes 77, (SN<=77) may be indicated. When the first RLC PDU is missed, the LOWER_SN and the UPPER_SN may be defined by various methods. Alternatively, another field may be defined.

The E2 field has a length of 1 bit and indicates whether the SOstart and the SOend follow as in Table 1-15.

TABLE 1-15

| E2 field value | Description |
| --- | --- |
| 0 | A set of SOstart and SOend does not follow for this LOWER_SN or UPPER_SN. |
| 1 | A set of SOstart and SOend follows for this LOWER_SN or UPPER_SN. |

The SOstart field indicates a head position of the part when indicating a part of the LOWER_SN or the UPPER_SN. The head position may be indicated by a byte unit. The SOstart has a predetermined length, and the predetermined length can be variously defined such as 15 bits, 16 bits, or 18 bits.

The SOend field indicates a tail position of the part when indicating a part of the LOWER_SN or the UPPER_SN. The tail position may be indicated by a byte unit. The SOend has a predetermined length, and the predetermined length can be variously defined such as 15 bits, 16 bits, and 18 bits.

The 1-3-3-th RLC status reporting method proposed above can be equally applied to the NR RLC apparatus of the scenarios such as 1*f*-02, 1*f*-03, and 1*f*-04 in FIGS. 1FA and 1FB.

Figure 1P:
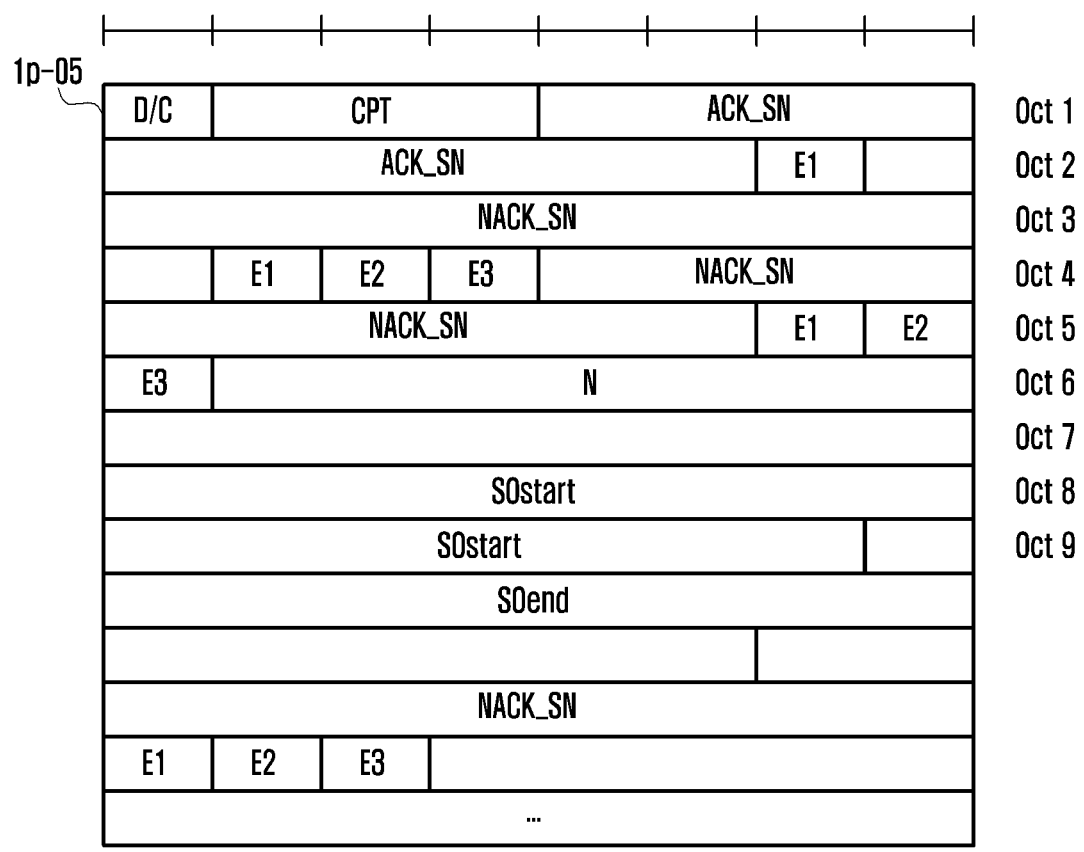
FIG. 1P is a diagram of an RLC status reporting method, according to an embodiment of the present disclosure.

FIG. 1P is a diagram of an RLC status reporting method, according to an embodiment of the present disclosure.

In FIG. 1P an RLC status report is sent from a receiving side RLC layer apparatus to a transmitting side RLC layer device (assuming a 10 bit RLC SN length).

The receiving side RLC layer device stores the received RLC PDUs in the receiving buffer and then checks the SN to recognize the SN of the RLC PDU missed during the transmission. If the predetermined condition is satisfied, the receiving side RLC layer apparatus generates an RLC status report message and transmits the generated RLC status report message to the transmitting side RLC layer apparatus. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written as 1*p*-05 in FIG. 1P. The RLC status report message includes one ACK_SN or a set of one ACK_SN and one or more NACK_SN, E1, E2, and E3 fields. It is indicated by the E1 field whether there are the set of NACK_SN, E1, E2, and E3 fields. The E1 field indicates whether a set of one NACK_SN field, the E1 field, the E2 field, and the E3 field follow, and the E2 field indicates whether or not SOstart and SOend fields indicating a part of the NACK_SN follow. The E3 field indicates whether there are N (number of missing RLC PDUs) fields indicating how many SNs above (larger) or below (smaller) from the SN indicated by the NACK_SN are missed. The N field is a field indicating how many SNs above (having a larger SN) or below (having a smaller SN) from the SN indicated by the NACK_SN are missed.

The ACK_SN field may include the next SN of the highest SN among the SNs of RLC PDUs that have successfully been received and the NACK_SN may include the SN that has not been successfully received. When a plurality of consecutive RLC PDUs are missed, the highest SN that has not been received or the lowest SN that has not been received can be included in the NACK_SN in order to use NACK_SN together with the N field, and the N field may include the number of missed SNs. The NACK_SN and N fields may be defined and applied by various other methods to indicate a number of RLC PDUs that have been missed consecutively. That is, as an example, the RLC apparatus of the receiving end may request the retransmission to the RLC apparatus of the transmitting end since the RLC PDUs corresponding to all SNs between 2<SN<=8 as the NACK SN=8 and N=6. As another example, the transmitting side RLC layer apparatus transmits RLC PDU 5 to RLC PDU 80 at any time, and the receiving side RLC layer apparatus receives only RLC PDU 5, RLC PDU 78, RLC PDU 79, and RLC PDU 80 and stores the received RLC PDU 5, RLC PDU 78, RLC PDU 79, and RLC PDU 80 in the receiving buffer. If the RLC status report message generation condition is satisfied at any time, the receiving side RLC layer apparatus generates the RLC status report message. The ACK_SN field of the RLC status report message may include the SN 81, the NACK_SN field may include the SN 6, and another NACK_SN field may include 69 in the N field together with the SN 8 (6, 8<=SN<=77). The transmitting side RLC layer apparatus receiving the RLC status report message determines that the RLC PDU having a SN lower than the lowest NACK_SN, that is, the RLC PDUs having a SN lower than 6 is successfully transmitted and discards it in a retransmitting buffer. In addition, PDCP SDUs mapped to the RLC PDUs having a SN lower than 6 among the PDCP SDUs stored in the transmission buffer is also discarded. The transmitting side RLC layer apparatus retransmits the RLC PDU 6 to RLC PDU 8 to RLC PDU 77 reporting that the receiving side RLC layer apparatus has not received.

The RLC layer apparatus transmits the RLC PDU with the SN, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.

Identify RLC PDU failed in transmission
Identify RLC PDU succeeded in transmission It is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the RLC status reporting method for the present disclosure are as follows.

The D/C field has a length of 1 bit and indicates whether the RLC PDU is an RLC data PDU or an RLC control PDU as in Table 1-16.

TABLE 1-16

| D/C field value | Description |
| --- | --- |
| 0 | Control PDU |
| 1 | Data PDU |

The CPT field has a length of 1 bit and indicates a kind of RLC control PDU as in Table 1-17.

TABLE 1-17

| CPT field value | Description |
| --- | --- |
| 000 | STATUS PDU |
| 001-111 | Reserved (PDUs with this coding will be discarded by the receiving entity for this release of the protocol) |

ACK_SN indicates the next SN of the RLC PDU that has not yet been received and a SN that is not reported as missed in the RLC status report. Upon receiving the RLC status report at the transmitting end, it is determined that the SN indicated by the ACK_SN is not included, the SNs indicated by the NACK_SN are not included, the SNs included in the range indicated by the NACK_SN and the N field are not included, and the SN smaller than the ACK_SN has been received successfully (when the NACK_SN is indicated together with the SOstart and the SOend, it is determined that the SOstart and the SOend successfully receive only a part other than the part indicated by the NACK_SN). The ACK_SN has a predetermined length, and the predetermined length can be variously defined such as 10 bits, 16 bits, or 18 bits.

The E1 field has a length of 1 bit and indicates whether or not the LOWER_SN, the UPPER_SN, the E1 field, and the E2 field follow as in Table 1-18.

TABLE 1-18

| E1 field value | Description |
| --- | --- |
| 0 | A set of NACK_SN, E1, E2, and E3 does not follow. |
| 1 | A set of NACK_SN, E1, E2, and E3 follows. |

The NACK_SN may include the SN that has not been received. When a plurality of consecutive RLC PDUs are missed, the highest SN that has not been received or the lowest SN that has not been received can be included in the NACK_SN in order to use NACK_SN together with the N field, and the N field may include the number of missed SNs. The NACK_SN and N fields may be defined and applied by various other methods to indicate a number of RLC PDUs that have been missed consecutively. The NACK_SN has a predetermined length, and the predetermined length can be variously defined such as 10 bits, 16 bits, or 18 bits.

The N field is a field indicating how many SNs above (having a larger SN) or below (having a smaller SN) from the SN indicated by the NACK_SN are missed.

The E2 field has a length of 1 bit and indicates whether the SOstart and the SOend follow as in Table 1-19.

TABLE 1-19

| E2 field value | Description |
| --- | --- |
| 0 | A set of SOstart and SOend does not follow for this LOWER_SN or UPPER_SN. |
| 1 | A set of SOstart and SOend follows for this LOWER_SN or UPPER_SN. |

The E3 field indicates whether there are N (number of missing RLC PDUs) fields indicating how many SNs above (larger) or below (smaller) from the SN indicated by the NACK_SN are missed as in Table 1-20.

TABLE 1-20

| E3 field value | Description |
| --- | --- |
| 0 | N does not follow for this NACK_SN. |
| 1 | N follows for this NACK_SN. |

The SOstart field indicates a head position of the part when indicating a part of the NACK_SN. The head position may be indicated by a byte unit. The SOstart has a predetermined length, and the predetermined length can be variously defined such as 15 bits, 16 bits, and 18 bits.

The SOend field indicates a tail position of the part when indicating a part of the NACK_SN. The tail position may be indicated by a byte unit. The SOend has a predetermined length, and the predetermined length can be variously defined such as 15 bits, 16 bits, and 18 bits.

The RLC status reporting method proposed above can be equally applied to the NR RLC apparatus of 1*f*-02, 1*f*-03, and 1*f*-04 in FIGS. 1FA and 1FB.

Figure 1Q:
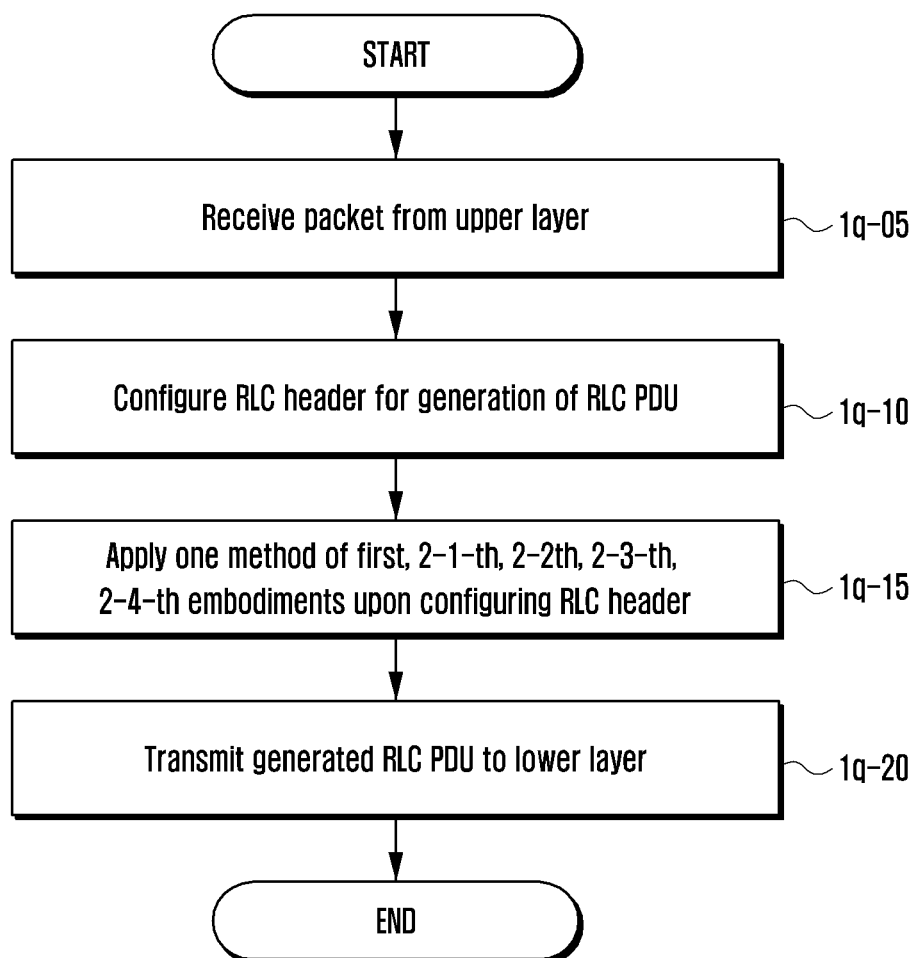
FIG. 1Q is a flowchart of an operation of a terminal, according to an embodiment of the present disclosure.

FIG. 1Q is a flowchart of a method of the terminal.

In FIG. 1Q, the terminal receives a packet from the higher layer (at step 1*q*-05) and configures an RLC header (at step 1*q*-10) to generate the received packet as the RLC PDU. When configuring the RLC header, one of the previously described methods for configuring the RLC header can be used to configure the RLC header (at step 1*q*-15). The generated RLC PDU is transferred to a lower layer (at step 1*q*-20). The operation of the terminal may equally apply to the NR RLC apparatus of the 1*f*-02, 1*f*-03, 1*f*-04 in FIGS. 1FA and 1FB.

Figure 1R:
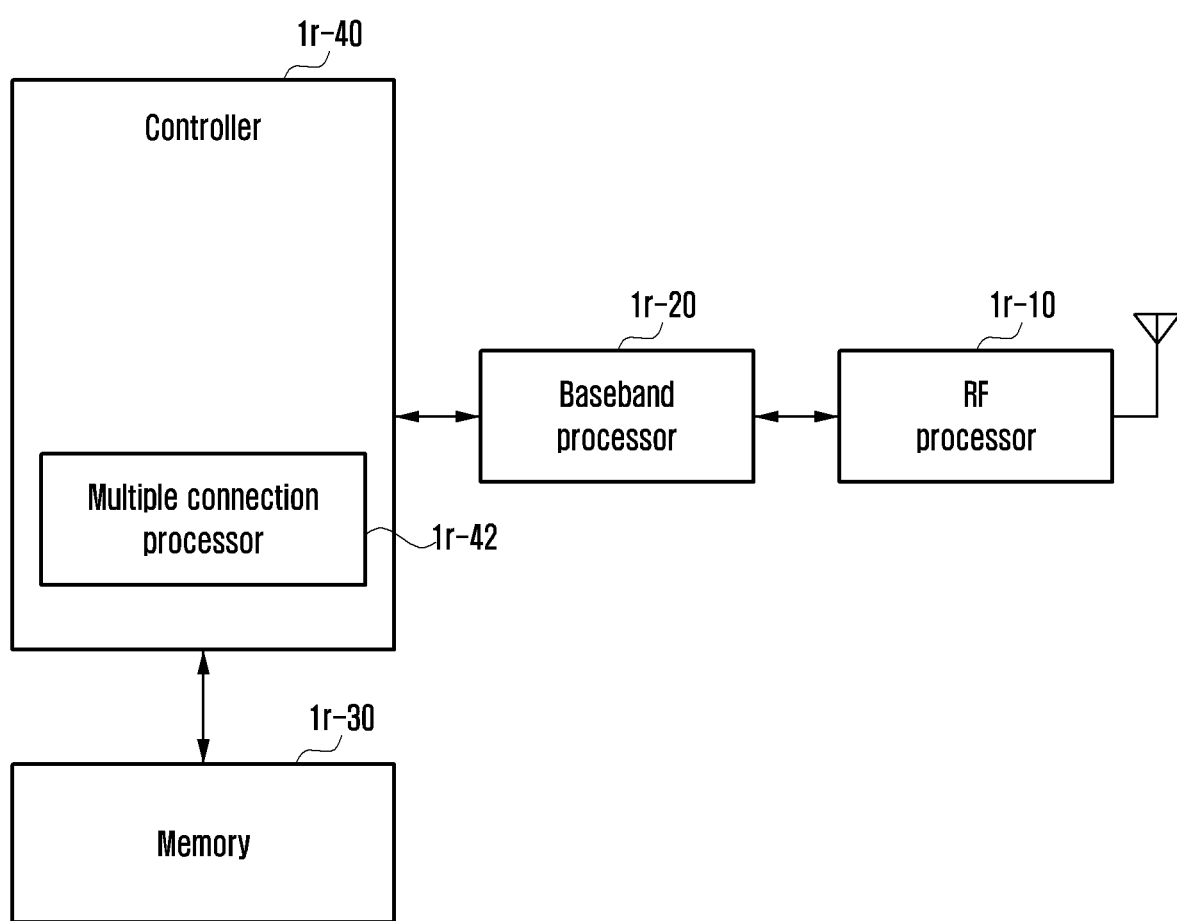
FIG. 1R is a block diagram of an internal structure of the terminal, according to an embodiment of the present disclosure.

FIG. 1R is a diagram of the terminal, according to an embodiment of the present disclosure.

Referring to FIG. 1R, the terminal includes a radio frequency (RF) processor 1*r*-10, a baseband processor 1*r*-20, a memory 1*r*-30, and a controller 1*r*-40.

The RF processor 1*r*-10 serves to transmit and receive a signal through a radio channel, such as band conversion and amplification of a signal. That is, the RF processor 1*r*-10 up-converts a baseband signal provided from the baseband processor 1*r*-20 into an RF band signal and then transmits the RF band signal through an antenna and down-converts the RF band signal received through the antenna into the baseband signal. The RF processor 1*r*-10 may include a transmitting filter, a receiving filter, an amplifier, a mixer, an oscillator, a digital to analog converter (DAC), an analog to digital converter (ADC), or the like. FIG. 1R illustrates only one antenna but the terminal may include a plurality of antennas. The RF processor 1*r*-10 may include a plurality of RF chains. The RF processor 1*r*-10 may perform beamforming. For the beamforming, the RF processor 1*r*-10 may adjust a phase and a size of each of the signals transmitted and received through a plurality of antennas or antenna elements. In addition, the RF processor may perform MIMO and may receive a plurality of layers when performing a MIMO operation. The RF processor 1*r*-10 may perform reception beam sweeping by appropriately configuring a plurality of antennas or antenna elements under the control of the controller or adjust a direction and a beam width of the reception beam so that the reception beam is resonated with the transmission beam.

The baseband processor 1*r*-20 performs a conversion function between a baseband signal and a bit string according to a physical layer standard of a system. When data is transmitted, the baseband processor 1*r*-20 generates complex symbols by coding and modulating a transmitted bit string. Further, when data is received, the baseband processor 1*r*-20 recovers the received bit string by demodulating and decoding the baseband signal provided from the RF processor 1*r*-10. According to the OFDM scheme, when data is transmitted, the baseband processor 1*r*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 1*r*-20 divides the baseband signal provided from the RF processor 1*r*-10 in an OFDM symbol unit and recovers the signals mapped to the sub-carriers by a fast Fourier transform (FFT) operation and then recovers the received bit string by the modulation and decoding.

The baseband processor 1*r*-20 and the RF processor 1*r*-10 transmit and receive a signal as described above. The baseband processor 1*r*-20 and the RF processor 1*r*-10 may be called a transmitter, a receiver, a transceiver, or a communication unit. At least one of the baseband processor 1*r*-20 and the RF processor 1*r*-10 may include a plurality of communication modules to support a plurality of different RATs. Further, at least one of the baseband processor 1*r*-20 and the RF processor 1*r*-10 may include different communication modules to process signals in different frequency bands. The different wireless access technologies may include an LTE network, an NR network, and the like. Further, different frequency bands may include a super high frequency (SHF) (for example, 2.5 GHz, 5 GHz) band, a millimeter wave (for example, 60 GHz) band.

The memory 1r-30 stores data such as basic programs, application programs, and configuration information for the operation of the terminal. Further, the memory 1r-30 provides the stored data according to the request of the controller 1r-40.

The controller 1r-40 controls the overall operations of the terminal. The controller 1r-40 transmits and receives a signal through the baseband processor 1r-20 and the RF processor 1r-10. Further, the controller 1r-40 records and reads data in and from the memory 1r-40. The controller 1r-40 may include at least one processor, and may include a communication processor (CP) performing a control for communication, an application processor (AP) controlling a higher layer such as the application programs, and a multiple connection processor 1r-42 controlling connections between multiple nodes.

Figure 1S:
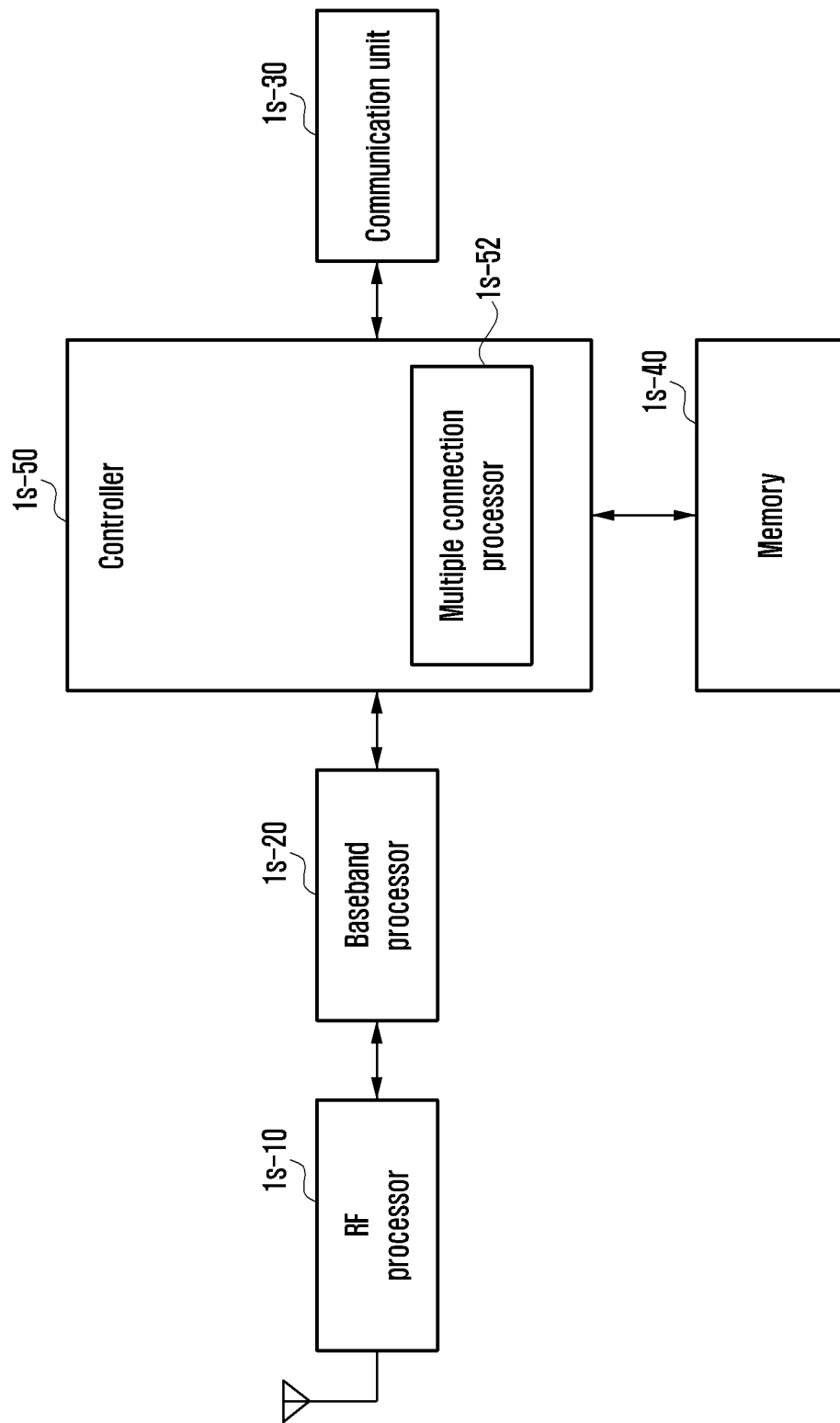
FIG. 1S is a block diagram of a base station transceiver, according to an embodiment of the present disclosure.

FIG. 1S is a diagram of a base station or a TRP (transmission and reception point) in a wireless communication system, according to an embodiment of the present disclosure.

As illustrated in FIG. 1S, the base station is configured to include an RF processor 1s-10, a baseband processor 1s-20, a communication unit 1s-30, a memory 1s-40, and a controller 1s-50.

The RF processor 1s-10 serves to transmit and receive a signal through a radio channel, such as band conversion and amplification of a signal. That is, the RF processor 1s-10 up-converts a baseband signal provided from the baseband processor 1s-20 into an RF band signal and then transmits the RF band signal through an antenna and down-converts the RF band signal received through the antenna into the baseband signal. The RF processor 1s-10 may include a transmitting filter, a receiving filter, an amplifier, a mixer, an oscillator, a DAC, an ADC, or the like. FIG. 1S illustrates only one antenna but the first access node may include a plurality of antennas. The RF processor 1s-10 may include a plurality of RF chains. Further, the RF processor 1s-10 may perform the beamforming. For the beamforming, the RF processor 1s-10 may adjust a phase and a size of each of the signals transmitted/received through a plurality of antennas or antenna elements. The RF processor 1s-10 may perform a downward MIMO operation by transmitting one or more layers.

The baseband processor 1s-20 performs a conversion function between the baseband signal and the bit string according to the physical layer standard of the first radio access technology. When data is transmitted, the baseband processor 1s-20 generates complex symbols by coding and modulating a transmitted bit string. Further, when data is received, the baseband processor 1s-20 recovers the received bit string by demodulating and decoding the baseband signal provided from the RF processor 1s-10. According to the OFDM scheme, when data is transmitted, the baseband processor 1s-20 generates the complex symbols by coding and modulating the transmitting bit string, maps the complex symbols to the sub-carriers, and then performs the IFFT operation and the CP insertion to construct the OFDM symbols. When data is received, the baseband processor 1s-20 divides the baseband signal provided from the RF processor 1s-10 in the OFDM symbol unit and recovers the signals mapped to the sub-carriers by the FFT operation and then recovers the receiving bit string by the modulation and decoding. The baseband processor 1s-20 and the RF processor 1s-10 transmit and receive a signal as described above. Therefore, the baseband processor 1s-20 and the RF processor 1s-10 may be called a transmitter, a receiver, a transceiver, or a communication unit.

The communication unit 1s-30 provides an interface for performing communication with other nodes within the network.

The memory 1s-40 stores data such as basic programs, application programs, and setting information for the operation of the main base station. In particular, the memory 1s-40 may store the information on the bearer allocated to the accessed terminal, the measured results reported from the accessed terminal, etc. The memory 1s-40 may store information that is a determination criterion on whether to provide a multiple connection to the terminal or stop the multiple connection to the terminal. Further, the memory 1s-40 provides the stored data according to the request of the controller 1s-50.

The controller 1s-50 controls the general operations of the main base station. The controller 1s-50 transmits/receives a signal through the baseband processor 1s-20 and the RF processor 1s-10 or the communication unit 1s-30. Further, the controller 1s-50 records and reads data in and from the memory 1s-40. For this purpose, the controller 1s-50 may include at least one processor and/or a multiple connection processor 1s-52 controlling connections between multiple nodes.

Figure 2A:
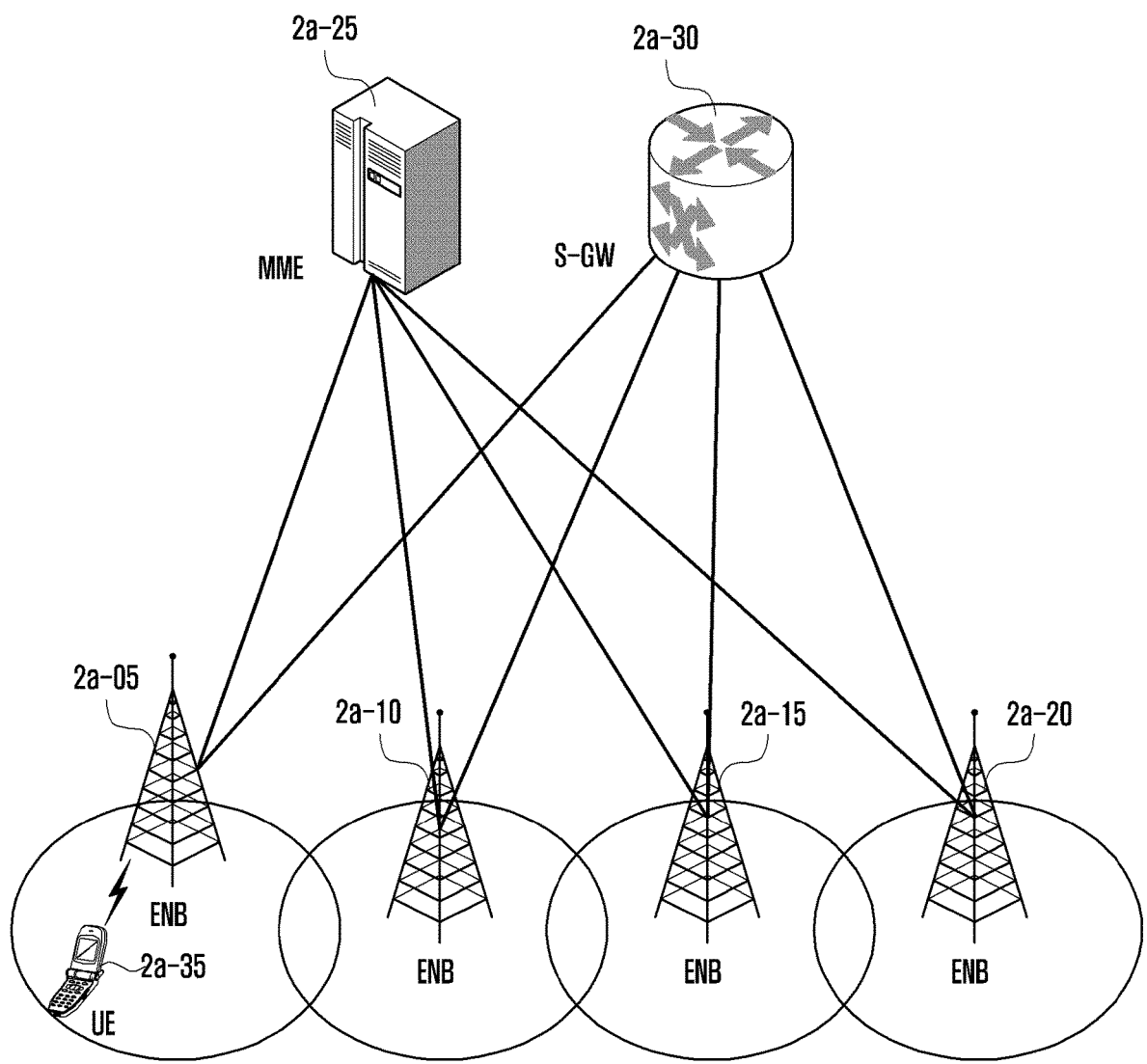
FIG. 2A is a diagram of a structure of an LTE system, according to an embodiment of the present disclosure.

FIG. 2A is a diagram of an LTE system, according to an embodiment of the present disclosure.

As illustrated in FIG. 1A, a RAT of an LTE system is configured to include next generation base stations (ENB, Node B, or base station) 2a-05, 2a-10, 2a-15, and 2a-20, an MME 2a-25, and a S-GW 2a-30. UE or terminal 2a-35 accesses an external network through the ENBs 2a-05 to 2a-20 and the S-GW 2a-30.

The ENBs 2a-05 to 2a-20 correspond to the existing node B of the UMTS system. The ENB is connected to the UE 2a-35 through a radio channel and performs more complicated role than the existing node B. In the LTE system, in addition to a real-time service like a VoIP through the internet protocol, all the user traffics are served through a shared channel and therefore an apparatus for collecting and scheduling status information such as a buffer status, an available transmission power status, and a channel state of the terminals is required. The ENBs 2a-05 to 2a-20 take charge of the collecting and scheduling status information. One ENB generally controls a plurality of cells. For example, to implement a transmission rate of 100 Mbps, the LTE system uses, as a RAT, OFDM in, for example, a bandwidth of 20 MHz. Further, an AMC scheme for determining a modulation scheme and a channel coding rate depending on a channel status of the terminal is applied. The S-GW 2a-30 is an apparatus for providing a data bearer and generates or removes the data bearer according to the control of the MME 2a-25. The MME is an apparatus for performing a mobility management function for the terminal and various control functions and is connected to a plurality of base station.

Figure 2B:
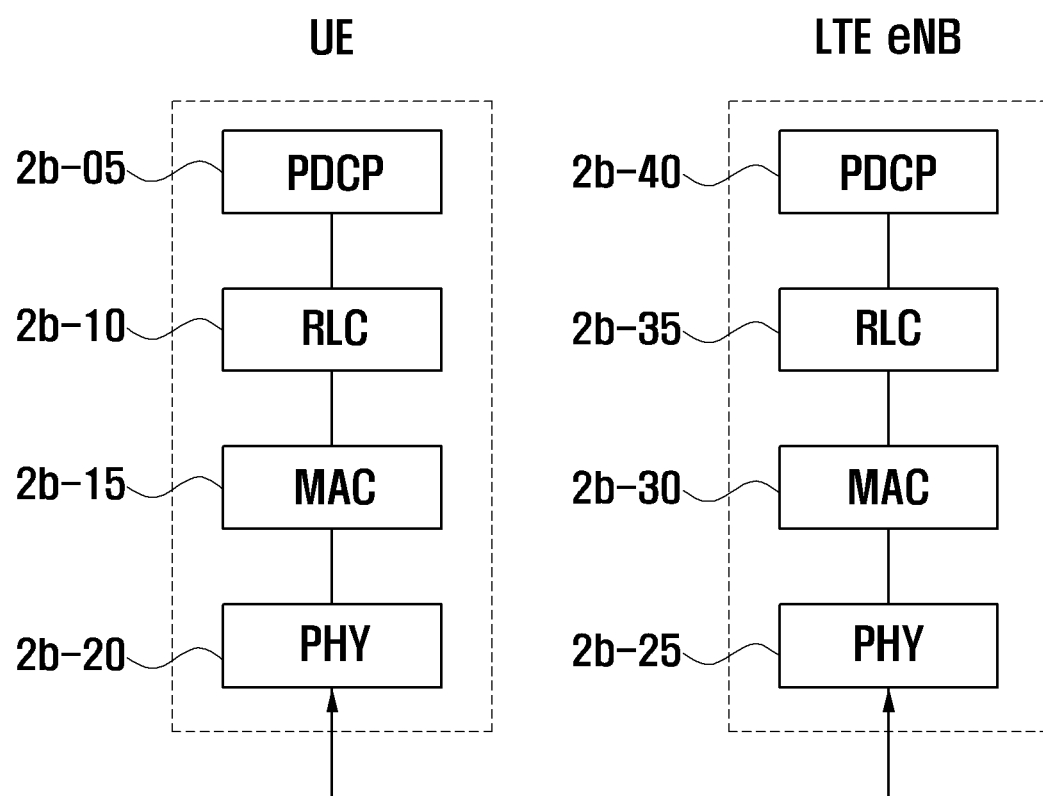
FIG. 2B is a diagram of a radio protocol structure in the LTE system, according to an embodiment of the present disclosure.

FIG. 2B is a diagram of a radio protocol structure in the LTE system.

The radio protocol of the LTE system is configured to include PDCPs 2b-05 and 2b-40, RLCs 2b-10 and 2b-35, and medium access controls (MACs 2b-15 and 2b-30 in the terminal and the ENB, respectively. The PDCPs 2b-05 and 2b-40 control operations such as IP header compression/decompression. The main functions of the PDCP are summarized as follows.

Header compression and decompression function (Header compression and decompression: ROHC only)

Transfer of user data

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at HO and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 2b-10 and 2b-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 2b-15 and 2b-30 are connected to several RLC layer apparatuses configured in one terminal and perform multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from TBs delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 2b-20 and 2b-25 perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2C:
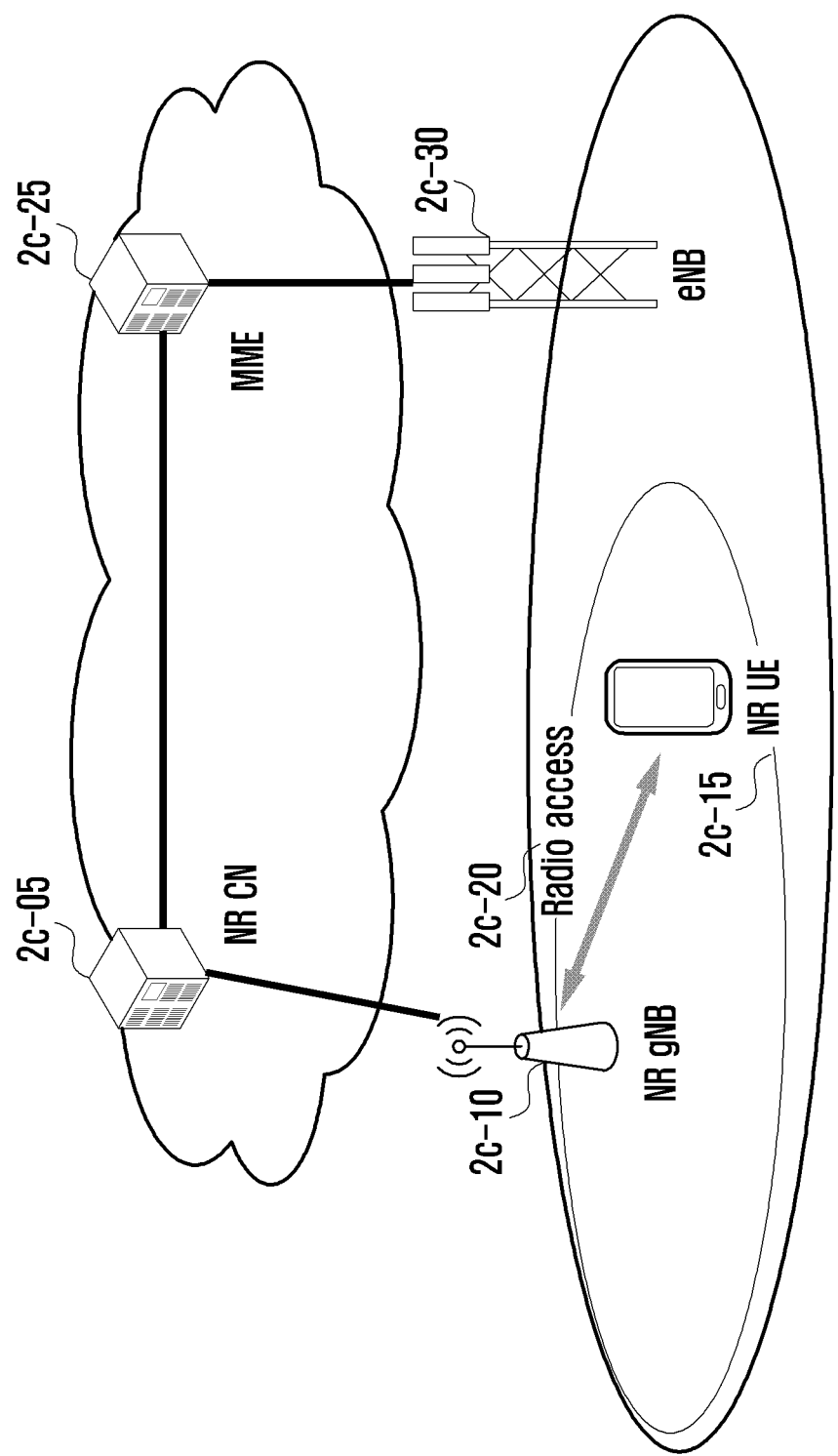
FIG. 2C is a diagram of a next generation mobile communication system, according to an embodiment of the present disclosure.

FIG. 2C is a diagram of a next generation mobile communication system, according to an embodiment of the present disclosure.

A RAN of a next generation mobile communication system (hereinafter referred to as NR or 5G) is configured to include a next generation base station (NR node B, hereinafter NR gNB or NR base station) 2c-10 and an NR CN 2c-05. The user terminal (NR UE or UE) 8c-15 accesses the external network through the NR gNB 2c-10 and the NR CN 2c-05.

In FIG. 2C, the NR gNB 2c-10 corresponds to an eNB of the existing LTE system. The NR gNB is connected to the NR UE 2c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 2c-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a RAT. An AMC scheme for determining a modulation scheme and a channel coding rate depending on a channel status of the terminal is applied. The NR CN 2c-05 may perform functions such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 2c-25 through the network interface. The MME is connected to the eNB 2c-30 which is the existing base station.

Figure 2D:
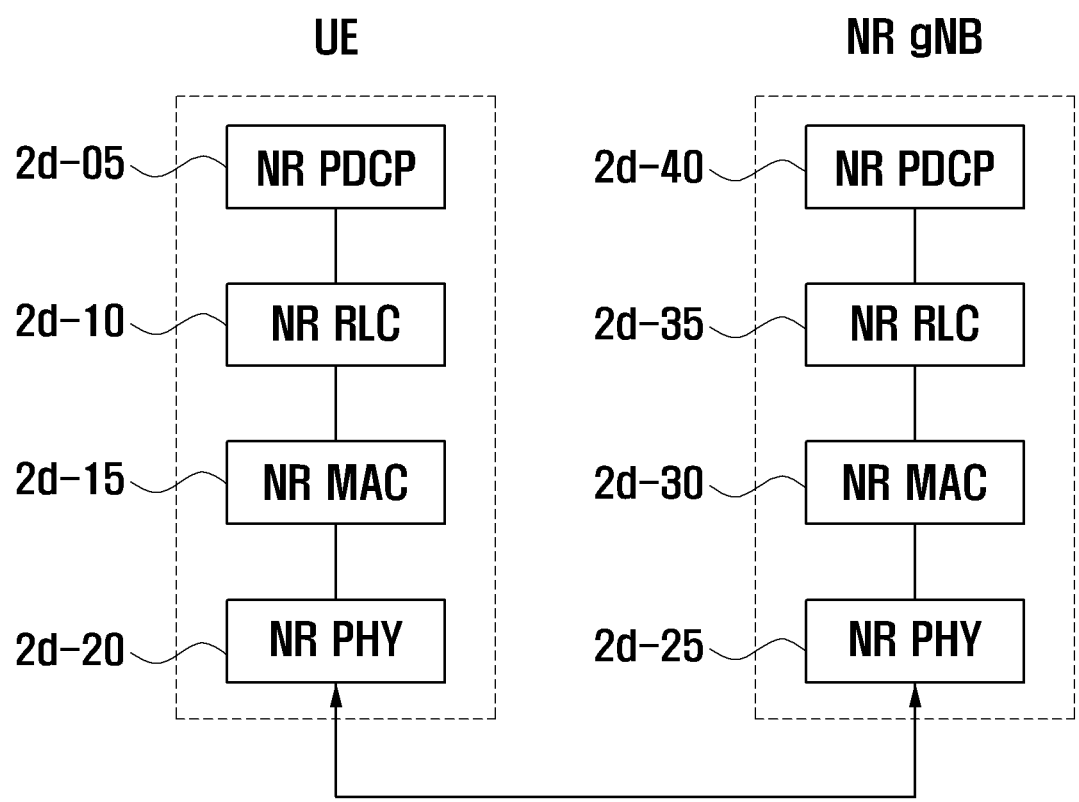
FIG. 2D is a diagram of a radio protocol structure of a next generation mobile communication system, according to an embodiment of the present disclosure.

FIG. 2D is a diagram of a radio protocol structure of a next generation mobile communication system, according to an embodiment of the present disclosure.

The radio protocol of the next generation mobile communication system is configured to include NR PDCPs 2d-05 and 2d-40, NR RLCs 2d-10 and 2d-35, and NR MACs 2d-15 and 2d-30 in the terminal and the NR base station. The main functions of the NR PDCPs 2d-05 and 2d-40 may include some of the following functions.

Header compression and decompression function (Header compression and decompression: ROHC only)

Transfer of user data

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

In this case, the reordering function of the NR PDCP apparatus is for rearranging PDCP PDUs received in a lower layer in order based on a PDCP SN and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 2d-10 and 2d-35 may include some of the following functions.

Data transfer function (Transfer of upper layer PDUs)
In-sequence delivery function (In-sequence delivery of upper layer PDUs)
Out-of-sequence delivery function (Out-of-sequence delivery of upper layer PDUs)
ARQ function (Error correction through HARQ)
Concatenation, segmentation, reassembly function (Concatenation, segmentation and reassembly of RLC SDUs)
Re-segmentation function (Re-segmentation of RLC data PDUs)
Reordering function (Reordering of RLC data PDUs)
Duplicate detection function (Duplicate detection)
Error detection function (Protocol error detection)
RLC SDU discard function (RLC SDU discard)
RLC re-establishment function (RLC re-establishment)

In the above description, the in-sequence delivery function of the NR RLC apparatus is for delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC SN or the PDCP SN, a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received to the higher layer if the predetermined timer expires even if there is the lost RLC SDU.

The out-of-sequence delivery function of the NR RLC apparatus is for directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 2d-15 and 2d-30 may be connected to several NR RLC layer apparatuses configured in one terminal, and the main functions of the NR MAC may include some of the following functions.

Mapping function (Mapping between logical channels and transport channels)
Multiplexing and demultiplexing function (Multiplexing/demultiplexing of MAC SDUs)
Scheduling information reporting function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

The NR PHY layers 2d-20 and 2d-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2E:
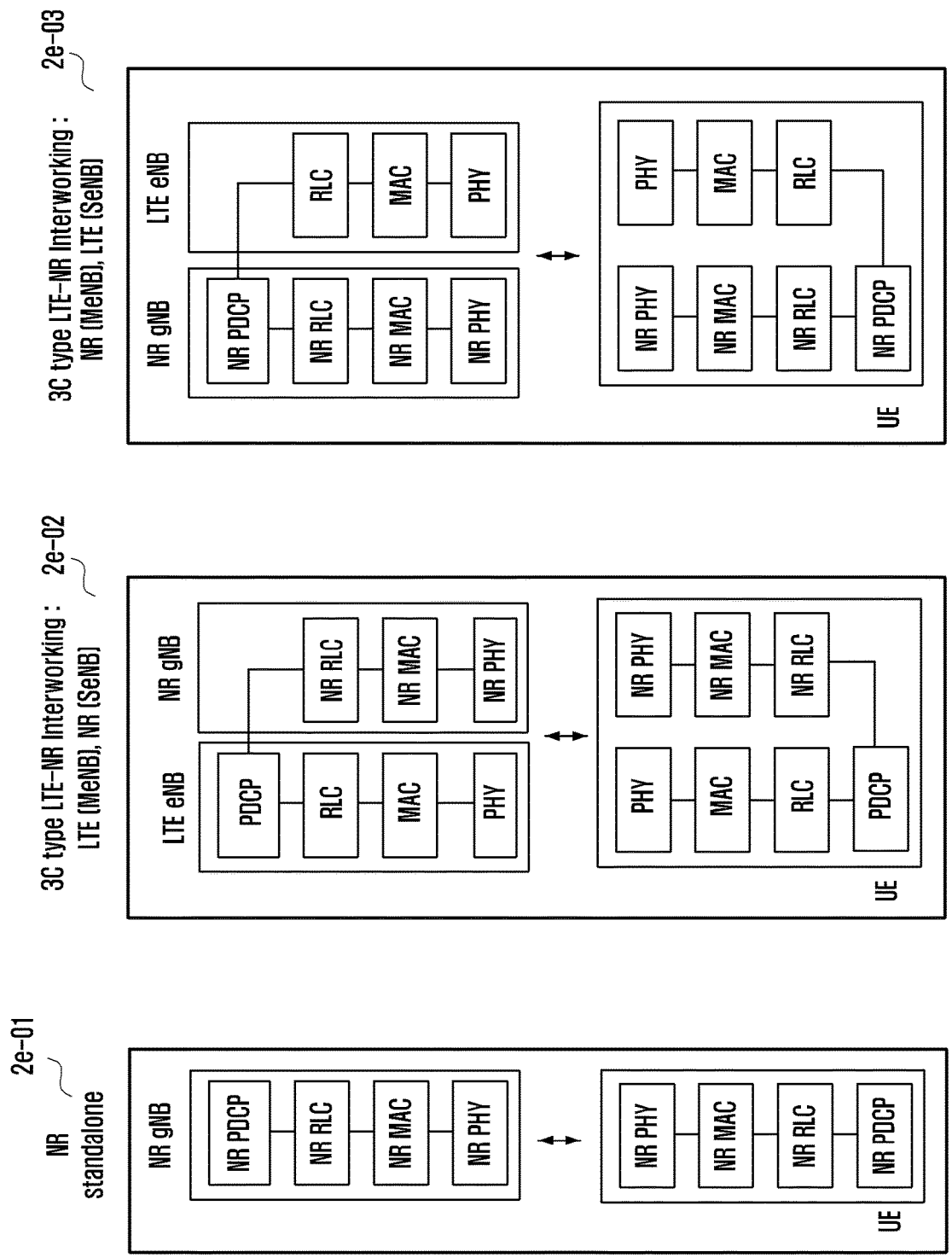
FIGS. 2EA and 2EB are diagrams of a terminal for receiving services through an LTE base station and a new radio (NR) base station in the next generation mobile communication system, according to an embodiment of the present disclosure.
Figure 2E:
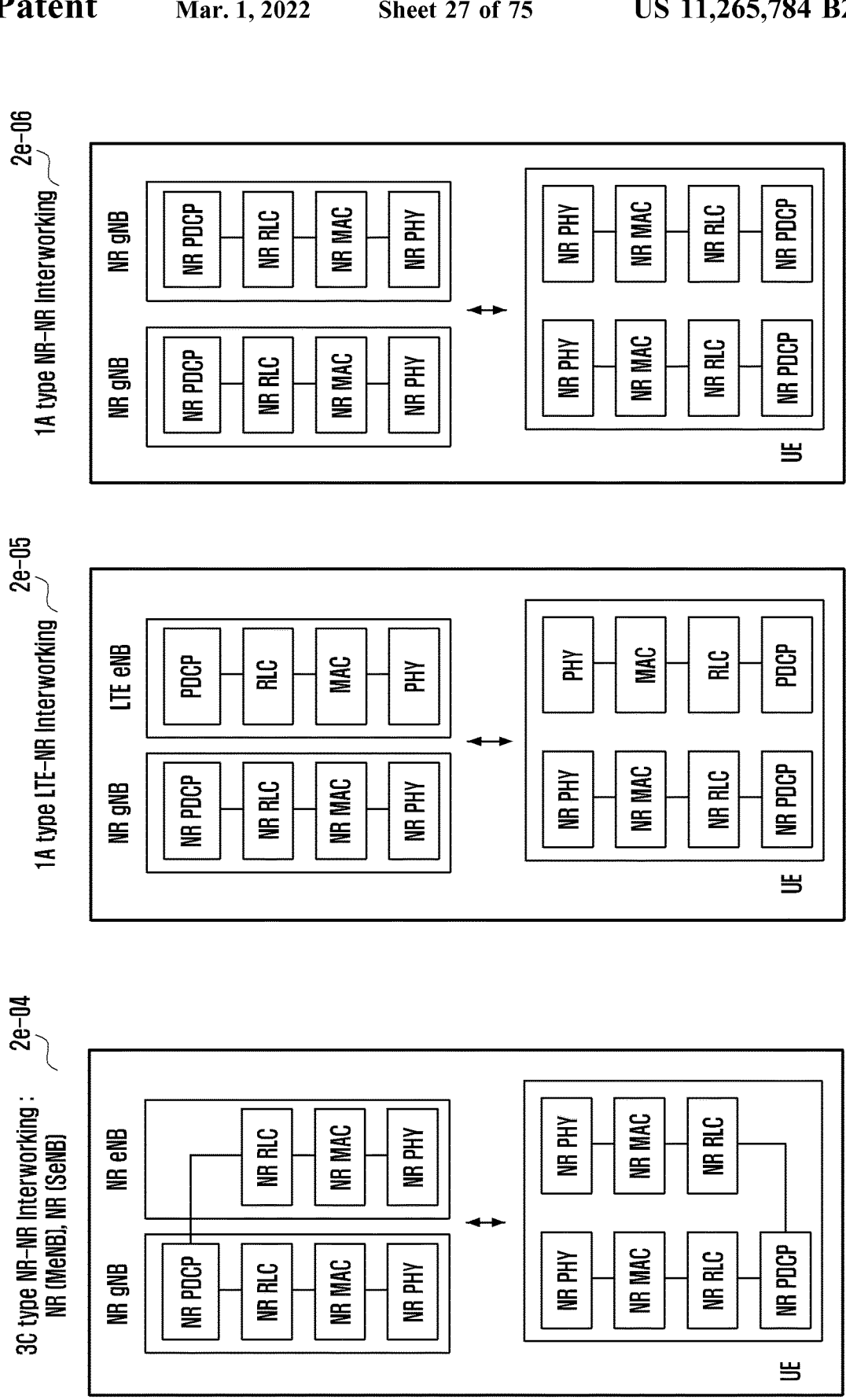

FIGS. 2EA and 2EB are diagrams of the terminal that receives services through an LTE base station and an NR base station in the next generation mobile communication system, according to an embodiment of the present disclosure.

In FIGS. 2EA and 2EB, 2e-01 shows that the terminal is served from the NR base station, 2e-02 shows that the LTE base station is the master (MeNB) in the 3C type LTE base station-NR base station interworking, 2e-03 shows that the NR base station is the master (MeNB) in the 3C type LTE base station-NR base station interworking, 2e-04 shows that the NR base station is the master (MeNB) in the 3C type NR base station-NR base station interworking, 2e-05 shows a 2a type LTE-base station-NR base station interworking, and 2e-06 shows a 2a type NR base station-NR base station interworking.

Figure 2F:
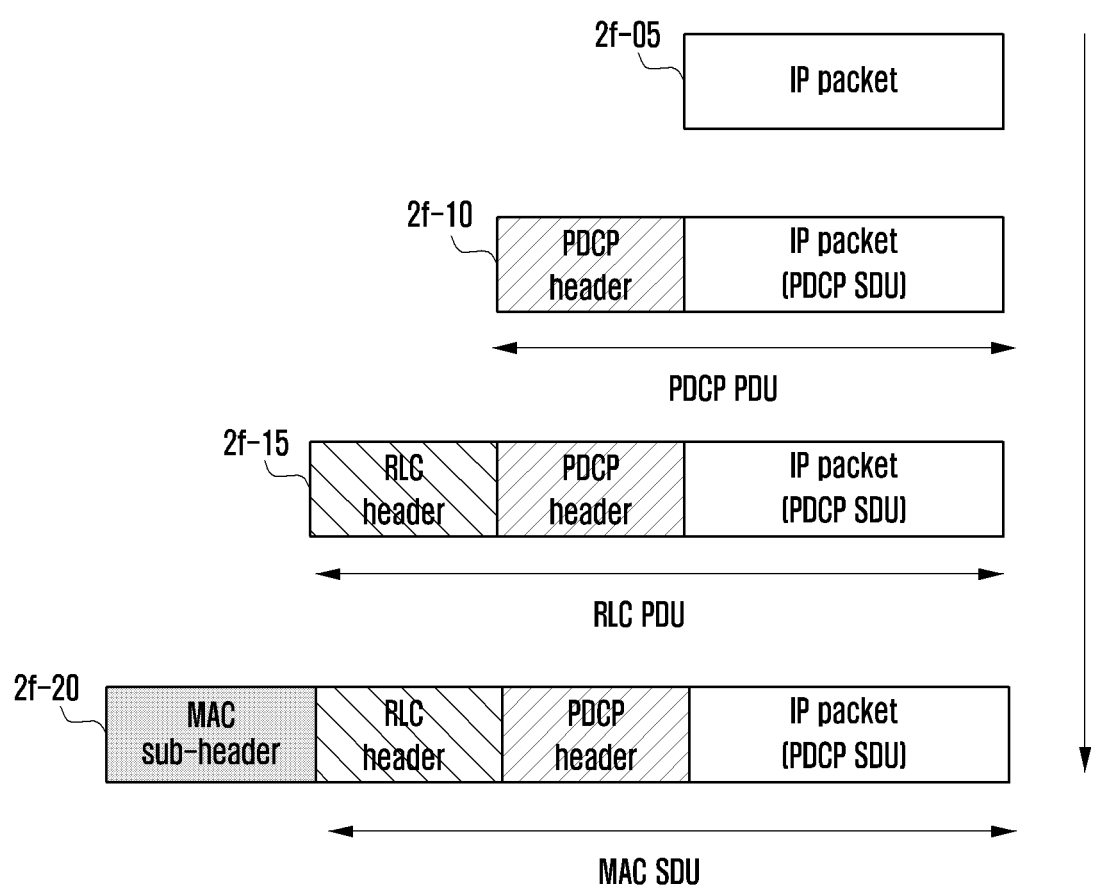
FIG. 2F is a diagram of a method for processing a data packet in advance, according to an embodiment of the present disclosure.

FIG. 2F is a diagram of a method for processing a data packet in advance, according to an embodiment of the present disclosure.

In 2e-01, 2e-02, 2e-03, 2e-04, 2e-05, and 2e-06 of FIGS. 2EA and 2EB, when receiving the IP packet 2f-05 from a higher layer on a user plane layer, the NR base station or the terminal of the next generation mobile communication systems may process the received package in advance. The processing refers to processing the IP packet to the PDCP PDU 2f-10 of the PDCP layer, the RLC PDU 2f-15 of the RLC layer, or the MAC SDU 2f-20 together with the MAC subheader of the MAC layer in advance.

FIG. 2G is a diagram illustrating problems that may occur by a timer (e.g., PDCP discard timer) maintained at a PDCP layer.

In FIG. 2G, when the IP packets are received by the PDCP layer, the PDCP layer may maintain one timer for each IP packet. The timer may represent the expiration date of the corresponding packet, and if the timer expires, the corresponding packet is discarded since the expiration date of the packet expires. For example, it is assumed that the timer for the IP packet 4 expires. If the IP packet 4 is processed in the PDCP layer 2g-05 in advance to be the PDCP PDU, since the expiration date of the corresponding IP packet has expired, the corresponding PDCP PDU should be discarded. Therefore, the PDCP SN 3 2g-15 is discarded. The PDCP layer of the receiving end may not know whether the discarded PDCP SN 3 is missed during the transmission or is discarded since the timer has expired. Therefore, the receiving end waits for the PDCP SN 3 to be retransmitted, thereby causing a transmission delay. If the IP packet 4 is processed in the PDCP layer in advance and transmitted to the RLC layer 2g-20 and processed in the RLC layer in advance to be the RLC PDU 2g-25, the RLC PDU should be discarded. In this case, the RLC SN 3 is discarded. Therefore, the RLC layer of the receiving end may not know whether the RLC SN 3 is missed or discarded during the transmission and therefore continuously waits, such that the window stalling problem occurs and the normal RLC ARQ operation may not be performed. The problem may occur when the PDCP SN is reused in the RLC and the RLC SN is not used in the RLC layer, in other words, when only one SN is used during the whole data processing.

Figure 2H:
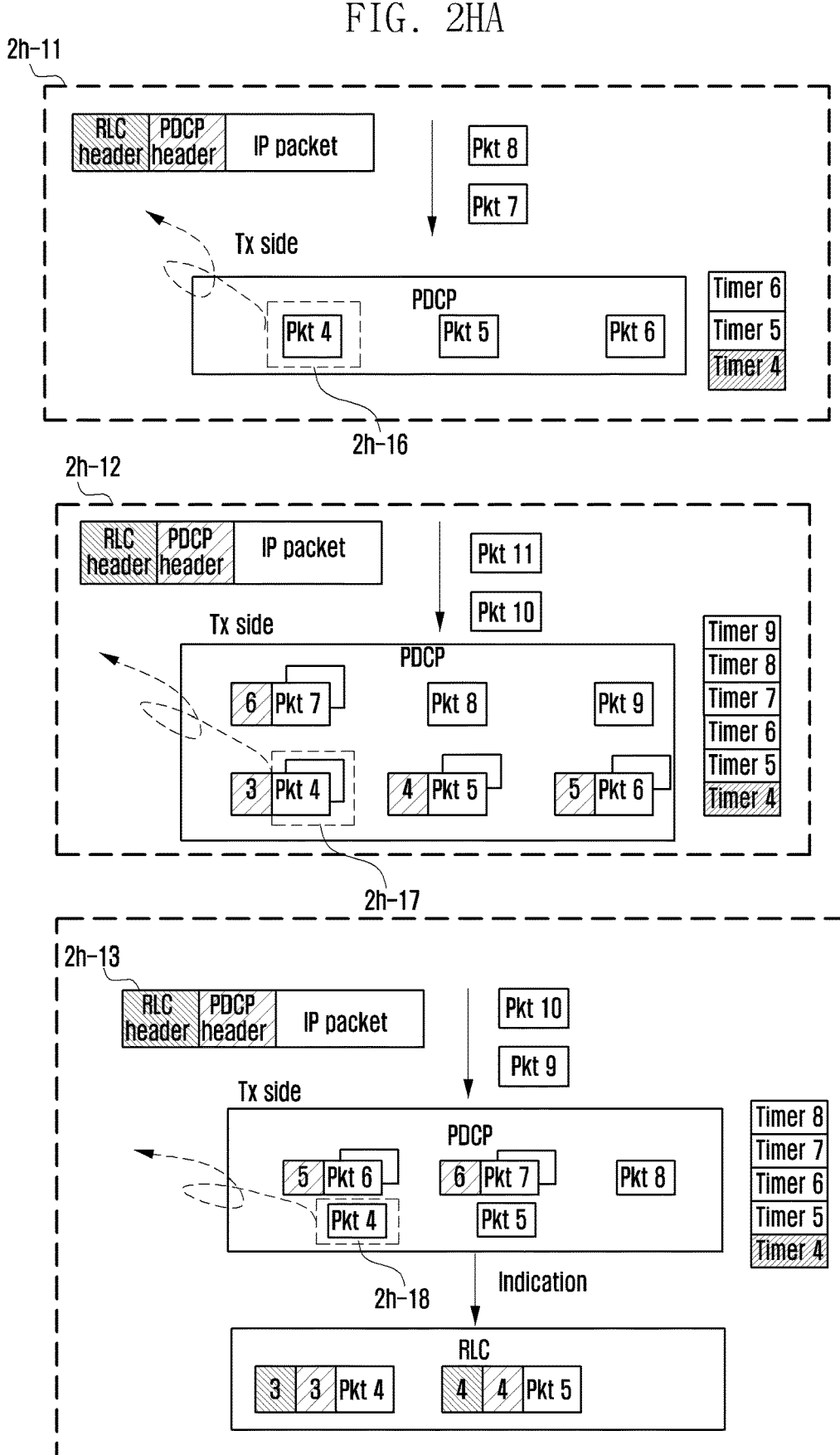
FIGS. 2HA, 2HB, and 2HC are diagrams of an expiring packet, according to an embodiment of the present disclosure.
Figure 2H:
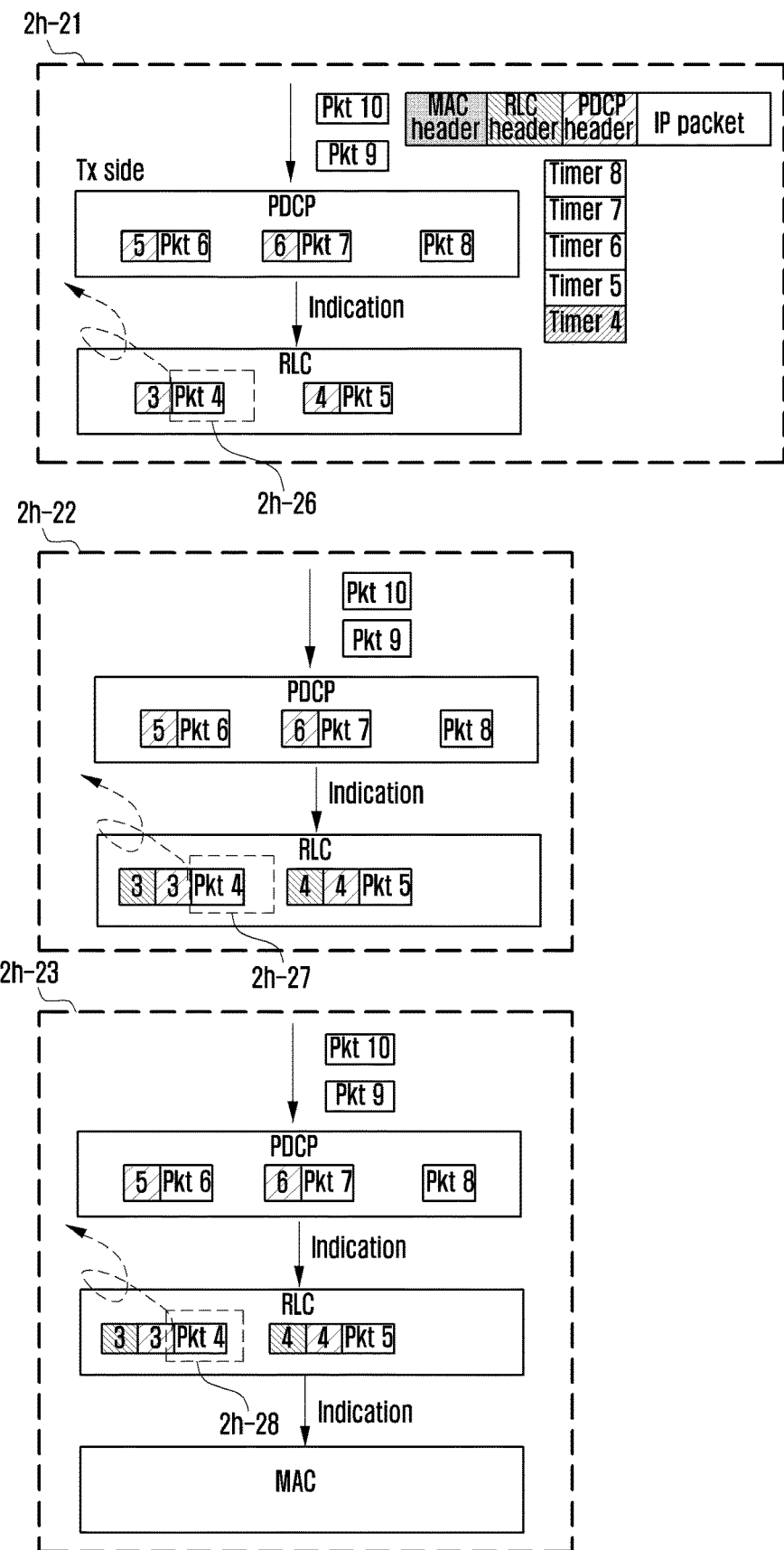
Figure 2H:
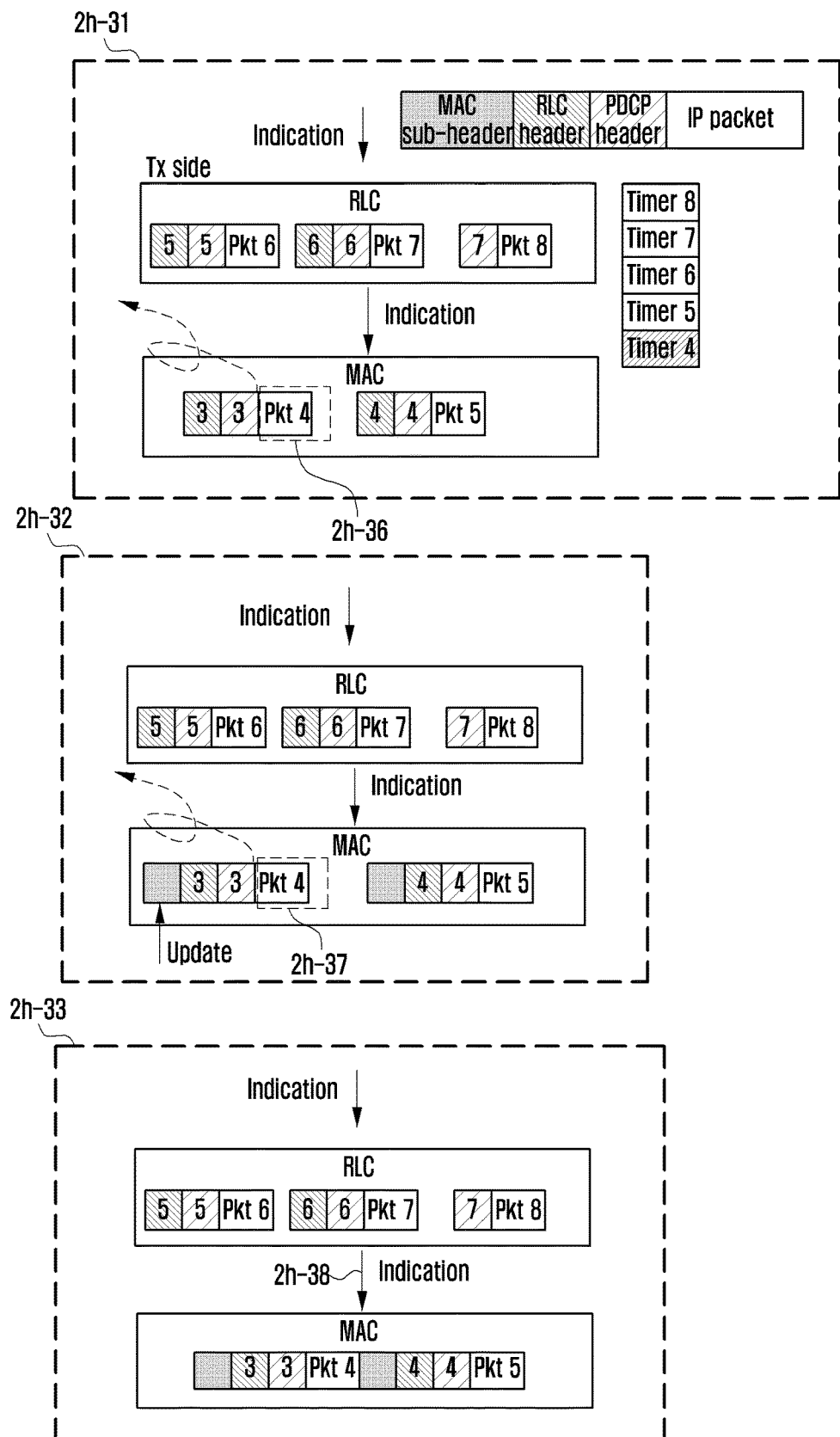
Figure 2I:
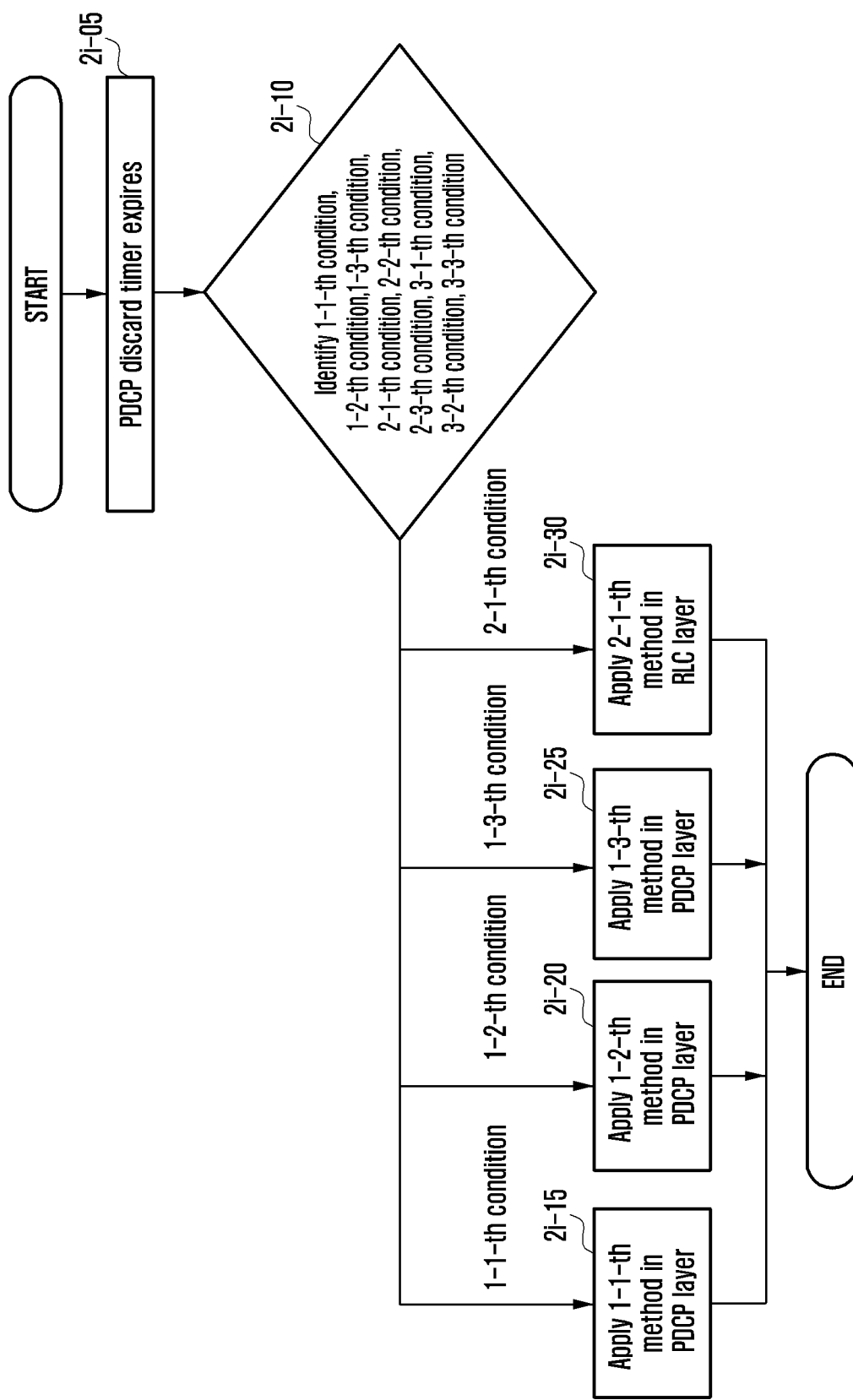
FIGS. 2IA and 2IB are flowcharts for a method of a terminal, according to an embodiment of the present disclosure.
Figure 2I:
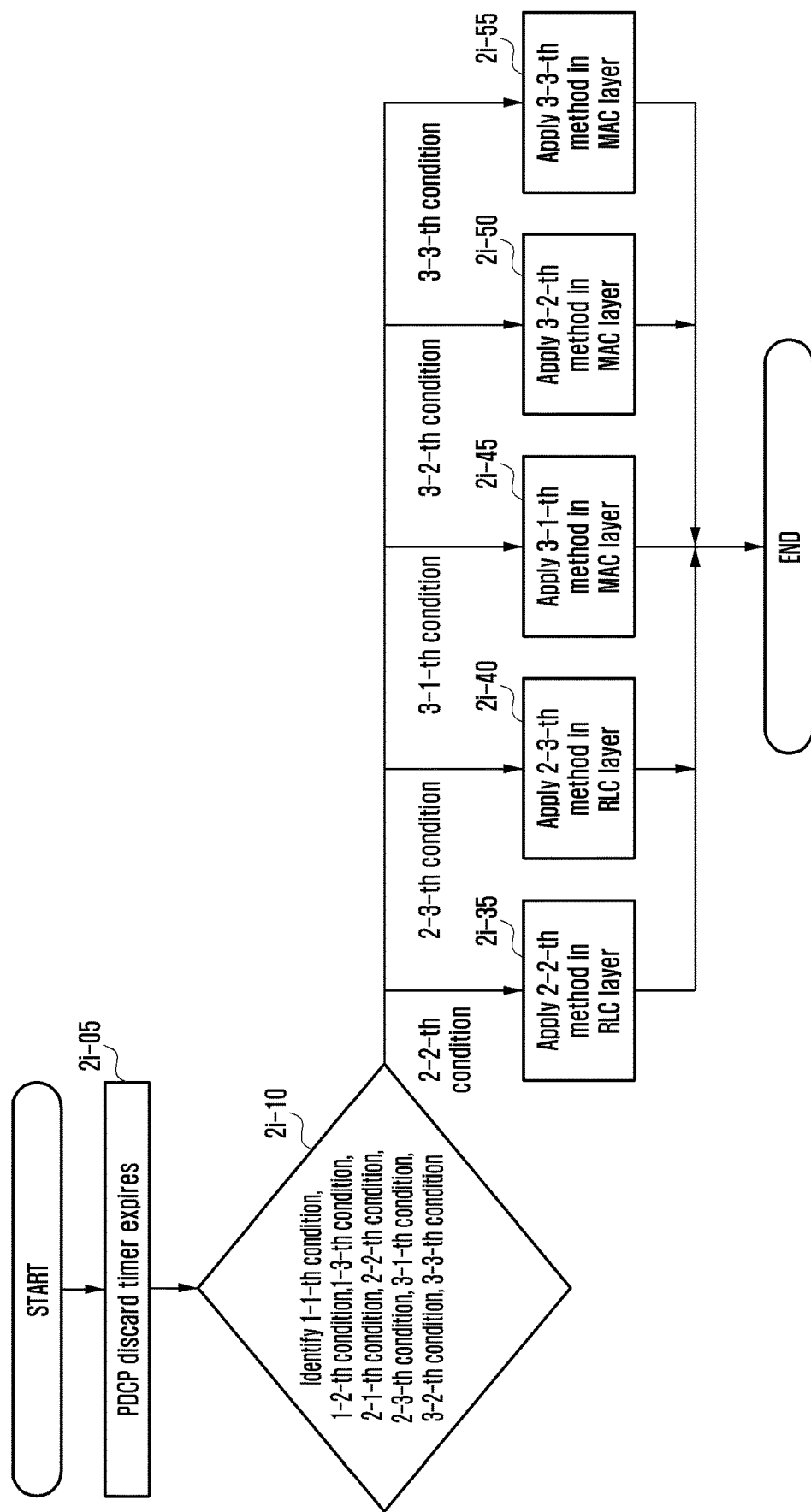

FIGS. 2HA, 2HB, and 2HC are diagrams of a 2-1-th packet that has expired, according to an embodiment of the present disclosure.

In FIGS. 2HA, 2HB, and 2HC, the 2-1-th expired packet processing method for the present disclosure may be divided into the operations of the PDCP layer, the RLC layer, and the MAC layer as follows.

Operation of PDCP Layer

In the PDCP layer, the timer is driven for each packet entering the PDCP layer. The timer may be a timer representing the expiration date of each timer, and each timer value may be indicated as the RRC message by the base station. If the timer has expired, the following operations are performed.

The timer has expired,
if the 1-1-th condition is satisfied, the 1-1-th method is performed,
if the 1-2-th condition is satisfied, the 1-2-th method is performed, and
if the 1-3-th condition is satisfied, the 1-3-th method is performed.

The 1-1-th condition is a case in which a packet corresponding to the expired timer is not yet processed in the PDCP layer and is stored in a packet or PDCP SDU 2h-11.

The 1-2-th condition is a case in which the packet corresponding to an expired timer is processed in the PDCP layer in advance and stored in the PDCP PDU and not yet transmitted to the RLC layer 2h-12.

The 1-3-th condition is a case in which the packet corresponding to an expired timer is processed in the PDCP layer in advance and stored in the PDCP PDU and transmitted to the RLC layer in advance 2h-13.

The 1-1-th method is a method for discarding a packet or a PDCP SDU stored in the PDCP layer 2h-16.

The 1-2-th method is a method for discarding the packet or the PDCP SDU stored in the PDCP layer, discarding only a payload of the PDCP PDU corresponding to the packet, and transmitting the PDCP header without discarding the PDCP header 2h-17, and only the PDCP header is transmitted to the RLC layer.

The 1-3-th method is a method for discarding a packet or a PDCP SDU stored in the PDCP layer and transmitting and notifying an indication of information on a packet having the expired timer to the RLC layer 2h-18.

Operation of RLC layer

The RLC layer stores the PDCP PDUs received from the PDCP layer and may process the RLC PDUs in advance. If the RLC layer receives an indication of information on the expired packet from the PDCP layer, the RLC layer performs the following operations.

The RLC layer receives the indication of the information on the expired packet from the PDCP layer,
if the 2-1-th condition is satisfied, the 2-1-th method is performed,
if the 2-2-th condition is satisfied, the 2-2-th method is performed, and
if the 2-3-th condition is satisfied, the 2-3-th method is performed.

The 2-1-th condition is a case in which a packet corresponding to the expired timer is transmitted to the RLC layer, not yet processed, and stored in PDCP SDU (RLC SDU) 2h-21.

The 2-2 condition is a case in which the packet corresponding to an expired timer is transmitted to the RLC layer, processed in advance to be stored in the PDCP layer, and is not yet transmitted to the RLC layer 2h-22.

The 2-3 condition is a case in which the packet corresponding to an expired timer is transmitted to the RLC layer, processed in advance to be stored in the RLC layer, and is transmitted to the RLC layer in advance 2h-23.

The 2-1-th method is a method for discarding only the payload of the PDCP PDU (RLC SDU) stored in the RLC layer corresponding to the expired packet and transmitting the PDCP header without discarding the PDCP header 2h-26, attaching only the PDCP header to the RLC header and transmitting it to the MAC layer.

The 2-2-th method is a method for discarding only the payload of the PDCP PDU of the RLC SDU processed and stored in the RLC layer and transmitting the RLC header and the PDCP header without discarding the RLC header and the PDCP header 2h-27, and transmitting only the PDCP header and RLC header to the MAC layer.

The 2-3-th method is a method for discarding only the payload of the PDCP PDU of the RLC PDU processed in the RLC layer corresponding to the expired packet and stored in the retransmission buffer and not discarding the RLC header and the PDCP header 2h-28 and transmitting and notifying the indication of the information on the packet having the expired timer to the MAC layer 2h-28.

Operation of MAC Layer

The MAC layer stores the RLC PDU received from the RLC layer and may perform the processing with the MAC subheader and the MAC PDU in advance. If the MAC layer receives an indication of information on the expired packet from the RLC layer, the RLC layer performs the following operations.

The MAC layer receives the indication of the information on the expired packet from the RLC layer,
if the 3-1-th condition is satisfied, the 3-1-th method is performed,
if the 3-2-th condition is satisfied, the 3-2-th method is performed, and
if the 3-3-th condition is satisfied, the 3-3-th method is performed.

The 3-1-th condition refers to a case in which a packet corresponding to the expired timer is transmitted to the MAC layer, not yet processed, and stored in RLC PDU (MAC SDU) 2h-31.

The 3-2 condition is a case in which the packet corresponding to the expired timer is transmitted to the MAC layer, processed in advance to be stored in the MAC subheader and the MAC SDU, and is not a part of the MAC PDU 2h-32.

The 3-3 condition is a case in which the packet corresponding to the expired timer is transmitted to the MAC layer, processed in advance to be stored in the MAC subheader and the MAC SDU, and is a part of the MAC PDU in advance 2h-33.

The 3-1-th method is a method for discarding only the payload of the PDCP PDU of the RLC SDU stored in the MAC layer corresponding to the expired packet and transmitting the PDCP header and the RLC header without discarding the PDCP header and the RLC header 2h-36, attaching only the MAC subheader to the PDCP header and the RLC header, and configured as the MAC PDU and transmitted.

The 3-2-th method is a method for discarding the MAC subheader and only the payload of the PDCP PDU of MAC SDU (RLC PDU) that are processed and stored in the MAC layer corresponding to the expired packet and transmitting the RLC header and the PDCP header without discarding the RLC header and the PDCP header 2h-37, and newly update the MAC subheader corresponding to the PDCP header and the RLC header, and configured as the MAC PDU and transmitted (for example, the L field of the MAC subheader should be updated if the payload part of the PDCP PDU of the MAC SDU is deleted).

The 3-3-th method does not perform the processing on the packet that is processed in the MAC layer in advance to be a part of the MAC PDU 2h-38.

The 2-1-th condition processes the expired packet for discarding only a part corresponding to the expired packet and transmitting only the headers when the expired packet is processed with the PDCP PDU, the RLC PDU, or the MAC subheader and the MAC SDU in advance, to solve the problem occurring in FIG. 2G. Since the header is transmitted by the method as described above, the missing of the SN does not occur in the PDCP layer or the RLC layer due to the expired packet. However, the overhead may be increased according to the size of the header during the transmission, and the overhead is insignificant at a high data rate. The 2-1-th condition for processing the expired packet may be applied to solve the problem that may likewise occur in 2e-01, 2e-02, 2e-03, 2e-04, 2e-05 and 2e-06 in FIGS. 2EA and 2EB.

When the 2-1-th condition for processing the expired packet is applied to the transmitting end, the operation at the receiving end is as follows.

When the MAC PDU is received at the receiving end, it is demultiplexed and transmitted to the RLC layer, and when the segmented segments are present, the RLC layer creates a complete RLC SDU (PDCP PDU) and transmits it to the PDCP layer. When the PDCP PDU is a header only packet, the PDCP layer updates the decoding related parameters (e.g., HFN (Hyper Frame Number), Next_PDCP_TX_SN, etc.) and does not perform a decoding process on the packet including only the headers (the reason is that there is no information to be transmitted to the higher layer because it is the header only information). If the PDCP PDU received by the PDCP layer is not a packet including only the header but a general data packet, the PDCP layer of the receiving end updates the parameters related to the decoding (e.g., HFN, Next_PDCP_TX_SN, etc.) and performs the decoding procedure on the data packet and performs the integrity verification if necessary.

FIGS. 21A and 21B are diagrams of a terminal to which the 2-1-th condition is applied, according to an embodiment of the present disclosure.

When a terminal proceeds to step 2i-10, if the PDCP discard timer on any packet expires in the PDCP layer at step 2i-05, the terminal 2i-01 proceeds to step 2i-10 to confirm the processing of the packet. If the 1-1-th condition is satisfied, the 1-1-th method is applied in the PDCP (at step 2i-15), if the 1-2-th condition is satisfied, the 1-2-th method is applied in the PDCP (at step 2i-20), if the 1-3-th condition is satisfied, the 1-3-th method is applied in the PDCP layer (at step 2i-25), if the 2-1-th condition is satisfied, the 2-1-th method is applied in the RLC layer (2i-30), if the 2-2-th condition is satisfied, the 2-2-th method is applied in the RLC layer (at step 2i-35), if the 2-3-th condition is satisfied, the 2-3-th method is applied in the RLC layer (at step 2i-40), if the 3-1-th condition is satisfied, the 3-1-th method is applied in the MAC layer (at step 2i-45), if the 3-2-th condition is satisfied, the 3-2-th method is applied in the MAC layer (at step 2i-50), and if the 3-3-th condition is satisfied, the 3-3-th method is applied in the MAC layer (at step 2i-55).

Figure 2J:
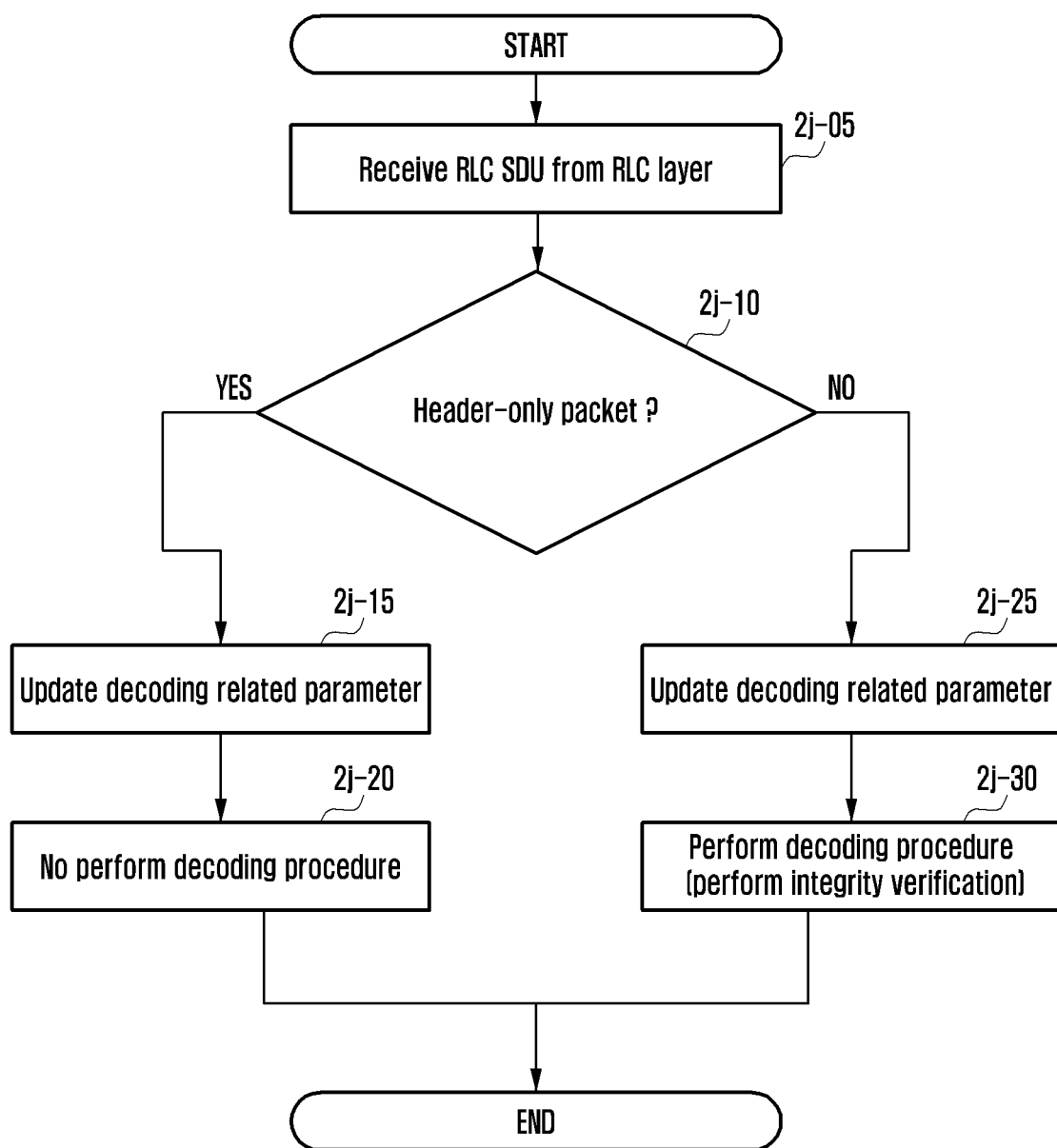
FIG. 2J is a flow for a method of a terminal of a receiving end, according to an embodiment of the present disclosure.

FIG. 2J is a flowchart of a method of a terminal of a receiving end when the 2-1-th condition is applied, according to an embodiment of the present disclosure.

When the receiving terminal receives the MAC PDU, it demultiplexes the MAC PDU and transmits the demultiplexed MAC PDU to the RLC layer, and when the segmented segments are present, the RLC layer creates a complete RLC SDU (PDCP PDU) and transmits it to the PDCP layer (at step 2j-05). When the PDCP layer receives the RLC SDU (PDCP PDU) from the RLC layer, it is confirmed whether the PDCP PDU is a header only packet (at step 2j-10). In the case of the header only packet, the decoding related parameters (e.g., HFN, Next_PDCP_TX_SN, etc.) are updated (at step 2j-15) and the decoding procedure on the packet including only the headers is not performed (at step 2j-20) (i.e., there is no information to be transmitted to the higher layer because it is the header only information). If the PDCP PDU received by the PDCP layer is not a packet including only the header but a general data packet, the PDCP layer of the receiving end updates the decoding related parameters (e.g., HFN, Next_PDCP_TX_SN, etc.) (at step 2j-25) and performs the decoding procedure on the data packet and performs the integrity verification if necessary (at step 2j-30).

Figure 2K:
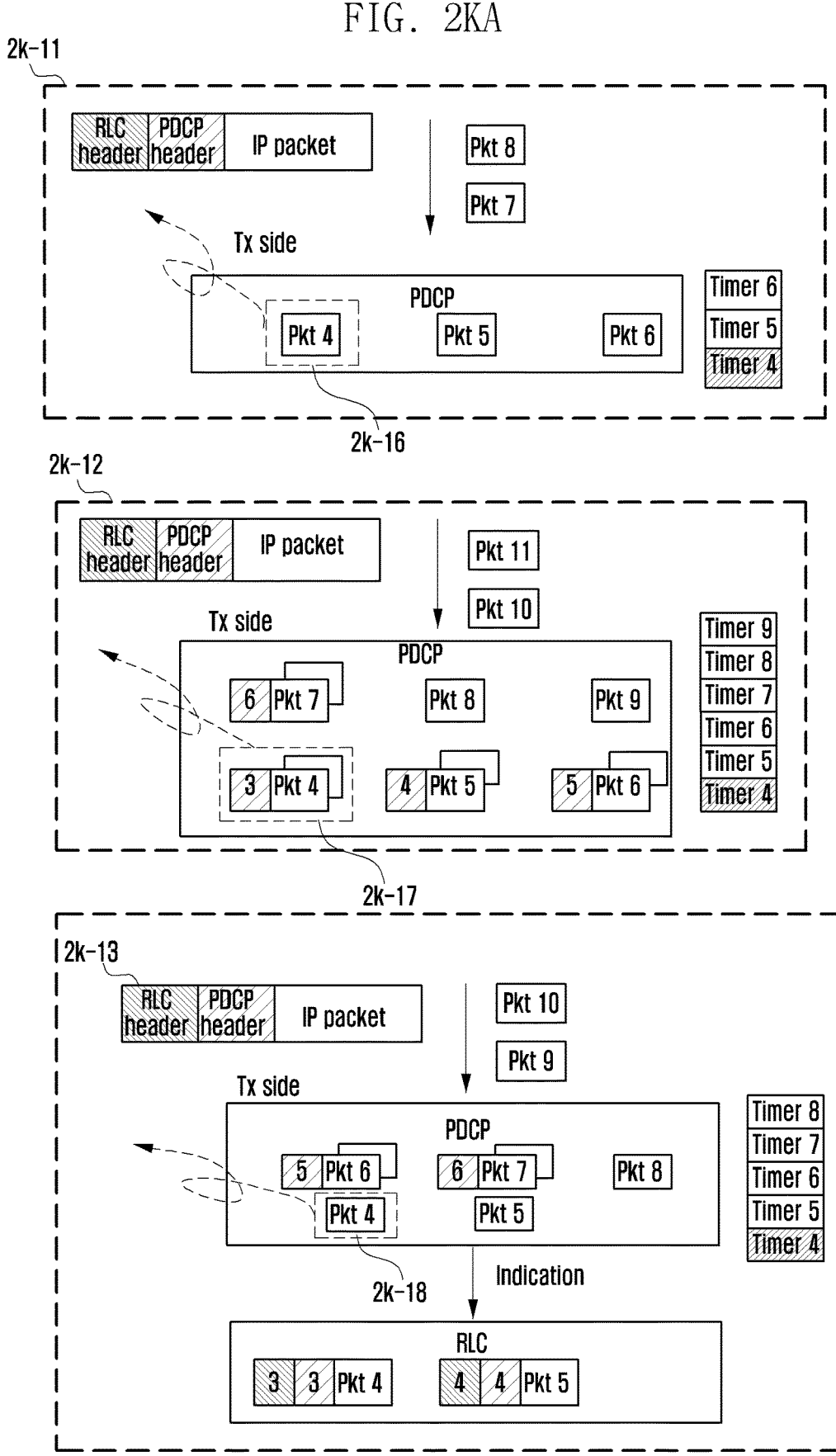
FIGS. 2KA and 2KB are diagrams of an expiring packet, according to an embodiment of the present disclosure.
Figure 2K:
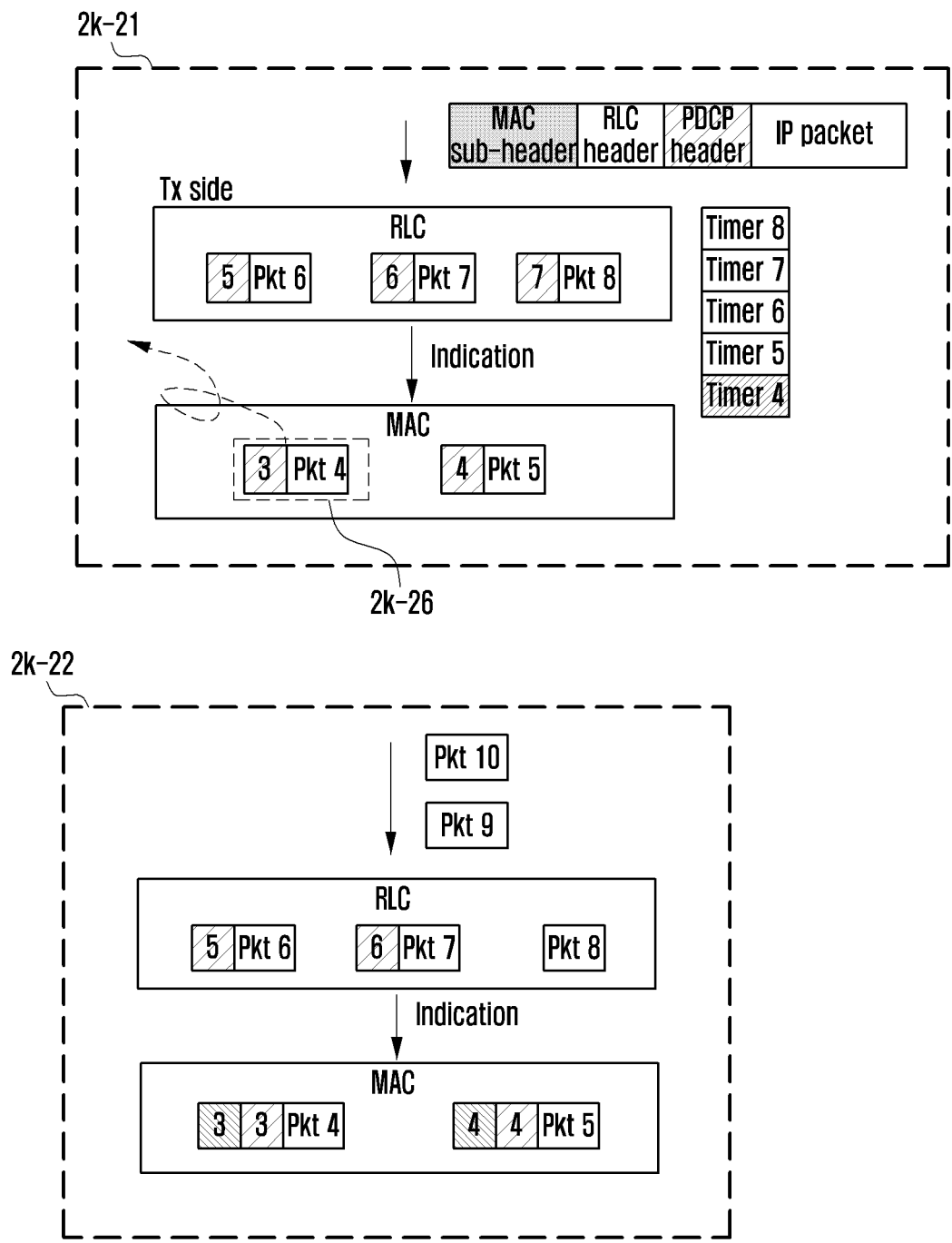

FIGS. 2KA and 2KB show a 2-2-th packet that has expired, according to an embodiment of the present disclosure.

In FIGS. 2Ka and 2KB, the 2-2-th expired packet processing method may be divided into the operations of the PDCP layer and the RLC layer as follows.

Operation of PDCP Layer

In the PDCP layer, the timer is driven for each packet entering the PDCP layer. The timer may be a timer representing the expiration date of each timer, and each timer value may be indicated as the RRC message by the base station. If the timer has expired, the following operations are performed.

The timer has expired, if the 1-1-th condition is satisfied, the 1-1-th method is performed, if the 1-2-th condition is satisfied, the 1-2-th method is performed, and if the 1-3-th condition is satisfied, the 1-3-th method is performed.

The 1-1-th condition is a case in which a packet corresponding to the expired timer is not yet processed in the PDCP layer and is stored in a packet or PDCP SDU 2k-11.

The 1-2-th condition is a case in which the packet corresponding to an expired timer is processed in the PDCP layer in advance and stored in the PDCP PDU and not yet transmitted to the RLC layer 2k-12.

The 1-3-th condition is a case in which the packet corresponding to an expired timer is processed in the PDCP layer in advance and stored in the PDCP PDU and transmitted to the RLC layer in advance 2k-13.

The 1-1-th method is a method for discarding a packet or a PDCP SDU stored in the PDCP layer 2k-16.

The 1-2-th method is a method for discarding a packet or a PDCP SDU stored in the PDCP layer and discarding a PDCP PDU corresponding to a packet 2k-17 (the PDCP header is also discarded).

The 1-3-th method is a method for discarding a packet or a PDCP SDU stored in the PDCP layer and transmitting and notifying an indication of information on a packet having the expired timer to the RLC layer 2k-18.

Operation of RLC layer

The RLC layer stores the PDCP PDUs received from the PDCP layer and may process the RLC PDUs in advance. If the RLC layer receives an indication of information on the expired packet from the PDCP layer, the RLC layer performs the following operations.

The RLC layer receives the indication of the information on the expired packet from the PDCP layer, if the 2-1-th condition is satisfied, the 2-1-th method is performed, and if the 2-2-th condition is satisfied, the 2-2-th method is performed.

The 2-1-th condition is a case in which a packet corresponding to the expired timer is transmitted to the RLC layer, not yet processed, and stored in PDCP SDU (RLC SDU) 2k-21.

The 2-2-th condition is a case in which the packet corresponding to an expired timer is transmitted to the RLC layer, processed in advance to be stored in the PDCP layer, and is not yet transmitted to the RLC layer 2k-22.

The 2-1-th condition described above is for discarding the PDCP PDU stored in the RLC layer corresponding to the expired packet 2k-26 (The PDCP header is also discarded).

The 2-2-th condition described above does not take any action on the RLC PDU stored in the RLC layer corresponding to the expired packet. At the time of discarding the RLC PDU, a problem may occur in the RLC ARQ of the receiving end.

The 2-2-th condition is for discarding the PDCP PDU corresponding to the expired packet when the expired packet has already been processed with the PDCP PDU or the RLC PDU and not discarding the RLC PDU, to solve the problem arising in FIG. 2G. Therefore, although the RLC ARQ problem can be prevented, the transmission delay may occur in the PDCP layer. However, since the case where the packet expires is rare, the effect of the transmission delay may be insignificant. The 2-2-th condition may be applied to solve the problem that may likewise occur even in 2e-01, 2e-02, 2e-03, 2e-04, 2e-05 and 2e-06 in FIGS. 2EA and 2EB.

Figure 2L:
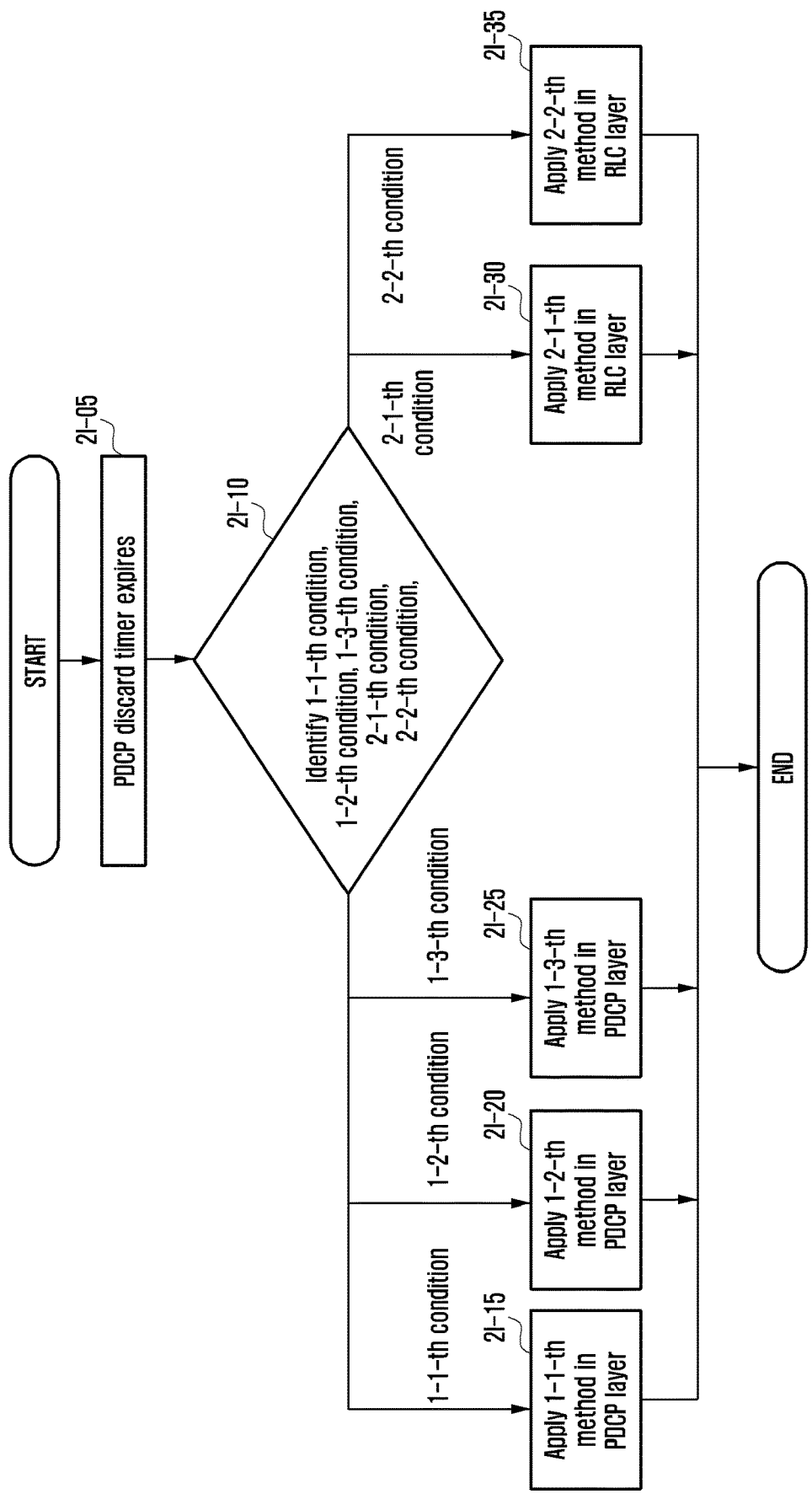
FIG. 2L is a flowchart for a method of a terminal, according to an embodiment of the present disclosure.

FIG. 2L is a flowchart of a method of a terminal to which the 2-2-th condition is applied, according to an embodiment of the present disclosure.

When a terminal proceeds to step 2i-10, if the PDCP discard timer on any packet expires in the PDCP layer (at step 2l-05), the terminal proceeds to step 2l-10 to identify the processing of the packet. If the 1-1-th condition is satisfied, the 1-1-th method is applied in the PDCP layer (at step 2l-15), if 1-2-th condition is satisfied, the 1-2-th method is applied in the PDCP layer (at step 2l-20), if the 1-3-th condition is satisfied, the 1-3-th method is applied in the PDCP layer (at step 2l-25), if the 2-1-th condition is satisfied, the 2-1-th method is applied in the RLC layer (at step 2l-30), and if the 2-2-th condition is satisfied, the 2-2-th method is applied in the RLC layer (at step 2l-35).

Figure 2M:
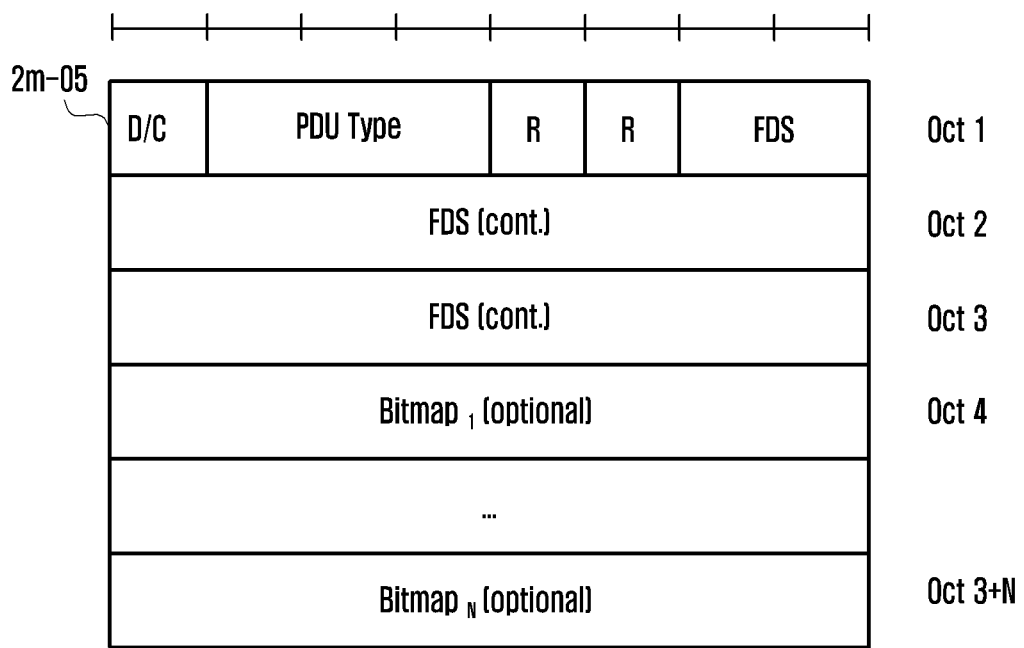
FIG. 2M is a diagram of a PDCP control PDU that processes an expiring packet, according to an embodiment of the present disclosure.

FIG. 2M is a diagram of a PDCP control PDU for explaining a 2-3-th packet that has expired, according to an embodiment of the present disclosure.

FIG. 2M shows an example of a PDCP status report format of a PDCP control PDU using 18 bits as a PDCP SN. The PDCP SNs discarded due to the expiration of the timer are transferred from the transmitting end to the receiving end. The PDCP SN may have any bit and may be set in the base station by the RRC message. As in 2m-05, the header may have a D/C field, a PDU Type field, an R field, a first discarded SN (FDS) field, and a bitmap field. Some or all of these fields or another new field may be included or defined in the PDCP status report format. The D/C field has a length of 1 bit and can indicate a PDCP control PDU if it has a value of 0 and indicate a PDCP data PDU if it has a value of 1 as in Table 2-1.

TABLE 2-1

| D/C field | Description |
| --- | --- |
| 0 | Control PDU |
| 1 | Data PDU |
| D/C field | Description |

The PDU Type field may have a length of 3 bits, and each bit value may indicate different PDU types as follows. The PDU Type field may have a predetermined different length and may be defined differently to indicate a PDCP status report as in Table 2-2.

TABLE 2-2

| PDU type field | Description |
| --- | --- |
| 000 | Tx PDCP status report |
| 001-111 | Reserved |

The FDS field may have a length equal to the PDCP SN, and may indicate a discarded first SN.

The bitmap field may have a predetermined length, and each bit may sequentially indicate whether to discard the SNs are discarded based on the SN of the FDS field.

The 2-3-th expired packet uses the PDCP status report to transmit the information on the packet discarded due to the expiration of the timer (PDCP discard timer). If the PDCP SNs 3, 4, 5, and 6 are discarded due to the expiration of the timer, the PDCP SNs 3, 4, 5, and 6 are discarded when the PDCP status report is sent to the PDCP control PDU and is indicated by the FDS field and the bitmap, and may be transmitted to the receiving side. The receiving side receives the PDCP status report, confirms the fact that the packets corresponding to the PDCP SNs 3, 4, 5 and 6 are not missed but discarded, and does not wait for the PDCP SNs 3, 4, 5 and 6, thereby preventing the transmission delay.

The PDCP status report transmitted in order to indicate the packet discarded due to the expiration may be transmitted according to a predetermined criterion. The predetermined conditions may be the following examples.

if the transmitting end transmits more than a predetermined number of PDCP SNs, transmission if the predetermined period is satisfied, that is, at each predetermined period, if the PDCP SN discarded due to the expiration is present, if the PDCP SN discarded due to the expiration is present and the transmission resource is allocated, if the retransmission is requested in the PDCP layer of the receiving end, and/or other reasons.

The PDCP control PDU of the PDCP status report may be located at the header if necessary when the transmitting end configures the MAC PDU.

Figure 2N:
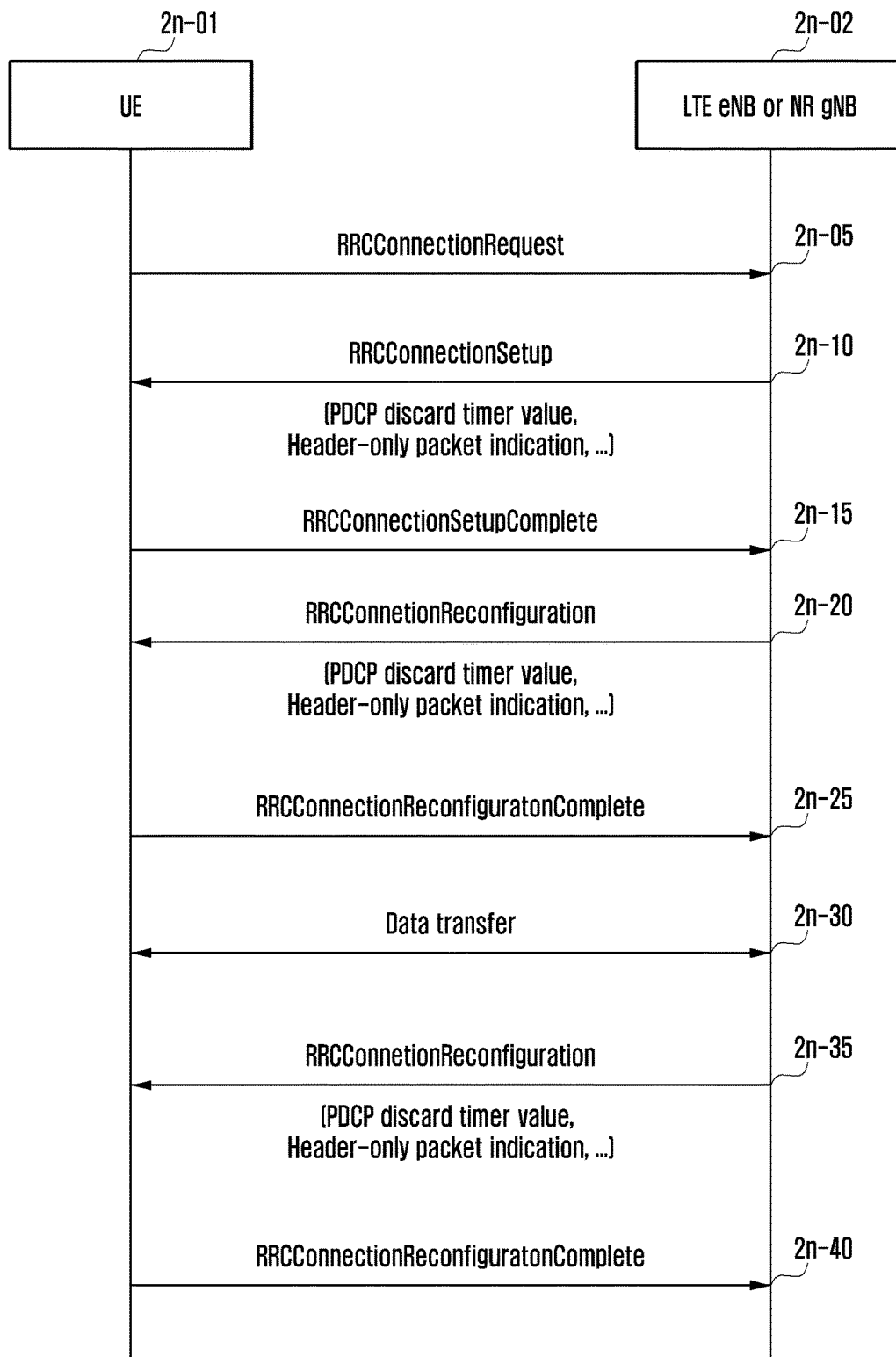
FIG. 2N is a diagram of setting, by a terminal, each layer apparatus in the next generation mobile communication, according to an embodiment of the present disclosure.
Figure 20:
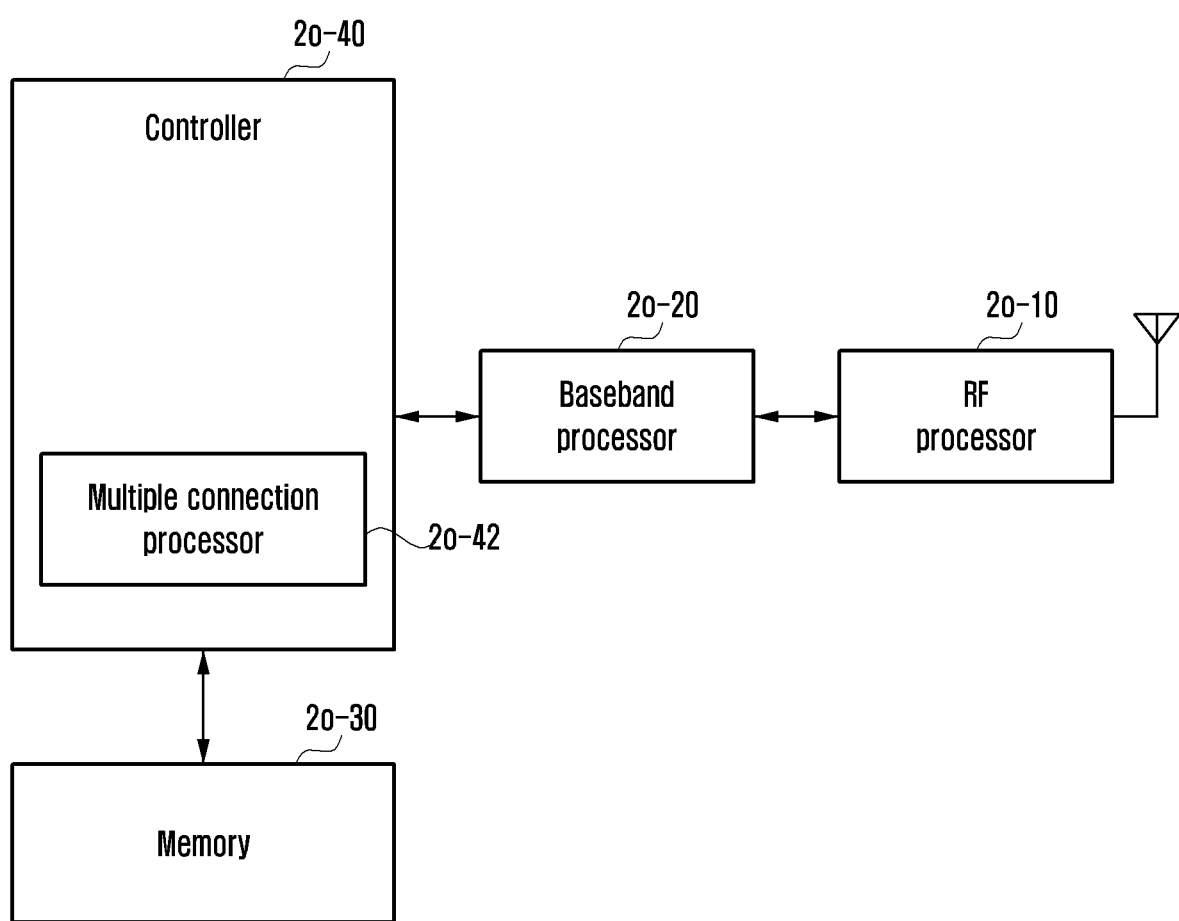

FIG. 2N is a flowchart of a method of setting, by a terminal, each layer apparatus in the next generation mobile communication systems of the present disclosure.

FIG. 2N also shows a method for setting a connection with a network in which a terminal transmits/receives data and configuring apparatuses of each layer.

If there is data to be transmitted, a terminal 2n-01 for which no connection is currently established performs an RRC connection establishment procedure with the LTE base station or the NR base station 2n-02. The terminal 2n-01 establishes uplink transmission synchronization with the base station 2n-02 through a random access procedure and transmits an RRCConnectionRequest message to the base station (at step 2n-05). The message includes establishment-Cause for connection with an identifier of the terminal 2n-01.

The base station 2n-02 transmits an RRCConnectionSetup message to allow the terminal 2n-01 to set the RRC connection (at step 2n-10). The message may store RRC connection configuration information, setting information of each layer, and the like. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 2B or 2D) supported by the layer apparatuses. In addition, the message may include an indication as to whether to use the PDCP discard timer value to be used in the PDCP apparatus or the header-only packet, an indication as to whether the PDCP control PDU sends the information on the discarded packet due to the expiration of the timer to the PDCP status report, and the like. The RRC connection is also called a signaling radio bearer (SRB) and is used for transmission and reception of the RRC message that is a control message between the terminal 2n-01 and the base station 2n-02.

The terminal 2n-01 establishing the RRC connection transmits an RRCConnetionSetupComplete message to the base station 2n-02 (at step 2n-15). The base station 2n-02 transmits an RRCConnectionReconfiguration message to the terminal 2n-01 in order to set up a DRB (at step 2n-20). The configuration information of each layer and the like may be stored in the message. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 2B or 2D) supported by the layer apparatuses.

In addition, the message may include an indication as to whether to use the PDCP discard timer value to be used in the PDCP apparatus or the header-only packet, an indication as to whether the PDCP control PDU sends the information on the discarded packet due to the expiration of the timer to the PDCP status report, and the like. In addition, the message includes the configuration information of the DRB in which user data are processed, and the terminal 2n-01 applies the information to set the DRB and set the functions of each layer and transmits an RRCConnectionReconfiguration-Complete message to the base station 2n-02 (at step 2n-25).

If the above procedure is completed, the terminal 2n-01 transmits and receives data to and from the base station 2n-02 (at step 2n-30). While transmitting and receiving data, the base station 2n-02 may again transmit the RRCConnectionReconfiguration message to the terminal 2n-01 (at step 2n-35), if necessary, and again set the configuration information of each layer of the terminal 2n-01.

In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 2B or 2D) supported by the layer apparatuses.

In addition, the message may include an indication as to whether to use the PDCP discard timer value to be used in the PDCP apparatus or the header-only packet, an indication as to whether the PDCP control PDU sends the information on the discarded packet due to the expiration of the timer to the PDCP status report, and the like. The message may include the information for configuring the interworking between the LTE base station (or NR base station) and the NR base station. The information for setting the interworking between the LTE base station and the NR base station may include information indicating a 3C type or a 2a type, information on each layer apparatus according to each type, and the like. Upon completion of the setting of apparatuses of each layer according to the message, the terminal 2n-01 transmits an RRCConnectionReconfigurationComplete message to the base station 2n-02 (at step 2n-40).

In the above procedure, if the terminal 2n-01 receives the PDCP discard timer value by the RRCConnectionSetup message (at step 2n-10) or the RRCConnectionReconfiguration message (at steps 2n-20 and 2n-35), the terminal 2n-01 can set the value as a timer value for each packet in the PDCP layer. If the indicator for the header only packet is received in the above messages, the 2-1-th processing of the expired packet can be applied. If the indicator for the header only packet is not received, the 2-2-th processing of the expired packet can be applied, and if the PDCP control PDU receives an indication as to whether to transmit the information on the packet discarded due to the expiration of the timer to the PDCP status report, the 2-3-th processing of the expired packet can be applied. If the indication for the header only packet is received in the messages and the PDCP control PDU receives the indication as to whether to transmit the information on the packet discarded due to the expiration of the timer to the PCCP status report, both of the 2-2-th and 2-3-th processing of the expired packet can be applied.

FIG. 2O is a diagram of the terminal, according to an embodiment of the present disclosure.

Referring to FIG. 2O, the terminal includes an RF processor 2o-10, a baseband processor 2o-20, a memory 2o-30, and a controller 2o-40 including a multiple connection processor 2o-42.

The RF processor 2o-10 serves to transmit and receive a signal through a radio channel, such as band conversion and amplification of a signal. That is, the RF processor 2o-10 up-converts a baseband signal provided from the baseband processor 2o-20 into an RF band signal and then transmits the RF band signal through an antenna and down-converts the RF band signal received through the antenna into the baseband signal. The RF processor 2o-10 may include a transmitting filter, a receiving filter, an amplifier, a mixer, an oscillator, a DAC, an ADC, or the like. FIG. 2O illustrates only one antenna but the terminal may include a plurality of antennas. Further, the RF processor 2o-10 may include a plurality of RF chains. Further, the RF processor 2o-10 may perform beamforming. The RF processor 2o-10 may adjust a phase and a size of each of the signals transmitted and received through a plurality of antennas or antenna elements. In addition, the RF processor 2o-10 may perform MIMO and may receive a plurality of layers when performing a MIMO operation. The RF processor 2o-10 may perform reception beam sweeping by appropriately configuring a plurality of antennas or antenna elements under the control of the controller or adjust a direction and a beam width of the reception beam so that the reception beam is resonated with the transmission beam.

The baseband processor 2o-20 performs a conversion function between a baseband signal and a bit string according to a physical layer standard of a system. When data is transmitted, the baseband processor 2o-20 generates complex symbols by coding and modulating a transmitted bit string. Further, when data is received, the baseband processor 2o-20 recovers the received bit string by demodulating and decoding the baseband signal provided from the RF processor 2o-10. According to the OFDM scheme, when data is transmitted, the baseband processor 2o-20 generates the complex symbols by coding and modulating the transmitting bit string, maps the complex symbols to sub-carriers, and then performs an IFFT operation and a CP insertion to construct the OFDM symbols. Further, when data is received, the baseband processor 2o-20 divides the baseband signal provided from the RF processor 2o-10 in an OFDM symbol unit and recovers the signals mapped to the sub-carriers by an FFT operation and then recovers the received bit string by the modulation and decoding.

The baseband processor 2o-20 and the RF processor 2o-10 transmit and receive a signal as described above. Therefore, the baseband processor 2o-20 and the RF processor 2o-10 may be called a transmitter, a receiver, a transceiver, or a communication unit. Further, at least one of the baseband processor 2o-20 and the RF processor 2o-10 may include a plurality of communication modules to support a plurality of different RATs. Further, at least one of the baseband processor 2o-20 and the RF processor 2o-10 may include different communication modules to process signals in different frequency bands. The different wireless access technologies may include an LTE network, an NR network, and the like. Further, different frequency bands may include an SHF (for example: 2.5 GHz, 5 GHz) band, a millimeter wave (for example: 60 GHz) band.

The memory 2o-30 stores data such as basic programs, application programs, and configuration information for the terminal. The memory 2o-30 provides the stored data according to the request of the controller 2o-40.

The controller 2o-40 controls the overall operations of the terminal. The controller 2o-40 transmits and receives a signal through the baseband processor 2o-20 and the RF processor 2o-10. The controller 2o-40 records and reads data in and from the memory 2o-40. The controller 2o-40 may include at least one processor, a CP performing a control for communication and an AP controlling an upper layer such as the application programs.

Figure 2P:
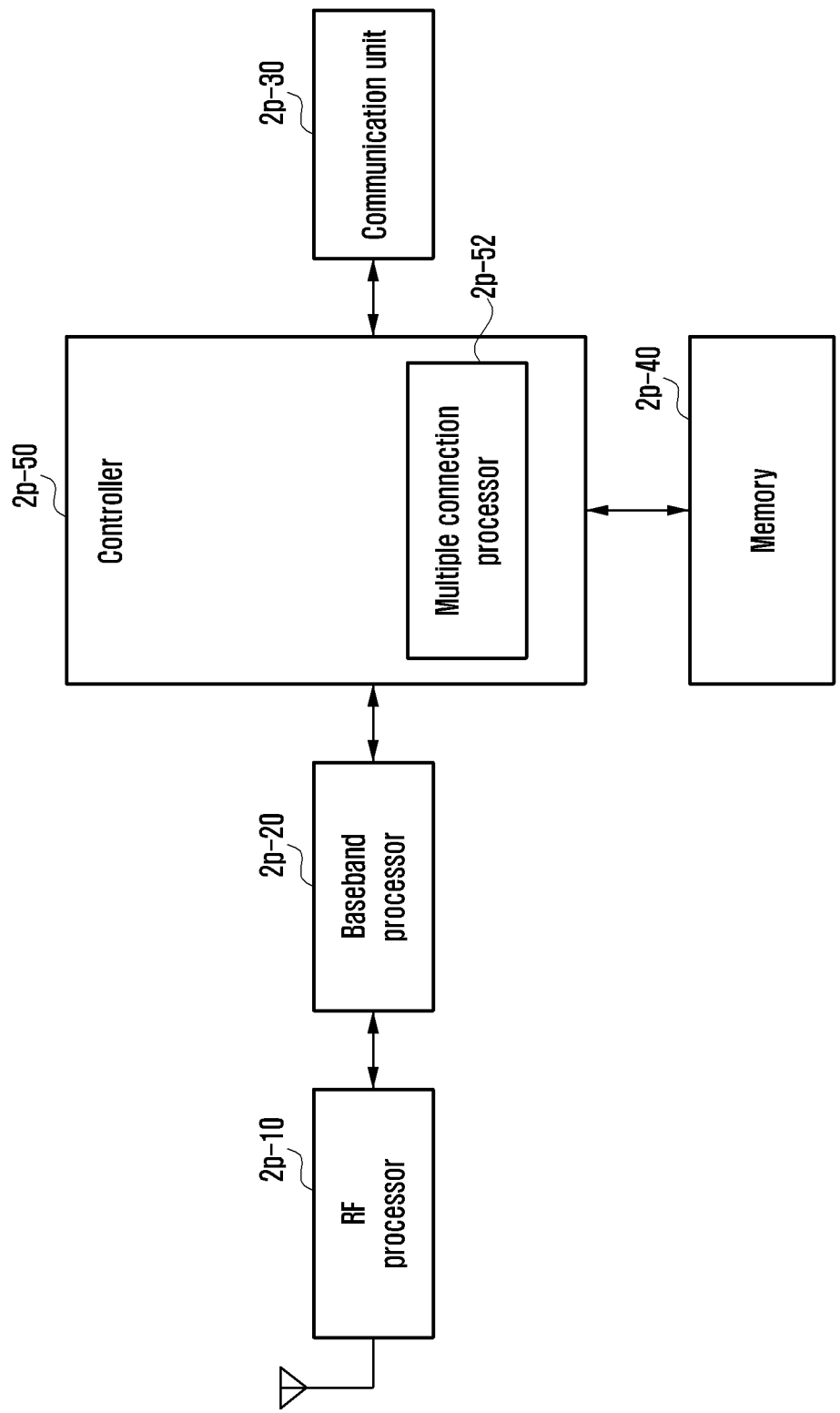
FIG. 2P is a block diagram of a base station transceiver, according to an embodiment of the present disclosure.

FIG. 2P is a diagram of a base station or a TRP in a wireless communication system, according to an embodiment of the present disclosure.

The base station is configured to include an RF processor 2p-10, a baseband processor 2p-20, a communication unit 2p-30, a memory 2p-40, and a controller 2p-50.

The RF processor 2p-10 serves to transmit and receive a signal through a radio channel, such as band conversion and amplification of a signal. The RF processor 2p-10 up-converts a baseband signal provided from the baseband processor 2p-20 into an RF band signal and then transmits the RF band signal through an antenna and down-converts the RF band signal received through the antenna into the baseband signal. The RF processor 2p-10 may include a transmitting filter, a receiving filter, an amplifier, a mixer, an oscillator, a DAC, an ADC, or the like. FIG. 2P illustrates only one antenna but the RF processor 2p-10 may include a plurality of antennas. The RF processor 2p-10 may include a plurality of RF chains. The RF processor 2p-10 may perform beamforming. The RF processor 2p-10 may adjust a phase and a size of each of the signals transmitted/received through a plurality of antennas or antenna elements. The RF processor 2p-10 may perform a downward MIMO operation by transmitting one or more layers.

The baseband processor 2p-20 performs a conversion function between the baseband signal and the bit string according to the physical layer standard of the first RAT. When data is transmitted, the baseband processor 2p-20 generates complex symbols by coding and modulating a transmitted bit string. When data is received, the baseband processor 2p-20 recovers the received bit string by demodulating and decoding the baseband signal provided from the RF processor 2p-10. According to the OFDM scheme, when data is transmitted, the baseband processor 2p-20 generates the complex symbols by coding and modulating the transmitting bit string, maps the complex symbols to the sub-carriers, and then performs the IFFT operation and the CP insertion to construct the OFDM symbols. When data is received, the baseband processor 2p-20 divides the baseband signal provided from the RF processor 2p-10 in the OFDM symbol unit and recovers the signals mapped to the sub-carriers by the FFT operation and then recovers the receiving bit string by the modulation and decoding. The baseband processor 2p-20 and the RF processor 2p-10 transmit and receive a signal as described above. The baseband processor 2p-20 and the RF processor 2p-10 may be called a transmitter, a receiver, a transceiver, or a communication unit.

The communication unit 2p-30 provides an interface for performing communication with other nodes within the network.

The memory 2p-40 stores data such as basic programs, application programs, and setting information for the main base station. In particular, the memory 2p-40 may store the information on the bearer allocated to the accessed terminal, the measured results reported from the accessed terminal, etc. Further, the memory 2p-40 may store information that is a determination criterion on whether to provide a multiple connection to the terminal or stop the multiple connection to the terminal. Further, the memory 2p-40 provides the stored data according to the request of the controller 2p-50.

The controller 2p-50 controls the general operations of the main base station. The controller 2p-50 transmits and receives a signal through the baseband processor 2p-20 and the RF processor 2p-10 or the communication unit 2p-30. The controller 2p-50 records and reads data in and from the memory 2p-40. For this purpose, the controller 2p-50 may include at least one processor.

Figure 3A:
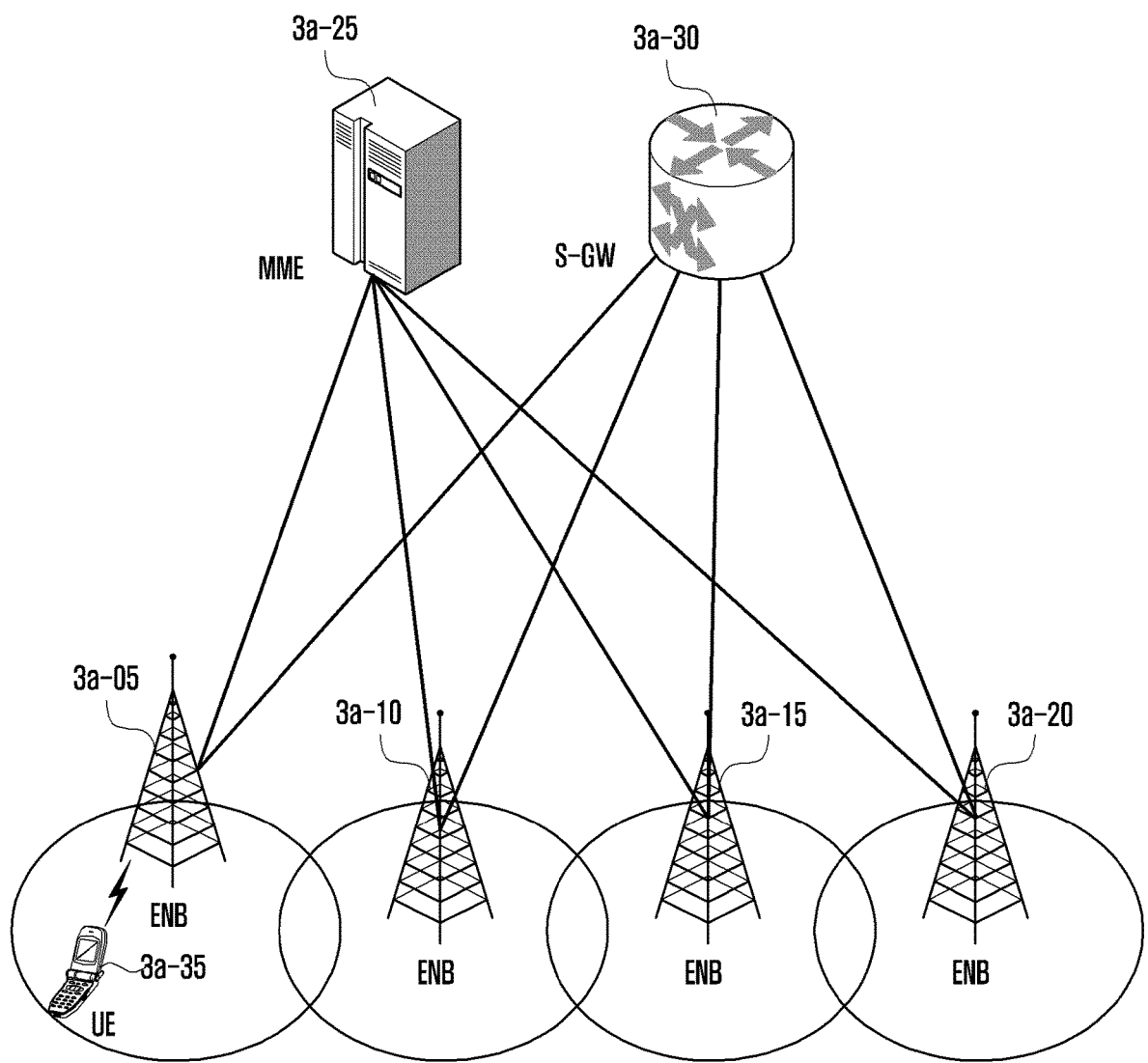
FIG. 3A is a diagram of an LTE system, according to an embodiment of the present disclosure.

FIG. 3A is a diagram of a structure of an LTE system, in accordance with an embodiment of the present disclosure.

As illustrated in FIG. 1A, a RAN of an LTE system is configured to include next generation base stations (ENB, Node B, or base station) 3a-05, 3a-10, 3a-15, and 3a-20, an MME 3a-25, and a S-GW 3a-30. UE or terminal 3a-35 accesses an external network through the ENBs 3a-05 to 3a-20 and the S-GW 3a-30.

In FIG. 3A, the ENBs 3a-05 to 3a-20 correspond to the existing node B of the UMTS system. The ENB is connected to the UE 3a-35 through a radio channel and performs a more complicated role than the existing node B. In the LTE system, in addition to a real-time service like a VoIP through the internet protocol, all the user traffics are served through a shared channel and therefore an apparatus for collecting and scheduling status information such as a buffer status, an available transmission power status, and a channel state of the terminals is required. Here, the ENBs 3a-05 to 3a-20 control the collecting and scheduling of the buffer status information. One ENB generally controls a plurality of cells. For example, to implement a transmission rate of 100 Mbps, the LTE system uses, as RAT, OFDM in, for example, a bandwidth of 20 MHz. Further, an AMC scheme determining a modulation scheme and a channel coding rate depending on a channel status of the terminal is applied. The S-GW 3a-30 is an apparatus for providing a data bearer and generates or removes the data bearer according to the control of the MME 3a-25. The MME is an apparatus for performing a mobility management function for the terminal and various control functions and is connected to a plurality of base stations.

Figure 3B:
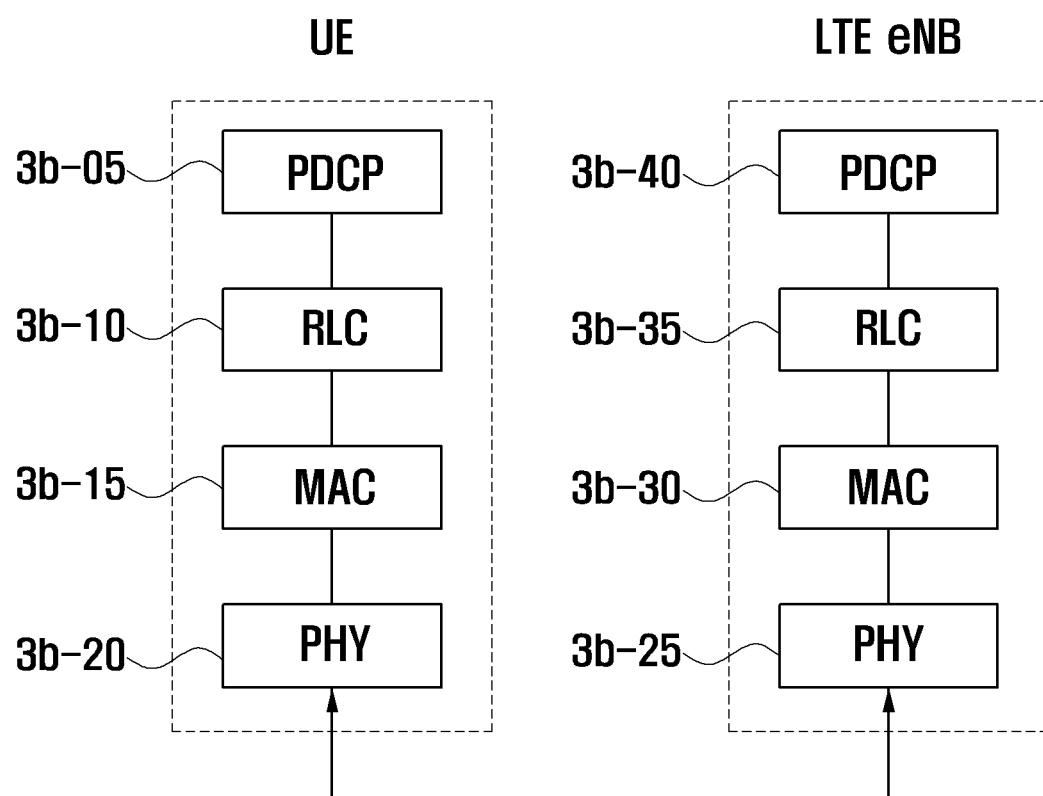
FIG. 3B is a diagram of a radio protocol structure in the LTE system, according to an embodiment of the present disclosure.

FIG. 3B is a diagram of a radio protocol structure in the LTE system, in accordance with an embodiment of the present disclosure.

Referring to FIG. 3B, the radio protocol of the LTE system is configured to include PDCPs 3b-05 and 3b-40, RLCs 3b-10 and 3b-35, and MACs 3b-15 and 3b-30 in the terminal and the ENB, respectively. The PDCPs 3b-05 and 3b-40 control operations such as IP header compression/decompression. The main functions of the PDCP are summarized as follows.

Header compression and decompression function (Header compression and decompression: ROHC only)
Transfer of user data
In-sequence delivery function (In-sequence delivery of upper layer PDUs at PDCP re-establishment procedure for RLC AM)
Reordering function (For split bearers in DC (only support for RLC AM): PDCP PDU routing for transmission and PDCP PDU reordering for reception)
Duplicate detection function (Duplicate detection of lower layer SDUs at PDCP re-establishment procedure for RLC AM)
Retransmission function (Retransmission of PDCP SDUs at HO and, for split bearers in DC, of PDCP PDUs at PDCP data-recovery procedure, for RLC AM)
Ciphering and deciphering function (Ciphering and deciphering)
Timer-based SDU discard function (Timer-based SDU discard in uplink)

The RLCs 3b-10 and 3b-35 reconfigure the PDCP PDU to an appropriate size to perform the ARQ operation or the like. The main functions of the RLC are summarized as follows.

Data transfer function (Transfer of upper layer PDUs)
ARQ function (Error Correction through ARQ (only for AM data transfer))
Concatenation, segmentation, reassembly functions (Concatenation, segmentation and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The MACs 3b-15 and 3b-30 are connected to several RLC layer apparatuses configured in one terminal and perform multiplexing RLC PDUs into an MAC PDU and demultiplexing the RLC PDUs from the MAC PDU. The main functions of the MAC are summarized as follows.

Mapping function (Mapping between logical channels and transport channels)
Multiplexing/demultiplexing function (Multiplexing/demultiplexing of MAC SDUs belonging to one or different logical channels into/from TBs delivered to/from the physical layer on transport channels)
Scheduling information reporting function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

Physical layers 3b-20 and 3b-25 perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 3C:
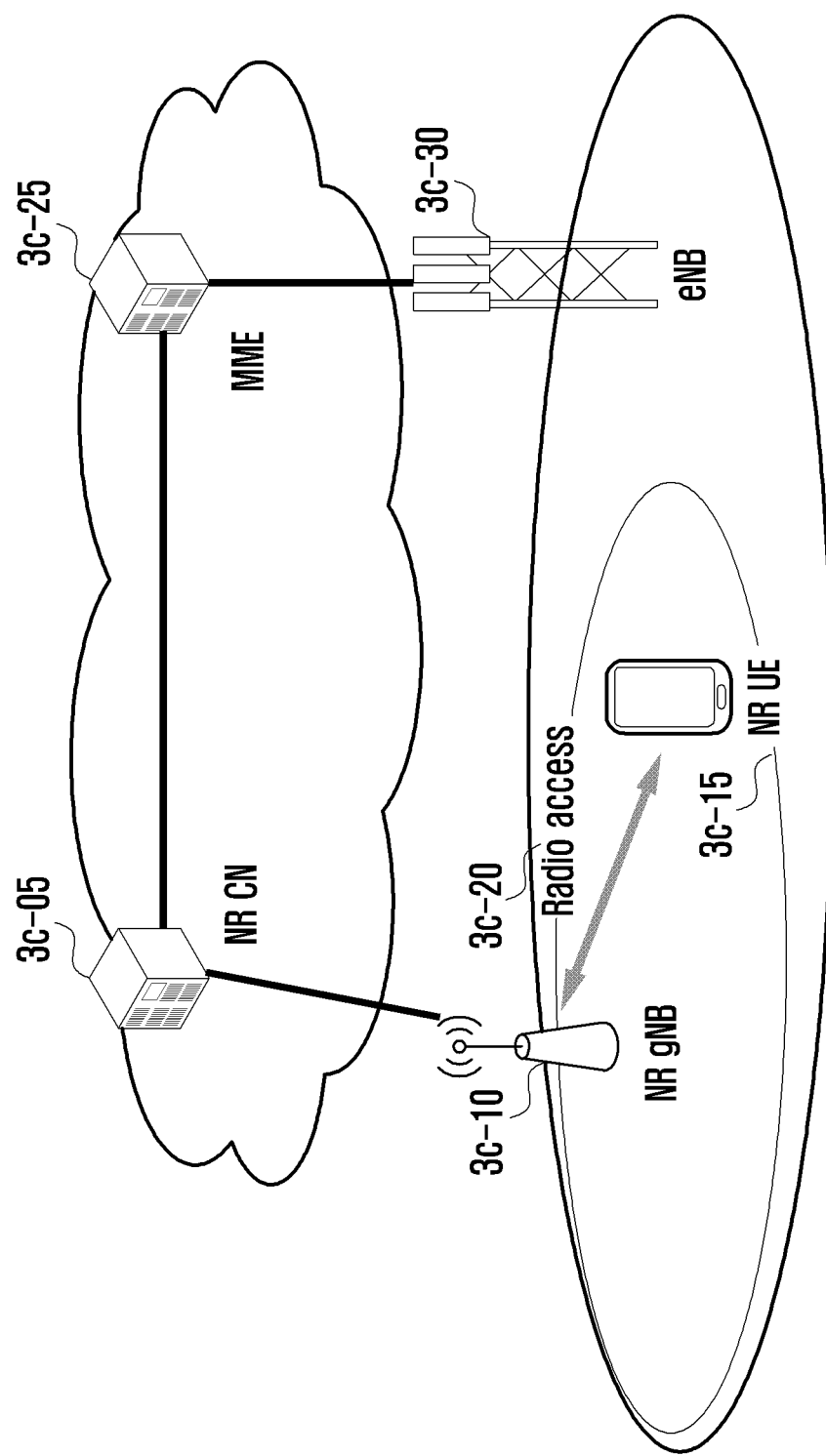
FIG. 3C is a diagram of a next generation mobile communication system, according to an embodiment of the present disclosure.

FIG. 3C is a diagram of a next generation mobile communication system, in accordance with an embodiment of the present disclosure.

Referring to FIG. 3C, a RAN of a next generation mobile communication system (e.g., NR or 5G) is configured to include a next generation base station (NR node B, NR gNB or NR base station) 3c-10 and an NR CN 3c-05. The user terminal (NR UE or UE) 3c-15 accesses the external network through the NR gNB 3c-10 and the NR CN 3c-05.

In FIG. 3C, the NR gNB 3c-10 corresponds to an eNB of the existing LTE system. The NR gNB is connected to the NR UE 3c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 3c-10 may serve as the device. One NR gNB generally controls a plurality of cells. In order to realize high-speed data transmission compared with the current LTE, the NR gNB may have an existing maximum bandwidth, and may be additionally incorporated into a beam-forming technology may be applied by using OFDM as a RAT. Further, an AMC scheme determining a modulation scheme and a channel coding rate depending on a channel status of the terminal is applied. The NR CN 3c-05 may perform functions such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 3c-25 through the network interface. The MME is connected to the eNB 3c-30 which is the existing base station.

Figure 3D:
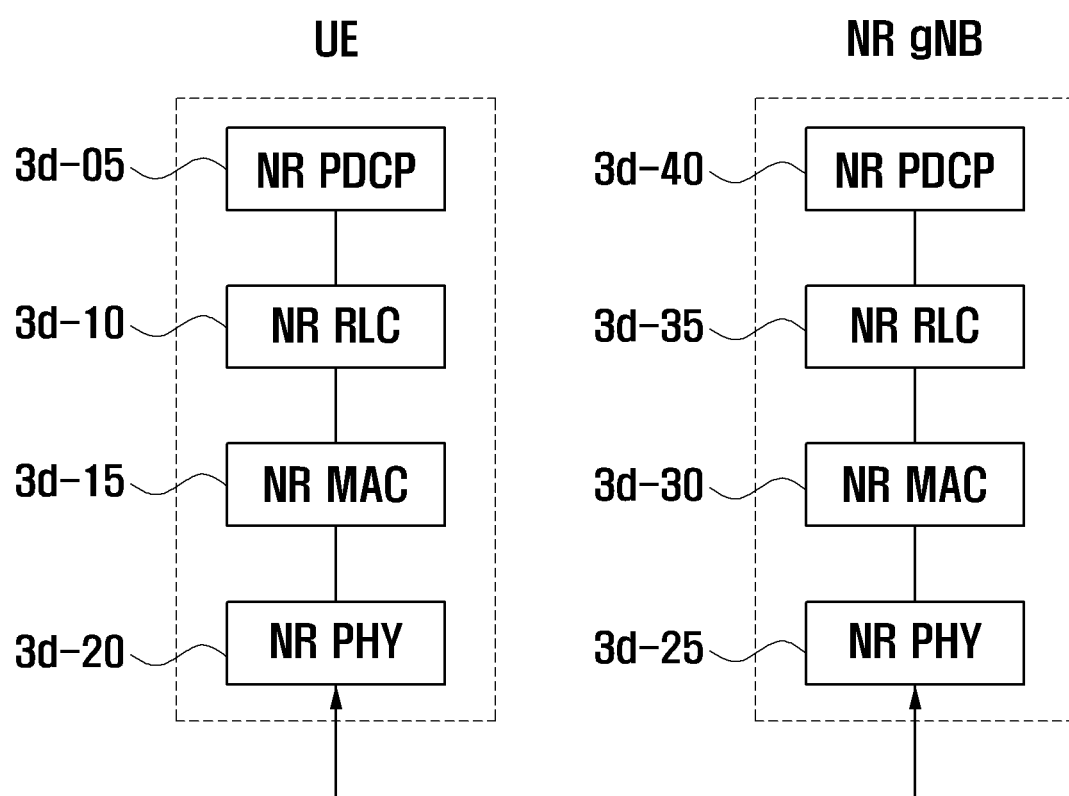
FIG. 3D is a diagram of a radio protocol structure of a next generation mobile communication system, according to an embodiment of the present disclosure.

FIG. 3D is a diagram of a radio protocol structure of a next generation mobile communication system, in accordance with an embodiment of the present disclosure.

Referring to FIG. 3D, the radio protocol of the next generation mobile communication system is configured to include NR PDCPs 3*d*-05 and 3*d*-40, NR RLCs 3*d*-10 and 3*d*-35, and NR MACs 3*d*-15 and 3*d*-30 in the terminal and the NR base station. The main functions of the NR PDCPs 3*d*-05 and 3*d*-40 may include some of the following functions.

- Header compression and decompression function (Header compression and decompression: ROHC only)
- Transfer of user data
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink)

In this case, the reordering function of the NR PDCP apparatus is for rearranging PDCP PDUs received in a lower layer in order based on a PDCP (SN and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 3*d*-10 and 3*d*-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above description, the in-sequence delivery function of the NR RLC apparatus is for of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC SN or the PDCP SN, a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

In this case, the out-of-sequence delivery function of the NR RLC apparatus is for directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 3*d*-15 and 3*d*-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

The NR PHY layers 3*d*-20 and 3*d*-25 may perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Although not illustrated, RRC layers are present at an upper part of the PDCP layer of the terminal and the base station, and the RRC layer may receive and transmit connection and measurement related control messages for a RRC.

Figure 3E:
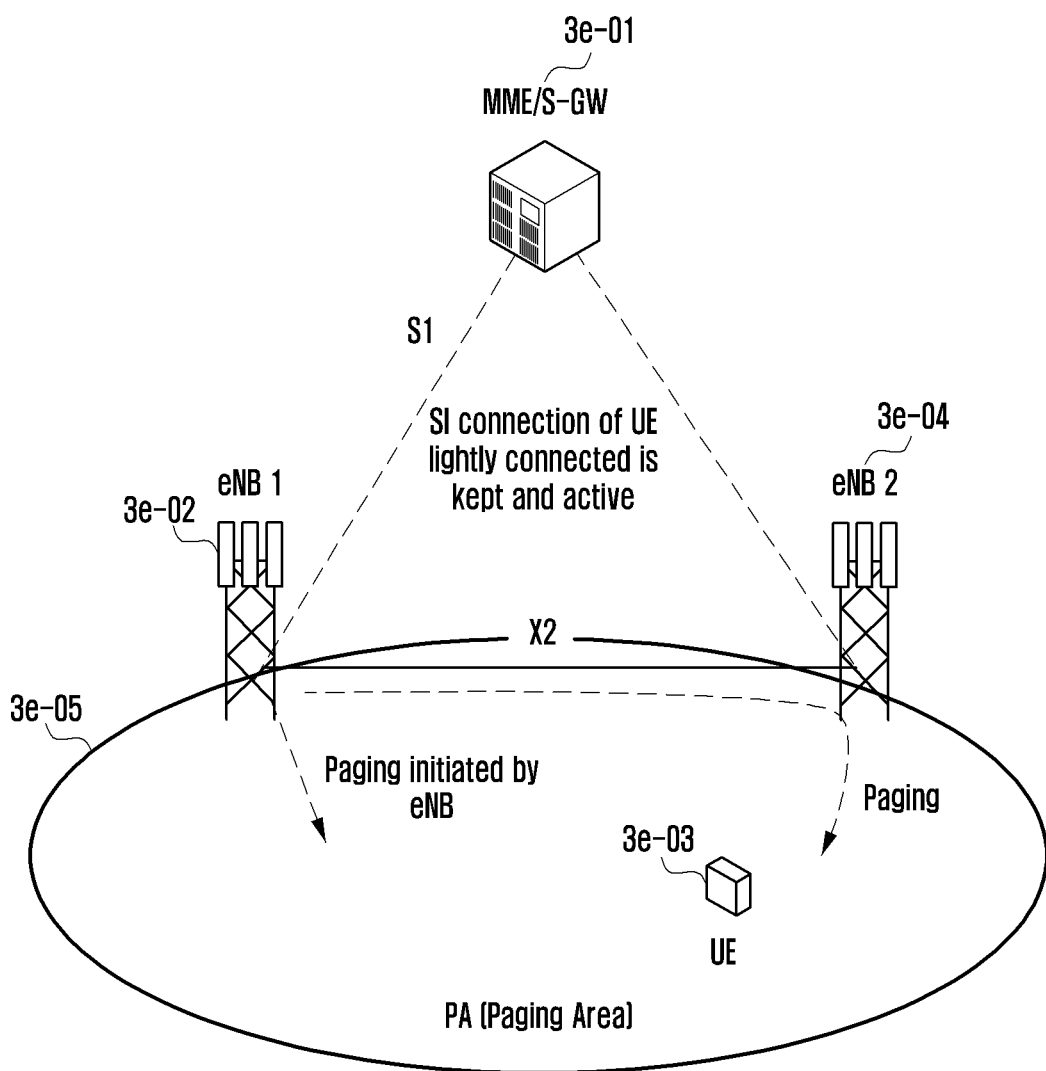
FIG. 3E is a diagram of a light connection concept, according to an embodiment of the present disclosure.

FIG. 3E is a diagram of a light connection concept, in accordance with an embodiment of the present disclosure.

In FIG. 3E, the light connection technology defines a new terminal mode in addition to the idle mode or the connected mode in order to reduce the signaling overhead due to the existing HO and paging transmission operation. The new terminal mode can be established as a light connected mode, an RRC Inactive mode or any other named modes. Hereinafter, for the terminal 3*e*-03 in the light connected mode, the UE context of the terminal is stored, the S1 connection is maintained, and the paging is triggered by the base station 3*e*-02 and 3*e*-04 or the MME. Therefore, since the terminal 3*e*-03 is recognized as the connected mode, if there is data to be transmitted to the terminal 3*e*-03, the MME 3*e*-01 does not first trigger the paging but immediately transmits the data to the base station. The base station 3*e*-02 and 3*e*-04 receiving the data forwards the paging to all base stations in a predetermined PA 3*e*-05, and all base stations transmit the paging.

The terminal 3*e*-03 and the network can reduce the battery consumption and signaling overhead of the terminal 3*e*-03 in consideration of the above-mentioned light connection features.

Figure 3F:
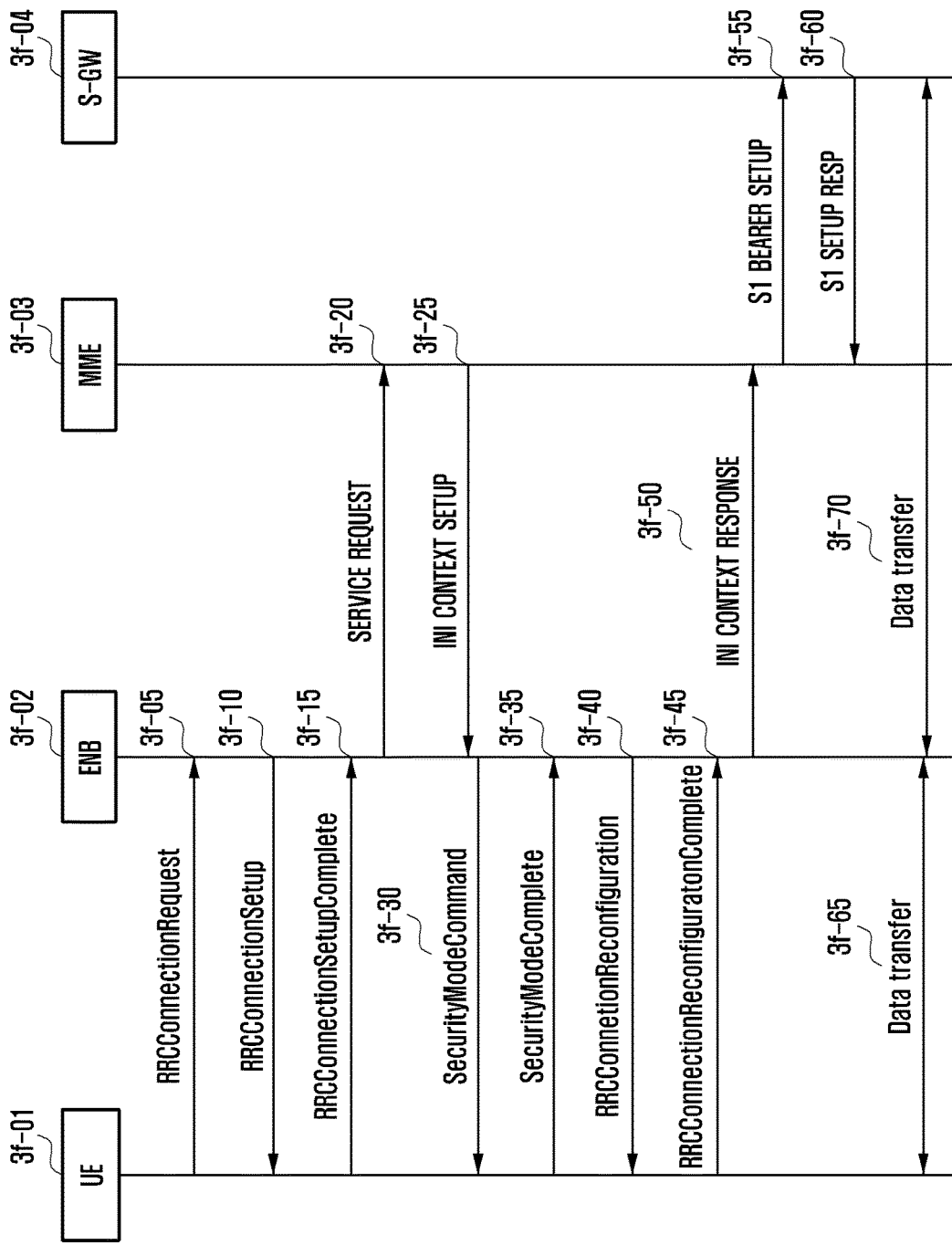
FIG. 3F is a diagram of a method for establishing a connection of a general terminal to a network so that the general terminal transmits/receives data, according to an embodiment of the present disclosure.

FIG. 3F is a diagram of a method for establishing a connection of a general terminal to a network so that the general terminal transmits/receives data, in accordance with an embodiment of the present disclosure.

When a UE (idle mode UE) 3*f*-01 that is not currently connected generates data to be transmitted, the UE 3*f*-01 performs an RRCConnectionSetup procedure with the base station 3*f*-02. The UE 3*f*-01 establishes uplink transmission synchronization with the base station 3*f*-02 through a RAP and transmits an RRCConnectionRequest message to the base station (at step 3*f*-05). The message includes establishmentCause of connection with the identifier of the UE 3*f*-01. The base station 3*f*-02 transmits an RRCConnectionSetup message to allow the UE 3*f*-01 to set the RRC connection (at step 3*f*-10). The RRCConnectionSetup message includes the RRC connection configuration information, etc. The RRC connection is also called a SRB and is used for transmission and reception of the RRC message that is a control message between the UE 3*f*-01 and the base station 3*f*-02. The UE 3*f*-01 establishing the RRC connection transmits an RRC-ConnetionSetupComplete message to the base station 3*f*-02 (at step 3*f*-15). The message includes a control message called a service request that that allows the UE 3*f*-01 to request a bearer setup for a predetermined service to an MME 3*f*-03. The base station 3*f*-02 transmits a service request message included in the RRCConnectionSetupComplete message to the MME 3*f*-03 (at step 3*f*-20) and the MME 3*f*-03 determines whether to provide the service the UE 3*f*-01 requests as the determination result, if the MME 3*f*-03 decides to provide the service that the UE 3*f*-01 requests, the MME 3*f*-03 transmits an initial context setup request message to the base station 3*f*-02 (at step 3*f*-25). The initial context setup request message may include information such as QoS information to be applied when setting up a DRB and security related information (e.g., security key, security algorithm) to be applied to the DRB. The base station 3*f*-02 exchanges a SecurityModeCommand message at step 3*f*-30 and a SecurityModeComplete message at step 3*f*-35 with the UE 3*f*-01 to establish security. When the security establishment is completed, the base station 3*f*-02 transmits an RRCConnectionReconfiguration message to the UE 3*f*-01 (at step 3*f*-40). The message includes the configuration information of the DRB in which user data are processed, and the UE 3*f*-01 applies the information to setup the DRB and transmits an RRCConnectionReconfiguration-Complete message to the base station (at step 3*f*-45). The base station 3*f*-02 that completes the DRB setup with the UE 3*f*-01 transmits an initial context setup complete message to the MME 3*f*-03 (at step 3*f*-50) and the MME 3*f*-03 receiving the message exchanges an S1 bearer setup message and an S1 bearer setup response message with a S-GW 3*f*-04 to setup an S1 bearer (at steps 3*f*-55 and 3*f*-60). The S bearer is a data transmission connection established between the S-GW 3*f*-04 and the base station 3*f*-02 and corresponds to a DRB on a one-to-one basis. If all of the procedures are completed, the UE 3*f*-01 transmits and receives data to and from the base station 3*f*-02 through the S-GW 3*f*-04 (at steps 3*f*-65 and 3*f*-70). As described above, the normal data transmission procedure largely consists of three stages: RRCConnectionSetup, security setup, and DRB setup.

Figure 3G:
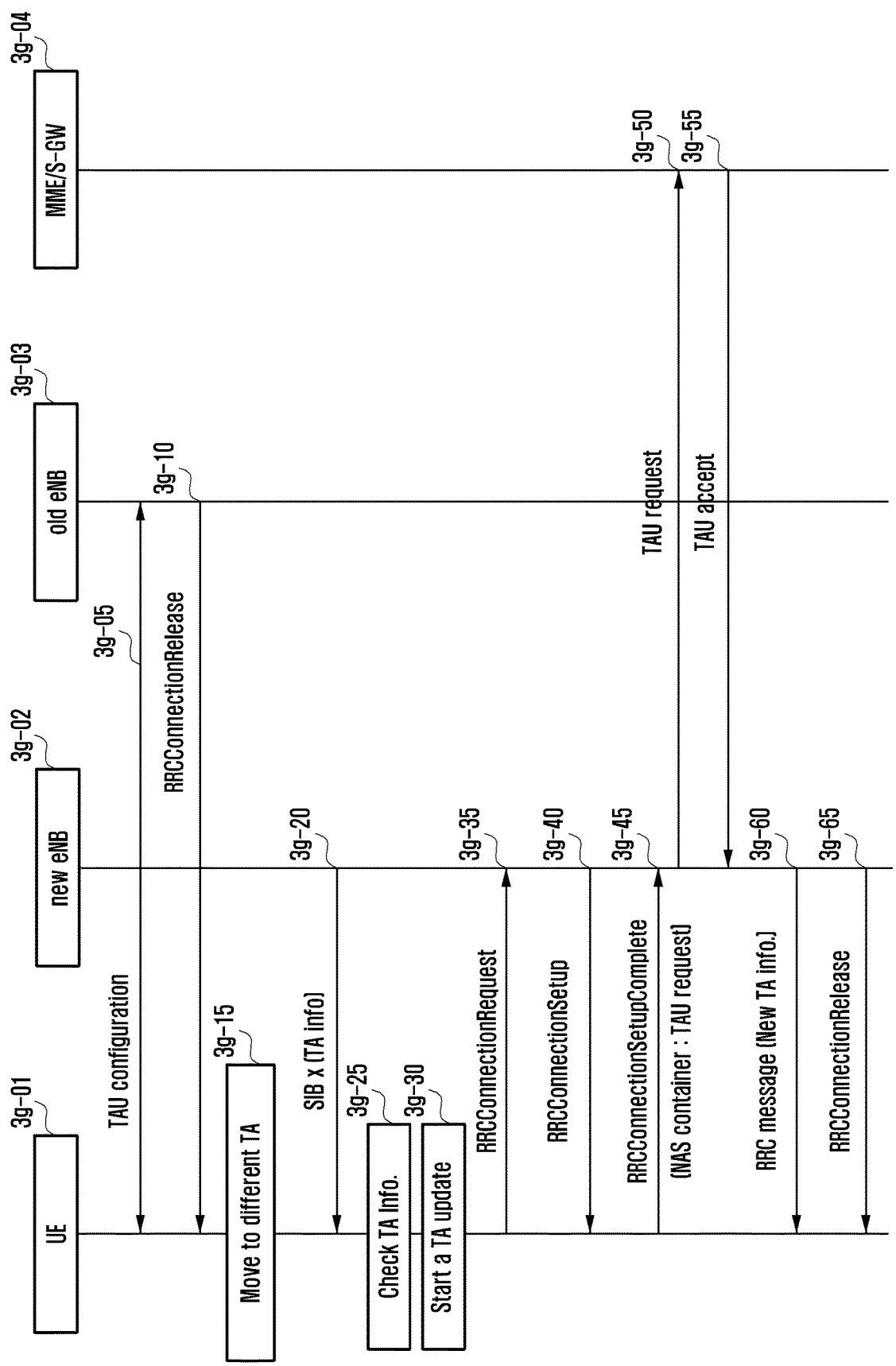
FIG. 3G is a diagram of updating, by a general terminal, a tracking region, according to an embodiment of the present disclosure.

FIG. 3G is a diagram of a method of updating, by a general terminal, a tracking region, in accordance with an embodiment of the present disclosure.

In FIG. 3G, a UE 3*g*-01 may establish a tracking area for a predetermined reason (at step 3*g*-05). The tracking area may be indicated by a list of tracking area identifiers (IDs). The predetermined reason can be established in a procedure in which the terminal initially accesses the network, can be established when the tracking area is periodically updated, and can be established by other causes. The UE 3*g*-01 may establish the tracking area by receiving a tracking area update (TAU) accept message by an MME in the tracking area establishing procedure. The TAU accept message may be included in the RRC message, and may be transmitted to the terminal by being included in, for example, the DedicatedInfoNAS of the RRCConnectionReconfiguration message or DLnformationTasfer message. The base station (old eNB) 3*g*-03 may disconnect the UE 3*g*-01 for a predetermined reason (at step 3*g*-10). The predetermined reason may be that the inactive timer expires because there is no data transmission/reception between the UE 3*g*-01 and the network for a predetermined time. The UE 3*g*-01 returns to the idle mode and can move according to the movement of the user. The UE 3*g*-01 may out of the established tracking area due to the mobility (at step 3*g*-15), confirm the tracking area identifier from the system information of the current cell (at step 3*g*-20), and perform the TAU procedure (at step 3*g*-30). The UE 3*g*-01 may transmit the RRCConnectionRequest message to the base station 3*g*-03 in order to establish a connection to the new base station or the cell 3*g*-02 and to update the tracking area at step 3*g*-35. The RRC message may try to update the tracking area by mo (mobile originated)-signaling the RRC connection establishmentCause. The base station 3*g*-02 can send the RRCConnectionSetup message to the UE 3*g*-01 to allow the RRCConnectionSetup (at step 3*g*-40). In order to update the tracking area setup, the UE 3*g*-01 may transmit the TAU request message by including the TAU request message in the DedicatedInfoNAS of the RRCConnectionSetupComplete message (at step 3*g*-45). The base station 3*g*-02 may transmit the TAU request message to an MME 3*g*-04 to request the TAU (at step 3*g*-50). When receiving the TAU request message and accepting the TAU, the MME 3*g*-04 transmits the TAU accept message to the base station 3*g*-02 (at step 3*g*-55), and the base station 3*g*-02 transmits the TAU accept message to the UE 3*g*-01 by including the TAU accept message in the RRC message. The TAU accept message may include new tracking area information. The RRC message transmitted from the base station 3*g*-02 to the UE 3*g*-01 may be an RRCConnectionReconfiguration message or a DLInformationTransfer message.

FIG. 3H is a diagram of a method of a terminal and a base station for supporting a light connection in a next generation mobile communication system, in accordance with an embodiment of the present disclosure.

FIG. 3H illustrates the overall flow of a terminal (UE) 3*h*-01, an anchor eNB (base station) 3*h*-02, a new eNB 3*h*-03, and an MME 3*h*-04 so that the terminal 3*h*-01 and the base station 3*h*-02 performs the UE context (terminal context) and the SI bearer. The terminal 3*h*-01 in the RRC connected state performs data transmission/reception with the base station 3*h*-02. When the data transmission/reception stops, the base station 3*h*-02 drives a predetermined timer and if the data transmission/reception is not resumed until the timer expires (at step 3*h*-05), the base station 3*h*-02 considers releasing the RRC connection of the terminal 3*h*-01. The base station 3*h*-02 may release the RRC connection of the terminal 3*h*-01 according to a predetermined rule, store the UE context, allocate a Resume ID while transmitting a control message instructing the terminal 3*h*-01 to release the RRC connection, and allow the terminal 3*h*-01 to establish the paging area (PA) to which the mobility is reported during the light connected mode. In this case, it can be appreciated that the terminal 3*h*-01 should store the UE context due to the Resume ID allocation. Alternatively, the base station 3*h*-02 may send to the message a separate context retention indication that instructs the base station 3*h*-02 to operate the terminal 3*h*-01 in the light connected mode and to store the UE context (at step 3h-10). In addition, the control message may include a list of cells, or the like to which a procedure of using the stored context may be applied, when the base station 3h-02 tries to again setup the RRC connection within the period when the UE context is retained or the expiration date of the UE. The PA may be constructed and configured in the paging area identify of the PA or the list of cell identifiers (IDs). The base station 3h-02 releases the RRC connection of the terminal 3h-01 and then retains the UE context and the S1 bearer of the UE as they are (at step 3h-15). The S1 bearer is called an S-control bearer used to transmit and receive the control message between the base station 3h-02 and an MME 3h-04 and an S1-user plane bearer used to transmit and receive user data between the base station 3h-02 and the S-GW 3h-04. By retaining the S1 bearer, it is possible to omit the procedure for S1 bearer setup when the terminal 3h-01 tries to setup an RRC connection in the same cell or in the same base station. If the expiration date expires, the base station 3h-02 may delete the UE context and release the S1 bearer. The terminal 3h-01 receiving the RRC connection release message in step 3h-10 is switched to the light connected mode.

The base station base station 3h-02 transmits a control message requesting a connection pause to the MME 3h-04 (at step 3h-20). The MME 3h-04 receiving the control message requests the S-GW to allow the MME 3h-04 to start the paging procedure without transmitting the downlink data to the base station when the downlink data for the terminal 3h-01 is generated, the S-GW is operated accordingly (at step 3h-35) or immediately transmits the downlink data to an anchor eNB 3h-03 when the downlink data for the terminal 3h-01 is generated, and the anchor eNB 3h-03 may generate the paging message and transmit the generated paging message to neighboring base stations. That is, the anchor eNB 3h-03 receiving the downlink data stores the data in the buffer and performs the paging procedure. The anchor eNB 3h-03 is named the base station 3h-02 that maintains the UE context and the S1-U bearer of the terminal.

The terminal 3h-01 receiving the RRC connection release message at step 3h-10 including the information indicating the context retention and the resume ID may release the RRC connection, drive the timer corresponding to the expiration date and record a valid cell list in the memory, maintain the currently terminal context in the memory without deleting the currently terminal context (at step 3h-25) and may be shifted to the light connected mode. In above description, the UE context is various information associated with the RRC connection of the terminal 3h-01 and includes SRB setup information, DRB setup information, security key information, etc. Hereinafter, for any reason, a necessity to setup the RRC connection may be generated (at step 3h-30). A terminal that has not been allocated the Resume ID or is not instructed to maintain the context during the previous RRC connection release initiates the general RRCConnectionSetup process described in FIG. 3F, but the light connected mode terminal which has been allocated the Resume ID during the previous RRC connection release may try the RRCConnectionResume process using the stored terminal context.

In above description, the light connected mode terminal may perform the general RRCConnectionSetup process (FIG. 3F) and perform the RRCConnectionResume process using the stored terminal context according to whether to support the light connection of the network. In the present disclosure, each base station or cell may transmit an indication as to whether or not each base station or cell supports the light connection by including the indication in the system information. The indication may be included in a second bloc of system information (Systeminformation 2), or may be included in blocks of other system information (Systeminformation 1 to 19). In the above description, supporting the light connection may mean that the corresponding base station 3h-02 or the corresponding cell may establish and support the following at steps 3h-50, 3h-55, 3h-60, 3h-65, 3h-70, 3h-75, 3h-80, 3h-85, and 3h-90. If the light connected mode terminal needs to establish the RRC connection, it reads the system information of the currently camped-on cell. If the system information does not include the indication that the base station 3h-02 or the cell supports light connection, the terminal 3h-01 can perform the general RRC connection establishment procedure described in FIG. 3F (at step 3h-45). However, if the system information includes the indication that the base station 3h-02 or the cell supports light connection, the terminal 3h-02 can perform an RRCConnectionResume process using the stored UE context (at step 3h-45). The RRCConnectionResume process using the stored UE context is as follows.

First, the terminal 3h-01 transmits a preamble in a message 1 to perform the RAP. If the resource allocation is possible according to the preamble received in the message 1, the base station 3h-02 allocates the corresponding uplink resource to the terminal 3h-01 in q message 2. The terminal 3h-01 transmits a Resume request message including the Resume ID received in step 3h-10 based on the received uplink resource information (at step 3h-50). The message may be a modified message of the RRCConnectionRequest message or a newly defined message (e.g., RRCConnectionResumeRequest). When the terminal 3h-01 in the light connected mode moves to camp on the cell of another base station by releasing the connection from the existing anchor eNB, e.g., base station 3h-02, (at step 3h-02), the new base station 3h-03 receives and confirms the Resume ID of the terminal, such that it can be appreciated from which base station the corresponding terminal receives a service previously. If the new base station 3h-03 successfully receives and confirms the Resume ID, it performs a procedure of retrieving the UE context from the existing base station 3h-02 (Context Retrieve Procedure at steps 3h-55 and 3h-60). The new base station 3h-03 may obtain the terminal context from the existing base station 3h-02 through the S1 or X2 interface. If the new base station 3h-03 receives the Resume ID but fails to successfully identify the terminal 3h-01 for predetermined reasons, the RRC connection establishment procedure may be sent to the terminal 3h-01 and may return to the general connection setup procedure described in FIG. 3F. That is, if the RRCConnectionSetup message is sent to the terminal 3h-01 and the terminal 3h-01 receives the message, the RRCConnectionSetup message may be sent to the base station 3h-02 to establish the connection. Alternatively, if the new base station 3h-03 receives the Resume ID but does not successfully identify the terminal 3h-01 (e.g., when fails to retrieve the UE context from the existing anchor eNB), the RRCConnectionRelease message or the RRCConnectionReject message is sent to the terminal 3h-01 to reject the connection of the terminal 3h-01 and the general RRCConnectionSetup procedure described in FIG. 2F may be tried from the beginning.

The new base station 3h-03 confirms the MAC-I based on the retrieved UE context (at step 3h-65). The MAC-I is a message authentication code calculated by the terminal 3h-01 for the control message by applying the security information of the restored UE context, that is, applying a security key and a security counter. The base station 3h-03 confirms the integrity of the message using the MAC-I of the message, a security key, a security counter stored in the context of the terminal 3h-01, or the like. The base station 3h-03 determines the establishment to be applied to the RRC connection of the terminal 3h-01 and transmits the RRC-ConnectionResume receiving the configuration information to the terminal 3h-01 (at step 3h-70). The RRCConnectionResume message may be a control message in which the reuse indicator indicating 'RRC context reuse' is included in the general RRC connection request message. The RRCConnectionResume message modified RRCConnectionSetup message receives various information related to the RRCConnectionSetup of the terminal like the RRCConnectionSetup message. When the terminal 3h-01 receives the normal RRCConnectionSetup message, the terminal 3h-01 establishes the RRC connection on the basis of the configuration information indicated in the RRC connection setup message, but when the terminal 3h-01 receives the RRCConnectionResume message, the terminal 3h-01 establishes (delta configuration) the RRC connection in consideration of both of the stored configuration information and the configuration information indicated in the control message.

In summary, the terminal 3h-01 determines the indicated configuration information as the delta information on the stored configuration information to determine the configuration information to be applied and updates the configuration information or the UE context. For example, if the modified RRCConnectionResume message includes the SRB configuration information, the SRB is configured by applying the indicated SRB configuration information, and if the SRB configuration information is not included in the RRCConnectionResume message, the SRB may be configured by applying the SRB configuration information stored in the UE context.

The terminal 3h-01 configures the RRC connection by applying the updated terminal and the configuration information and transmits the RRCConnectionResumeComplete message to the base station 3h-03 (at step 3h-75). The control message requesting the connection pause to the MME 3h-04 is transmitted and the S1 bearer is requested to be reestablished in a new base station (3h-80 and 3h-85). When receiving the message, the MME instructs the S-GW to reestablish the S1 bearer as a new base station and normally process data for the terminal 3h-01. When the process is completed, the terminal resumes data transmission/reception in the cell (at step 3h-90).

In the above procedure, if the terminal 3h-01 in the light connected mode does not greatly move by releasing the connection from the base station (anchor eNB) 3h-02, and thus if the camped-on cell (base station 3h-02) of the existing anchor eNB 3h-03 is made, the existing anchor eNB 3h-03 does not perform steps 3h-55 and 3h-60 but performs only the connection pause of the S bearer in place of steps 3h-80 and 3h-85 and refers to the Resume ID indicated in the message 3 to search for the UE context of the terminal and reestablish the connection by the method similar to the above procedures based on the same.

If the data transmission/reception stops, the base station 3h-02 drives a predetermined timer and if the data transmission/reception is not resumed until the timer expires (at step 3h-95), the base station 3h-02 considers releasing the RRC connection of the terminal 3h-02. The base station 3h-02 may release the RRC connection of the terminal 3h-01 according to a predetermined rule, store the UE context, allocate a Resume ID while transmitting a control message instructing the terminal 3h-01 to release the RRC connection, and allow the terminal 3h-01 to establish the PA to which the mobility is reported during the light connected mode (at step 3h-100). The terminal 3h-01 at step 3h-105 in the light connected mode performs a procedure of updating the paging area if the terminal 3h-01 at step 3h-105 is out of the established PA.

Figure 3I:
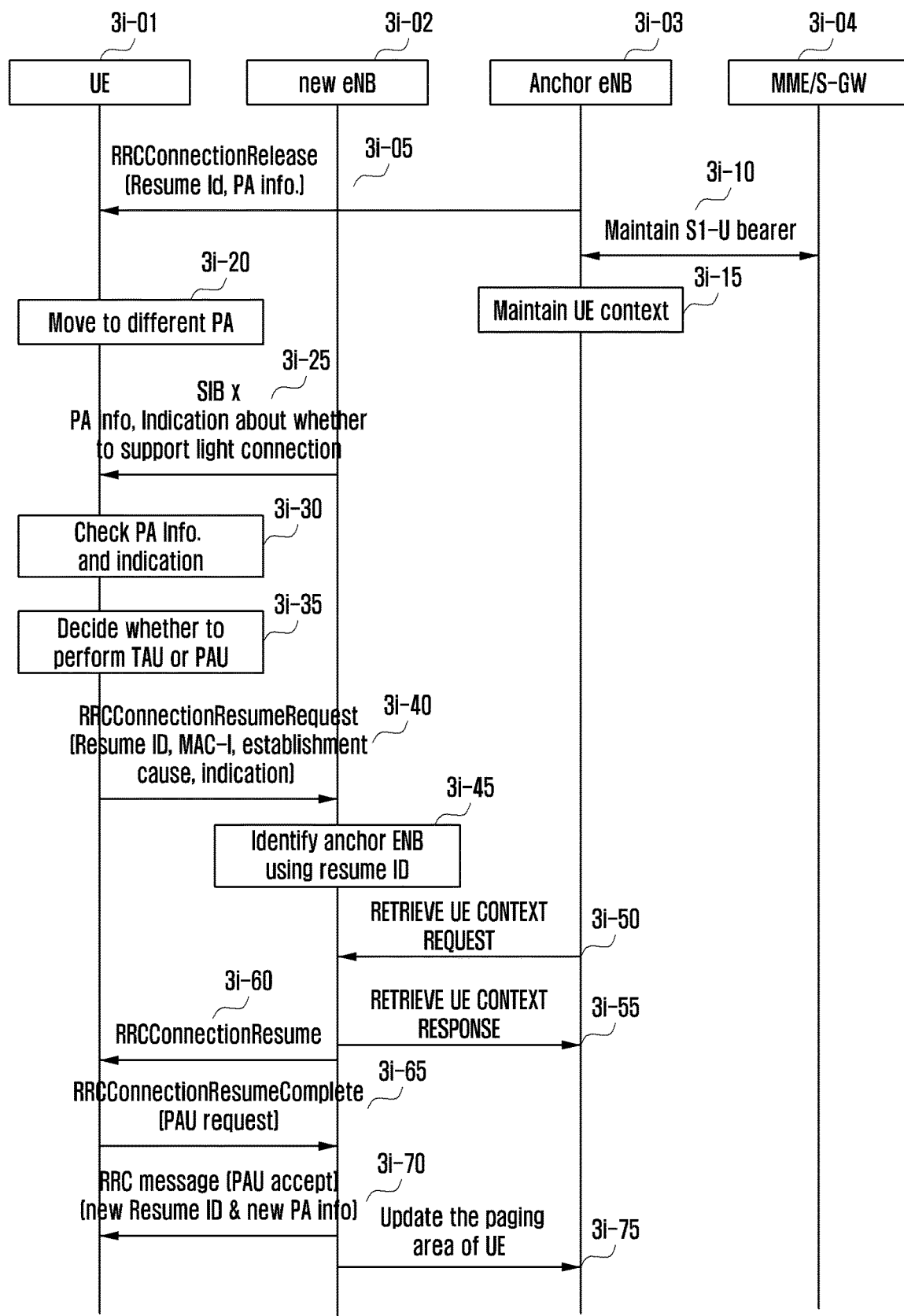
FIG. 3I is a diagram of a method for a paging area update (PAU) to a new base station by the light connected terminal, according to an embodiment of the present disclosure.

FIG. 3I is a diagram of a method for performing a paging area update (PAU) to a new base station by the light connected terminal, in accordance with an embodiment of the present disclosure.

In FIG. 3I, the terminal (UE) 3i-01 in the connection state with the anchor eNB 3i-03 receives the RRCConnectionrRelease message from the anchor eNB 3i-03 (at step 3l-05). If there is no data transmission/reception for a predetermined period of time, the anchor eNB 3i-03 can transmit the RRCConnectionRelease message to the terminal 3i-01 to be established in the light connected mode. The RRC message may include the information on the resume ID and the PA for the light-connected terminal 3l-01. The information on the PA may indicate one or more PA identifiers (PA IDs) or a list of one or more cell identifiers (Cell IDs). The terminal 3i-01 receiving the RRC message 3i-03 3i-05 can go to the light connected mode or the RRC idle state. The anchor eNB 3i-03 may store the context information of the terminal 3l-01 and may maintain the S1 bearer (at steps 3i-10 and 3i-15). In addition, the anchor eNB 3i-03 can manage the mobility of the terminal 3l-01 instead of an MME 3i-04. That is, if the anchor eNB 3i-03 has the downlink data to be transmitted to the terminal, it can generate a paging message and send the generated paging message to the terminal 3i-01 through the PA.

The terminal 3l-01 may move to another new base station or cell (new eNB) 3i-02 in another PA (at step 3i-20). Each cell managed by the base stations uses the predetermined system information (SIB) to broadcast the PA information such as its own cell ID or a PA ID or whether the cell (base station) supports the light connection (for example, using the indication) (at step 3i-25). In step 3i-30, the terminal 3i-01 receives the system information of the camped-on cell and confirms whether the PA information or the cell supports light connection (at step 3i-30). When the indication indicating that the cell (or the base station) supports light connection is not included in the system information, the terminal 3i-01 may perform the general TAU procedure as shown in FIG. 3G. However, if the indication indicating that the cell (or the base station) supports light connection is included in the system information, the terminal 3i-01 can perform the method of FIG. 3I of updating the following paging area (at step 3i-35).

If the PA ID or the cell identifiers broadcast in the system information are not included in the PA information established the terminal in step 3i-05, it is determined that the terminal 3i-01 is out of the PA, and the RRCConnectionResumeRequest is transmitted to the base station 3i-02 of the currently camped-on cell to request the paging area update (at step 3i-40). The establishment cause for the PA updating request in the message is newly defined and may be included. Alternatively, it may include the indication to indicate that the request is for updating the paging area using the reserved 1 bit of the message. Also, the message includes at least one of the Resume ID, the MAC-I, and the establishment cause. The base station 3i-02 receiving the RRCConnectionResumeRequest message uses the Resume ID to know the anchor eNB 3i-03 that previously supports the terminal (at step 3i-45). Accordingly, the base station 3i-02 can request the context information of the terminal 3i-01 to the anchor eNB 3i-03 (at steps 3i-50 and 3i-55). The security establishment can be confirmed using the retrieved terminal context information. The above steps at 3*i*-50 and 3*i*-55 may be omitted if the terminal 3*i*-01 attempts the connection establishment to original anchor eNB 3*i*-03. The base station 3*i*-02 transmits an RRCConnectionResume message to the terminal 3*i*-01 in step to allow the terminal 3*i*-01 to establish the connection (at step 3*i*-60), and the terminal 3*i*-01 can transmit an RRCConnectionResumeComplete message to complete the connection setup (at step 3*i*-65). In the message, the terminal 3*i*-01 may transmit a message or an indicator for requesting paging area update to the base station 3*i*-02. The base station 3*i*-02 receiving the paging area update request can send a paging area update response in the RRC message and establish new PA information (at step 3*i*-70).

In the above description, the RRC message may be the RRCConnectionRelease message or the RRCConnectionReconfiguration message and may be a newly defined RRC message. The base station 3*i*-02 can confirm the mobility, speed, traffic pattern, and the like of the terminal 3*i*-01 through the history information of the terminal 3*i*-01, and can establish a new PA of the terminal 3*i*-01 by reflecting the information (at step 3*i*-70). The history information may be received when a new base station exchanges messages with the anchor eNB 3*i*-03, and may include information such as the number of times, the period, and the time that the terminal performs the paging update at steps 3*i*-50, 3*l*-55. After the base station 3*i*-02 updates the PA of the terminal 3*i*-01, it updates the PA for the terminal 3*i*-01 of the anchor eNB 3*i*-03 (at step 3*l*-75). Since the anchor eNB 3*i*-03 is the base station that maintains the terminal context and the SI-U bearer of the terminal 3*l*-01 and the base station that manages the mobility of the terminal 3*i*-01, the paging area of the terminal should be updated. If the downlink data for the corresponding terminal reaches the anchor eNB 3*i*-03 in future, the anchor eNB 3*l*-03 managing the mobility of the terminal 3*i*-01 appropriately generates and transmits the paging message to each find the terminal 3*i*-01.

In the above procedure, if the mobility of the terminal 3*i*-01 is small and the connection to the base station 3*i*-03 that is connected previously is attempted, steps 3*i*-50, 3*i*-55, and 3*i*-75 are not performed and the procedure of updating the PA may be performed.

Figure 3J:
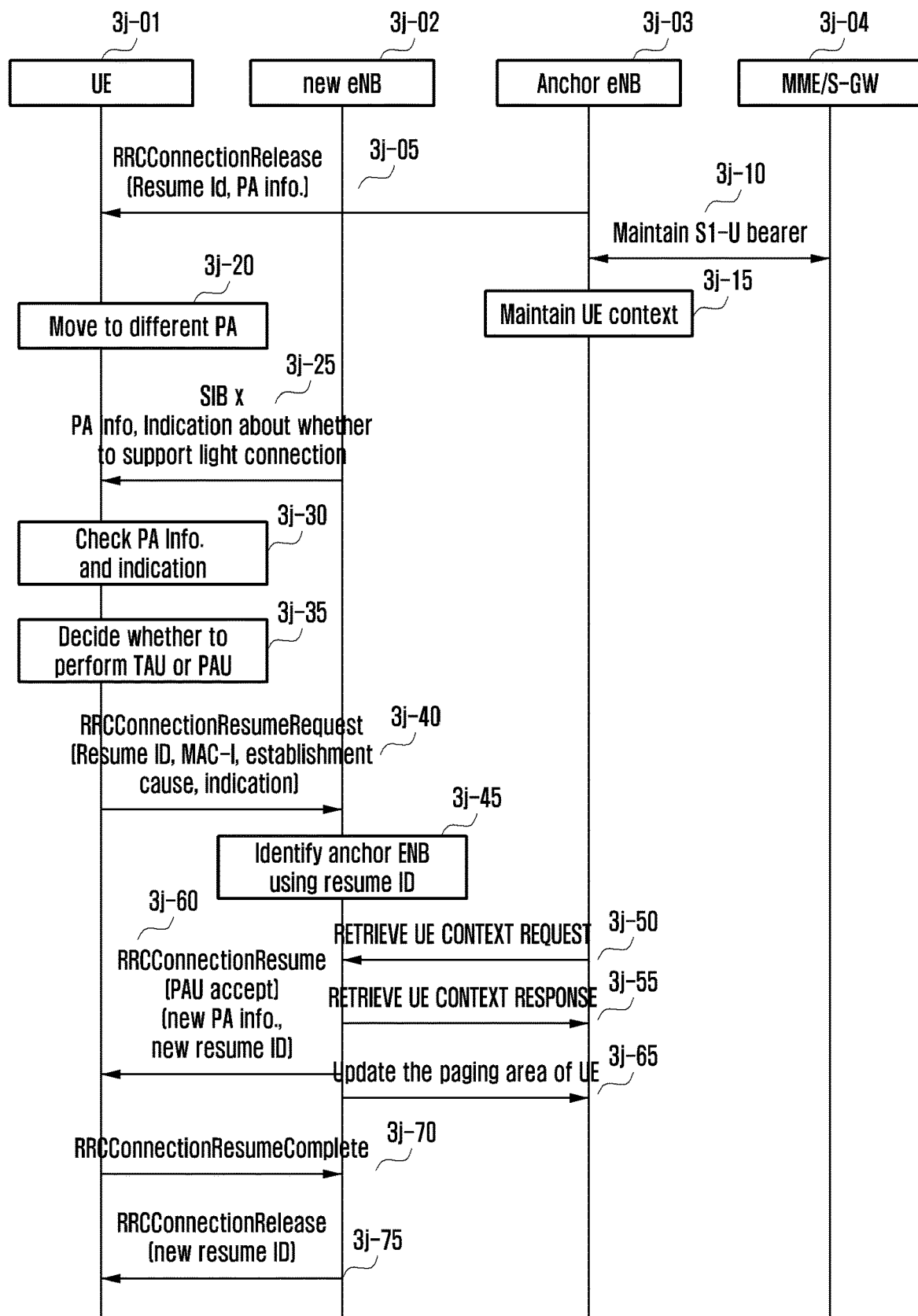
FIG. 3J is a diagram of a method for a PAU to a new base station by the light connected terminal, according to an embodiment of the present disclosure.

FIG. 3J is a diagram of a method for performing a PAU to a new base station by the light connected terminal, in accordance with an embodiment of the present disclosure.

In FIG. 3J, the terminal 3*j*-01 in the connection state with the anchor eNB 3*j*-03 receives the RRCConnectionrRlease message from the anchor eNB 3*j*-03 (at step 3*j*-05). If there is no data transmission/reception for a predetermined period of time, the anchor eNB 3*j*-03 can transmit the RRCConnectionRelease message to the terminal 3*j*-01 to be established in the light connected mode. The RRC message may include the information on the resume ID and the PA for the light-connected terminal. The information on the PA may indicate one or more PA IDs or a list of one or more Cell IDs. The terminal 3*j*-01 receiving the RRC message at step 3*j*-05 can go to the light connected mode or the RRC idle state. The anchor eNB 3*j*-03 may store the context information of the terminal 3*j*-01 and may maintain the S1 bearer (at steps 3*j*-10 and 3*j*-15). In addition, the anchor eNB 3*j*-03 can manage the mobility of the terminal 3*j*-01 instead of N MME 3*j*-04. That is, if the anchor eNB 3*j*-03 has the downlink data to be transmitted to the terminal 3*j*-01, it can generate a paging message and send the generated paging message to the mobile station through the PA.

The terminal 3*j*-01 may move to another new base station or cell (eNB) 3*j*-02 in another PA (at step 3*j*-20). Each cell managed by the base stations uses the predetermined SIB to broadcast the PA information such as its own cell ID or a PA ID or whether the cell (base station) supports the light connection (for example, using the indication) (at step 3*j*-25). In step 3*j*-30, the terminal 3*j*-01 receives the system information of the camped-on cell and confirms whether the PA information or the cell supports light connection (at step 3*j*-30). When the indication indicating that the cell (or the base station) supports light connection is not included in the system information, the terminal 3*j*-01 may perform the general TAU procedure as shown in FIG. 3G. However, if the indication indicating that the cell (or the base station) supports light connection is included in the system information, the terminal 3*j*-01 can perform the method of FIG. 3J for updating the following PA (at step 3*j*-35).

If the PA ID or the cell identifiers broadcast in the system information are not included in the PA information established the terminal 3*j*-01 in step 3*j*-05, it is determined that the terminal 3*j*-01 is out of the PA, and the RRCConnectionResumeRequest is transmitted to the base station of the currently camped-on cell to request the PA update (at step 3*j*-40). The establishment cause for the paging area updating request in the message is newly defined and may be included. Alternatively, it may include the indication to indicate that the request is for updating the paging area using the reserved 1 bit of the message. Also, the message includes at least one of the Resume ID, the MAC-I, and the establishment cause. The base station receiving the RRCConnectionResumeRequest message uses the Resume ID to know the anchor eNB 3*j*-03 that previously supports the terminal 3*j*-01 (at step 3*j*-45). Accordingly, the new base station 3*j*-02 can request the context information of the terminal 3*j*-01 to the anchor eNB 3*j*-03 (at steps 3*j*-50 and 3*j*-55). The security establishment can be confirmed using the retrieved terminal context information. The above steps 3*j*-50 and 3*j*-55 may be omitted if the terminal 3*j*-01 attempts the connection establishment to original anchor eNB 3*j*-03. The base station 3*j*-02 can transmit a RRCConnectionResume message at step 3*j*-60 in order to receive the PA update request of the terminal 3*j*-01 in the message at step 3*j*-40 and permit the PA update message (at step 3*j*-60). The base station 3*j*-02 may include information on a new PA in response to the paging area update request in the message, and may include a new resume ID, and if necessary, the new resume ID may be transmitted to the terminal 3*j*-01 by being included in the RRCConnectionRelease message at step 3*j*-75.

The new base station 3*j*-02 can confirm the mobility, speed, traffic pattern, and the like of the terminal 3*j*-01 through the history information of the terminal 3*j*-01, and can establish a new paging area of the terminal 3*j*-01 by reflecting the information (3*j*-70). The history information may be received when a new base station 3*j*-02 exchanges messages with the anchor eNB 3*j*-03, and may include information such as the number of times, the period, and the time that the terminal 3*j*-01 performs the paging update procedure (3*i*-50, 55). After the new base station 3*j*-02 updates the paging area of the terminal 3*j*-01, it updates the paging area for the terminal of the anchor eNB 3*j*-03 (at step 3*j*-65). The terminal 3*j*-01 can transmit the RRCConnectionResumeComplete message to complete the connection establishment (at step 3*j*-70). If there is no data transmission/reception while the predetermined time elapses, the base station 3*j*-02 can send the RRCConnectionRelease message to establish the terminal 3*j*-01 to be in the light connected mode again (at step 3*j*-75). Since the anchor eNB 3*j*-03 is the base station 3*j*-01 that maintains the terminal 3*j*-01 context and the SI-U bearer of the terminal 3*j*-01 and the base station 3*j*-02 that manages the mobility of the terminal 3*j*-01, the paging area of the terminal 3*j*-01 should be updated. If the downlink data for the corresponding terminal 3*j*-01 reaches the anchor eNB 3*j*-03 in future, the anchor eNB 3*j*-03 managing the mobility of the terminal appropriately generates and transmits the paging message to each find the terminal 3*j*-01.

In the above procedure, if the mobility of the terminal 3*j*-01 is small and the connection to the base station 3*j*-03 that is connected previously is attempted, steps 3*j*-50, 3*j*-55, and 3*j*-65 are not performed and the method of FIG. 3J for updating the PA may be performed.

Figure 3K:
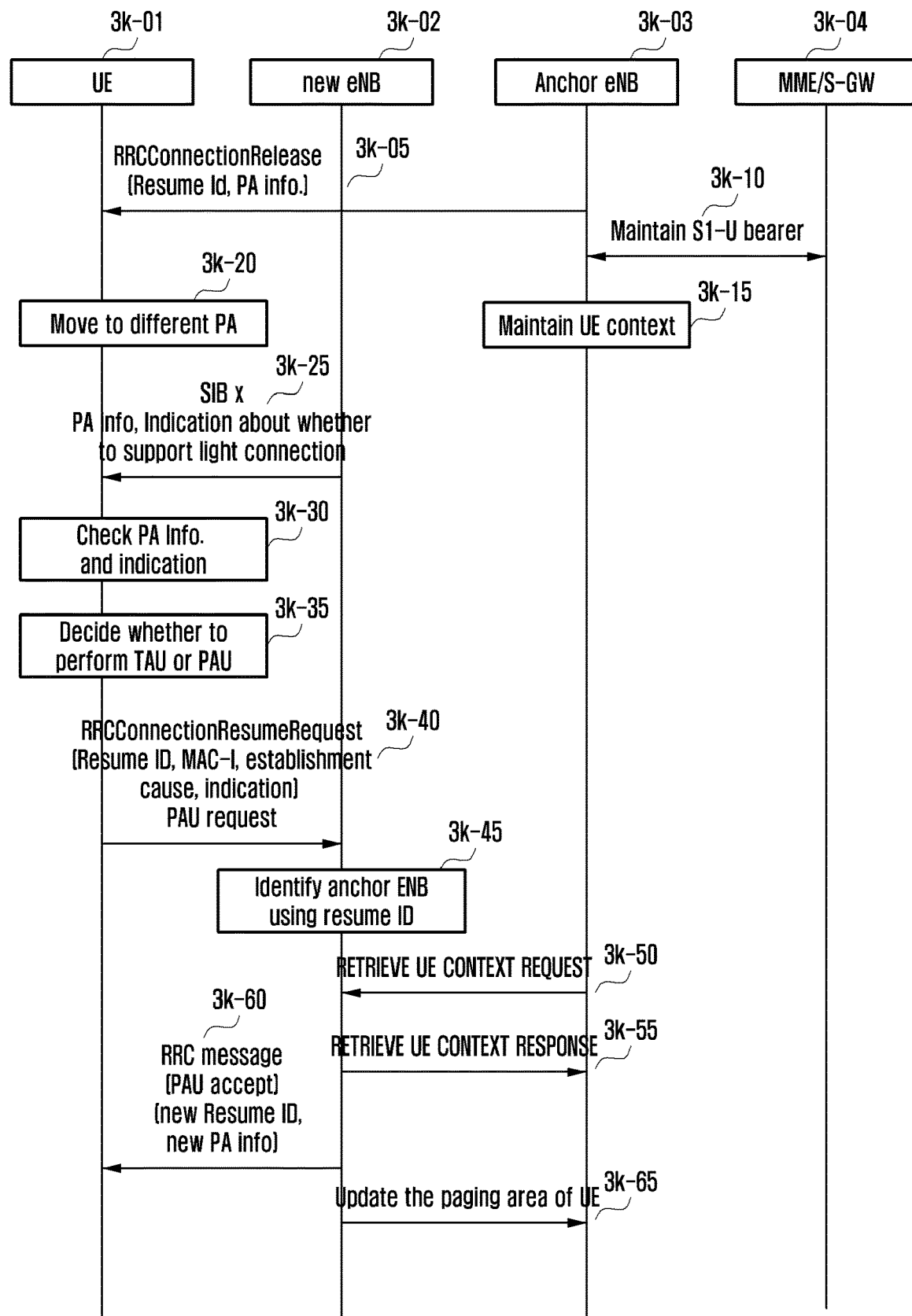
FIG. 3K is a diagram of a method for a PAU to a new base station by the light connected terminal, according to an embodiment of the present disclosure.
Figure 3L:
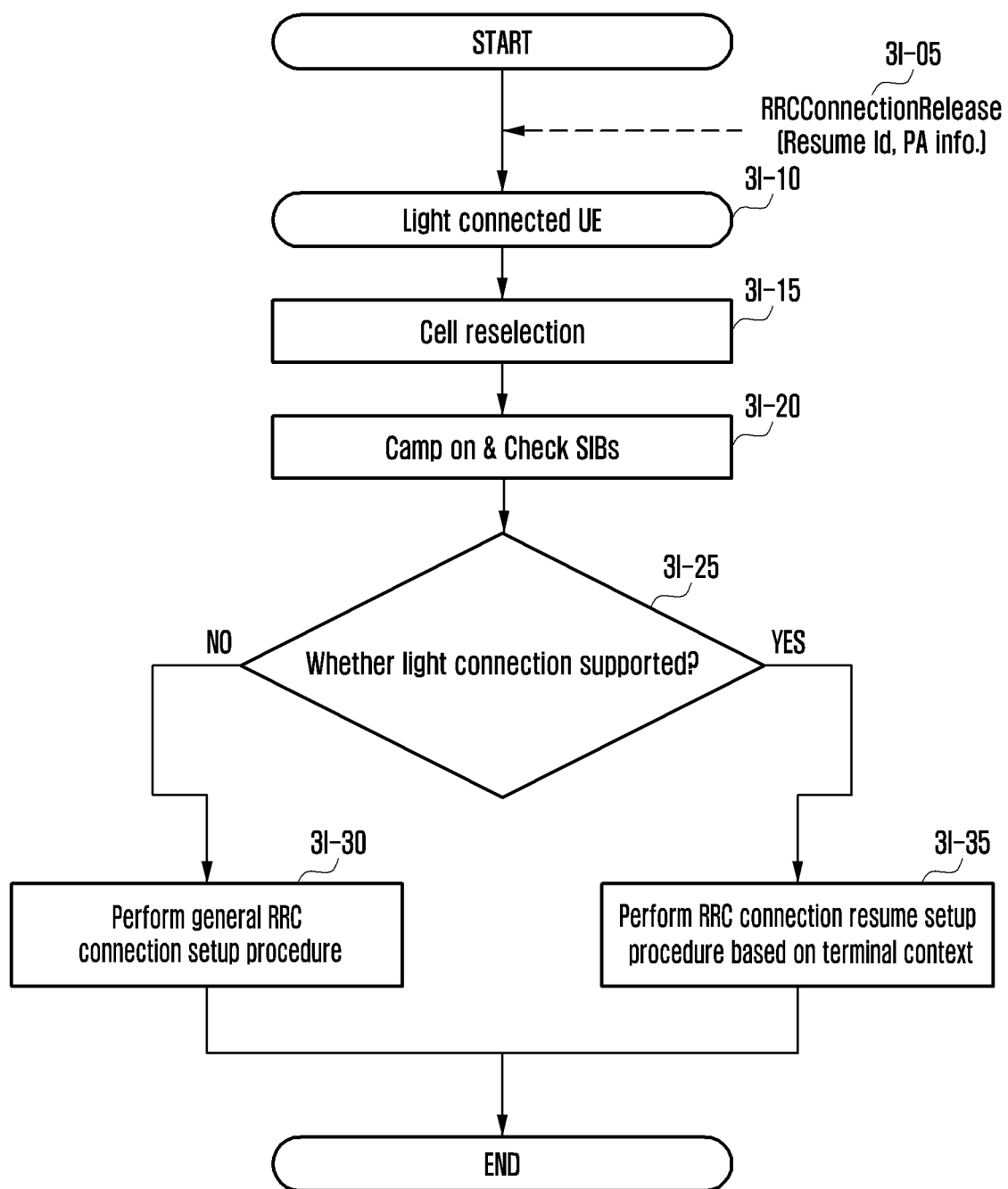
FIG. 3L is a flowchart for a method of a terminal when the light connected mode terminal establishes an RRC connection to the network, according to an embodiment of the present disclosure.

FIG. 3K is a diagram of a method for performing a PAU to a new base station by the light connected terminal, in accordance with an embodiment of the present disclosure.

In FIG. 3K, the terminal 3*k*-01 in the connection state with the anchor eNB 3*k*-03 receives the RRCConnectionrRlease message from the anchor eNB (at step 3*k*-05). If there is no data transmission/reception for a predetermined period of time, the anchor eNB 3*k*-03 can transmit the RRCConnectionRelease message to the terminal 3*k*-01 to be established in the light connected mode. The RRC message may include the information on the resume ID and the PA for the light-connected terminal. The information on the PA may indicate one or more PA IDs or a list of one or more Cell IDs. The terminal 3*k*-01 receiving the RRC message at step 3*k*-05 can go to the light connected mode or the RRC idle state. The anchor eNB 3*k*-03 may store the context information of the terminal 3*k*-01 and may maintain the S1 bearer (at steps 3*k*-10 and 3*k*-15). In addition, the anchor eNB 3*k*-03 can manage the mobility of the terminal 3*k*-01 instead of an MME 3*k*-04. That is, if the anchor eNB 3*k*-03 has the downlink data to be transmitted to the terminal 3*k*-01, it can generate a paging message and send the generated paging message to the mobile station through the PA.

The terminal 3*k*-01 may move to another new base station or cell 3*k*-02 in another PA (at step 3*k*-20). Each cell managed by the base stations uses the predetermined SIB to broadcast the PA information such as its own cell ID or a PA ID or whether the cell (base station) supports the light connection (for example, using the indication) (at step 3*k*-25). In step 3*k*-30, the terminal 3*k*-01 receives the system information of the camped-on cell and confirms whether the PA information or the cell supports light connection (at step 3*k*-30). When the indication indicating that the cell (or the base station) supports light connection is not included in the system information, the terminal 3*k*-01 may perform the general TAU procedure as shown in FIG. 3G. However, if the indication indicating that the cell (or the base station) supports light connection is included in the system information, the terminal 3*k*-01 can perform the method of FIG. 3K for updating the PA (at step 3*k*-35).

If the PA ID or the cell identifiers broadcast in the system information are not included in the paging area information established the terminal in step 3*k*-05, it is determined that the terminal is out of the PA, and the RRCConnectionResumeRequest is transmitted to the base station of the currently camped-on cell to request the paging area update (at step 3*k*-40). The establishment cause for the PA updating request in the message is newly defined and may be included. Alternatively, it may include the indication to indicate that the request is for updating the PA using the reserved 1 bit of the message. Also, the message includes at least one of the Resume ID, the MAC-I, and the establishment cause. The base station receiving the RRCConnectionResumeRequest message uses the Resume ID to know the anchor eNB 3*k*-03 that previously supports the terminal 3*k*-01 (at step 3*k*-45). Accordingly, the new base station 3*k*-02 can request the context information of the terminal 3*k*-01 to the anchor eNB 3*k*-03 (at steps 3*k*-50 and 3*k*-55). The security establishment can be confirmed using the retrieved terminal context information. The steps of 3*k*-50 and 3*k*-55 may be omitted if the terminal 3*k*-01 attempts the connection establishment to original anchor eNB 3*k*-03. The base station 3*k*-02 can transmit the RRC message as the response to the PA update request in order to receive the PA update request of the terminal 3*k*-01 in the message at step 3*k*-40 and permit the PA update message (at step 3*k*-60). The base station 3*k*-02 may include information on a new PA as response to the paging area update request in the message, and may include a new resume ID. The RRC message may be a newly defined RRC message, an RRCConnectionRelease message, an RRCConnectionReconfiguration message, or an RRCConnectionResume message. The new base station 3*k*-02 can confirm the mobility, speed, traffic pattern, and the like of the terminal 3*k*-01 through the history information of the terminal, and can establish a new PA of the terminal 3*k*-01 by reflecting the information (at step 3*k*-60). The history information may be received when a new base station 3*k*-02 exchanges messages with the anchor eNB 3*k*-03, and may include information such as the number of times, the period, and the time that the terminal performs the paging update procedure (at step 3*k*-50, 3*k*-55). After the new base station 3*k*-02 updates the PA of the terminal 3*k*-01, it updates the paging area for the terminal 3*k*-01 of the anchor eNB 3*k*-03 (at step 3*k*-65). If there is no data transmission/reception while the predetermined time elapses, the base station 3*k*-02 may send the RRCConnectionRelease message and again establish the terminal in the light connected mode or may omit the message when using the RRCConnectionRelease message in step 3*k*-60. Since the anchor eNB 3*k*-03 is the base station 3*k*-03 that maintains the terminal context and the SI-U bearer of the terminal 3*k*-01 and the base station 3*k*-02 that manages the mobility of the terminal 3*k*-01, the PA of the terminal 3*k*-01 should be updated. If the downlink data for the corresponding terminal 3*k*-01 reaches the anchor eNB 3*k*-03 in future, the anchor eNB 3*k*-03 managing the mobility of the terminal 3*k*-01 appropriately generates and transmits the paging message to each find the terminal.

In the above procedure, if the mobility of the terminal 3*k*-01 is small and the connection to the base station (eNB) 3*k*-03 that is connected previously is attempted, steps 3*k*-50, 3*k*-55, 3*k*-65 are not performed and the method of FIG. 3K for updating the PA may be performed.

FIG. 3I is a flowchart of a method of a terminal when the light connected mode terminal establishes an RRC connection to the network, in accordance with an embodiment of the present disclosure.

In FIG. 3I, the terminal in the connection state to the anchor eNB receives an RRC ConnectionRelease message from the anchor eNB (at step 3*l*-05). The anchor eNB may establish the terminal in the light connected mode if there is no data transmission/reception for the predetermined time. The terminal receiving the message is switched to the light connected mode (at step 3*l*-10). Also, the terminal receiving the RRCConnectionRelease message may go to the RRC idle state. The terminal is allocated the Resume ID through the RRCConnectionRelease message and establishes the PA information. In the above description, the PA may indicate one or more than two sets of cells, and may indicate one or two or more PA ID (at step 3*l*-05). The terminal may move to another PA of the existing anchor eNB or another base station. If it is necessary for the terminal to establish the RRCConnectionsetup to the network for a predetermined reason, the terminal performs a cell reselection procedure and searches for a suitable cell (at step 3*l*-15). If an appropriate cell is found in the cell reselection procedure, the cell is camped on and the system information is read (at step 3*l*-20). The terminal confirms whether the PA information or the camped-on cell in the system information supports light connection (at step 3*l*-25). If the cell does not support the light connection, the terminal performs the general RRC connection establishment procedure described in FIG. 3F (at step 3*l*-30). If the cell supports light connection, the terminal performs the RRCConnectionResume procedure based on the terminal context as described in FIG. 3H (at step 3*l*-35).

Figure 3M:
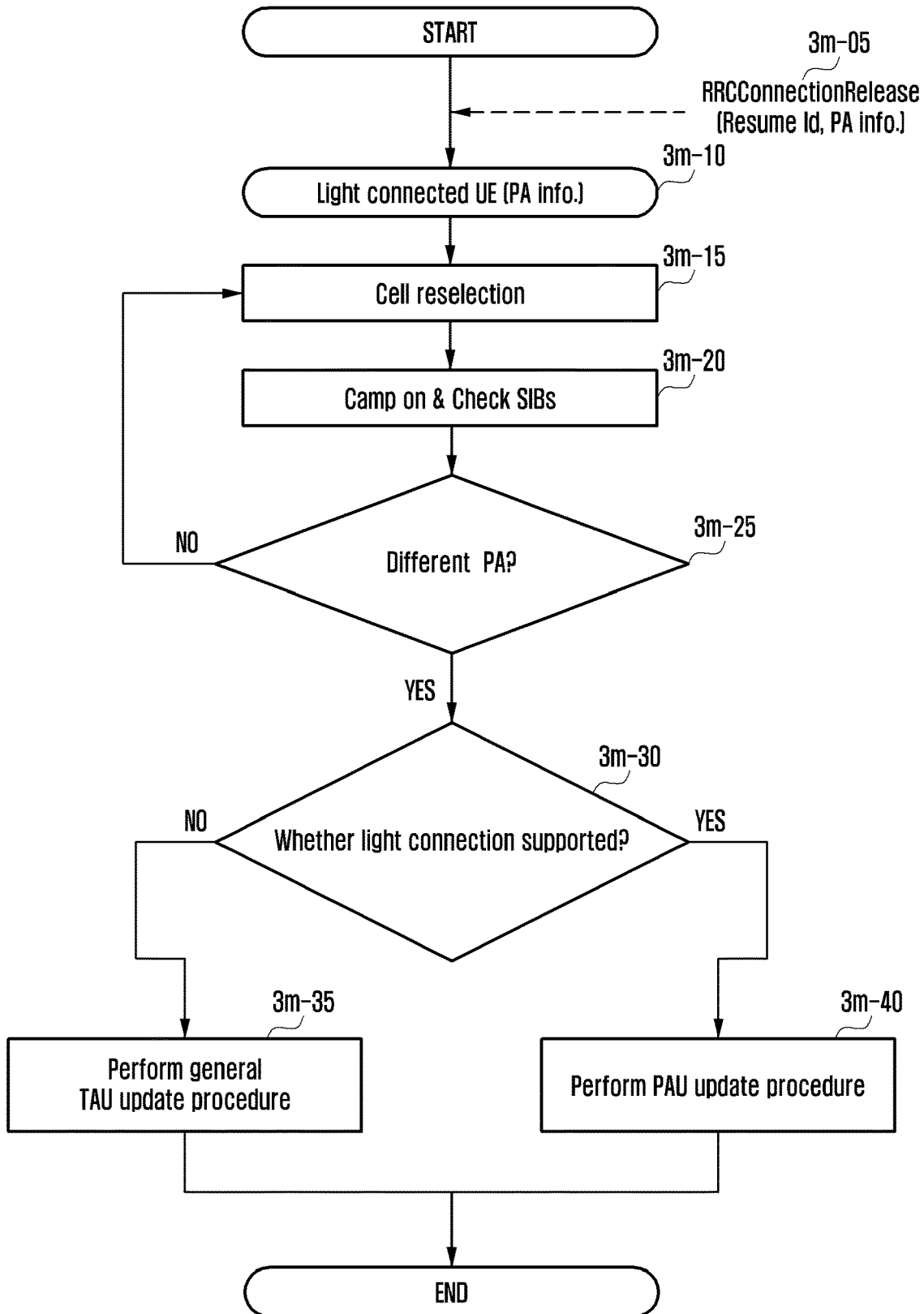
FIG. 3M is a diagram of the terminal when the light connected mode terminal performs the PAU, according to an embodiment of the present disclosure.

FIG. 3M is a flowchart of a method of the terminal when the light connected mode terminal performs the procedure of performing the paging area update, in accordance with an embodiment of the present disclosure.

In FIG. 3M, the terminal in the connection state to the anchor eNB receives an RRCConnectionRelease message from the anchor eNB (at step 3*m*-05). The anchor eNB may establish the terminal in the light connected mode if there is no data transmission/reception for the predetermined time. The terminal receiving the message is switched to the light connected mode (at step 3*m*-10). Also, the terminal receiving the RRCConnectionRelease message may go to the RRC idle state. The terminal is allocated the Resume ID through the RRCConnectionRelease message and establishes the PA information. In the above description, the PA may indicate one or more than two lists of cells, and may indicate one or two or more PA (at step 3*m*-05). The terminal may move to another PA of the existing anchor eNB or another base station. The terminal performs a cell reselection procedure to search for a suitable cell (at step 3*m*-15). If an appropriate cell is found in the cell reselection procedure, the cell is camped on and the system information is read (at step 3*m*-20). The terminal confirms the PA information in the system information, compares the confirmed PA information with the PA information established in step 3*m*-05, and then determines the PA as a different paging area if the terminal does not have the same PA information (at step 3*m*-25). If the PA information read from the system information is included in the PA information established in step 3*m*-05, the terminal determines that it is within the established paging area and continuously performs the cell reselection procedure without performing the PA update procedure (at step 3*m*-15). If it is determined that the terminal is currently in another PA, the process proceeds to step 3*m*-30 to check whether the currently camped-on cell supports the light connection in the system information. If the currently camped-on cell does not support the light connection, the terminal performs the general TAU procedure described in FIG. 3G (at step 3*m*-35), and if the currently camped-on cell supports the light conception, the methods described in FIGS. 3I, 3J, and 3K is performed (at step 3*m*-40).

Figure 3N:
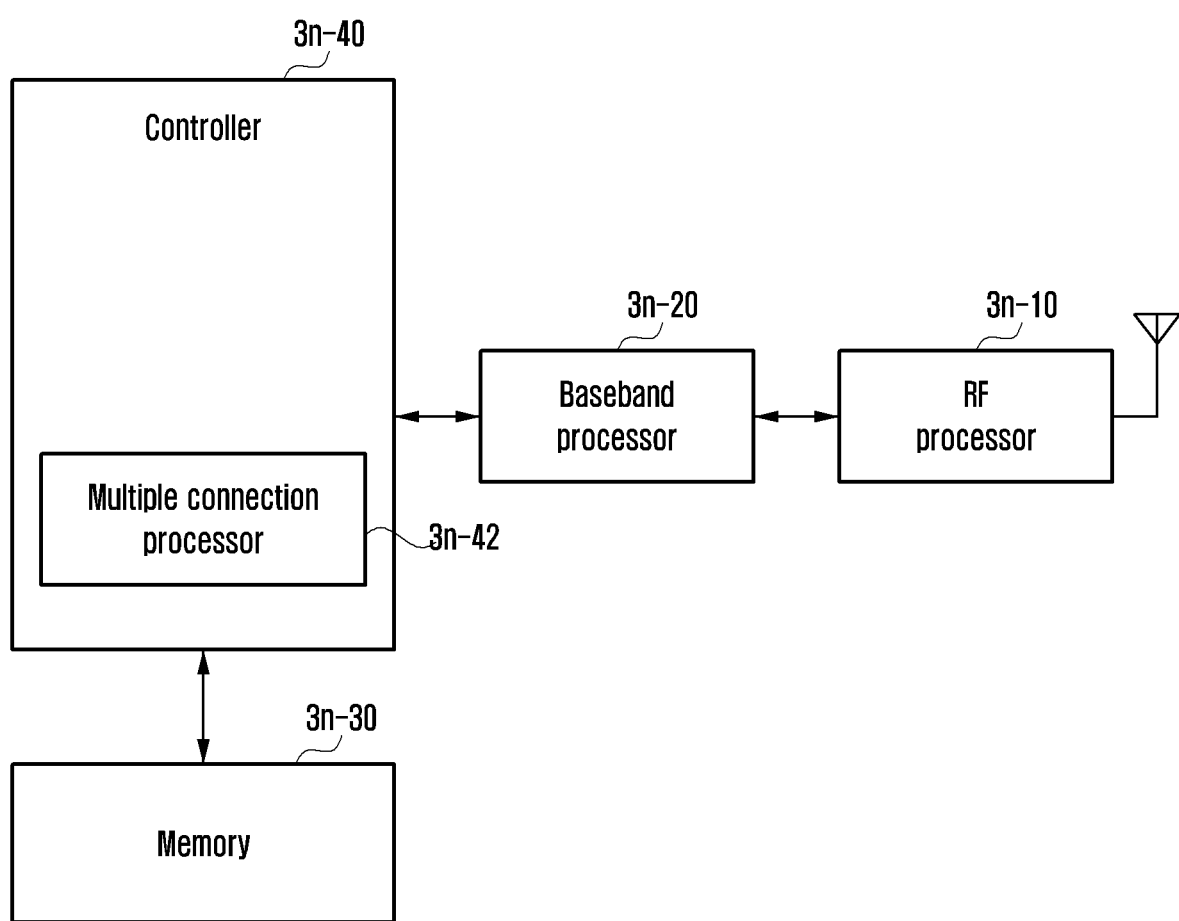
FIG. 3N is a block diagram of the terminal, according to an embodiment of the present disclosure.
Figure 30:
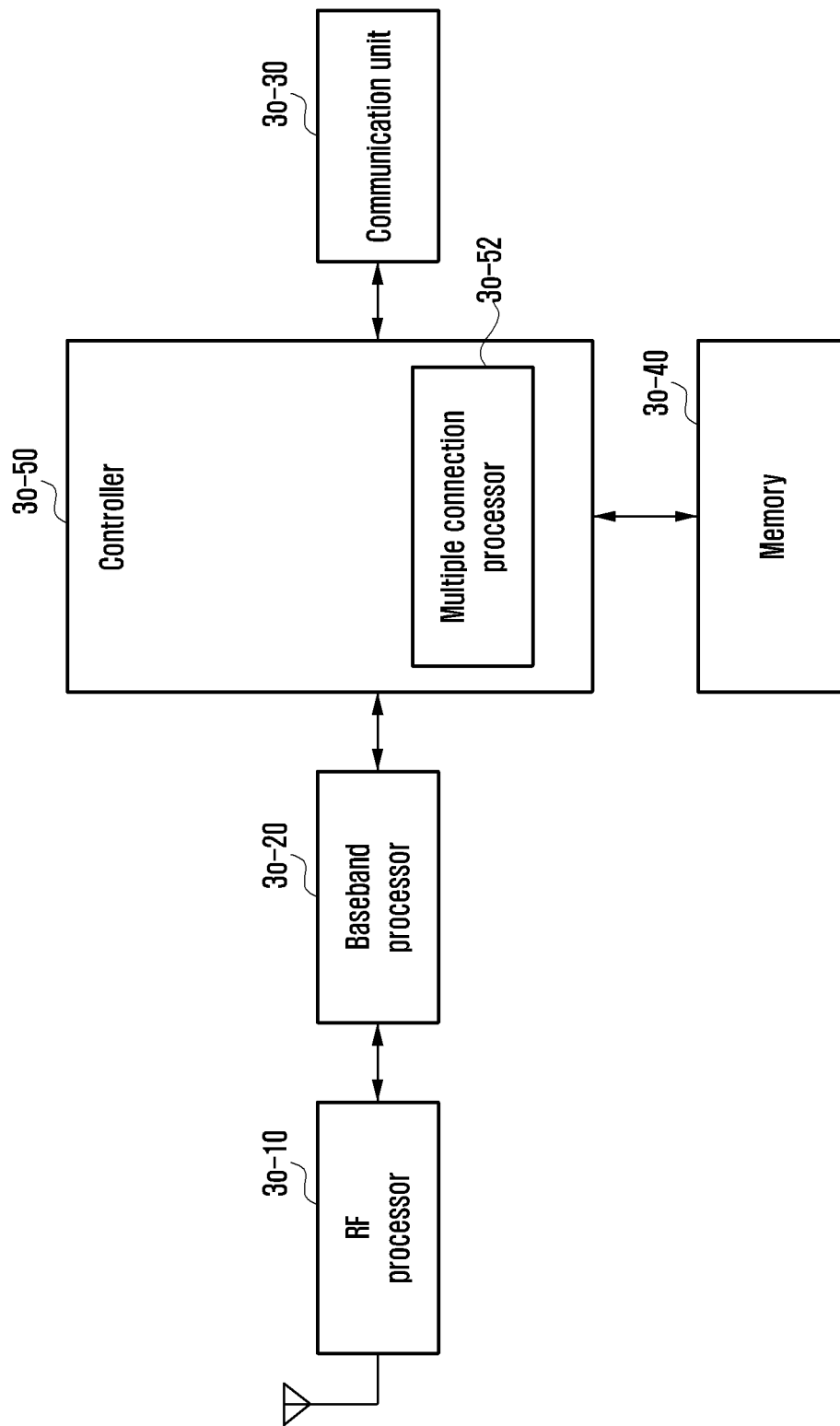

FIG. 3N is a diagram of the terminal, in accordance with an embodiment of the present disclosure.

The terminal includes an RF processor 3*n*-10, a baseband processor 3*n*-20, a memory 3*n*-30, and a controller 3*n*-40 including a multiple connection processor 3*n*-42.

The RF processor 3*n*-10 serves to transmit and receive a signal through a radio channel, such as band conversion and amplification of a signal. That is, the RF processor 3*n*-10 up-converts a baseband signal provided from the baseband processor 3*n*-20 into an RF band signal and then transmits the RF band signal through an antenna and down-converts the RF band signal received through the antenna into the baseband signal. The RF processor 3*n*-10 may include a transmitting filter, a receiving filter, an amplifier, a mixer, an oscillator, a DAC, an ADC, or the like. FIG. 3N illustrates only one antenna but the terminal may include a plurality of antennas. The RF processor 3*n*-10 may include a plurality of RF chains. Further, the RF processor 3*n*-10 may perform beamforming. The RF processor 3*n*-10 may adjust a phase and a size of each of the signals transmitted and received through a plurality of antennas or antenna elements. In addition, the RF processor 3*n*-10 may perform MIMO and may receive a plurality of layers when performing a MIMO operation. The RF processor 3*n*-10 may perform reception beam sweeping by appropriately configuring a plurality of antennas or antenna elements under the control of the controller or adjust a direction and a beam width of the reception beam so that the reception beam is resonated with the transmission beam.

The baseband processor 3*n*-20 performs a conversion function between a baseband signal and a bit string according to a physical layer standard of a system. When data are transmitted, the baseband processor 3*n*-20 generates complex symbols by coding and modulating a transmitted bit string. When data is received, the baseband processor 3*n*-20 recovers the received bit string by demodulating and decoding the baseband signal provided from the RF processor 3*n*-10. For example, according to the OFDM scheme, when data is transmitted, the baseband processor 3*n*-20 generates the complex symbols by coding and modulating the transmitting bit string, maps the complex symbols to sub-carriers, and then performs an IFFT operation and a CP insertion to construct the OFDM symbols. When data are received, the baseband processor 3*n*-20 divides the baseband signal provided from the RF processor 3*n*-10 in an OFDM symbol unit and recovers the signals mapped to the sub-carriers by an FFT operation and then recovers the received bit string by the modulation and decoding.

The baseband processor 3*n*-20 and the RF processor 3*n*-10 transmit and receive a signal as described above. Therefore, the baseband processor 3*n*-20 and the RF processor 3*n*-10 may be called a transmitter, a receiver, a transceiver, or a communication unit. At least one of the baseband processor 3*n*-20 and the RF processor 3*n*-10 may include a plurality of communication modules to support a plurality of different RATs. At least one of the baseband processor 3*n*-20 and the RF processor 3*n*-10 may include different communication modules to process signals in different frequency bands. The different wireless access technologies may include an LTE network, an NR network, and the like. Further, different frequency bands may include an SHF (for example: 2.5 GHz, 5 GHz) band, a millimeter wave (for example: 60 GHz) band.

The memory 3*n*-30 stores data such as basic programs, application programs, and configuration information for the terminal. Further, the memory 3*n*-30 provides the stored data according to the request of the controller 3*n*-40.

The controller 3*n*-40 controls the overall operations of the terminal. The controller 3*n*-40 transmits and receives a signal through the baseband processor 3*n*-20 and the RF processor 3*n*-10. The controller 3*n*-40 records and reads data in and from the memory 3*n*-40. The controller 3*n*-40 may include at least one processor, and may include a CP performing a control for communication and an AP controlling a higher layer such as the application programs.

FIG. 3O is a diagram of TRP in a wireless communication system, according to an embodiment of the present disclosure.

As illustrated in FIG. 3O, the base station is configured to include an RF processor 3o-10, a baseband processor 3o-20, a communication unit 3o-30, a memory 3o-40, and a controller 3o-50.

The RF processor 3o-10 serves to transmit and receive a signal through a radio channel, such as band conversion and amplification of a signal. That is, the RF processor 3o-10 up-converts a baseband signal provided from the baseband processor 3o-20 into an RF band signal and then transmits the RF band signal through an antenna and down-converts the RF band signal received through the antenna into the baseband signal. The RF processor 3o-10 may include a transmitting filter, a receiving filter, an amplifier, a mixer, an oscillator, a DAC, an ADC, or the like. FIG. 3O illustrates only one antenna but the first access node may include a plurality of antennas. The RF processor 3o-10 may include a plurality of RF chains. Further, the RF processor 3o-10 may perform the beamforming. The RF processor 3o-10 may adjust a phase and a size of each of the signals transmitted/received through a plurality of antennas or antenna elements. The RF processor 3o-10 may perform a downward MIMO operation by transmitting one or more layers.

The baseband processor 3o-20 performs a conversion function between the baseband signal and the bit string according to the physical layer standard of the first RAT. When data are transmitted, the baseband processor 3o-20 generates complex symbols by coding and modulating a transmitted bit string. When data are received, the baseband processor 3o-20 recovers the received bit string by demodulating and decoding the baseband signal provided from the RF processor 3o-10. For example, according to the OFDM scheme, when data are transmitted, the baseband processor 3o-20 generates the complex symbols by coding and modulating the transmitting bit string, maps the complex symbols to the sub-carriers, and then performs the IFFT operation and the CP insertion to construct the OFDM symbols. When data are received, the baseband processor 3o-20 divides the baseband signal provided from the RF processor 3o-10 in the OFDM symbol unit and recovers the signals mapped to the sub-carriers by the FFT operation and then recovers the receiving bit string by the modulation and decoding. The baseband processor 3o-20 and the RF processor 3o-10 transmit and receive a signal as described above. Therefore, the baseband processor 3o-20 and the RF processor 3o-10 may be called a transmitter, a receiver, a transceiver, or a communication unit.

The communication unit 3o-30 provides an interface for performing communication with other nodes within the network.

The memory 3o-40 stores data such as basic programs, application programs, and setting information for the main base station. In particular, the memory 3o-40 may store the information on the bearer allocated to the accessed terminal, the measured results reported from the accessed terminal, etc. The memory 3o-40 may store information that is a determination criterion on whether to provide a multiple connection to the terminal or stop the multiple connection to the terminal. The memory 3o-40 provides the stored data according to the request of the controller 3o-50.

The controller 3o-50 controls the general operations of the main base station. The controller 3o-50 transmits/receives a signal through the baseband processor 3o-20 and the RF processor 3o-10 or the communication unit 3o-30. Further, the controller 3o-50 records and reads data in and from the memory 3o-40. For this purpose, the controller 3o-50 may include at least one processor.

Figure 4A:
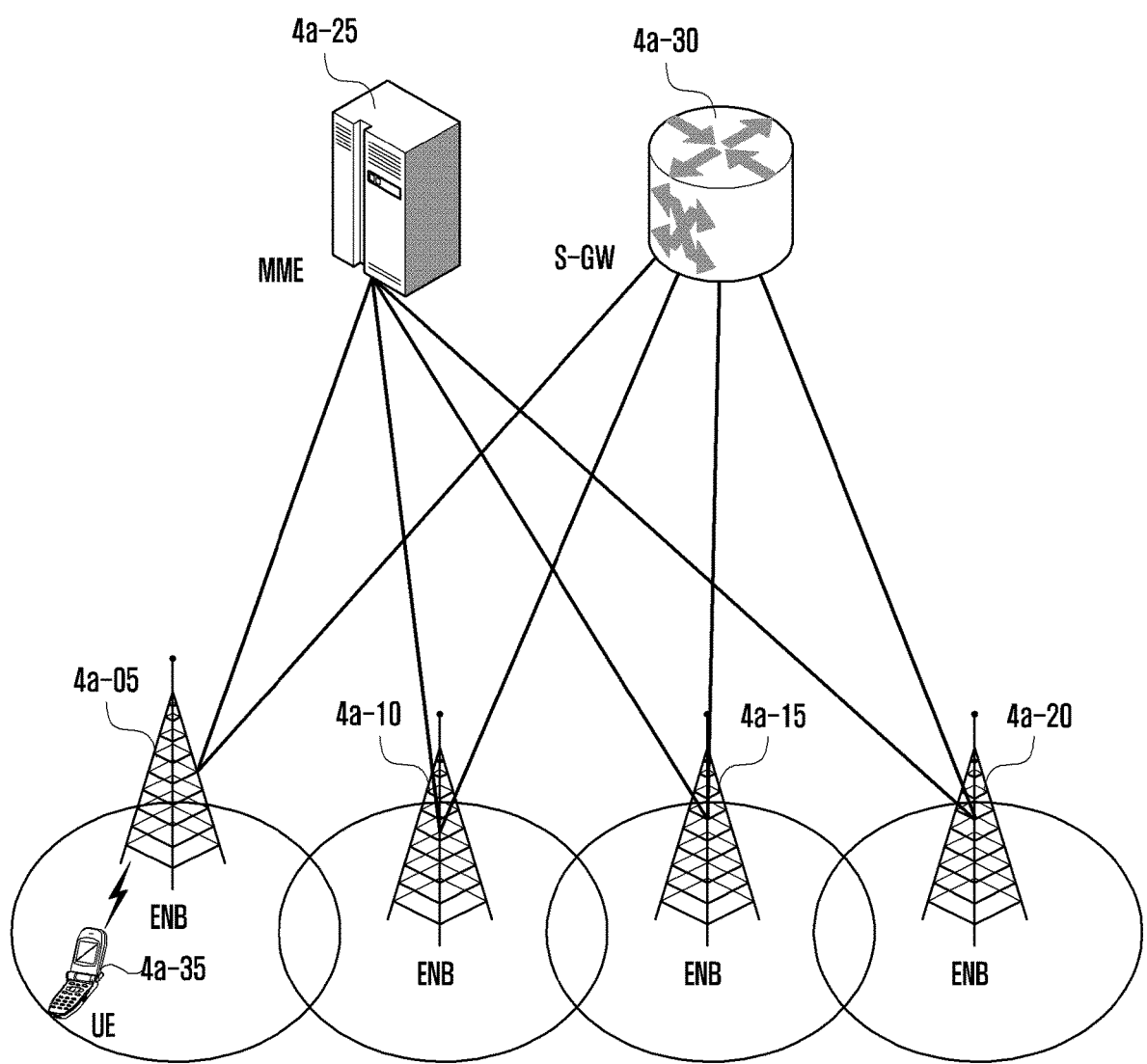
FIG. 4A is a diagram of the network structure of the wireless communication system, according to an embodiment of the present disclosure.

FIG. 4A is a diagram of the LTE system, in accordance with an embodiment of the present disclosure.

Referring to FIG. 4A, the wireless communication system is configured to include a plurality of base stations 4a-05, 4a-10, 4a-15, and 4a-20, an MME 4a-25, an S-GW 4a-30. UE or terminal 4a-35 accesses an external network through the base stations 4a-05, 4a-10, 4a-15, and 4a-20 and the S-GW 4a-30.

The base stations 4a-05, 4a-10, 4a-15, and 4a-20 are access nodes of a cellular network and provides a wireless access to terminals that are connected to a network. That is, in order to serve traffic of users, the base stations 4a-05, 4a-10, 4a-15, and 4a-20 collect state information such as a buffer state, an available transmission power state, a channel state, or the like of the terminals to perform scheduling, thereby supporting a connection between the terminals and a CN. The MME 4a-25 is an apparatus for performing various control functions as well as a mobility management function for the terminal 4a-35 and is connected to the plurality of base stations 4a-05, 4a-10, 4a-15, and 4a-20, and the S-GW 4a-30 is an apparatus for providing a data bearer. The MME 4a-25 and the S-GW 4a-30 may further perform authentication, bearer management, etc., on the terminal 4a-35 connected to the network and may process packets that are to be received from the base stations 4a-05, 4a-10, 4a-15, and 4a-20 and packets that are to be transmitted to the base stations 4a-05, 4a-10, 4a-15, and 4a-20.

Figure 4B:
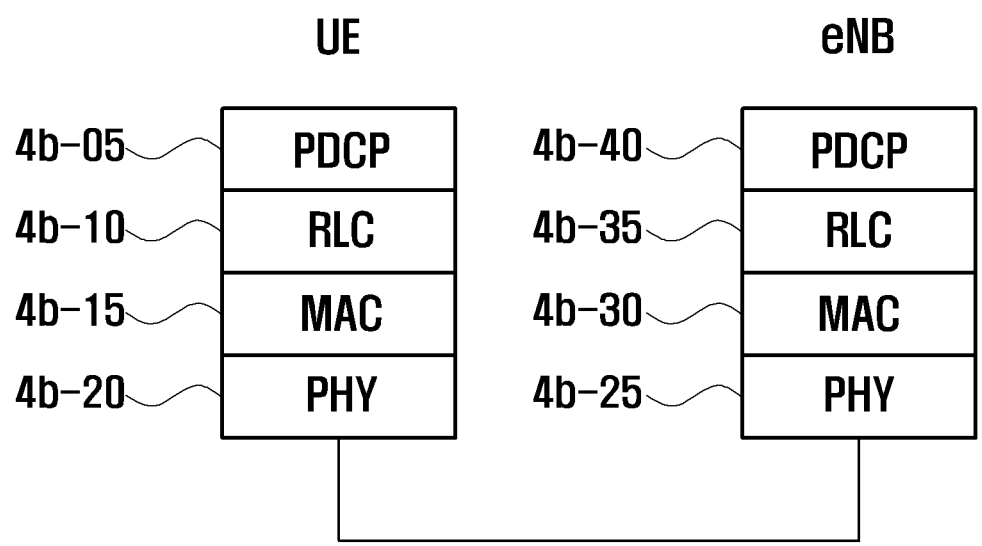
FIG. 4B is a diagram of a radio protocol structure in an LTE system, according to an embodiment of the present disclosure.

FIG. 4B is a diagram of a radio protocol structure in an LTE system, in accordance with an embodiment of the present disclosure.

Referring to FIG. 4B, the radio protocol of the LTE system is configured to include PDCPs 4b-05 and 4b-40, RLCs 4b-10 and 4b-35, and MACs 4b-15 and 4b-30 in the terminal and the eNB, respectively. The PDCPs 4b-05 and 4b-40 control IP header compression/decompression. The main functions of the PDCP are summarized as follows.

- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at HO and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink)

The RLCs 4b-10 and 4b-35 reconfigures the PDU to an appropriate size to perform the ARQ operation or the like. The main functions of the RLC are summarized as follows.

- Data transfer function (Transfer of upper layer PDUs)
- ARQ function (Error Correction through ARQ (only for AM data transfer))
- Concatenation, segmentation, reassembly functions (Concatenation, segmentation and reassembly of RLC SDUs (only for UM and AM data transfer))
- Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 4b-15 and 4b-30 are connected to several RLC layer devices configured in one terminal and perform multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from TBs delivered to/from the physical layer on transport channels)

Scheduling information reporting function (Scheduling information reporting)

HARQ function (Error correction through HARQ)

Priority handling function between Logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 4b-20 and 4b-25 perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Although not illustrated, RRC layers are present at an upper part of the PDCP layer of the terminal and the base station, and the RRC layer may receive and transmit connection and measurement related control messages for a RRC.

Figure 4C:
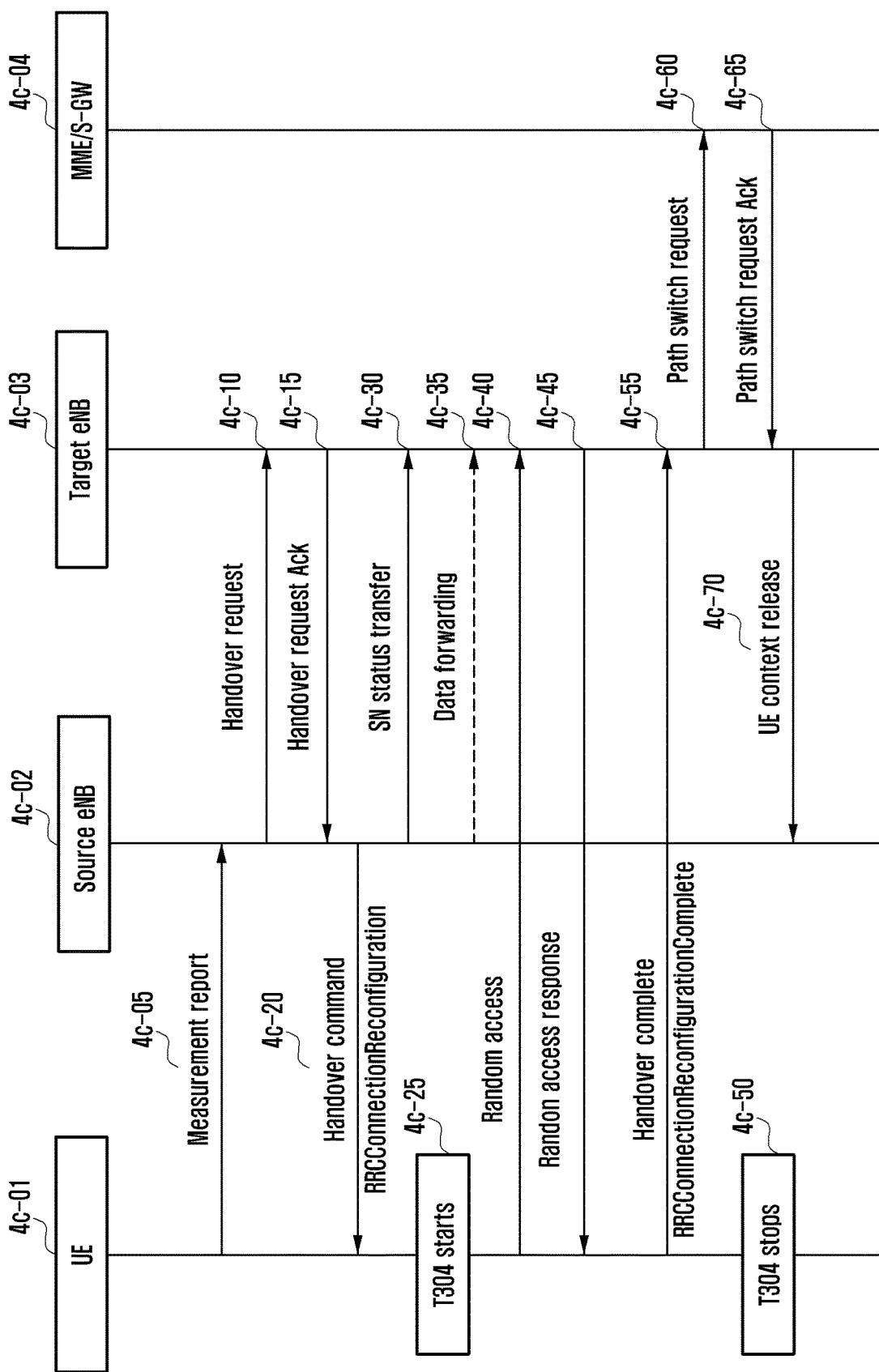
FIG. 4C is a diagram of a method for performing a handover in the existing LTE system, according to an embodiment of the present disclosure.

FIG. 4C is a diagram of a method of performing an HO in the existing LTE system, in accordance with an embodiment of the present disclosure.

The terminal (UE) 4c-01 in the connection mode state reports the cell measurement information to a source base station (source eNB) 4c-02 when the periodic or specific event is satisfied (at step 4c-05). Based on the measurement information, the source base station 4c-02 determines whether to perform an HO to neighboring cells. The HO is a technique for changing a source base station providing a service to a terminal in a connection mode to another base station. When the source base station 4c-02 determines the handover, the source base station 4c-02 sends an HO request message to a new base station, i.e., a target base station (target eNB) 4c-03 that services a service to the terminal 4c-01 to request the HO (at step 4c-10). If the target base station 4c-03 accepts the HO request, it transmits the HO request ACK message to the source base station 4c-02 (at step 4c-15). The source base 4c-02 station receiving the message transmits an HO command message to the terminal 4c-01 (at step 4c-20). The source base station 4c-02 transmits the HO command message to the terminal 4c-01 using the RRC ConnectionReconfiguration message (at step 4c-20). When the terminal 4c-01 receives the message, it stops transmitting/receiving data to/from the source base station 4c-02 and starts a T304 timer. If the terminal 4c-01 fails to succeed the HO to the target base station 4c-03 for a predetermined time, the T304 timer returns to the original establishment of the terminal 4c-01 and switches to the RRC Idle state. The source base station 4c-02 transmits a SN status for the uplink/downlink data and transmits it to the target base station 4c-03 if there is downlink data (at steps 4c-30, 4c-35). The terminal 4c-01 attempts random access to the target base station 4c-03 indicated by the source base station 4c-02 (at step 4c-40).

The random access is to fit an uplink synchronization simultaneously with notifying a target cell that the terminal 4c-01 moves through the HO. For the random access, the terminal 4c-01 transmits the preamble corresponding to the preamble ID received from the source base station 4c-02 or the randomly selected preamble ID to the target base station 4c-03. After a certain number of subframes have passed after the preamble is transmitted, the terminal 4c-01 monitors whether a random access response (RAR) is transmitted from the target base station 4c-03. The time period in which the monitoring is performed is referred to as an RAR window. If the RAR is received during the specific time (at step 4c-45), the terminal 4c-01 transmits an HO complete message to the target base station 4c-03 by including the HO compete message in an RRCConnectionReconfiguration-Complete message (at step 4c-50). As described above, if the RAP from the target base station 4c-03 is successfully completed in the MAC, the terminal 4c-01 ends the T304 timer (at step 4c-55). The target base station 4c-03 requests the path modification to modify the path of the bearers established in the source base station 4c-02 (at steps 4c-60, 4c-65) and notifies the source base station 4c-02 that the UE context of the terminal 4c-01 is deleted. Accordingly, the terminal 4c-01 attempts to receive data from the RAR window starting time for the target base station 4c-03, and receives the RAR and then starts the transmission to the target base station 4c-03 while transmitting the RRCConnectionReconfigurationCompletemessage.

Referring to the HO procedure in the LTE system shown in FIG. 4C, the specific terminal may not transmit or receive its own data until the HO complete message (RRCConnectionReconfigurationComplete) is transmitted since the HO to the target base station 4c-03 is completed from the time when the HO command message (RRCConnectionReconfiguration) is received from a source base station 4c-02. This data transmission/reception disconnection state causes a certain time delay in transmitting/receiving data by the terminal. In the present disclosure, a RACH-less HO method that minimizes the data transmission interruption time is considered, and the corresponding terminal is specified. In the RACH-less HO method, when the terminal 4c-01 performs the HO from the source base station 4c-02 to the target base station 4c-03, the RRCConnectionReconfiguration-Complete message is directly transmitted through the uplink resource previously allocated from the target base station 4c-03 without performing the RAP, thereby establishing the connection with the target base station 4c-03. The RACH-less HO may have various embodiments according to a specific operation procedure.

Figure 4D:
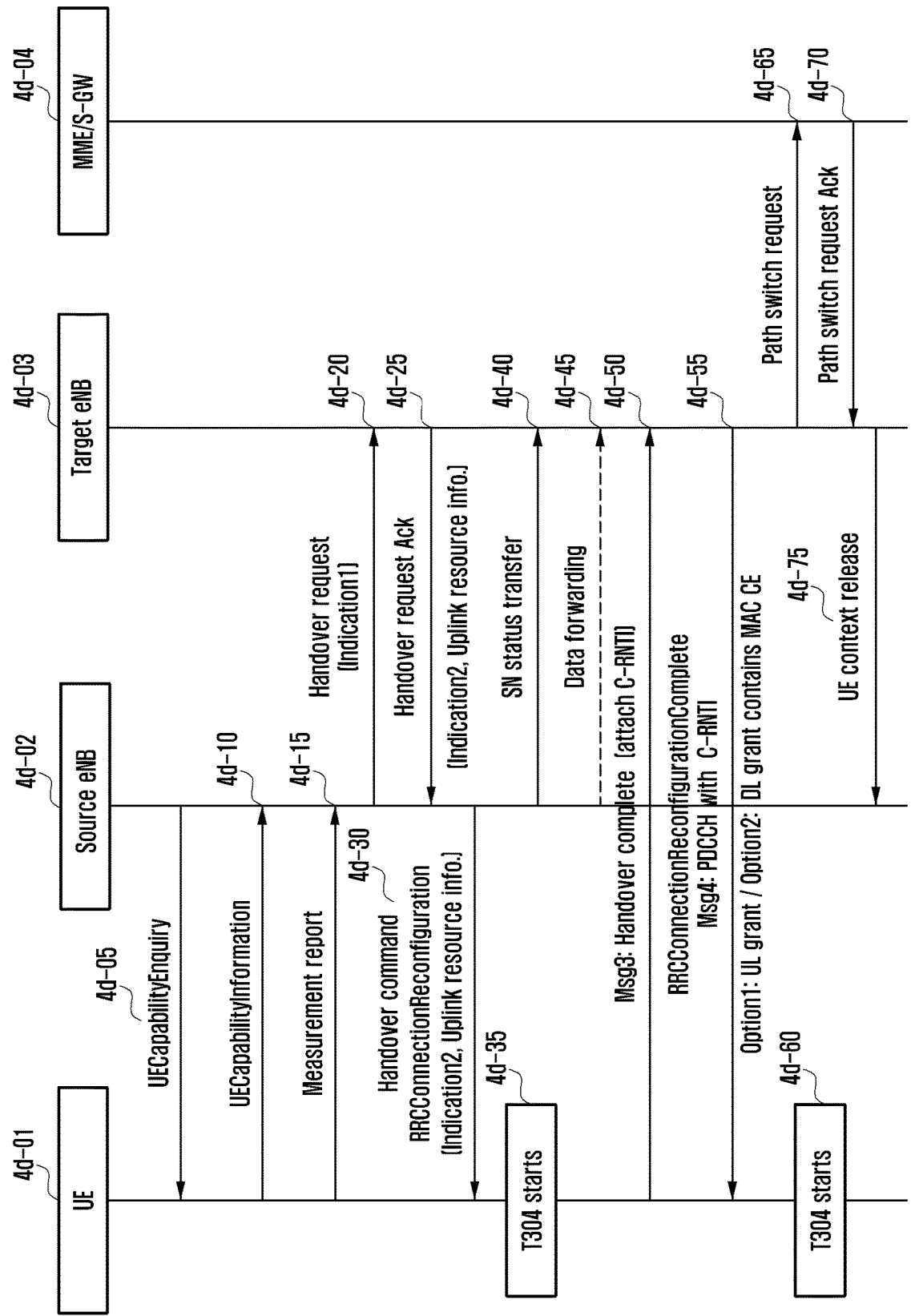
FIG. 4D is a diagram of a method for performing a random access channel (RACH)-less handover, according to an embodiment of the present disclosure.

FIG. 4D is a diagram of a method for performing a RACH-less HO, in accordance with an embodiment of the present disclosure.

In FIG. 4D, the source base station 4d-02 may request to the terminal 4d-01 the UE capability information using a UECapabilityEnquiry message (at step 4d-05). The terminal 4d-01 can report whether to support RACH-less HO for each band or band combination to the source base station using the UECapabilityInformation message (at step 4d-10). If the source base station 4d-02 also supports the RACH-less HO for each band or band combination, the RACH-less HO may be used. The terminal 4c-01 in the connection mode state reports the cell measurement information to the source base station (source eNB) 4d-02 when the periodic or specific event is satisfied (at step 4d-15). Based on the measurement information, the source base station 4d-02 determines whether to perform an HO to neighboring cells. When the source base station 4d-02 determines the HO, the source base station 4d-02 sends an HO request message to a new base station, i.e., a target base station (target eNB) 4d-03 that services a service to the terminal 4d-01 to request the HO (at step 4c-20). The source base station 4d-02 additionally determines whether the target base station 4d-03 applies RACH-less HO to the terminal 4d-01 supporting the RACH-less HO, and then requests HO to the target base station 4d-03 (at step 4d-20). In addition, when the HO is requested, it may include an indication (Indication 1) indicating whether to apply the RACH-less HO. If the target base station 4d-03 accepts the HO request, it transmits the HO request ACK message to the source base station 4d-02 (at step 4c-25). The HO request Ack message includes the configuration information of a target base station 4d-03 necessary for handover. The configuration information may include an indication (indication 2) indicating that RACH-less HO is supported when the target base station 4d-03 supports the RACH-less HO and the information on an uplink transmission resource that can be used when the terminal 4d-01 sends an RRC message (RRConnectionReconfgurationComplete) to the target base station 4d-03. The source base station 4d-02 instructs the terminal 4d-01 to perform the HO to the target base station 4d-03 using the RRCConnectionReconfiguration message (at step 4d-30). At this time, the RRC message includes one indication (indication 2) indicating to perform the RACH-less HO, and the information on an uplink transmission resource that can be used when the terminal 4d-01 sends an RRC message (RRConnectionReconfigurationComplete) to the target base station 4d-03. When the terminal 4d-01 receives the message, it stops transmitting/receiving data to/from the source base station 4d-02 and starts the T304 timer (at step 4d-35). If the terminal 4d-01 fails the HO to the target base station 4d-03 for a predetermined time, the T304 timer returns to the original establishment of the terminal 4d-01 and switches to the RRC Idle state. The source base station 4d-02 transmits a SN status for the uplink/downlink data and transmits it to the target base station 4d-03 if there is downlink data (at steps 4d-40, 4d-45). In step 4d-30, when the terminal 4d-01 receives the indicator, it performs the RACH-less HO operation. That is, the terminal 4d-01 does not perform an RAP such as in steps 4c-40 and 4c-45 in FIG. 4C and transmits an RRC message (RRConnectionReconfigurationComplete) as the uplink resource of the target base station 4d-03 included in the RRC message (RRConnectionReconfiguration) at step 4d-30 to the target base station 4d-03, including the C-RNTI (Cell Radio Network Temporary Identifier)_information (at step 4d-50). The target base station 4d-03 can forward msg4 for confirming the reception of the RRC message corresponding to the msg3 through the PDCCH (at step 4d-55). The msg4 PDCCH signal is transmitted to the C-RNTI received in msg3 and includes uplink resource information.

If the RRC message 4d-30 does not include an indication indicating to perform the RACH-less HO, the terminal 4d-01 performs an HO operation as shown in FIG. 4C (at step 4d-30). When the HO procedure is successfully completed as described above, the terminal 4d-01 ends the T304 timer (at step 4d-60). The target base station 4d-03 requests the path modification to modify the path of the bearers established in the source base station 4d-02 (at steps 4d-60, 4d-65) and notifies the source base station 4d-02 that the UE context of the terminal 4d-01 is deleted (at step 4d-70).

Figure 4E:
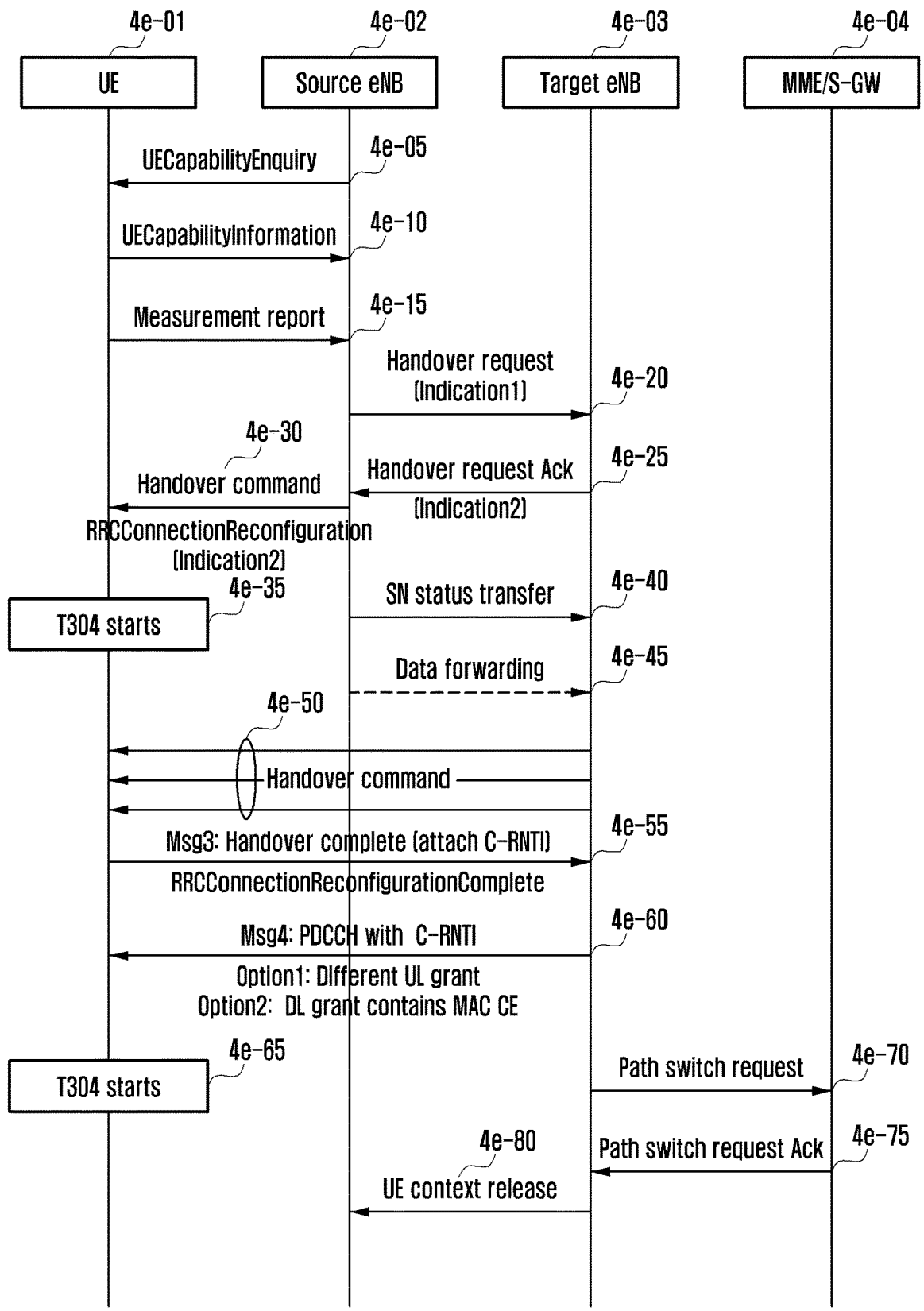
FIG. 4E is a diagram of a method for performing a RACH-less handover, according to an embodiment of the present disclosure.

FIG. 4E is a diagram of a method for performing a RACH-less HO, in accordance with an embodiment of the present disclosure.

In FIG. 4D, the source base station 4e-02 may request to the terminal 4e-01 the UE capability information using a UECapabilityEnquiry message (at step 4e-05). The terminal 4e-01 can report whether to support RACH-less HO for each band or band combination to the source base station 4e-02 using the UECapabilityInformation message (at step 4e-10). If the source base station 4e-02 also supports the RACH-less HO for each band or band combination, the RACH-less HO may be used. The terminal 4e-01 in the connection mode state reports the cell measurement information to a source base station (source eNB) 4e-02 when the periodic or specific event is satisfied (at step 4e15). Based on the measurement information, the source base station 4e-02 determines whether to perform an HO to neighboring cells. When the source base station 4e-02 determines the HO, the source base station 4e-02 sends an HO request message to a new base station, i.e., a target base station (target eNB) 4e-03 that services a service to the terminal 4e-01 to request the HO (at step 4e-20). The source base station 4e-02 additionally determines whether the target base station 4e-03 applies RACH-less HO to the terminal 4e-01 supporting the RACH-less HO, and then requests HO to the target base station 4e-03 (at step 4e-20). In addition, when the HO is requested, it may include an indication (Indication 1) indicating whether to apply the RACH-less HO. If the target base station 4e-03 accepts the HO request, it transmits the HO request ACK message to the source base station 4e-02 (at step 4e-25). The HO request Ack message includes the configuration information of a target base station 4e-03 necessary for HO. The configuration information may include an indication (indication 2) that RACH-less HO is supported when the target base station 4e-03 supports the RACH-less HO. The source base station 4e-02 instructs the terminal 4e-01 to perform the HO to the target base station 4e-02 using the RRCConnectionReconfiguration message (at step 4e-30). At this time, the RRC message may include one indication (indication 2) indicating to perform the RACH-less HO. When the terminal 4e-01 receives the message, it stops transmitting/receiving data to/from the source base station 4e-02 and starts the T304 timer (at step 4e-35). If the terminal 4e-01 fails to succeed the HO to the target base station 4e-03 for a predetermined time, the T304 timer returns to the original establishment of the terminal 4e-01 and switches to the RRC Idle state. The source base station 4e-01 transmits a SN status for the uplink/downlink data and transmits it to the target base station 4e-03 if there is downlink data (at steps 4e-40, 4e-45). In step 4e-30, when the terminal 4e-01 receives the indicator, it performs the RACH-less HO operation. That is, the terminal 4e-01 monitors uplink resource allocation information repeatedly transmitted from the target base station to the PDCCH without performing the RAP as shown at steps 4c-40 and 4c-45 in FIG. 4C. The target base station 4e-03 allocates fixed uplink resources to the terminal 4e-01 on the PDCCH so that the terminal 4e-01 can complete the HO procedure (at step 4e-50). In the above step, the target base station 4e-03 continues to transmit the fixed uplink resource allocation information on the PDCCH and then stops when receiving a response indicating that the uplink resource allocation information has been successfully received from the terminal 4e-01. When the terminal 4e-01 receives the uplink resource allocation, the terminal 4e-01 transmits a RRC message (RRConnectionReconfigurationComplete) corresponding to msg3 to the target base station 4e-03, including the C-RNTI (at step 4e-55). The target base station 4e-03 can forward msg4 for confirming the reception of the RRC message corresponding to the msg3 through the PDCCH (at step 4e-60). The present disclosure proposes two methods of transmitting the PDCCH signal (msg4).

Option 1: When the target base station 4e-03 successfully receives the RRC message (msg3), a method can include scheduling an uplink resource allocation (grant) having parameters different from an uplink resource allocation previously transmitted to the terminal.

Option 2: If the target base station 4e-03 successfully receives the RRC message (msg3), a method can include scheduling downlink resource allocation.

When Option 1 is used, there is a restriction that parameters should be set to be scheduled in the same physical resource block (PRB) when initial uplink resource allocation is performed in the target base station 4e-03. That is, the terminal 4e-01 should repeatedly transmit the same parameters continuously for the same resource allocation before the terminal 4e-01 receives the uplink resource. On the other hand, when the Option 2 is used, there is a degree of freedom in initial uplink resource allocation in the target base station 4e-03. That is, since the terminal 4e-01 can know that the HO operation is completed when receiving the downlink resource allocation in the PDCCH, the terminal 4e-01 can identify the uplink resource allocation by transmitting another uplink resource allocation from the target base station 4e-03. In addition, the terminal 4e-01 may include UE Contention Resolution Identity in the MAC control element (CE) upon the downlink transmission for clear operation.

If the RRC message at step 4e-30 does not include an indication indicating to perform the RACH-less HO, the terminal 4e-01 performs an HO operation as shown in FIG. 4C (at step 4e-30). When the HO procedure is successfully completed as described above, the terminal 4e-01 ends the T304 timer (at step 4e-65). The target base station 4e-03 requests the path modification to modify the path of the bearers established in the source base station 4e-02 (at steps 4e-70, 4e-75) and notifies the source base station 4e-02 that the UE context of the terminal 4e-01 is deleted (at step 4e-80).

Figure 4F:
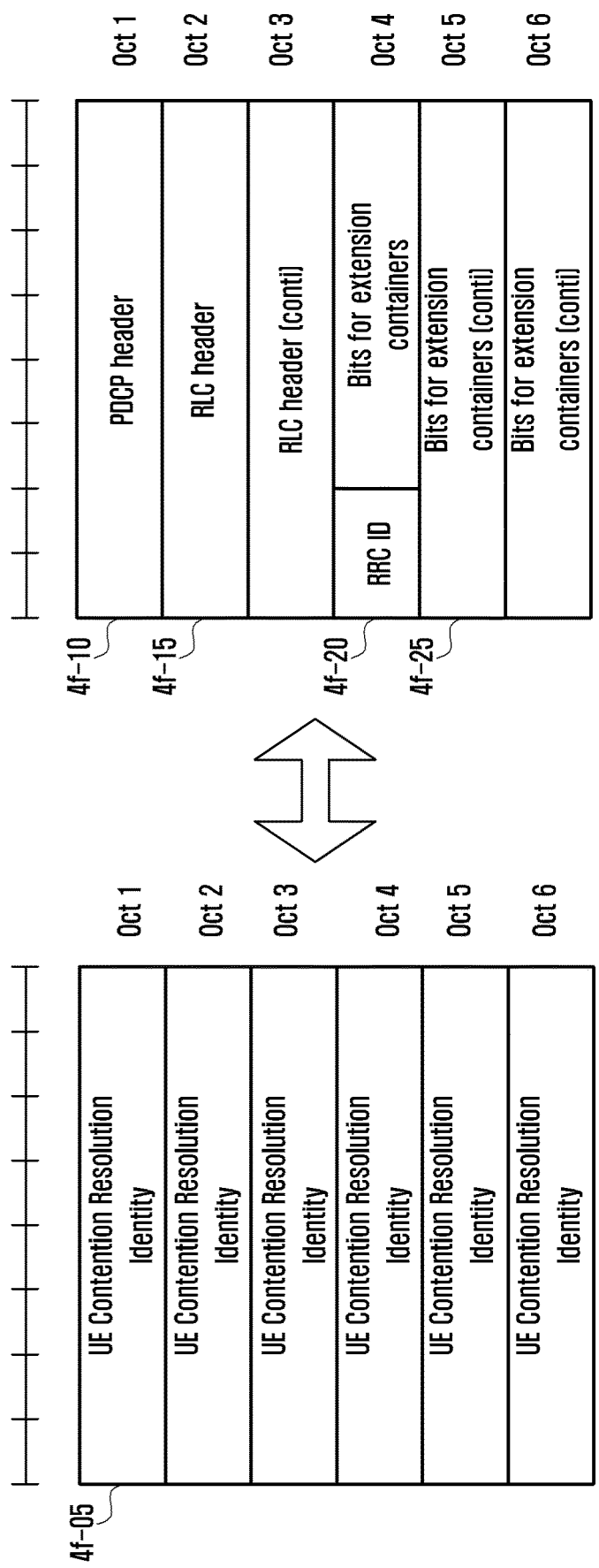
FIG. 4F is a diagram of a PDCCH structure corresponding to mgs4 in a second operation, according to an embodiment of the present disclosure.

FIG. 4F is a diagram of a PDCCH structure corresponding to mgs4, in accordance with an embodiment of the present disclosure.

In the first operation and the second operation of the present disclosure, RACH-less HO is premised, that is, the connection is established through the uplink resource previously allocated from the target base station by directly sending the RRCConnectionReconfigurationComplete message without performing the RAP when the terminal performs HO from the source base station to the target base station. The terminal can receive the reception acknowledgment of the RRC message corresponding to the msg3 on the PDCCH, and Option 1 and Option 2 for sending the msg4.

Option 1 has the same PDCCH structure as in the existing LTE, and the uplink resource grant has a value different from the uplink resource grant that was transmitted in the previous step. In Option 2, the PDCCH downlink resource allocation (grant) corresponding to the msg4 is transmitted to inform that the msg3 transmitted by the terminal is successfully received. If the terminal receives the acknowledgment message, the MS performs uplink transmission through uplink resource allocation previously transmitted by the base station. A MAC CE composed of UE contention resolution identity having a length of 6 bytes is transmitted to the MAC PDU of the PDCCH (4f-05). In addition, the RRCConnectionReconfigurationComplete message received in msg3 may be copied and used in the payload of the UE contention resolution identity configuration content (payload) of the MAC CE. The RRC message requires at least the following 3 bytes.

PDPC header (4f-10): 1 byte
RLC header (4f-15): 2 bytes
Payload: RRC transaction identifier (2 bits) (4f-20)+other bits needs for the extension containers (4f-25)

If the RRCConnectionReconfigurationComplete message cannot be completely represented by 6 bytes, the RRCConnectionReconfigurationComplete message may be composed of only 48 bits and the remaining bits may be discarded. The above operation is similar to the method of configuring the UE contention resolution identity MAC CE in the LTE, and can use existing methods. Alternatively, a new MAC CE having the same structure and purpose as the UE contention resolution identity MAC CE may be defined and used.

Figure 4G:
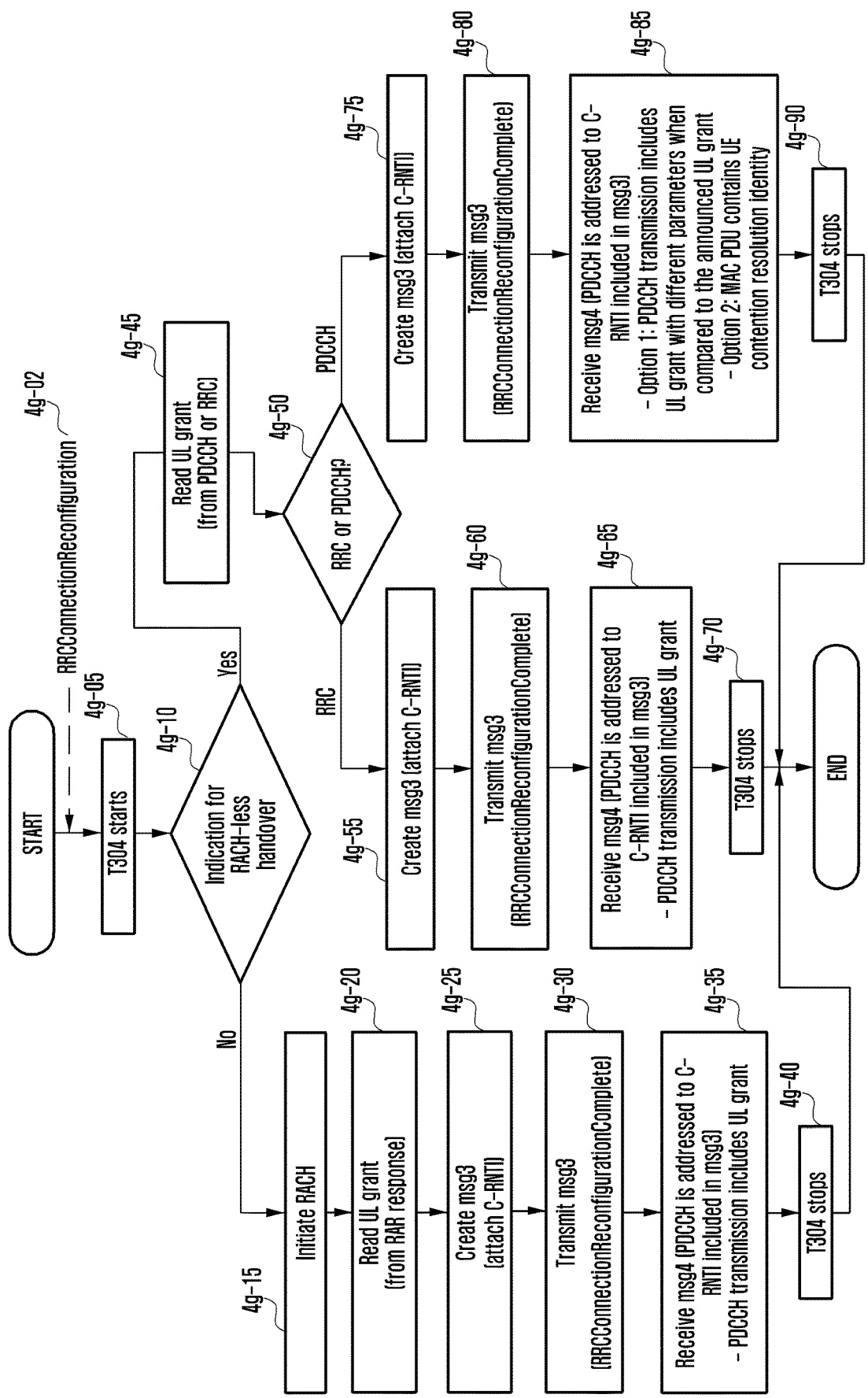
FIG. 4G is a flowchart for a method of a terminal of performing a RACH-less handover, according to an embodiment of the present disclosure.

FIG. 4G is a flowchart of a method of a terminal for performing an RACH-less HO, in accordance with an embodiment of the present disclosure.

First, it is assumed that the terminal is connected to the source base station to transmit/receive data. The terminal in the connected mode may instruct the current source base station to perform the HO based on the measurement information and may receive the HO command from the target base station through the RRCConnectionReconfiguration message (at step 4g-02). The terminal receiving the HO message starts a T304 timer (at step 4g-05), performs an HO process, and stops if the HO procedure is completed (at steps 4g-40, 4g-70, 4g-90). The HO operation can be performed differently depending on whether the RRC message includes an indicator indicating the RACH-less HO to the target cell.

If there is no RACH-less HO indication in the RRCConnectionReconfiguration message, the existing LTE HO procedure described in FIG. 4C is performed. The terminal transmits a random access preamble (at step 4g-15), receives an RAR from the target BS, and identifies uplink resource allocation (at step 4g-20). The terminal generates a msg3 signal including a C-RNTI to notify the target base station of the completion of the HO procedure (at step 4g-25), and transmits the HO complete message to the target base station by including the HO complete message in the RRCConnectionReconfigurationComplete message (at step 4g-30). The msg4 for identifying the reception of the RRC message corresponding to the msg3 is received through the PDCCH (at step 4g-35). The PDCCH is transmitted to the C-RNTI transmitted from the msg3 and includes the uplink resource allocation information. As described above, if the RAP from the target base station is successfully completed in the MAC, the terminal ends the T304 timer (at step 4g-40).

If the RACH-less HO indicator is in the RRCConnectionReconfiguration message, the terminal monitors the PDCCH or the RRC to receive the uplink resource allocation. Upon receiving the uplink resource allocation through the transmitted RRC message, a first operation of the RACH-less HO except for the RAP is performed. That is, the terminal generates a msg3 signal including a C-RNTI to notify the target base station of the completion of the HO procedure (at step 4g-55), and transmits the HO complete message to the target base station by including the HO complete message in the RRCConnectionReconfigurationComplete message (at step 4g-60). The msg4 for identifying the reception of the RRC message corresponding to the msg3 is received through the PDCCH (at step 4g-65). The PDCCH is transmitted to the C-RNTI transmitted from the msg3 and includes the uplink resource allocation information. As described above, if the RAP from the target base station is successfully completed in the MAC, the terminal ends the T304 timer (at step 4g-70).

If the terminal receives the uplink resource allocation on the PDCCH in step 4g-50, a second operation of the RACH-less HO except for the RAP is performed. The PDCCH may be repeatedly transmitted from the target base station. In particular, the uplink resource allocation information included in the PDCCH may have the same value or different values until the terminal transmits msg3. The terminal generates a msg3 signal including a C-RNTI to notify the target base station of the completion of the HO procedure (at step 4g-75), and transmits the HO complete message to the target base station by including the HO complete message in the RRCConnectionReconfiguration-Complete message (at step 4g-80). The msg4 for identifying the reception of the RRC message corresponding to the msg3 is received through the PDCCH (at step 4g-85). The PDCCH is transmitted to the C-RNTI transmitted in the msg3, and the method for identifying the reception of the msg3 can include one of the following two methods.

Option 1: When the target base station successfully receives the RRC message (msg3), a method can include scheduling an uplink resource allocation (grant) having parameters different from an uplink resource allocation previously transmitted to the terminal.

Option 2: If the target base station successfully receives the RRC message (msg3), a method can include scheduling downlink resource allocation.

When Option 1 is used, there is a restriction that parameters should be set to be scheduled in the same PRB when initial uplink resource allocation is performed in the target cell. That is, the terminal should repeatedly transmit the same parameters continuously for the same resource allocation before the terminal receives the uplink resource. On the other hand, when Option 2 is used, there is a degree of freedom in initial uplink resource allocation in the target cell. That is, since the terminal can know that the HO operation is completed when receiving the downlink resource allocation in the PDCCH, the terminal can identify the uplink resource allocation by transmitting another uplink resource allocation from the target base station. In addition, the UE Contention Resolution Identity may be included in the MAC CE upon the downlink transmission for clear operation. The MAC CE design method is described in detail with reference to FIG. 4F. As described above, if the RAP from the target base station is successfully completed in the MAC, the terminal ends the T304 timer (at step 4g-90).

Figure 4H:
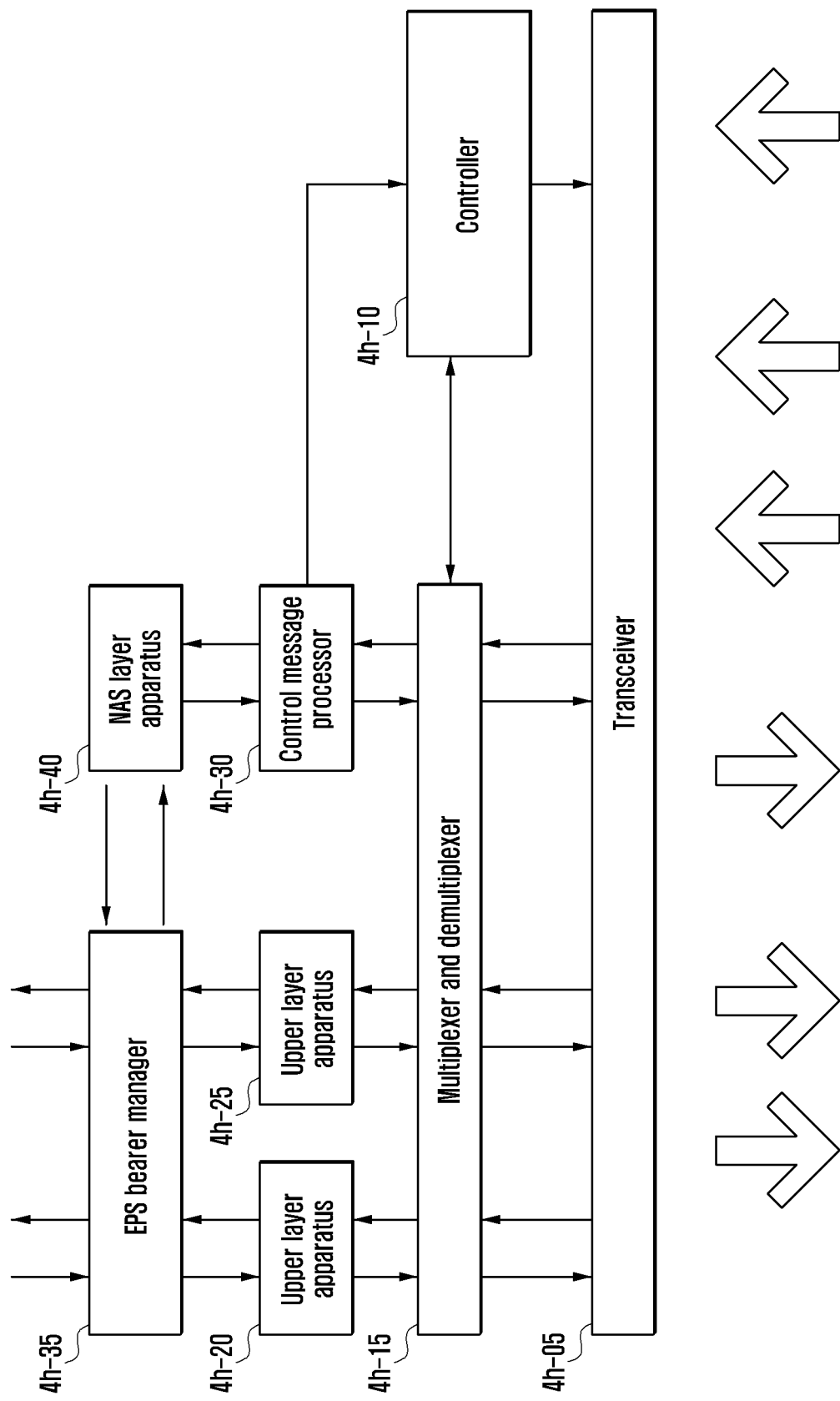
FIG. 4H is a block diagram of the terminal, according to an embodiment of the present disclosure.

FIG. 4H is a diagram of the terminal, according to an embodiment of the present disclosure.

Referring to FIG. 4H, the terminal includes a transceiver 4h-05, a controller 4h-10, a multiplexer and demultiplexer 4h-15, a control message processor 4h-30, various higher layer processors 4h-20 and 4h-25, an EPS bearer manager 4h-35, and a NAS layer apparatus 4h-40.

The transceiver 4h-05 receives data and a predetermined control signal through a forward channel of the serving cell and transmits the data and the predetermined control signal through a the reverse channel. When a plurality of serving cells are configured, the transceiver 4h-05 transmits and receives data and a control signal through the plurality of carriers.

The multiplexer and demultiplexer 4h-15 serves to multiplex data generated from the upper layer processors 4h-20 and 4h-25 or the control message processor 4h-30 or demultiplex data received by the transceiver 4h-05 and transmit the data to the appropriate upper layer processors 4h-20 and 4h-25 or the control message processor 4h-30.

The control message processor 4h-30 is an RRC layer apparatus and process the control message received from the base station to take the required operation. For example, when receiving an RRC CONNECTION SETUP message, it configures an SRB and a temporary DRB.

The upper layer processors 4h-20 and 4h-25 are the DRB apparatus and may be configured for each service. The higher layer processors 4h-20 and 4h-25 process data generated from user services such as a file transfer protocol (FTP) or a VoIP and transfer the processed data to the multiplexer and demultiplexer 4h-15 or process the data transferred from the multiplexer and demultiplexer 4h-15 and transfer the processed data to service application of the higher layer. One service may be mapped one-to-one with one evolved packet system (EPS) bearer and one higher layer processor on a one-to-one basis.

The controller 4h-10 confirms scheduling commands, for example, reverse grants, received through the transceiver 4h-05 to control the transceiver 4h-05 and the multiplexer and demultiplexer 4h-15 to perform the reverse transmission by an appropriate transmission resource at an appropriate time.

Figure 4I:
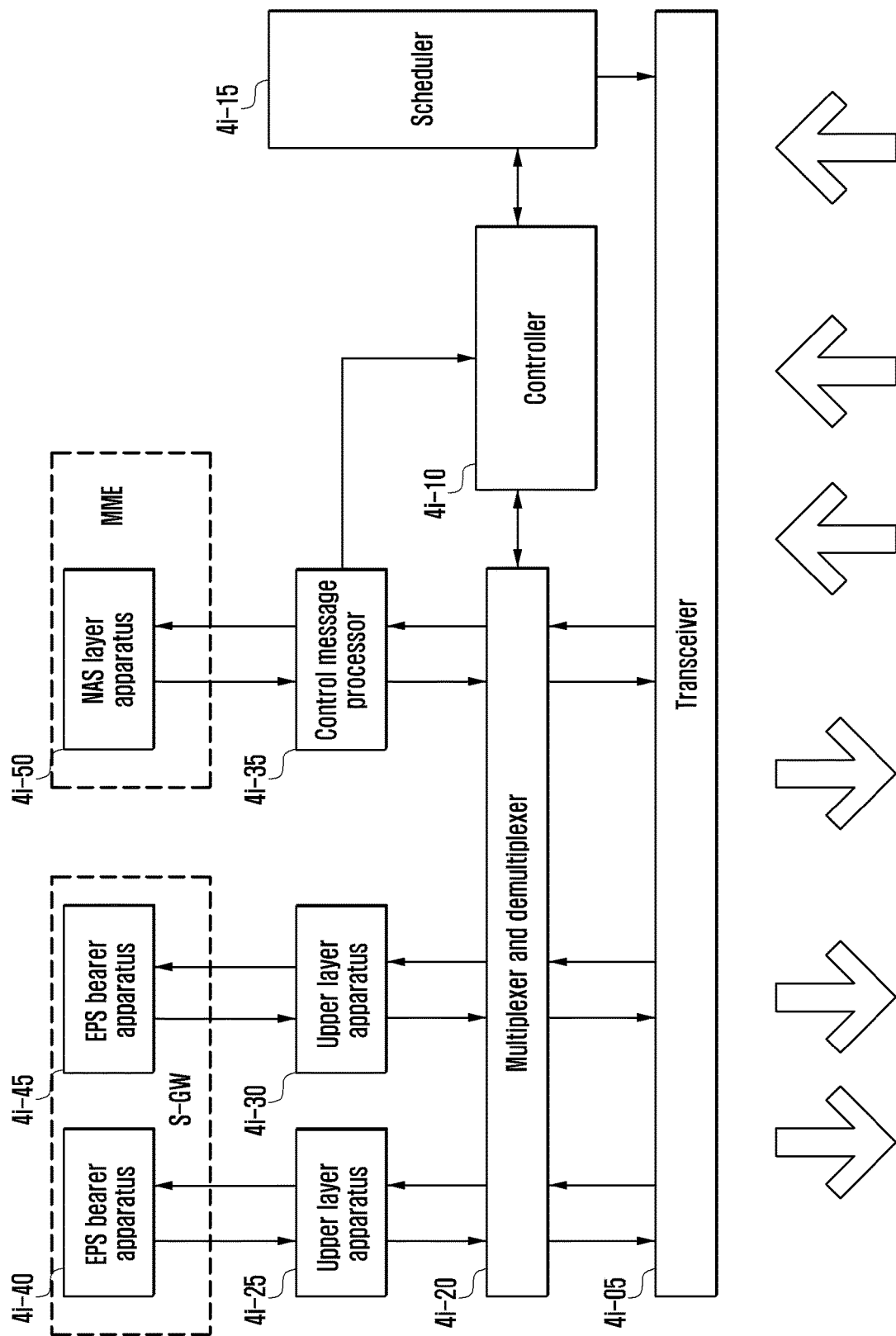
FIG. 4I is a block diagram of a base station, mobility management entity (MME), and serving-gateway (S-GW), according to an embodiment of the present disclosure.

FIG. 4I is a diagram of a base station, MME, and S-GW, according to an embodiment of the present disclosure.

The base station of FIG. 4I includes a transceiver 4i-05, a controller 4i-10, a multiplexer and demultiplexer 4i-20, a control message processor 4i-35, various upper layer processors 4i-25 and 4i-30, a scheduler 4i-15, EPS bearer apparatuses 4i-40 and 4i-45, and a NAS layer apparatus 4i-50. The EPS bearer apparatuses 4i-40 and 4i-45 are located on the S-GW and the NAS layer apparatus is located on the MME.

The transceiver 4i-05 transmits data and a predetermined control signal through a forward carrier and receives the data and the predetermined control signal through a reverse carrier. When a plurality of carriers are configured, the transceiver 4i-05 transmits and receives the data and the control signal through the plurality of carriers.

The multiplexer and demultiplexer 4i-20 serves to multiplex data generated from the upper layer processors 4i-25 and 4i-30 or the control message processor 4i-35 or demultiplex data received by the transceiver 4i-05 and transmit the data to the appropriate upper layer processors 4i-25 and 4i-30 or the control message processor 4i-35 or the controller 4i-10. The control message processor 4i-35 allows the UE to process the transmitted control message to perform the required operation or generates the control message to be transmitted to the UE and transmits the generated control message to the lower layer.

The higher layer processors 4i-25 and 4i-30 may be configured for each EPS bearer and configure data transferred from the EPS bearer apparatuses 4*i*-40 and 4*i*-45 as the RLC PDU and may transfer the data to the multiplexer and demultiplexer 4*i*-20 or configure RLC PDU transferred from the multiplexer and demultiplexer 4*i*-20 as the PDCP SDU and transfer the RLC PDU to the EPS bearer apparatuses 4*i*-40 and 4*i*-45.

The scheduler 4*i*-15 allocates a transmission resource to the terminal at appropriate timing in consideration of the buffer status and the channel status of the terminal, etc. and allows the transceiver to process the signal transmitted from the terminal or perform a process to transmit a signal to the terminal.

The EPS bearer apparatuses 4*i*-40 and 4*i*-45 are configured for each EPS bearer, and processes the data transmitted from the higher layer processor and transmits the processed data to the next network node.

The upper layer processors 4*i*-25 and 4*i*-30 and the EPS bearer apparatuses 4*i*-40 and 4*i*-45 are connected to each other by the S1-U bearer. The higher layer processor corresponding to the common DRB is connected to the EPS bearer for the common DRB by a common S1-U bearer.

The NAS layer apparatus 4*i*-50 processes the IP packet included in the NAS message and transmits the processed IP packet to the S-GW.

A method for determining and identifying a successful uplink resource allocation of a terminal in an HO when a random access is not used.

1. A method of receiving an indicator indicating that a terminal does not use random access.
   A method for receiving the indication through an RRC message (HO command) of a source base station;
2. A method for making an operation different according to whether the indication is received.
   A method for performing the existing LTE HO procedure when the indicator is not included;
   A method for not using a random access for an HO to a target base station when the indicator is included;
3. A method for performing a first operation and a second operation of an HO without a random access according to a method for receiving uplink resource allocation information.
   A method for allowing a terminal to receive resource allocation information to an RRC message (HO command) by a first operation;
   A method for allowing a terminal to receive uplink resource allocation information on a PDCCH by a second operation;
   The first operation receives the uplink resource allocation by the RRC message to omit the random access operation;
   A method for performing an HO procedure of the existing LTE after omitting the random access in the first operation;
   A method for omitting, by a terminal, a random access and receiving uplink resource allocation (msg2) on a PDCCH in the second operation;
   A method for repeatedly transmitting the same uplink resource allocation by allowing a base station to use the same parameter for the msg2 of the second operation;
   A method for generating and transmitting msg3 including C-RNTI of a terminal in the second operation;
   A method for differently operating option 1 and option 2 in a method for receiving msg4 in the second operation;
   An object to notify that the msg4 of the second operation successfully receives the msg3 transmitted by the terminal;
   A method for receiving a resource allocation value different from an uplink resource already received on a PDCCH in the option 1 of the second operation;
   A method for including downlink resource allocation information in the option 2 of the second operation;
   A method for including "UE Contention Resolution Identity" in MAC PDU of the downlink resource allocation information;
   A method for allowing the "UE Contention Resolution Identity" to include a content of the RRC message received in the msg3;
   The "UE Contention Resolution Identity" reuses the existing LTE structure or uses a new MAC CE;
   A method for including only initial 48 bit information when the content of the msg3 exceeds 48 bits.

The present disclosure relates to a mobile communication system, and more particularly, to a method and apparatus for determining priority of uplink and downlink transmission links and side links in an LTE terminal supporting vehicle-to-everything (V2X).

Figure 5A:
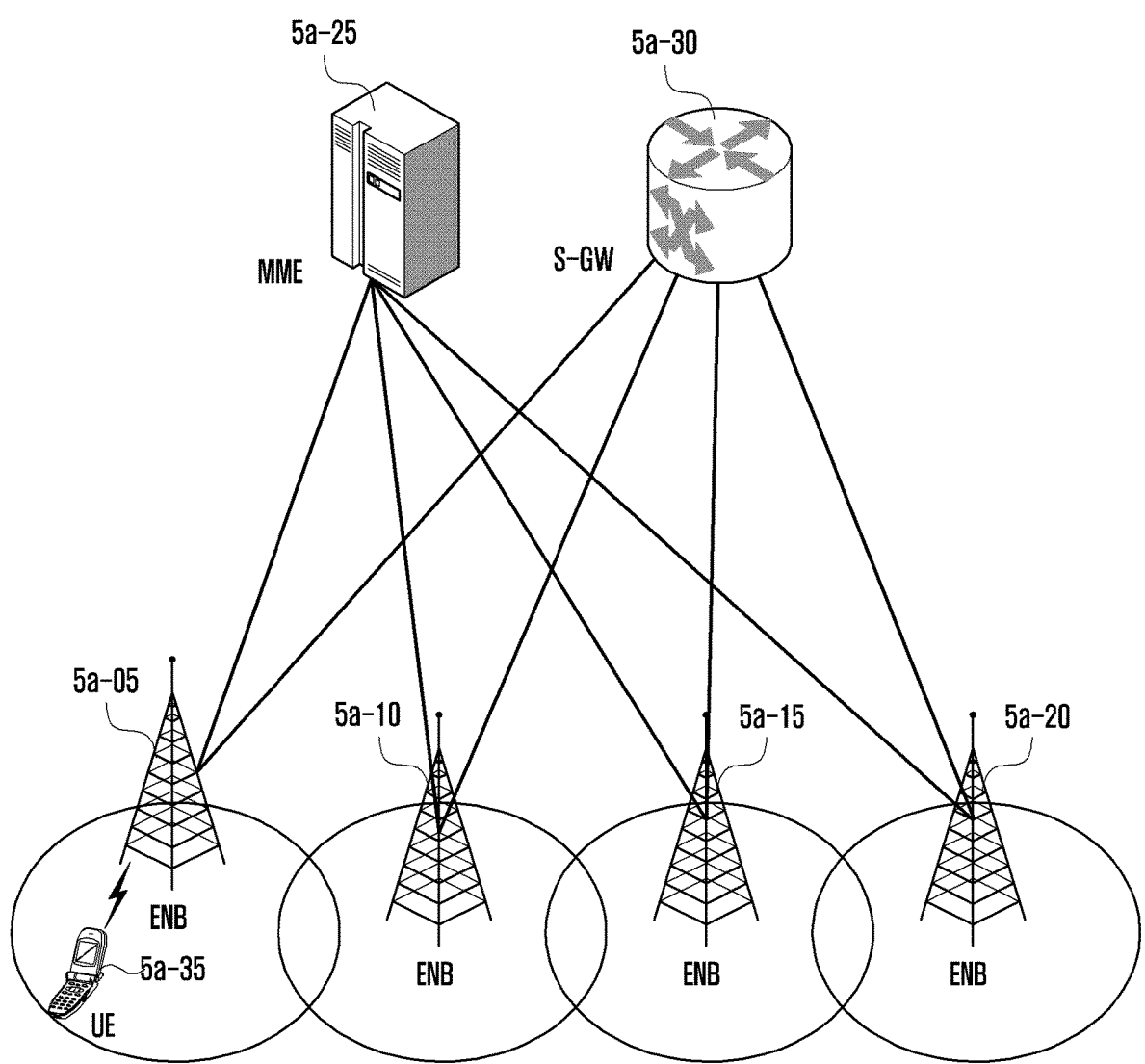
FIG. 5A is a diagram of the LTE system, according to an embodiment of the present disclosure.

FIG. 5A is a diagram of the LTE system, in accordance with an embodiment of the present disclosure.

Referring to FIG. 5A, the wireless communication system is configured to include a plurality of base stations 5*a*-05, 5*a*-10, 5*a*-15, and 5*a*-20, an MME 5*a*-25, an S-GW 5*a*-30. UE or terminal 5*a*-35 accesses an external network through the base stations 5*a*-05, 5*a*-10, 5*a*-15, and 5*a*-20 and the S-GW 5*a*-30.

The base stations 5*a*-05, 5*a*-10, 5*a*-15, and 5*a*-20 are access nodes of a cellular network and provides a wireless access to terminals that are connected to a network. That is, in order to serve traffic of users, the base stations 5*a*-05, 5*a*-10, 5*a*-15, and 5*a*-20 collect state information such as a buffer state, an available transmission power state, a channel state, or the like of the terminals to perform scheduling, thereby supporting a connection between the terminals and a core network (CN). The MME 5*a*-25 is an apparatus for performing various control functions as well as a mobility management function for the terminal 5*a*-35 and is connected to a plurality of base stations 5*a*-05, 5*a*-10, 5*a*-15, and 5*a*-20, and the S-GW 5*a*-30 is an apparatus for providing a data bearer. Further, the MME 5*a*-25 and the S-GW 5*a*-30 may further perform authentication, bearer management, etc., on the terminal 5*a*-35 connected to the network and may process packets that are to be received from the base stations 5*a*-05, 5*a*-10, 5*a*-15, and 5*a*-20 and packets that are to be transmitted to the base stations 5*a*-05, 5*a*-10, 5*a*-15, and 5*a*-20.

Figure 5B:
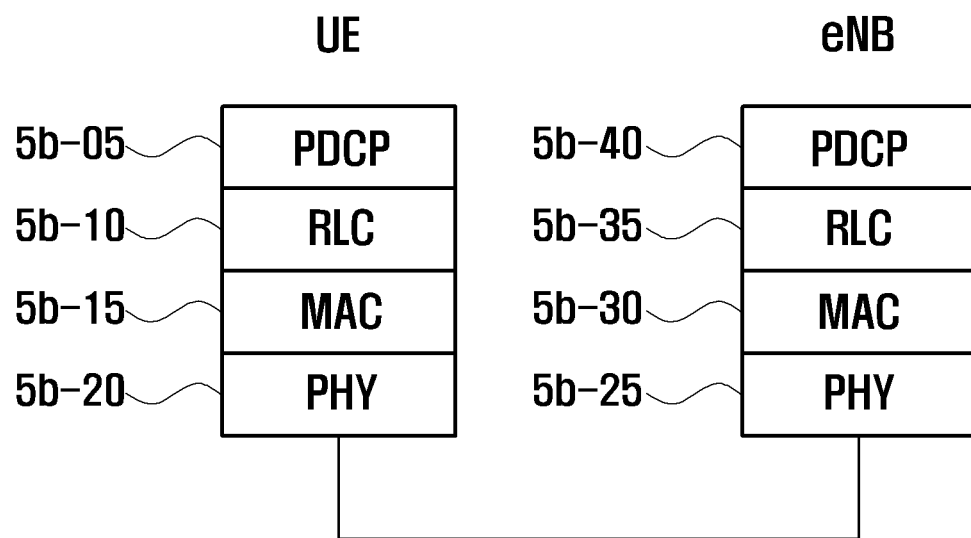
FIG. 5B is a diagram of a radio protocol structure in the LTE system, according to an embodiment of the present disclosure.

FIG. 5B is a diagram of a radio protocol structure in the LTE system, in accordance with an embodiment of the present disclosure.

Referring to FIG. 5B, the radio protocol of the LTE system is configured to include PDCPs 5*b*-05 and 5*b*-40, RLCs 5*b*-10 and 5*b*-35, and MACs 5*b*-15 and 5*b*-30 in the terminal and the eNB, respectively. The PDCPs 5*b*-05 and 5*b*-40 control IP header compression/decompression. The main functions of the PDCP are summarized as follows.

Header compression and decompression function (Header compression and decompression: ROHC only)
Transfer function of user data (Transfer of user data)
In-sequence delivery function (In-sequence delivery of upper layer PDUs at PDCP re-establishment procedure for RLC AM)
Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at HO and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 5b-10 and 5b-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 5b-15 and 5b-30 are connected to several RLC layer devices configured in one terminal and perform multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from TBs delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 5b-20 and 5b-25 perform channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Although not illustrated, RRC layers are present at an upper part of the PDCP layer of the terminal and the base station, and the RRC layer may receive and transmit connection and measurement related control messages for a radio resource control.

FIG. 5C is a diagram of vehicle-to-everything (V2X) communication within a cellular system, in accordance with an embodiment of the present disclosure.

A V2X is a communication technology through a vehicle and all interfaces, and examples thereof may include a vehicle-to-vehicle (V2V), vehicle-to-infra-structure (V2I), a vehicle-to-pedestrian (V2P), and the like according to the form thereof and the component forming the communication. The V2P and V2V depends on a structure and an operation principle of device-to-device (D2D).

The base station 5c-01 includes at least one vehicle terminal 5c-05 and 5c-10 and a pedestrian portable terminal 5c-15 located in a cell 5c-02 supporting V2X. That is, the vehicle terminal 5c-05 performs cellular communication using the base station 5c-01 and the vehicle terminal-base link 5c-30 and 5c-35 or the device-to-device communication using side links 5c-20 and 5c-25 with the other vehicle terminal 5c-10 or the pedestrian portable terminal 5c-15. In order for the vehicle terminals 5c-05 and 5c-10 and the pedestrian portable terminal 5c-15 to directly transmit and receive information using the side links 5c-20 and 5c-25, the base station 5c-01 should allocate a resource pool that may be used for the side link communication. It may be divided into a scheduled resource allocation (mode 3) and UE autonomous resource allocation (mode 4), by a base station. In the case of the scheduled resource allocation, the base station allocates resources used for the side link transmission to the RRC-connected UEs in a dedicated scheduling manner. The above method is effective for interference management and resource pool management (semi-persistence transmission) because the base station 5c-01 can manage the resources of the side link.

In addition, in the case of the scheduled resource allocation (mode 3) in which a base station 5c-01 assigns and manages resources for the V2P, if an RRC-connected terminal has data to be transmitted to another terminal, the data may be transmitted to the base station 5c-01 using the RRC message or the MAC control element (MAC CE). Here, for the RRC message, SidelinkUEInformation and UEAssistanceInformation message may be used. The MAC CE may be, for example, a buffer status report MAC CE in a new format (including an indicator that notifies at least a buffer status report for at least V2P communication and information on a size of data that are buffered for D2D communication). The detailed format and content of the buffer status report used in the 3GPP refer to 3GPP standard TS36.321 E-UTRA MAC Protocol Specification.

On the other hand, in the UE autonomous resource allocation, the base station 5c-01 provides the side link transmission/reception resource pool for V2X as the system information, and the terminal selects the resource pool according to the predetermined rule. The resource selection method may include resource selection based on zone mapping and sensing, random selection, or the like. In the structure of the resource pool for V2X, one sub channel may be configured by allowing resources 5c-40, 5c-50, and 5c-60 for scheduling allocation (SA) and resources 5c-45, 5c-55, and 5c-65 for data transmission to be adjacent to each other and the resources for SAs 5c-70, 5c-75 and 5c-80 and data 5c-85, 5c-90 and 5c-95 may be used in a manner not adjacent to each other. Whichever of the above two structures is used, the SA consists of two consecutive PRBs and contains content indicating the location of the resource for the data. The number of terminals receiving the V2X service in one cell may be many and the relationship between the base station 5c-01 and the terminals 5c-05, 5c-10, and 5c-15 as described above may be extended and applied.

Figure 5D:
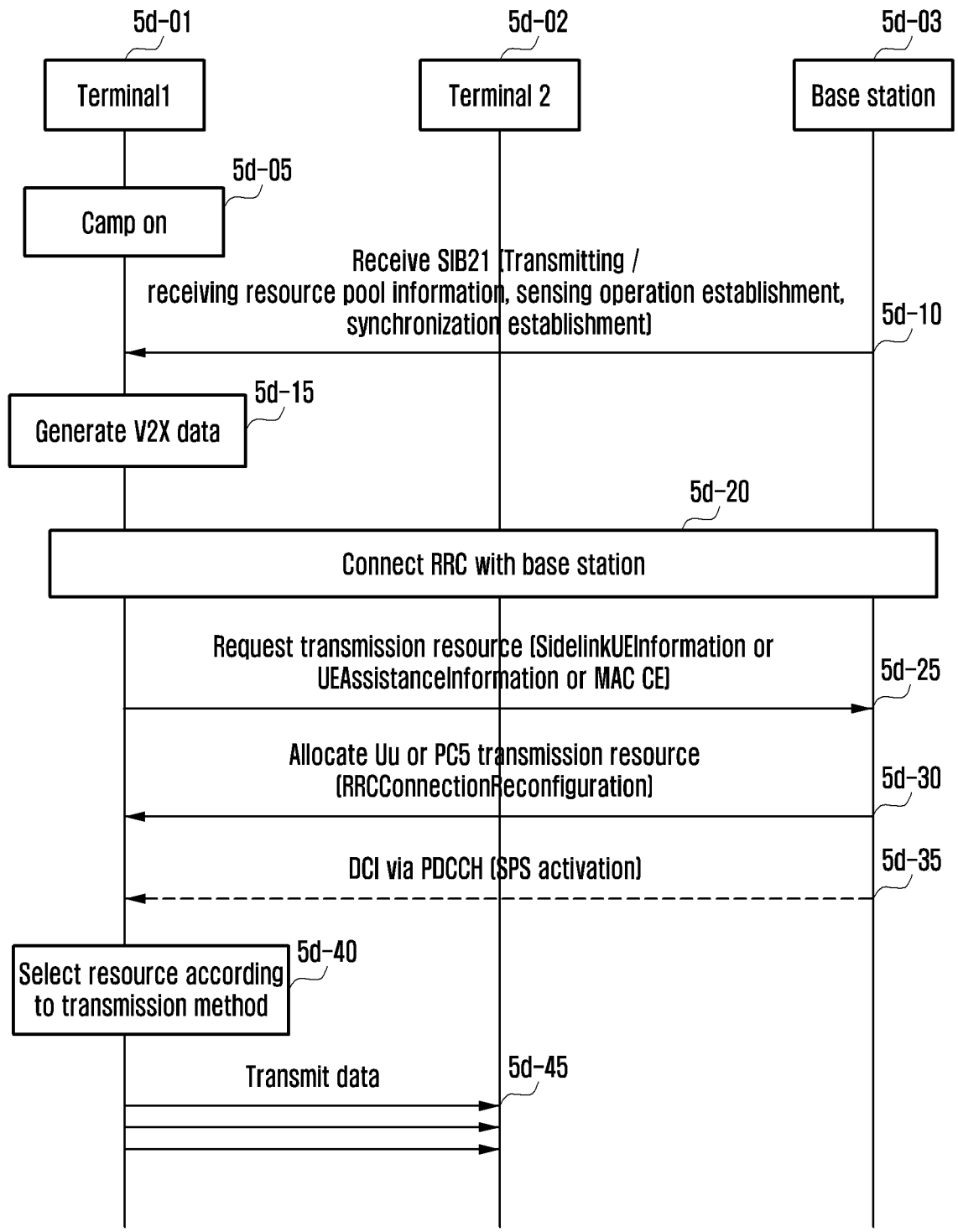
FIG. 5D is a diagram of a method for a data transmission procedure of a V2X terminal operated in a mode 3, according to an embodiment of the present disclosure.

FIG. 5D is a diagram of a data transmission procedure of a V2X terminal operated in a mode 3, in accordance with an embodiment of the present disclosure.

A terminal 5d-01 that is camped at step 5d-05 receives the system information block 21 (SIB21) from the base station 5d-03. The system information includes resource pool information for transmission and reception, configuration information for sensing operation, information for setting synchronization, information for transmitting/receiving inter-frequency, and the like. When data traffic for V2X is generated (at step 5d-15) in the terminal 5d-01, an RRC connection with the base station 5d-01 is performed (at step 5d-20). The above RRC connection process may be performed before the data traffic is generated (at step 5d-15). The terminal 5d-01 requests the base station 5d-03 for transmission resources capable of performing V2X communication with the other terminal 5d-02 (at step 5d-25). The terminal 5d-01 may request the base station 5d-03 using the RRC message or the MAC CE. Here, as the RRC message, SidelinkUEInformation, UEAssistanceInformation message may be used. The MAC CE may be, for example, a buffer status report MAC CE in a new format (including indicator that notifies at least a buffer status report for at least V2X communication and information on a size of data that are buffered for D2D communication). The base station 5d-03 allocates a V2X transmission resource to the terminal 5d-01 through a dedicated RRC message (at step 5d-30). The message may be included in the RRCConnectionReconfiguration message. The resource allocation may be a V2X resource through the vehicle terminal-base link 5c-30 or a resource for the side links 5c-20 and 5c-25 according to the type of traffic requested by the terminal 5d-01 or the congestion of the corresponding link. In order to make the above determination, the terminal 5d-01 additionally transmits prose per packet priority (PPPP) or logical channel ID (LCID) information of V2X traffic through UEAssistanceInformation or MAC CE. Since the base station 5d-03 also knows information about resources used by other terminals, the base station 5d-03 schedules the resources requested by the terminal 5d-01 among the remaining resources. If the SPS configuration information via the vehicle terminal-base link 5c-30 is included in the RRC message, the SPS can be activated by DCI transmission on the PDCCH (at step 5d-35). The terminal 5d-01 selects a transmission link and a resource according to the resource and transmission method allocated from the base station 5d-03 (at step 5d-40) and transmits the data to the terminal 5d-02 (at step 5d-45).

Figure 5E:
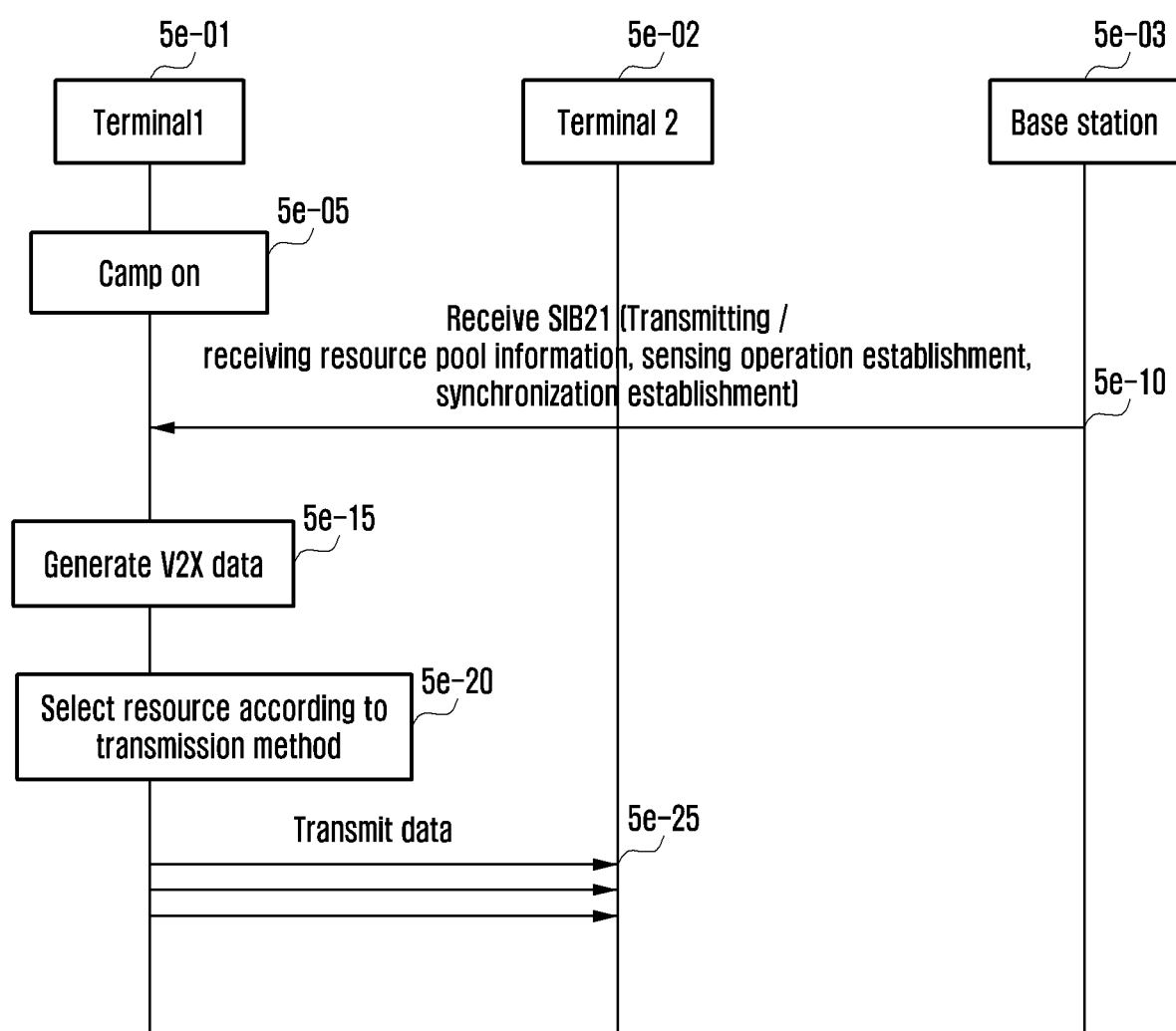
FIG. 5E is a diagram of a method for a data transmission of a V2X terminal operated in a mode 4, according to an embodiment of the present disclosure.

FIG. 5E is a diagram of a data transmission method of a V2X terminal operated in a mode 4, in accordance with an embodiment of the present disclosure.

Unlike the mode 3 in which the base station 5e-03 directly participates in resource allocation, the mode 4 operation is different from the mode 3 operation in that the terminal 5e-01 autonomously selects a resource based on the resource pool received in advance through the system information and transmits the data. In the V2X communication, the base station 5e-03 allocates various kinds of resource pools (V2V resource pool, V2P resource pool) for the terminal 5e-01. The resource pool includes a resource pool for autonomously selecting an available resource pool after a terminal senses resources used by nearby terminals, and a resource pool in which a terminal randomly selects resources from a resource pool established in advance, or the like.

The terminal 5e-01 that is camped at step 5e-05 receives the SIB21 from the base station 5e-03 (at step 5e-10). The system information includes resource pool information for transmission and reception, configuration information for sensing operation, information for setting synchronization, information for transmitting/receiving inter-frequency, and the like. If the data traffic for V2X is generated in the terminal 5e-01 (at step 5e-15), the terminal 5e-01 selects the resource in the time/frequency region (at step 5e-20) and transmits data to other terminals 5e-02 according to the transmission operation (dynamic allocation one-time transmission, dynamic allocation multiple transmission, sensing based one-time transmission, sensing based multiple transmission, random transmission) established in the resource pool transmitted from the base station 5e-03 through the system information (at step 5e-25).

The terminal 5e-01 supporting the LTE V2X may perform the V2X communication through the side link PC5 and the LTE uplink (UL)/downlink (DL) (i.e., resource for the side links 5c-20 and 5c-25 or a vehicle terminal-base link 5c-30). The terminal 5e-01 needs a plurality of RF chains for the reception of the LTE downlink and the side link, and the type and number of V2X services that can be received according to the number of RF chains held by the terminal 5e-01 are determined. Referring to the transmission capability of the terminal 5e-01, the terminal 5e-01 can have a plurality of RF chains or share one RF chain for LTE uplink and side link transmission. The terminal 5e-01 supporting the LTE V2X should appropriately perform the path switching or the power allocation when the LTE uplink and side link traffics are simultaneously generated, based on the following:

Case 1: Separated Tx chain for the uplink transmission and the side link transmission is present and the power limitation is present separately;

Case 2: Separated Tx chain for the uplink transmission and the side link transmission is present and the power limitation is shared; and Case 3: Power limitation is shared with Tx chain for the uplink transmission and the side link transmission.

The transmission method can be changed according to the Tx chain capability of the terminal in the above situations. In Case 1, since the uplink transmission and the side link transmission do not affect each other because they are independent of the number of Tx chains and power, they are operated independently of the priorities of LTE UL/DL and PC5 (i.e., vehicle terminal-base link 5c-30 or a resource for the side links 5c-20 and 5c-25). In case 2, the uplink transmission and the side link transmission use a separated Tx chain, but because power is shared, a method of reallocating transmission power according to priority is needed. In Case 3, both the Tx chain selection and the power reallocation should be considered according to the priorities of the LTE UL/DL and the PC5, since the uplink transmission and the side link transmission share both the Tx chain and power. In particular, when there is one Tx chain, it is necessary to define the priority in order to switch and transmit the path according to the priority of the LTE UL/DL and the PC5. In the present disclosure, in order to clearly define the priorities of the LTE UL/DL and the PC5, it is assumed that there is one RF Tx chain in Case 3. However, the operation proposed below can be extended to other cases, and can be applied, and may be applied to the Tx chain selection and the power reallocation according to the priorities of the LTE UL/DL and the PC5 described herein. In addition, the V2X operation proposed herein is based on the mode 4 operation. In the case of the mode 3, the base station 5e-03 can schedule resources to manage the LTE UL/DL and PC5 traffics that are simultaneously generated.

Figure 5F:
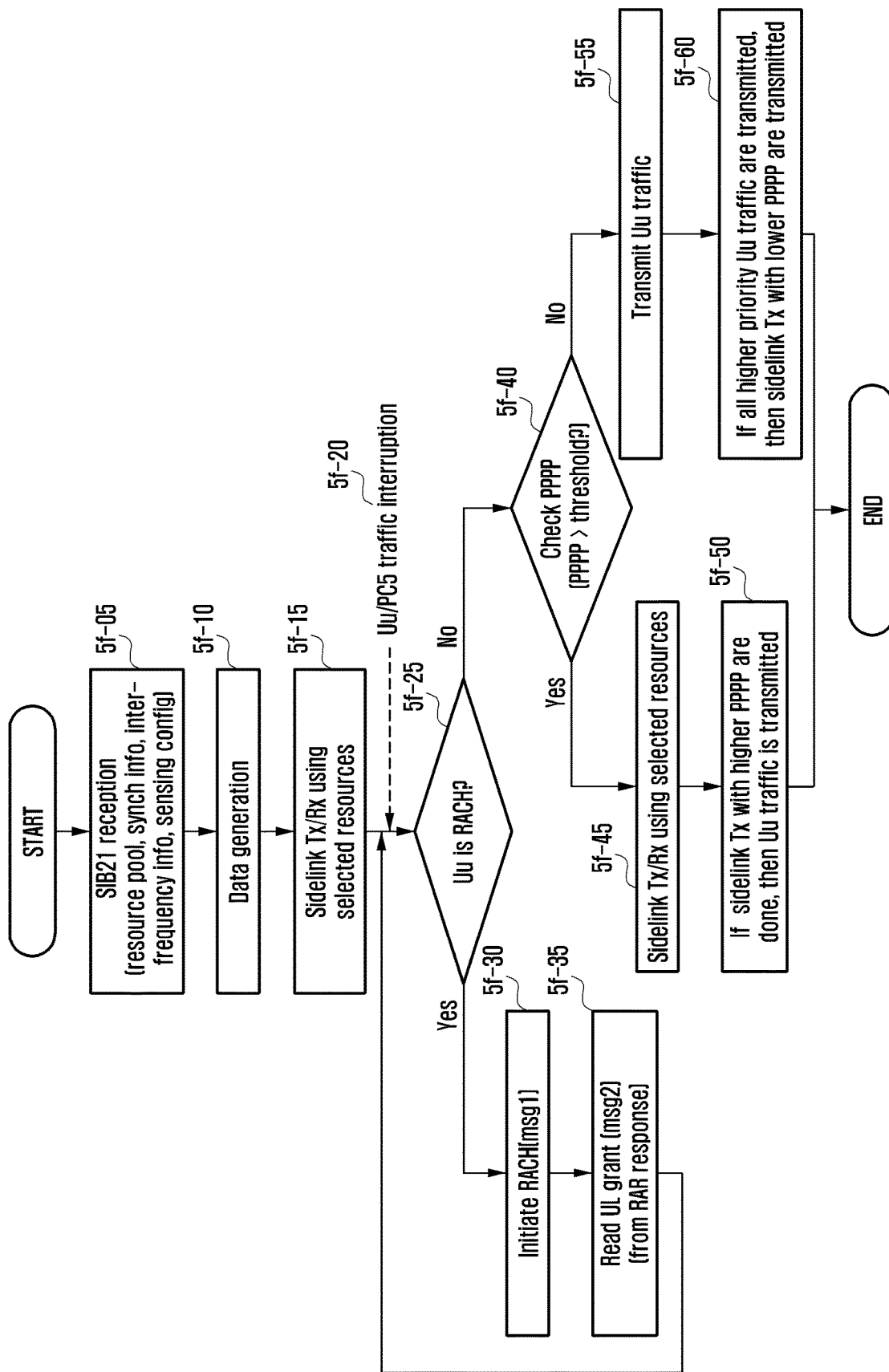
FIG. 5F is a diagram of a first operation of the terminal according to priority of Uu and PC5, according to an embodiment of the present disclosure.

FIG. 5F is a flowchart of a first operation of the terminal according to priority of LTE UL/DL and PC5 (i.e., vehicle terminal-base link 5c-30 or a resource for the side links 5c-20 and 5c-25), in accordance with an embodiment of the present disclosure.

The terminal supporting LTE V2X receives the SIB21 from the base station (at step 5f-05). The system information includes resource pool information for transmission and reception, configuration information for sensing operation, information for setting synchronization, information for transmitting/receiving inter-frequency, and the like. If the data traffic for the V2X is generated in the terminal (at step 5f-10), the terminal selects the resources in the time/frequency region in the side link transmission resource pool and transmits data to other terminals, according to the transmission operation (dynamic allocation, sensing based transmission, random transmission) established in the resource pools transmitted through the system information of the base station (at step 5f-15). When the transmission for the uplink and the transmission for the side link are simultaneously generated in the terminal, that is, when the LTE UL/DL transmission and the PC5 transmission for the V2X side link that are required for the existing LTE uplink, the terminal is operated according to the predetermined priority. In the present disclosure, the priority of the Uu and PC5 transmission of the terminal supporting the LTE V2X is defined as follows.

1. Uplink transmission when the random access is generated.
2. Sidelink transmission having high priority (the side link traffic of the PPPP larger than the predetermined PPPP threshold value).
3. Uplink transmission other than the random access.
4. Sidelink transmission having low priority (the side link traffic of the PPPP smaller than the predetermined PPPP threshold value).

Based on the priority of the LTE UL/DL and PC5 transmissions, it is checked whether there is a random access among the Uu and PC5 traffics generated simultaneously (at step 5f-25). If the LTE UL/DL traffic is random access, the terminal performs the random access through the LTE UL/DL regardless of the PPPP. The random access serves to maintain the synchronization and RRC connection for the LTE uplink/downlink transmission and reception, and if the random access is not performed, the entire operation of the LTE uplink/downlink transmission/reception is not performed smoothly, so it should be operated at the highest priority.

The terminal transmits a preamble corresponding to the preamble ID provided from the base station or the randomly selected preamble ID to the cell (at step 5f-30). After a certain number of subframes have passed after the preamble is transmitted, the terminal monitors whether a RAR is transmitted from the cell. The time period in which the monitoring is performed is referred to as a RAR window. If the RAR is received for the specific time (at step 5f-35), the terminal completes the random access procedure, again confirms whether there is interference between the LTE UL/DL and PC5 transmission, and then repeats the operation. The RAP may be completed after the transmission of msg1 in the uplink transmission view. That is, the operation may be made without performing step 5f-35.

In step 5f-40, the terminal compares the PPPP of the V2X side link traffic with the preset PPPP threshold. The PPPP threshold value may be received by the system information of the base station or the RRC message or may be a value preset in the terminal. If the PPPP of the generated V2X side link traffic is greater than the threshold value, the terminal performs the V2X side link (PC5) transmission (at step 5f-45). If the V2X side link transmission is completed, the terminal performs the LTE uplink transmission (at step 5f-50). This is because the V2X transmission having high priority is overall associated with safety and has low latency requirements. If the PPPP of the V2X side link traffic generated in step 5f-40 is smaller than the threshold value, the terminal performs the LTE uplink transmission (at step 5f-55). If the uplink transmission is completed, the V2X side link transmission is performed (at step 5f-60).

Figure 5G:
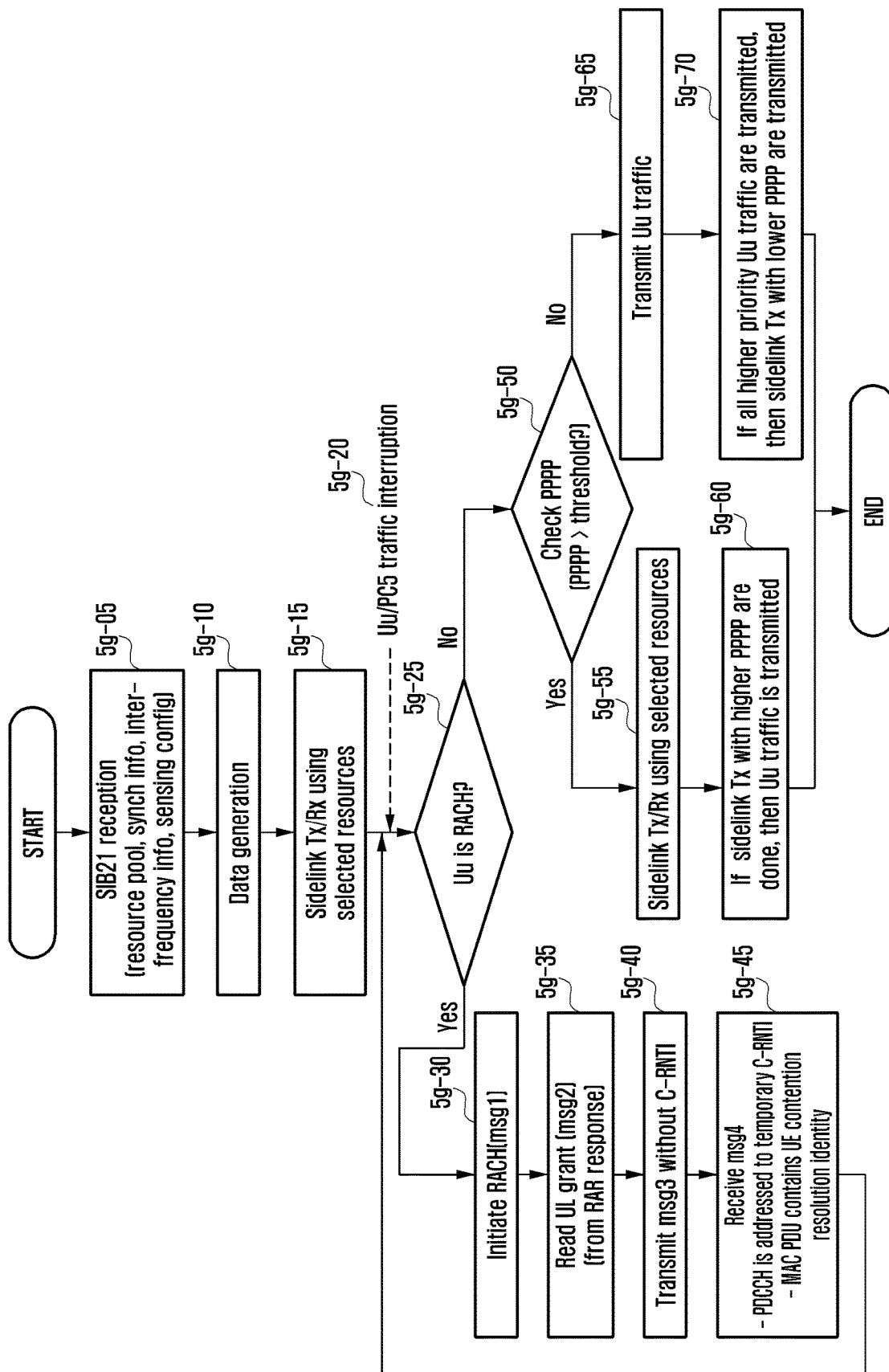
FIG. 5G is a diagram of a first operation of the terminal according to priority of Uu and PC5, according to an embodiment of the present disclosure.

FIG. 5G is a flowchart of a second operation of the terminal according to priority of LTE UL/DL and PC5, in accordance with an embodiment of the present disclosure.

The terminal supporting LTE V2X receives the SIB21 from the base station (at step 5g-05). The system information includes resource pool information for transmission and reception, configuration information for sensing operation, information for setting synchronization, information for transmitting/receiving inter-frequency, and the like. If the data traffic for the V2X is generated in the terminal (at step 5g-10), the terminal selects the resources in the time/frequency region in the side link transmission resource pool and transmits data to other terminals, according to the transmission operation (dynamic allocation, sensing based transmission, random transmission) established in the resource pools transmitted through the system information of the base station (at step 5g-15). When the transmission for the uplink and the transmission for the side link are simultaneously generated in the terminal, that is, when the LTE UL/DL transmission and the PC5 transmission for the V2X side link that are required for the existing LTE uplink, the terminal is operated according to the predetermined priority. The priority of the LTE UL/DL and PC5 transmission of the terminal supporting the LTE V2X is defined as follows.

1. Uplink transmission when the random access is generated.
2. Sidelink transmission having high priority (side link traffic of PPPP larger than the predetermined PPPP threshold value).
3. Uplink transmission other than the random access.
4. Sidelink transmission having low priority (the side link traffic of the PPPP smaller than the predetermined PPPP threshold value).

Based on the priority of the LTE UL/DL and PC5 transmissions, it is checked whether there is a random access among the LTE UL/DL and PC5 traffics generated simultaneously (at step 5g-25). If the LTE UL/DL traffic is random access, the terminal performs the random access through the LTE UL/DL regardless of the PPPP. The random access serves to maintain the synchronization and RRC connection for the LTE UL/DL transmission and reception, and if the random access is not performed, the entire operation of the LTE UL/DL transmission/reception is not performed smoothly, so it should be operated at the highest priority. The terminal transmits a preamble corresponding to the preamble ID provided from the base station or the randomly selected preamble ID to the cell (at step 5g-30). After a certain number of subframes have passed after the preamble is transmitted, the terminal monitors whether a RAR is transmitted from the cell. The time period in which the monitoring is performed is referred to as a RAR window. If the RAR is received for the specific time (at step 5g-35), the terminal generates the RRC message (msg3) and transmits the generated RRC message to the base station (at step 5g-40).

Upon receiving the PDCCH corresponding to the msg4 from the base station, the terminal terminates the RAP (at step 5g-45). The PDCCH is transmitted as a temporary C-RNTI value, and the received MAC PDU includes the UE contention resolution identity information in the MAC CE. The terminal completes the RAP, again confirms whether there is the interference between the LTE UL/DL and PC5 transmissions, and thereafter repeats the operation. Since step 5g-45 is associated with the reception of the msg4 in the RAP, the terminal may omit step 5g-45. That is, after the msg3 transmission, the terminal may complete the random access transmission and proceed to the next step.

In step 5g-50, the terminal compares the PPPP of the V2X side link traffic with the preset PPPP threshold. The PPPP threshold value may be received by the system information of the base station or the RRC message or may be a value preset in the terminal. If the PPPP of the generated V2X side link traffic is greater than the threshold value, the terminal performs the V2X side link (PC5) transmission (at step 5g-55). If the V2X side link transmission is completed, the terminal performs the LTE uplink transmission (at step 5g-60). This is because the V2X transmission having high priority is overall associated with safety and has low latency requirements. If the PPPP of the V2X side link traffic generated in step 5g-50 is smaller than the threshold value, the terminal performs the LTE UL/DL transmission (at step 5g-65). If the LTE UL/DL is completed, the V2X side link transmission is performed (at step 5g-70).

Figure 5H:
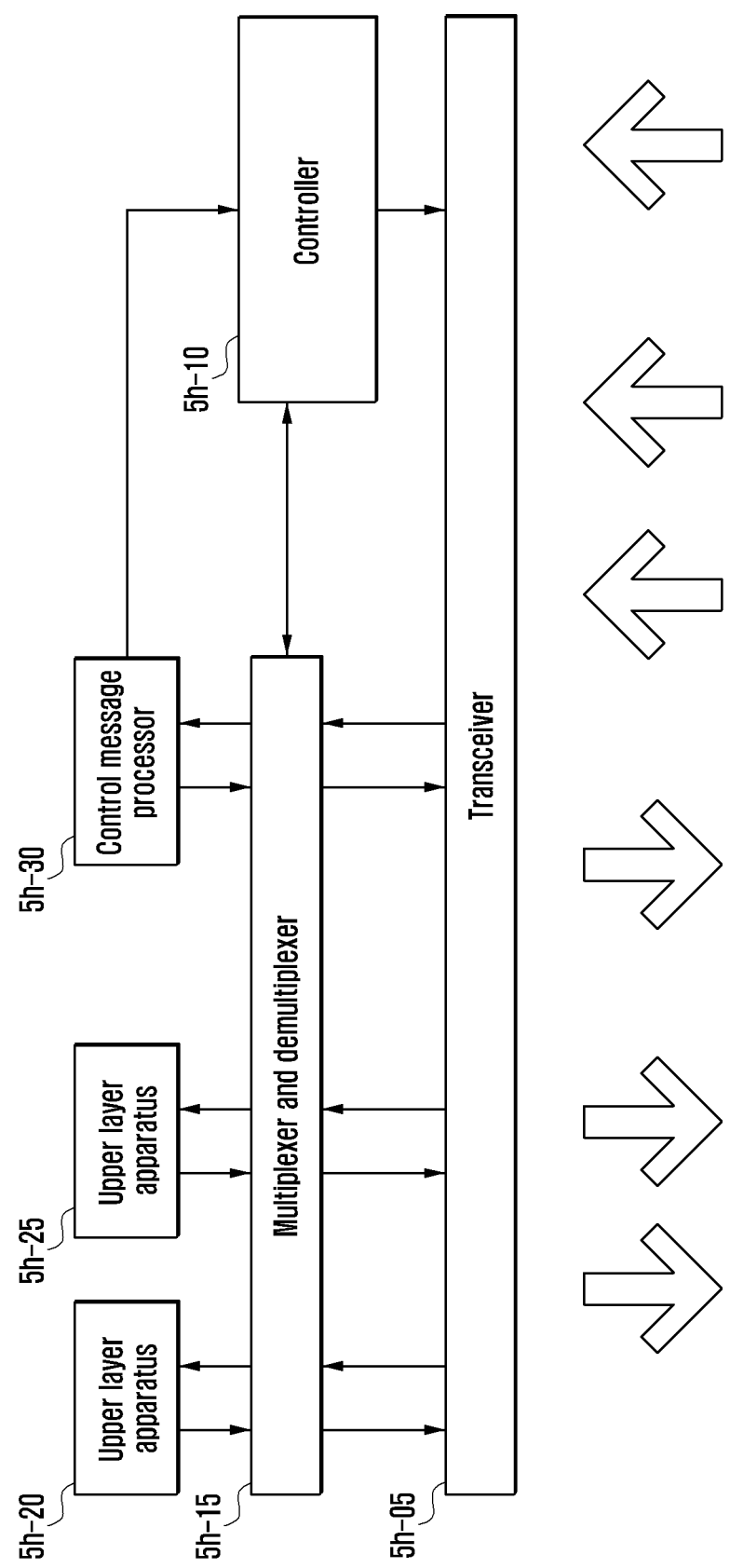
FIG. 5H is a block diagram of the terminal, according to an embodiment of the present disclosure.

FIG. 5H is a diagram of the terminal, according to the embodiment of the present disclosure.

As shown in FIG. 5H, the terminal according to the embodiment of the present disclosure includes a transceiver 5h-05, a controller 5h-10, a multiplexer and demultiplexer 5h-15, various upper layer processors 5h-20 and 5h-25, and a control message processor 5h-30.

The transceiver 5h-05 receives data and a predetermined control signal through a forward channel of the serving cell and transmits the data and the predetermined control signal through a the reverse channel. When a plurality of serving cells are configured, the transceiver 5h-05 transmits and receives data and a control signal through the plurality of carriers. The multiplexer and demultiplexer 5h-15 serves to multiplex data generated from the upper layer processors 5h-20 and 5h-25 or the control message processor 5h-30 or demultiplex data received by the transceiver 5h-05 and transmit the data to the appropriate upper layer processors 5h-20 and 5h-25 or the control message processor 5h-30. The control message processor 5h-30 transmits and receives a control message from the base station and takes necessary actions. This includes the function of processing the RRC message and the control messages such as the MAC CE, and includes reporting of the channel busy ratio (CBR) measurement value and receiving the RRC messages for the resource pool and the terminal operation. The upper layer processors 5h-20 and 5h-25 mean the DRB apparatus and may be configured for each service. The higher layer processors 5h-20 and 5h-25 process data generated from user services such as an FTP or a VoIP and transfer the processed data to the multiplexer and demultiplexer 5h-15 or process the data transferred from the multiplexer and demultiplexer 5h-15 and transfer the processed data to service application of the higher layer. The controller 5h-10 confirms scheduling commands, for example, reverse grants controls received through the transceiver 5h-05 to control the transceiver 5h-05 and the multiplexer and demultiplexer 5h-15 to perform the reverse transmission by an appropriate transmission resource at an appropriate time. It is described above that the terminal is configured of a plurality of blocks and each block performs different functions, the controller 5h-10, however, may also perform the function performed by the demultiplexer 5h-15.

Figure 5I:
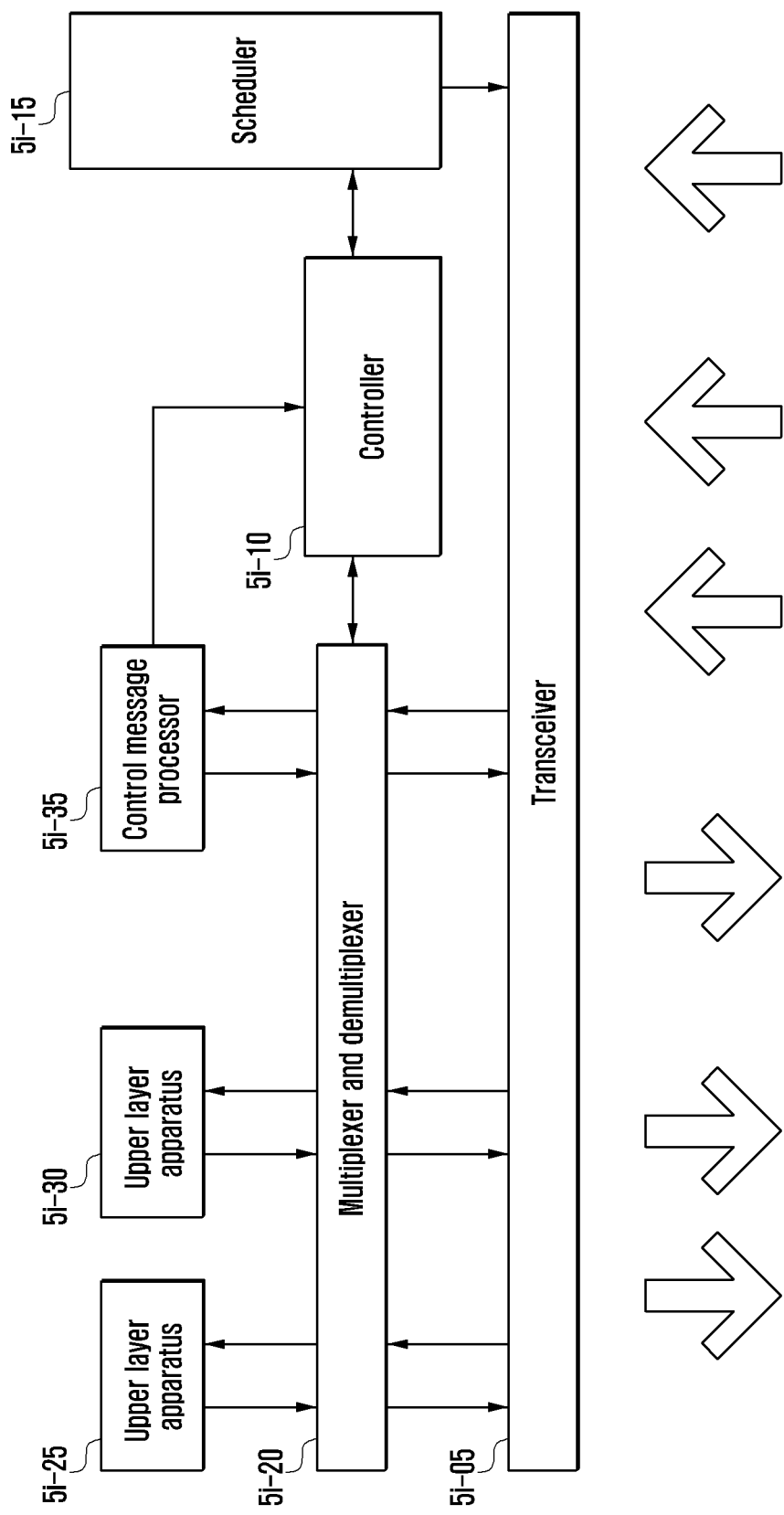
FIG. 5I is a block diagram of the base station, according to an embodiment of the present disclosure.

FIG. 5I is a diagram of the base station, according to the embodiment of the present disclosure.

The base station apparatus of FIG. 5I includes a transceiver 5i-05, a controller 5i-10, a multiplexer and demultiplexer 5i-20, a control message processor 5i-35, various upper layer processors 5i-25 and 5i-30, and a scheduler 5i-15.

The transceiver 5i-05 transmits data and a predetermined control signal through a forward carrier and receives the data and the predetermined control signal through a reverse carrier. When a plurality of carriers are configured, the transceiver 5i-05 transmits and receives the data and the control signal through the plurality of carriers. The multiplexer and demultiplexer 5i-20 serves to multiplex data generated from the upper layer processors 5i-25 and 5i-30 or the control message processor 5i-35 or demultiplex data received by the transceiver 5i-05 and transmit the data to the appropriate upper layer processors 5i-25 and 5i-30 or the control message processor 5i-35 or the controller 5i-10.

The control message processor 5i-35 receives the instruction of the controller 5i-10, generates a message to be transmitted to the terminal, and transmits the generated message to the lower layer. The upper layer processors 5i-25 and 5i-30 may be configured for each terminal and each service and processes data generated from user services such as FTP and VoIP and transmits the processed data to the multiplexer and demultiplexer 5i-20 or processes data transmitted from the multiplexer and demultiplexer 5i-20 and transmits the processed data to service applications of the upper layer.

The scheduler 5i-15 allocates a transmission resource to the terminal at appropriate timing in consideration of the buffer status and the channel status of the terminal, the active time of the terminal, etc. and allows the transceiver to process a signal transmitted from the terminal or performs a process to transmit a signal to the terminal.

The present disclosure has the right of the following claims.

Priority determination and operation of uplink (Uu) and side link (PC5) transmission for terminals supporting both LTE and V2X.

1. A method for setting, by a terminal, a priority (PPPP) threshold of V2X side-link traffic.

A method for receiving the above priority (PPPP) threshold value in system information of the base station or in an RRC message;

A method of storing the priority (PPPP) threshold value as a preset value by the terminal;

2. A method in which a terminal checks the capability of the terminal, such as the number of RF chains and power control, and operates according to priority.

A method of differently setting an operation at the time of collision between the uplink and the side link differently according to the terminal capability;

A method of performing a power control according to priority when the number of transmission RF chains is sufficient for each link;

A method of switching the transmission of the uplink and the side link according to the priority when the number of transmission RF chains is insufficient;

3. A method for performing an operation according to priority when there is a collision in time/frequency between uplink and side link.

A method of setting random access as the highest priority in the priority order;

A method for transmitting, as second priority, a V2X side link transmission of priority higher than the PPPP threshold in the priority;

A method for transmitting, as third priority, uplink transmissions other than the random access in the priority;

A method for transmitting, as fourth priority, a V2X side link transmission of priority lower than the PPPP threshold in the priority;

A first operating method for including only the msg1 transmission in the highest priority random access procedure;

A method for receiving a msg2 for the first operation;

A second operation method for including both of the msg1 and msg3 transmissions in the highest priority random access procedure;

A method for receiving a msg4 for the second operation;

4. A method in which the terminal is basically operated in a mode 4.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method performed by a terminal in a wireless communication system, the method comprising:
   receiving, from a first base station, a first radio resource control (RRC) release message in an RRC connected state, the first RRC release message including first information configuring an RRC inactive state and second information associated with a paging area;
   receiving, from a second base station, a system information block 1 (SIB1) in the RRC inactive state;
   identifying a cell that does not belong to the paging area based on the SIB1;
   transmitting, to the second base station, an RRC resume request message to resume an RRC connection from the RRC inactive state, the RRC resume request message including a cause value for updating the paging area; and
   receiving, from the second base station, a second RRC release message for the RRC resume request message, the second RRC release message including third information associated with an updated paging area.

2. The method of claim 1, wherein the RRC resume request message further includes a message authentication code for integrity (MAC-I) associated with security information of the terminal, the MAC-I being generated based on a user equipment (UE) context included in the first RRC release message.

3. The method of claim 1, wherein the first information configuring the RRC inactive state includes a resume identity.

4. The method of claim 1, further comprising:
   identifying whether the SIB1 includes fourth information associated with a support for an RRC inactive mode of the second base station,
   wherein the RRC resume request message is transmitted to the second base station, in case that the SIB1 includes the fourth information, and
   wherein an RRC connection request message to establish an RRC connection is transmitted to the second base station, in case that the SIB1 does not include the fourth information.

5. The method of claim 1, wherein the second RRC release message is received as a response to the RRC resume request message.

6. A method performed by a second base station in a wireless communication system, the method comprising:
   transmitting, to a terminal in a radio resource control (RRC) inactive state and configured with a paging area, a system information block 1 (SIB1);
   receiving, from the terminal, an RRC resume request message to resume an RRC connection from the RRC inactive state, wherein the RRC resume request message includes a cause value for updating the paging area in case that a cell does not belong to the paging area; and
   transmitting, to the terminal, an RRC release message for the RRC resume request message, the RRC release message including first information associated with an updated paging area.

7. The method of claim 6, wherein the RRC resume request message further includes a message authentication code for integrity (MAC-I) associated with security information of the terminal, the MAC-I being generated based on a user equipment (UE) context configured for the terminal in the RRC inactive state.

8. The method of claim 6, wherein the RRC inactive state is configured for the terminal with a resume identity.

9. The method of claim 6, wherein the RRC resume request message is received from the terminal, in case that the SIB1 includes second information associated with a support for an RRC inactive mode of the second base station, and
   wherein an RRC connection request message to establish an RRC connection is received from the terminal, in case that the SIB1 does not include the second information.

10. The method of claim 6, wherein the RRC release message is transmitted as a response to the RRC resume request message.

11. A terminal in a wireless communication system, the terminal comprising:
   a transceiver configured to transmit and receive a signal; and
   a controller configured to:
      receive, from a first base station, a first radio resource control (RRC) release message in an RRC connected state, the first RRC release message including first information configuring an RRC inactive state and second information associated with a paging area,
      receive, from a second base station, a system information block 1 (SIB1) in the RRC inactive state,
      identify a cell that does not belong to the paging area based on the SIB1,
      transmit, to the second base station, an RRC resume request message to resume an RRC connection from the RRC inactive state, the RRC resume request message including a cause value for updating the paging area, and
      receive, from the second base station, a second RRC release message for the RRC resume request message, the second RRC release message including third information associated with an updated paging area.

12. The terminal of claim 11, wherein the RRC resume request message further includes a message authentication code for integrity (MAC-I) associated with security information of the terminal, the MAC-I being generated based on a user equipment (UE) context included in the first RRC release message.

13. The terminal of claim 11, wherein the first information configuring the RRC inactive state includes a resume identity.

14. The terminal of claim 11, wherein the controller is further configured to:
identify whether the SIB1 includes fourth information associated with a support for an RRC inactive mode of the second base station,
wherein the RRC resume request message is transmitted to the second base station, in case that the SIB1 includes the fourth information, and
wherein an RRC connection request message to establish an RRC connection is transmitted to the second base station, in case that the SIB1 does not include the fourth information.

15. The terminal of claim 11, wherein the second RRC release message is received as a response to the RRC resume request message.

16. A second base station in a wireless communication system, the second base station comprising:
a transceiver configured to transmit and receive a signal; and
a controller configured to:
transmit, to a terminal in a radio resource control (RRC) inactive state and configured with a paging area, a system information block 1 (SIB1),
receive, from the terminal, an RRC resume request message to resume an RRC connection from the RRC inactive state, wherein the RRC resume request message includes a cause value for updating the paging area in case that a cell does not belong to the paging area, and
transmitting, to the terminal, an RRC release message for the RRC resume request message, the RRC release message including first information associated with an updated paging area.

17. The second base station of claim 16, wherein the RRC resume request message further includes a message authentication code for integrity (MAC-I) associated with security information of the terminal, the MAC-I being generated based on a user equipment (UE) context configured for the terminal in the RRC inactive state.

18. The second base station of claim 16, wherein the RRC inactive state is configured for the terminal with a resume identity.

19. The second base station of claim 16, wherein the RRC resume request message is received from the terminal, in case that the SIB includes second information associated with a support for an RRC inactive mode of the second base station, and
wherein an RRC connection request message to establish an RRC connection is received from the terminal, in case that the SIB1 does not include the second information.

20. The second base station of claim 16, wherein the RRC release message is transmitted as a response to the RRC resume request message.

* * * * *